US010834290B2

(12) United States Patent
Holman et al.

(10) Patent No.: US 10,834,290 B2
(45) Date of Patent: *Nov. 10, 2020

(54) METHODS, SYSTEMS, AND DEVICES FOR DELIVERING IMAGE DATA FROM CAPTURED IMAGES TO DEVICES

(71) Applicant: Elwha LLC, Bellevue, WA (US)

(72) Inventors: Pablos Holman, Seattle, WA (US); Roderick A. Hyde, Redmond, WA (US); Royce A. Levien, Lexington, MA (US); Richard T. Lord, Seattle, WA (US); Robert W. Lord, Seattle, WA (US); Mark A. Malamud, Seattle, WA (US)

(73) Assignee: Elwha LLC, Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/108,107

(22) Filed: Dec. 16, 2013

(65) Prior Publication Data
US 2015/0104012 A1 Apr. 16, 2015

Related U.S. Application Data

(63) Continuation of application No. 14/108,077, filed on Dec. 16, 2013, now abandoned, and a
(Continued)

(51) Int. Cl.
G06Q 50/18 (2012.01)
H04N 1/44 (2006.01)
(Continued)

(52) U.S. Cl.
CPC ....... *H04N 1/4486* (2013.01); *G06F 21/6209* (2013.01); *G06F 21/6245* (2013.01);
(Continued)

(58) Field of Classification Search
CPC ............... G06F 21/105; G06F 21/6245; G06F 21/6209; G06Q 50/184; H04W 12/02;
(Continued)

(56) References Cited

U.S. PATENT DOCUMENTS 5,644,727 A 7/1997 Atkins
5,862,217 A 1/1999 Steinberg et al.
(Continued)

FOREIGN PATENT DOCUMENTS

JP 2009188922 A 8/2009
JP 2009288245 A 12/2009
WO WO 2014/150073 A2 9/2014

OTHER PUBLICATIONS

Wikipedia Entry for "HTTPS" archived on Dec. 21, 2005. https://web.archive.org/web/20051221014406/https://en.wikipedia.org/wiki/ HTTPS.*
(Continued)

*Primary Examiner* — Matthew T Henning

(57) ABSTRACT

Computationally implemented methods and systems include acquiring a device-based encrypted image that is an image that has previously been encrypted through use of a particular device code associated with an image capture device configured to capture the image, wherein the image includes a representation of a feature of an entity, decrypting the device-based encrypted image in response to an indication that the image has been approved for decryption, and creating a client-based encrypted image through encryption of the decrypted image through use of a particular client code that is associated with a client that is linked to the image capture device configured to capture the image. In addition to the foregoing, other aspects are described in the claims, drawings, and text.

29 Claims, 65 Drawing Sheets

Related U.S. Application Data continuation-in-part of application No. 14/051,213, filed on Oct. 10, 2013, now abandoned, and a continuation-in-part of application No. 14/055,471, filed on Oct. 16, 2013, now abandoned, and a continuation-in-part of application No. 14/055,543, filed on Oct. 16, 2013, now abandoned, and a continuation-in-part of application No. 14/084,254, filed on Nov. 19, 2013, now abandoned, and a continuation-in-part of application No. 14/084,579, filed on Nov. 19, 2013, now abandoned, and a continuation-in-part of application No. 14/084,581, filed on Nov. 19, 2013, now abandoned, and a continuation-in-part of application No. 14/084,591, filed on Nov. 19, 2013, now abandoned.

(51) Int. Cl.
   *H04W 12/00*     (2009.01)
   *H04W 12/02*     (2009.01)
   *G06F 21/62*     (2013.01)
   *H04N 13/30*     (2018.01)
   *G06K 9/00*      (2006.01)

(52) U.S. Cl.
   CPC ........ *G06Q 50/184* (2013.01); *H04W 12/005* (2019.01); *H04W 12/00503* (2019.01); *H04W 12/00504* (2019.01); *H04W 12/00505* (2019.01); *H04W 12/02* (2013.01); *G06K 2009/00328* (2013.01); *H04N 2013/40* (2018.05)

(58) Field of Classification Search
   CPC ......... H04W 12/005; H04W 12/00503; H04W 12/00504; H04W 12/00505
   USPC .......................................................... 726/26
   See application file for complete search history.

(56) References Cited

U.S. PATENT DOCUMENTS

| | | | |
|---|---|---|---|
| 6,067,399 | A | 5/2000 | Berger |
| 6,178,243 | B1 | 1/2001 | Pomerantz et al. |
| 6,424,727 | B1 | 7/2002 | Musgrave et al. |
| 6,456,985 | B1 | 9/2002 | Ohtsuka |
| 6,526,158 | B1 | 2/2003 | Goldberg |
| 6,532,541 | B1 | 3/2003 | Chang et al. |
| 6,600,823 | B1 | 7/2003 | Hayosh |
| 6,727,935 | B1 | 4/2004 | Allen et al. |
| 6,765,608 | B1 | 7/2004 | Himeda et al. |
| 6,775,775 | B1 | 8/2004 | Yoshiura et al. |
| 6,968,058 | B1 | 11/2005 | Kondoh et al. |
| 7,013,288 | B1 | 3/2006 | Reifel et al. |
| 7,036,019 | B1 | 4/2006 | Saito |
| 7,117,519 | B1 | 10/2006 | Anderson et al. |
| 7,603,321 | B2 | 10/2009 | Gurvey |
| 7,663,670 | B1 | 2/2010 | Oroubadian |
| 7,864,218 | B2 | 1/2011 | Kusaka et al. |
| 8,085,995 | B2 | 12/2011 | Yagnik |
| 8,126,190 | B2 | 2/2012 | Jung et al. |
| 8,301,505 | B2 | 10/2012 | Farouki et al. |
| 8,302,169 | B1 | 10/2012 | Presotto et al. |
| 8,391,825 | B2 | 3/2013 | Arseneau et al. |
| 8,412,602 | B2 | 4/2013 | Paz-Pujalt |
| 8,468,097 | B2 | 6/2013 | Alrabady et al. |
| 8,497,912 | B2 | 7/2013 | Wun |
| 8,620,800 | B1 | 12/2013 | Micaelian et al. |
| 8,751,800 | B1 | 6/2014 | Dorwin |
| 8,824,861 | B2 | 9/2014 | Gentile et al. |
| 8,831,299 | B2 | 9/2014 | Kurtz et al. |
| 8,854,465 | B1 | 10/2014 | McIntyre |
| 8,898,468 | B2 | 11/2014 | Reddy et al. |
| 9,065,979 | B2 | 6/2015 | Cohen et al. |
| 9,083,937 | B1 | 7/2015 | Oliphant |
| 9,268,792 | B2 | 2/2016 | Morrison et al. |
| 9,360,990 | B1 | 6/2016 | Emigh et al. |
| 9,363,409 | B2 | 6/2016 | Rhoads et al. |
| 9,373,076 | B1 | 6/2016 | Appelman et al. |
| 9,426,345 | B1 | 8/2016 | Turner, Jr. et al. |
| 9,621,628 | B1 | 4/2017 | Benton |
| 10,346,624 | B2 * | 7/2019 | Holman ............... G06Q 50/184 |
| 2001/0052037 | A1 | 12/2001 | Terasaki et al. |
| 2002/0001395 | A1 | 1/2002 | Davis et al. |
| 2002/0038076 | A1 | 3/2002 | Sheehan et al. |
| 2002/0039479 | A1 | 4/2002 | Watanabe et al. |
| 2002/0057915 | A1 | 5/2002 | Mann |
| 2002/0065779 | A1 * | 5/2002 | Dutta ................... G06Q 20/102 705/57 |
| 2002/0088000 | A1 | 7/2002 | Morris |
| 2002/0114452 | A1 | 8/2002 | Hamilton |
| 2002/0120589 | A1 | 8/2002 | Aoki |
| 2002/0164048 | A1 | 11/2002 | Bruckstein et al. |
| 2002/0184538 | A1 | 12/2002 | Sugimura et al. |
| 2003/0037138 | A1 | 2/2003 | Brown et al. |
| 2003/0069788 | A1 | 4/2003 | Han |
| 2003/0098776 | A1 | 5/2003 | Friedli |
| 2003/0179407 | A1 | 9/2003 | Herr |
| 2003/0231769 | A1 | 12/2003 | Bolle et al. |
| 2004/0022444 | A1 | 2/2004 | Rhoads |
| 2004/0075749 | A1 | 4/2004 | Kondo et al. |
| 2004/0096002 | A1 | 5/2004 | Zdepski et al. |
| 2004/0120522 | A1 | 6/2004 | Takeda et al. |
| 2004/0152485 | A1 | 8/2004 | Deeds |
| 2004/0162981 | A1 | 8/2004 | Wong |
| 2004/0201751 | A1 * | 10/2004 | Bell ...................... H04N 5/772 348/231.99 |
| 2004/0202382 | A1 | 10/2004 | Pilu |
| 2004/0204238 | A1 | 10/2004 | Aoki |
| 2004/0204985 | A1 | 10/2004 | Gibson et al. |
| 2004/0227634 | A1 | 11/2004 | Caulfield et al. |
| 2004/0249709 | A1 | 12/2004 | Donovan et al. |
| 2004/0260614 | A1 | 12/2004 | Taratino et al. |
| 2005/0008226 | A1 | 1/2005 | Aoki |
| 2005/0010776 | A1 | 1/2005 | Kenen et al. |
| 2005/0049971 | A1 | 3/2005 | Bettinger |
| 2005/0060545 | A1 | 3/2005 | Mont et al. |
| 2005/0066187 | A1 * | 3/2005 | Peinado ................. G06F 21/10 713/193 |
| 2005/0093980 | A1 | 5/2005 | Nonaka et al. |
| 2005/0096979 | A1 | 5/2005 | Koningstein |
| 2005/0111660 | A1 | 5/2005 | Hosoda |
| 2005/0180573 | A1 | 8/2005 | Pelly et al. |
| 2005/0196013 | A1 | 9/2005 | Rhoads |
| 2005/0206960 | A1 | 9/2005 | Shibata |
| 2005/0223045 | A1 | 10/2005 | Funahashi et al. |
| 2005/0226413 | A1 | 10/2005 | Wada |
| 2005/0243265 | A1 | 11/2005 | Winlow et al. |
| 2005/0258246 | A1 | 11/2005 | Wolff et al. |
| 2005/0262201 | A1 | 11/2005 | Rudolph et al. |
| 2005/0275720 | A1 | 12/2005 | Noguchi |
| 2006/0028558 | A1 * | 2/2006 | Sato ................... H04N 1/00281 348/211.99 |
| 2006/0044599 | A1 | 3/2006 | Lipowitz et al. |
| 2006/0075235 | A1 | 4/2006 | Renkis |
| 2006/0104483 | A1 | 5/2006 | Harel et al. |
| 2006/0135233 | A1 | 6/2006 | Willis et al. |
| 2006/0170767 | A1 | 8/2006 | Brassil |
| 2006/0206911 | A1 | 9/2006 | Kim et al. |
| 2006/0287813 | A1 | 12/2006 | Quigley |
| 2007/0011186 | A1 | 1/2007 | Horner et al. |
| 2007/0040654 | A1 | 2/2007 | Lee et al. |
| 2007/0057763 | A1 | 3/2007 | Blattner et al. |
| 2007/0061267 | A1 * | 3/2007 | Saito ..................... G06Q 20/02 705/51 |
| 2007/0067626 | A1 | 3/2007 | Louis Briancon et al. |
| 2007/0086626 | A1 | 4/2007 | Mariani et al. |
| 2007/0100757 | A1 | 5/2007 | Rhoads |
| 2007/0112968 | A1 | 5/2007 | Schwab |
| 2007/0115350 | A1 | 5/2007 | Currivan et al. |
| 2007/0124249 | A1 | 5/2007 | Aerrabotu et al. |
| 2007/0153091 | A1 | 7/2007 | Watlington et al. |
| 2007/0172155 | A1 | 7/2007 | Guckenberger |

(56) References Cited

U.S. PATENT DOCUMENTS

| | | |
|---|---|---|
| 2007/0174321 A1 | 7/2007 | Viikari et al. |
| 2007/0192872 A1 | 8/2007 | Rhoads et al. |
| 2007/0255962 A1 | 11/2007 | Lu et al. |
| 2007/0291155 A1 | 12/2007 | Kawaguchi et al. |
| 2007/0296817 A1 | 12/2007 | Ebrahimi et al. |
| 2007/0297610 A1 | 12/2007 | Chen et al. |
| 2008/0002861 A1 | 1/2008 | Yano et al. |
| 2008/0031446 A1 | 2/2008 | Suga |
| 2008/0059255 A1 | 3/2008 | Birkby |
| 2008/0071770 A1 | 3/2008 | Schloter et al. |
| 2008/0117295 A1 | 5/2008 | Ebrahimi et al. |
| 2008/0181533 A1 | 7/2008 | Jung et al. |
| 2008/0195664 A1 | 8/2008 | Maharajh et al. |
| 2008/0222127 A1 | 9/2008 | Bergin |
| 2008/0228821 A1 | 9/2008 | Mick et al. |
| 2008/0239096 A1* | 10/2008 | Shasa ............... H04N 1/00244 348/231.3 |
| 2008/0267403 A1 | 10/2008 | Boult |
| 2008/0270802 A1 | 10/2008 | Ashley et al. |
| 2008/0275763 A1 | 11/2008 | Tran et al. |
| 2008/0297586 A1 | 12/2008 | Kurtz et al. |
| 2008/0297587 A1 | 12/2008 | Kurtz et al. |
| 2008/0297588 A1 | 12/2008 | Kurtz et al. |
| 2008/0297589 A1 | 12/2008 | Kurtz et al. |
| 2008/0298571 A1 | 12/2008 | Kurtz et al. |
| 2008/0313226 A1 | 12/2008 | Bowden et al. |
| 2009/0021591 A1* | 1/2009 | Sako ............... H04N 1/00339 348/211.2 |
| 2009/0037515 A1 | 2/2009 | Zapata et al. |
| 2009/0037949 A1 | 2/2009 | Birch |
| 2009/0041311 A1 | 2/2009 | Hundley |
| 2009/0070206 A1 | 3/2009 | Sengamedu, Sr. |
| 2009/0122149 A1 | 5/2009 | Ishii |
| 2009/0132435 A1 | 5/2009 | Titus et al. |
| 2009/0150210 A1 | 6/2009 | Athsani et al. |
| 2009/0193055 A1 | 7/2009 | Kuberka et al. |
| 2009/0203361 A1 | 8/2009 | Huang et al. |
| 2009/0216769 A1* | 8/2009 | Bellwood ............... G06F 21/10 |
| 2009/0245512 A1 | 10/2009 | Masui et al. |
| 2009/0249443 A1 | 10/2009 | Fitzgerald et al. |
| 2009/0254572 A1 | 10/2009 | Redlich et al. |
| 2009/0257589 A1 | 10/2009 | Yokota et al. |
| 2009/0285506 A1 | 11/2009 | Benson et al. |
| 2009/0296940 A1 | 12/2009 | Moroney et al. |
| 2010/0002084 A1 | 1/2010 | Hattori et al. |
| 2010/0024045 A1 | 1/2010 | Sastry et al. |
| 2010/0052852 A1 | 3/2010 | Mohanty |
| 2010/0082990 A1 | 4/2010 | Grigorovitch |
| 2010/0088686 A1 | 4/2010 | Langworthy et al. |
| 2010/0094878 A1 | 4/2010 | Soroca et al. |
| 2010/0110095 A1 | 5/2010 | Sekiguchi et al. |
| 2010/0124363 A1 | 5/2010 | Ek et al. |
| 2010/0149782 A1 | 6/2010 | Smith, Jr. et al. |
| 2010/0163687 A1 | 7/2010 | Brand et al. |
| 2010/0182447 A1 | 7/2010 | Namba et al. |
| 2010/0201498 A1 | 8/2010 | Griffin |
| 2010/0259644 A1* | 10/2010 | Lee ............... H04N 5/772 348/231.5 |
| 2010/0278453 A1 | 11/2010 | King |
| 2010/0287048 A1 | 11/2010 | Ramer et al. |
| 2010/0289920 A1 | 11/2010 | Mizuno |
| 2010/0316222 A1 | 12/2010 | Inami et al. |
| 2010/0317420 A1 | 12/2010 | Hoffberg |
| 2010/0323608 A1 | 12/2010 | Sanhedrai et al. |
| 2010/0333152 A1 | 12/2010 | Redmann et al. |
| 2011/0019003 A1 | 1/2011 | Asa et al. |
| 2011/0019816 A1 | 1/2011 | Inami et al. |
| 2011/0035275 A1 | 2/2011 | Frankel et al. |
| 2011/0082902 A1 | 4/2011 | Rottler et al. |
| 2011/0096922 A1 | 4/2011 | Oya |
| 2011/0109792 A1 | 5/2011 | Montag |
| 2011/0129120 A1 | 6/2011 | Chan |
| 2011/0138183 A1 | 6/2011 | Reddy et al. |
| 2011/0145574 A1 | 6/2011 | Ju et al. |
| 2011/0184814 A1 | 7/2011 | Konkol et al. |
| 2011/0234829 A1 | 9/2011 | Gagvani et al. |
| 2011/0234841 A1 | 9/2011 | Akeley et al. |
| 2011/0292230 A1 | 12/2011 | Winters |
| 2011/0292231 A1 | 12/2011 | Winters |
| 2011/0317922 A1 | 12/2011 | Chertok et al. |
| 2012/0013631 A1 | 1/2012 | Hughes |
| 2012/0045095 A1 | 2/2012 | Tate et al. |
| 2012/0054029 A1 | 3/2012 | Trice et al. |
| 2012/0054838 A1 | 3/2012 | Kim et al. |
| 2012/0056546 A1 | 3/2012 | Harvey |
| 2012/0058747 A1 | 3/2012 | Yiannios et al. |
| 2012/0062932 A1 | 3/2012 | Rueby |
| 2012/0087589 A1 | 4/2012 | Chang-Tsun et al. |
| 2012/0095922 A1 | 4/2012 | Wada |
| 2012/0121084 A1 | 5/2012 | Tomlinson et al. |
| 2012/0131471 A1 | 5/2012 | Terlouw et al. |
| 2012/0154418 A1 | 6/2012 | Mikawa |
| 2012/0215811 A1 | 8/2012 | Tipper et al. |
| 2012/0233000 A1 | 9/2012 | Fisher et al. |
| 2012/0237908 A1 | 9/2012 | Fitzgerald et al. |
| 2012/0249550 A1 | 10/2012 | Akeley et al. |
| 2012/0259776 A1 | 10/2012 | Bajaj et al. |
| 2012/0317227 A1 | 12/2012 | Bettinger |
| 2012/0321143 A1 | 12/2012 | Krupka et al. |
| 2013/0067228 A1 | 3/2013 | Dewan et al. |
| 2013/0073359 A1 | 3/2013 | Caplan |
| 2013/0078962 A1 | 3/2013 | Clarke et al. |
| 2013/0088616 A1 | 4/2013 | Ingrassia, Jr. |
| 2013/0093913 A1 | 4/2013 | Okumura et al. |
| 2013/0095924 A1 | 4/2013 | Geisner et al. |
| 2013/0096873 A1 | 4/2013 | Rosengaus et al. |
| 2013/0156331 A1 | 6/2013 | Kurabayashi et al. |
| 2013/0169781 A1 | 7/2013 | Hanina et al. |
| 2013/0169853 A1 | 7/2013 | Luong |
| 2013/0182917 A1 | 7/2013 | Kritt et al. |
| 2013/0191211 A1 | 7/2013 | Nichols et al. |
| 2013/0198280 A1 | 8/2013 | Liu et al. |
| 2013/0217332 A1 | 8/2013 | Altman et al. |
| 2013/0226711 A1 | 8/2013 | Wu et al. |
| 2013/0232012 A1 | 9/2013 | Yan et al. |
| 2013/0246692 A1 | 9/2013 | Macor |
| 2013/0247220 A1 | 9/2013 | Bingell et al. |
| 2013/0262314 A1 | 10/2013 | Butler et al. |
| 2013/0262588 A1 | 10/2013 | Barak et al. |
| 2013/0269013 A1 | 10/2013 | Parry et al. |
| 2013/0275232 A1 | 10/2013 | Oh et al. |
| 2013/0283061 A1 | 10/2013 | Jeong |
| 2013/0305383 A1* | 11/2013 | Garralda ............... G06F 21/60 726/26 |
| 2013/0342699 A1 | 12/2013 | Hansen |
| 2014/0016107 A1 | 1/2014 | Coulson |
| 2014/0036088 A1 | 2/2014 | Gabriel |
| 2014/0049653 A1* | 2/2014 | Leonard ............... G06T 1/0042 348/207.1 |
| 2014/0051946 A1 | 2/2014 | Arne et al. |
| 2014/0101197 A1 | 4/2014 | Charytoniuk |
| 2014/0101456 A1 | 4/2014 | Meunier et al. |
| 2014/0112534 A1 | 4/2014 | Sako et al. |
| 2014/0122889 A1 | 5/2014 | Freund et al. |
| 2014/0139680 A1 | 5/2014 | Huang et al. |
| 2014/0140575 A1 | 5/2014 | Wolf |
| 2014/0142868 A1 | 5/2014 | Bidaud |
| 2014/0160248 A1 | 6/2014 | Pomerantz et al. |
| 2014/0160250 A1 | 6/2014 | Pomerantz et al. |
| 2014/0168272 A1 | 6/2014 | Chedeau et al. |
| 2014/0173648 A1 | 6/2014 | Ball et al. |
| 2014/0176663 A1 | 6/2014 | Cutler et al. |
| 2014/0176733 A1 | 6/2014 | Drooker et al. |
| 2014/0177830 A1 | 6/2014 | Gajek |
| 2014/0196152 A1 | 7/2014 | Ur et al. |
| 2014/0201527 A1 | 7/2014 | Krivorot |
| 2014/0201844 A1 | 7/2014 | Buck |
| 2014/0226029 A1 | 8/2014 | Matsuzawa et al. |
| 2014/0245452 A1 | 8/2014 | Hurwitz et al. |
| 2014/0247272 A1 | 9/2014 | Sako et al. |
| 2014/0263623 A1 | 9/2014 | Robison et al. |
| 2014/0278403 A1 | 9/2014 | Jacob et al. |
| 2014/0280533 A1 | 9/2014 | Chedeau et al. |
| 2014/0294293 A1 | 10/2014 | Yamamura |

(56) References Cited

U.S. PATENT DOCUMENTS

| | | | | |
|---|---|---|---|---|
| 2014/0344948 | A1* | 11/2014 | Hayato | G06F 21/6218 726/26 |
| 2014/0363143 | A1 | 12/2014 | Dharssi et al. | |
| 2015/0016799 | A1 | 1/2015 | Park et al. | |
| 2015/0032535 | A1 | 1/2015 | Li et al. | |
| 2015/0035999 | A1 | 2/2015 | Shehane et al. | |
| 2015/0049487 | A1 | 2/2015 | Connor | |
| 2015/0058229 | A1* | 2/2015 | Wiacek | G06F 21/10 705/310 |
| 2015/0104103 | A1 | 4/2015 | Candelore | |
| 2015/0113661 | A1 | 4/2015 | Mishra | |
| 2015/0113664 | A1* | 4/2015 | Aad | G06K 9/00288 726/27 |
| 2015/0169992 | A1 | 6/2015 | Ioffe et al. | |
| 2015/0178565 | A1 | 6/2015 | Rivlin et al. | |
| 2016/0171244 | A1 | 6/2016 | Ur et al. | |
| 2016/0188635 | A1 | 6/2016 | Shah et al. | |
| 2016/0232375 | A1 | 8/2016 | Loeb et al. | |
| 2017/0126630 | A1 | 5/2017 | Ekambaram et al. | |

OTHER PUBLICATIONS

PCT International Search Report; International App. No. PCT/US2014/060141; dated Jan. 16, 2015; pp. 1-4.

Gao, Yongsheng et al., "Face Recognition Using Line Edge Map," IEEE Transactions on Pattern Analysis and Machine Intelligence, vol. 24, No. 6, Jun. 2002, pp. 764-779.

Kim, Dong-Ju et al., "Face Recognition via Local Directional Pattern," International Journal of Security and Its Applications, vol. 7, No. 2, Mar. 2013, pp. 191-200.

Kodate, Kashiko et al., "Compact Parallel Optical Correlator for Face Recognition, and Its Application," Face Recognition, Kresimir Delac and Mislay Grgic (Ed.), ISBN: 978-3-902613-03-5, InTech, Available from: http://www.intechopen.com/books/face_recognition/compact_parallel_optical_correlator_for_face_recognition_and_its_application, Jun. 2007, pp. 235-249.

Krawczyk, H. et al., "HMAC-based Extract-and-Expand Key Derivation Function (HKDF)," Internet Engineering Task Force (IETF), Request for Comments: 5869, May 2010, 15 pages.

Vander Lugt, A.B., "Signal Detection by Complex Spatial Filtering," Report of Project Michigan, Institute of Science and Technology, The University of Michigan, Jul. 1963, 56 pages.

"Liquidated damages"; Wikipedia; bearing a date of May 4, 2011; printed on Jan. 12, 2017; pp. 1-2 located at: http://en.wikipedia.org/wiki/Liquidated_damages.

PCT International Search Report; International App. No. PCT/US2014/060148; dated Mar. 31, 2015; pp. 1-4.

Ashok et al.; "Do Not Share! Invisible Light Beacons for Signaling Preferences to Privacy-Respecting Cameras"; VLCS'14; Sep. 7, 2014; pp. 1-6; ACM.

Chattopadhyay et al.; "PrivacyCam: a Privacy Preserving Camera Using uCLinux on the Blackfin DSP"; IEEE Workshop on Embedded Vision Systems; Jun. 2007; pp. 1-8; IEEE.

Kapadia et al. "Virtual Walls: Protecting Digital Privacy in Pervasive Environments"; Pervasive; 2007; pp. 162-179; Springer-Verlag, Berlin Heidelberg, Germany.

Könings et al; "PriFi Beacons: Piggybacking Privacy Implications on WiFi Beacons"; UbiComp '13; Sep. 8-12, 2013; pp. 83-86; ACM; Zurich, Switzerland.

Laibowitz et al.; "Wearable Sensing for Dynamic Management of Dense Ubiquitous Media"; IEEE; 2009; pp. 1-6.

Pidcock et al; "NotiSense: An Urban Sensing Notification System to Improve Bystander Privacy"; 2011; pp. 1-5; PhoneSense.

Yamada et al.;"Use of Invisible Noise Signals to Prevent Privacy Invasion through Face Recognition from Camera Images"; Oct. 29-Nov. 2, 2012; pp. 1315-1316; Nara, Japan.

"Circuitry"; Merriam-Webster; bearing a date of Jan. 23, 2018; printed on Feb. 21, 2018; 1 page.

* cited by examiner

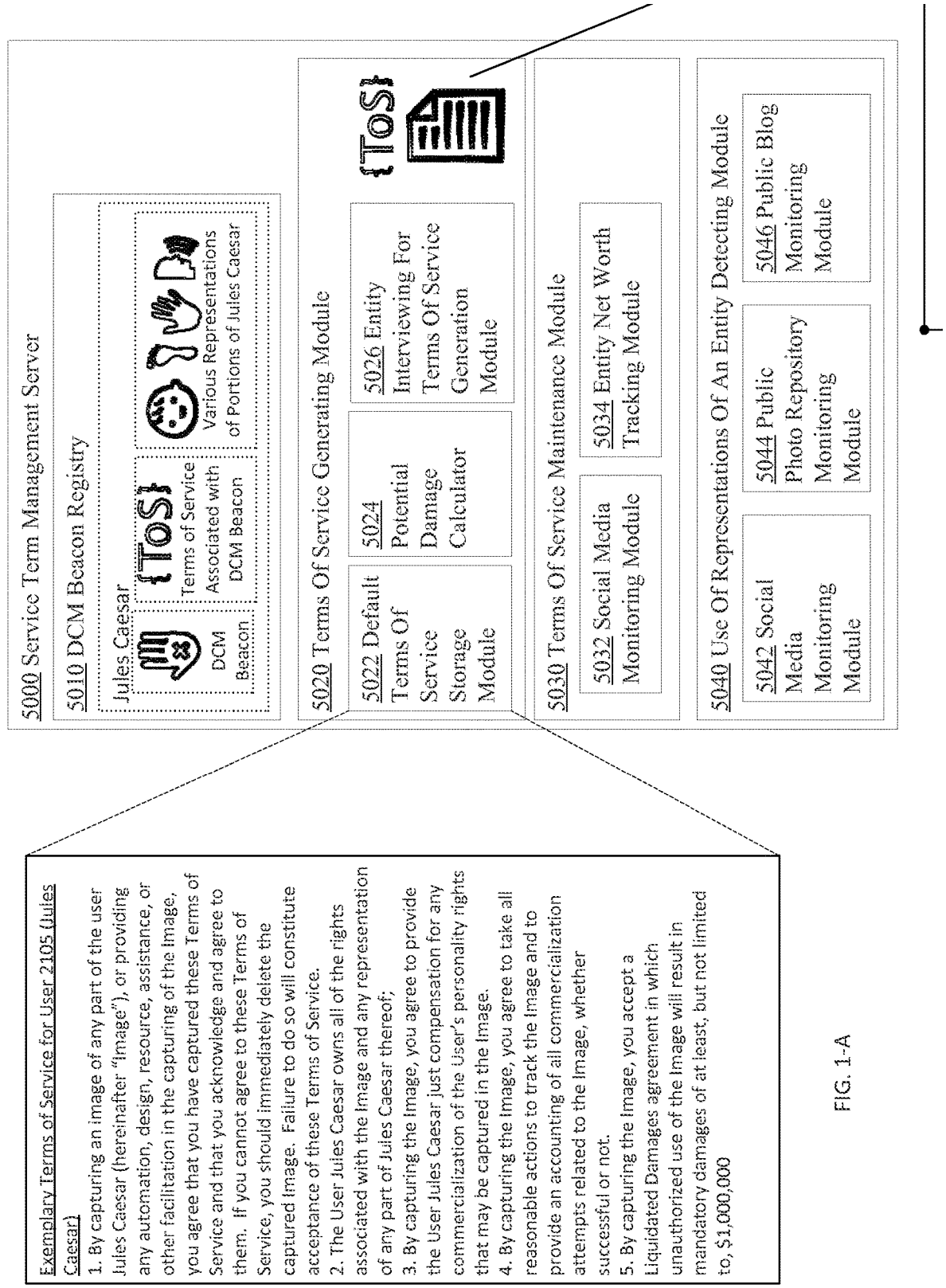
FIG. 1-A

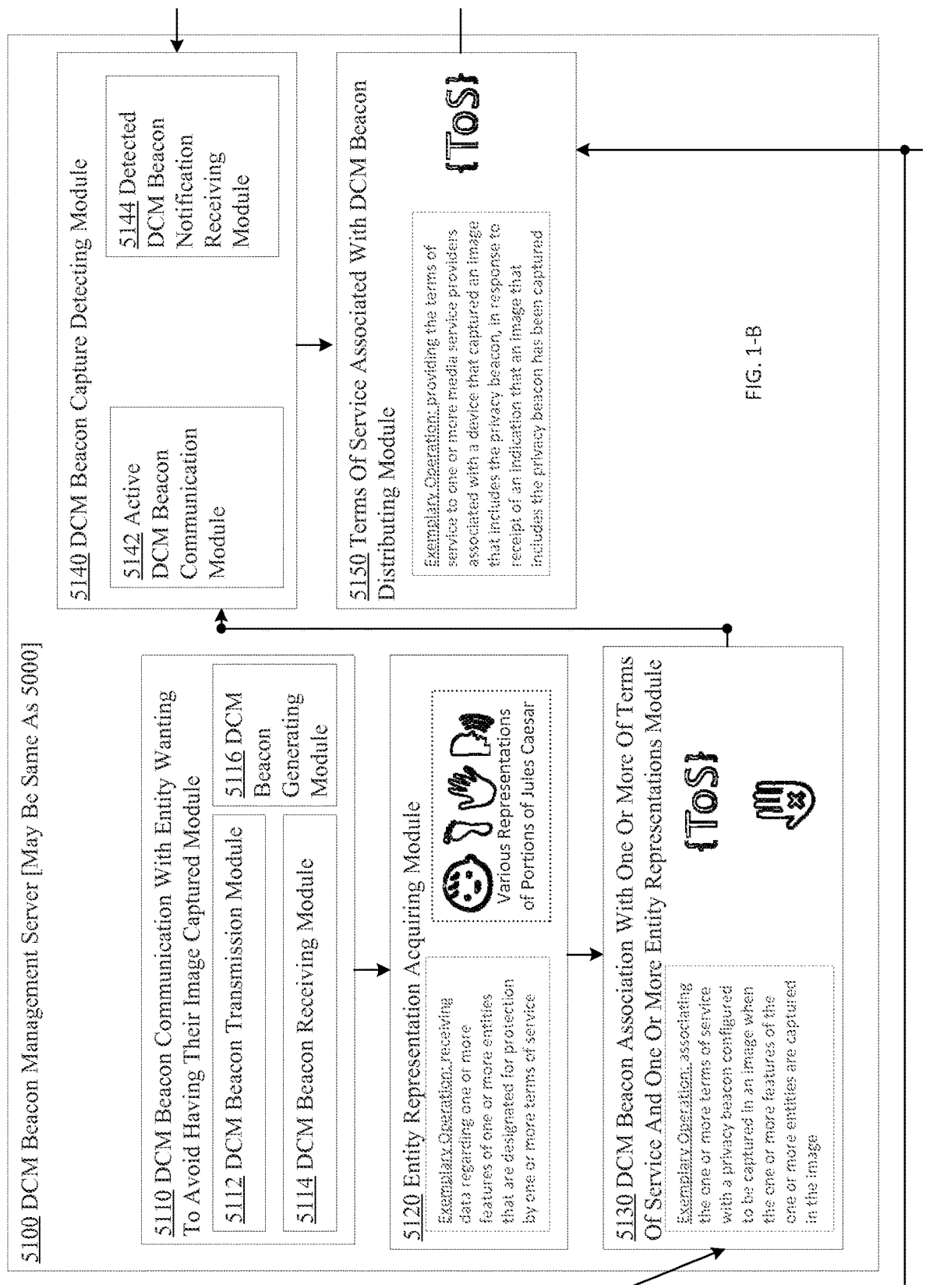
FIG. 1-B

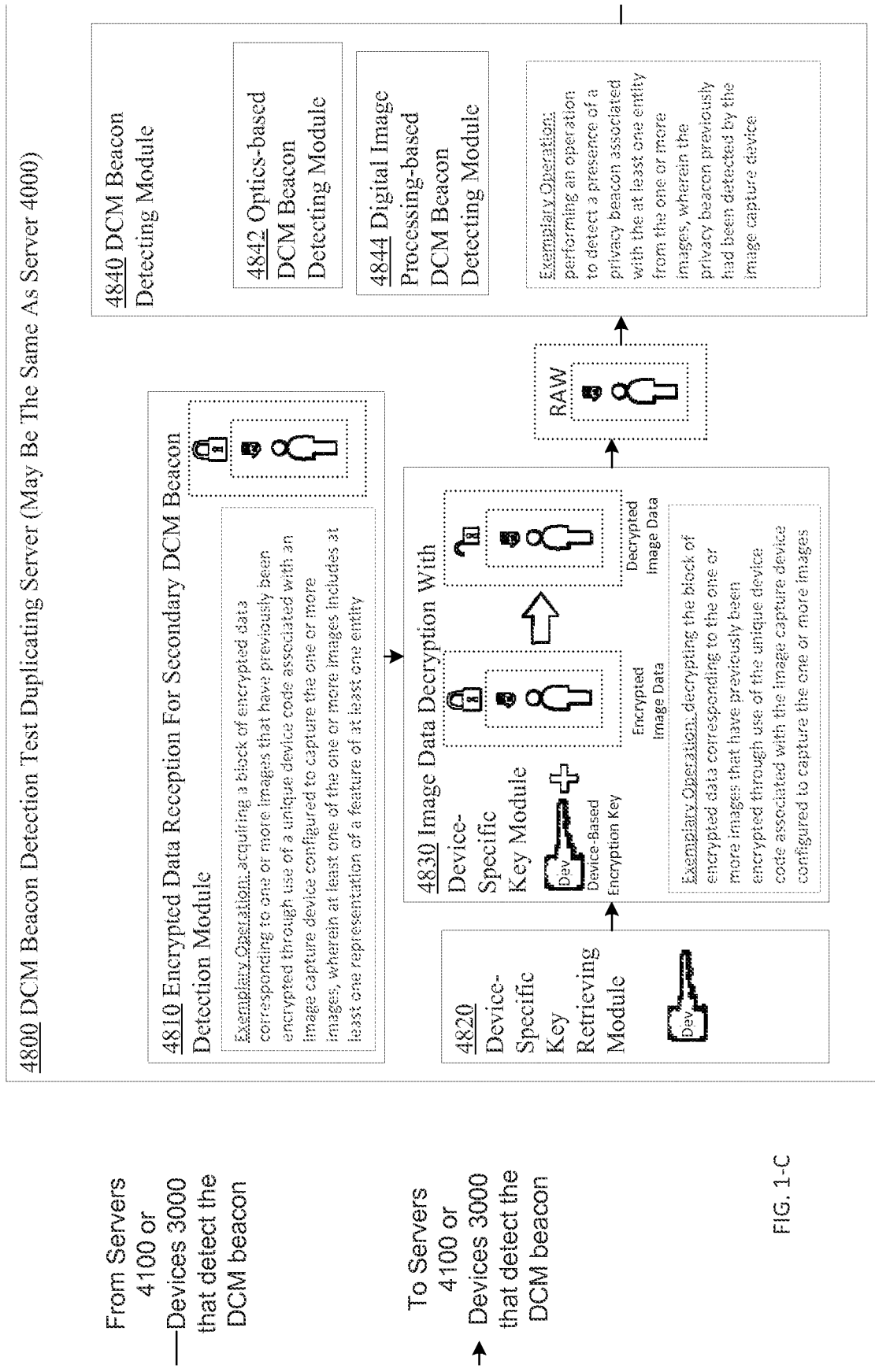
FIG. 1-C

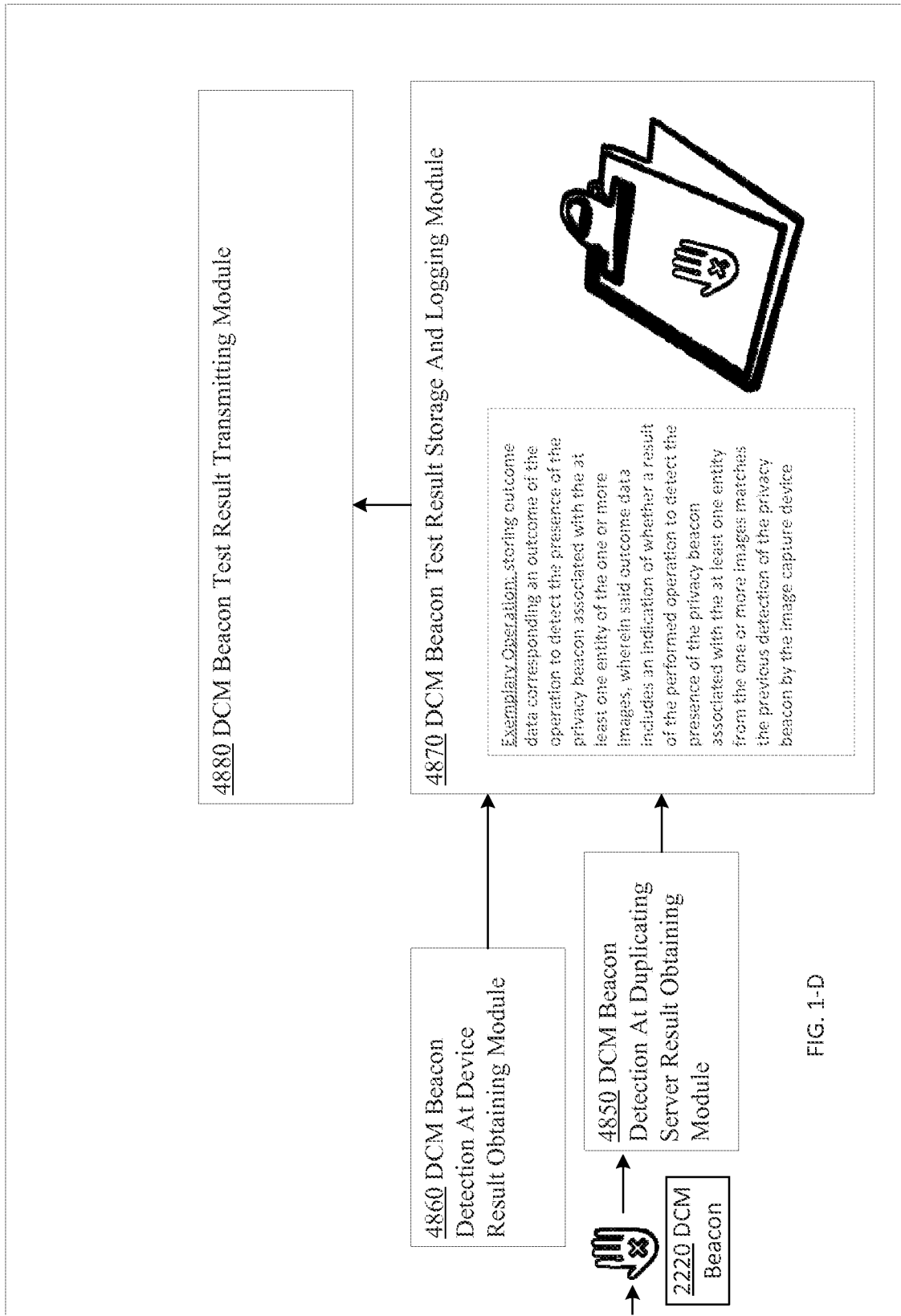
FIG. 1-D

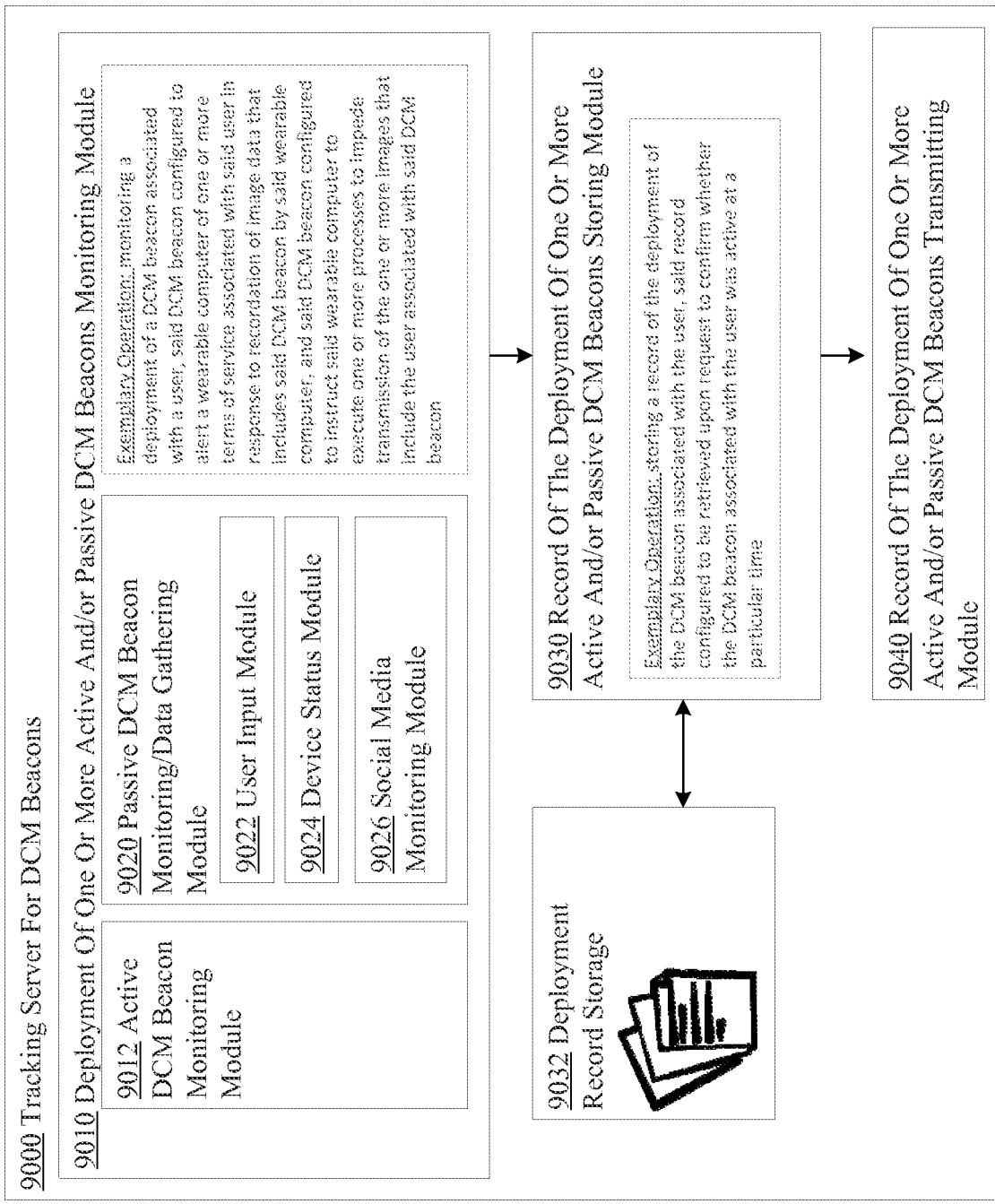
FIG. 1-E

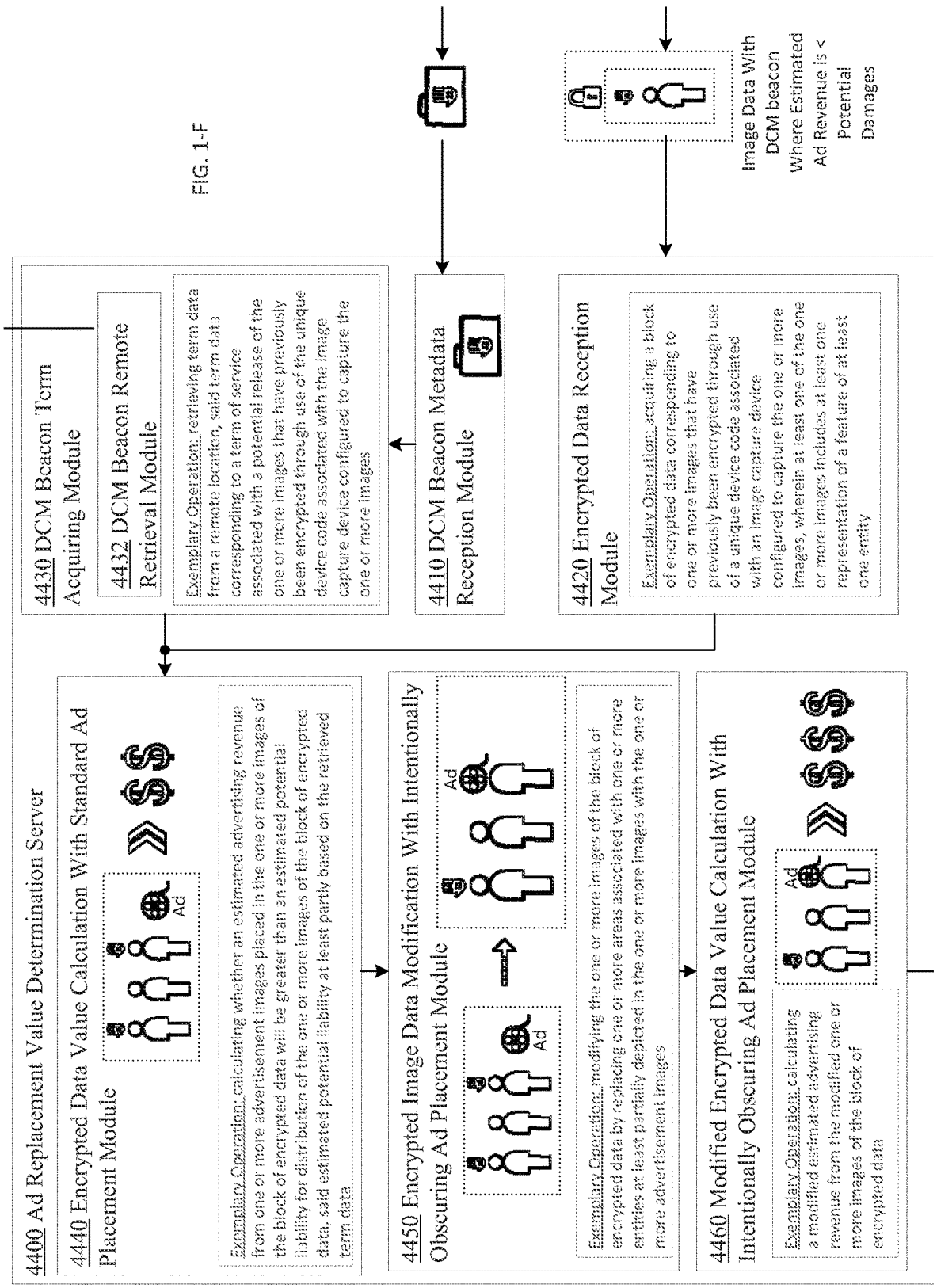

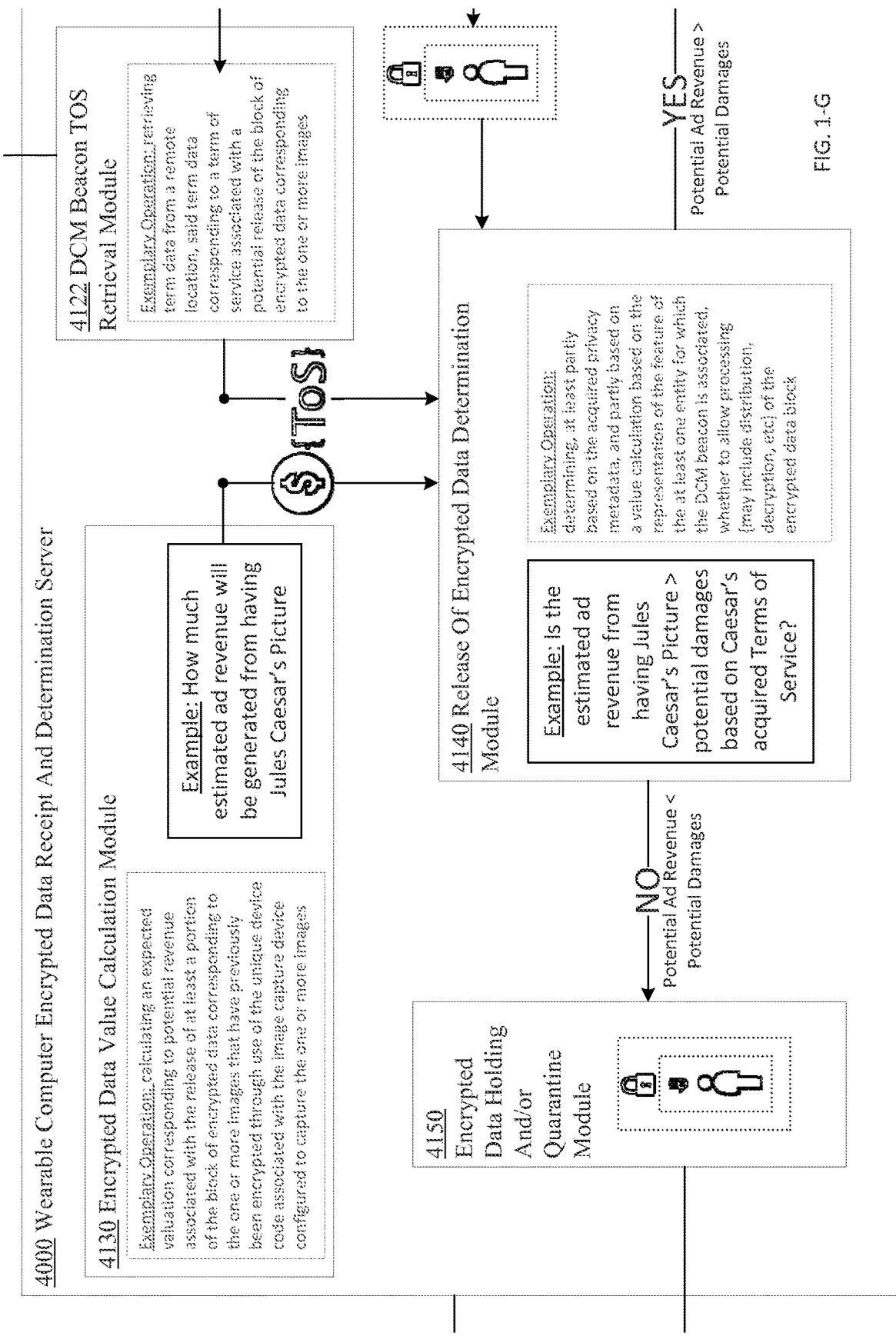
FIG. 1-G

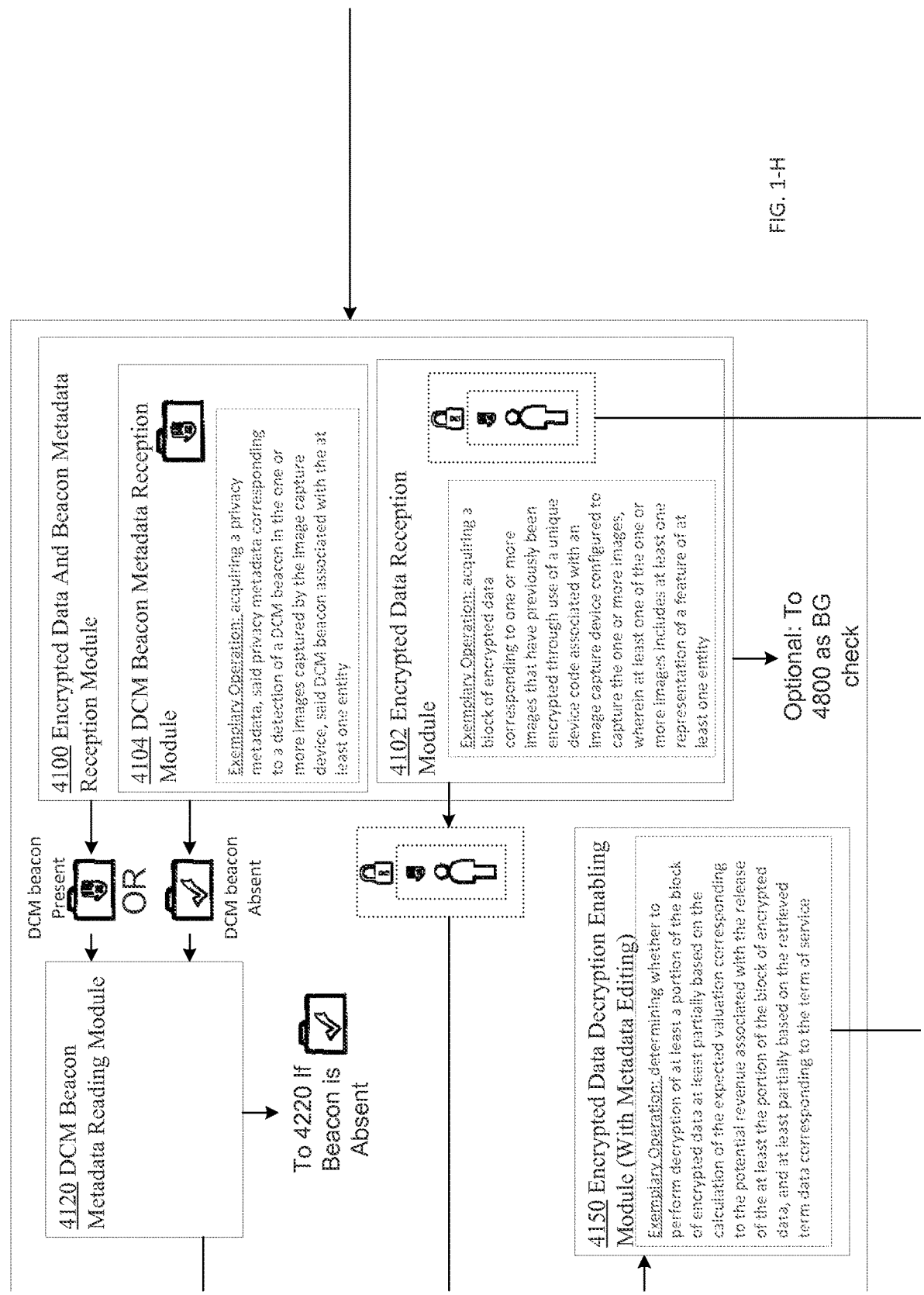
FIG. 1-H

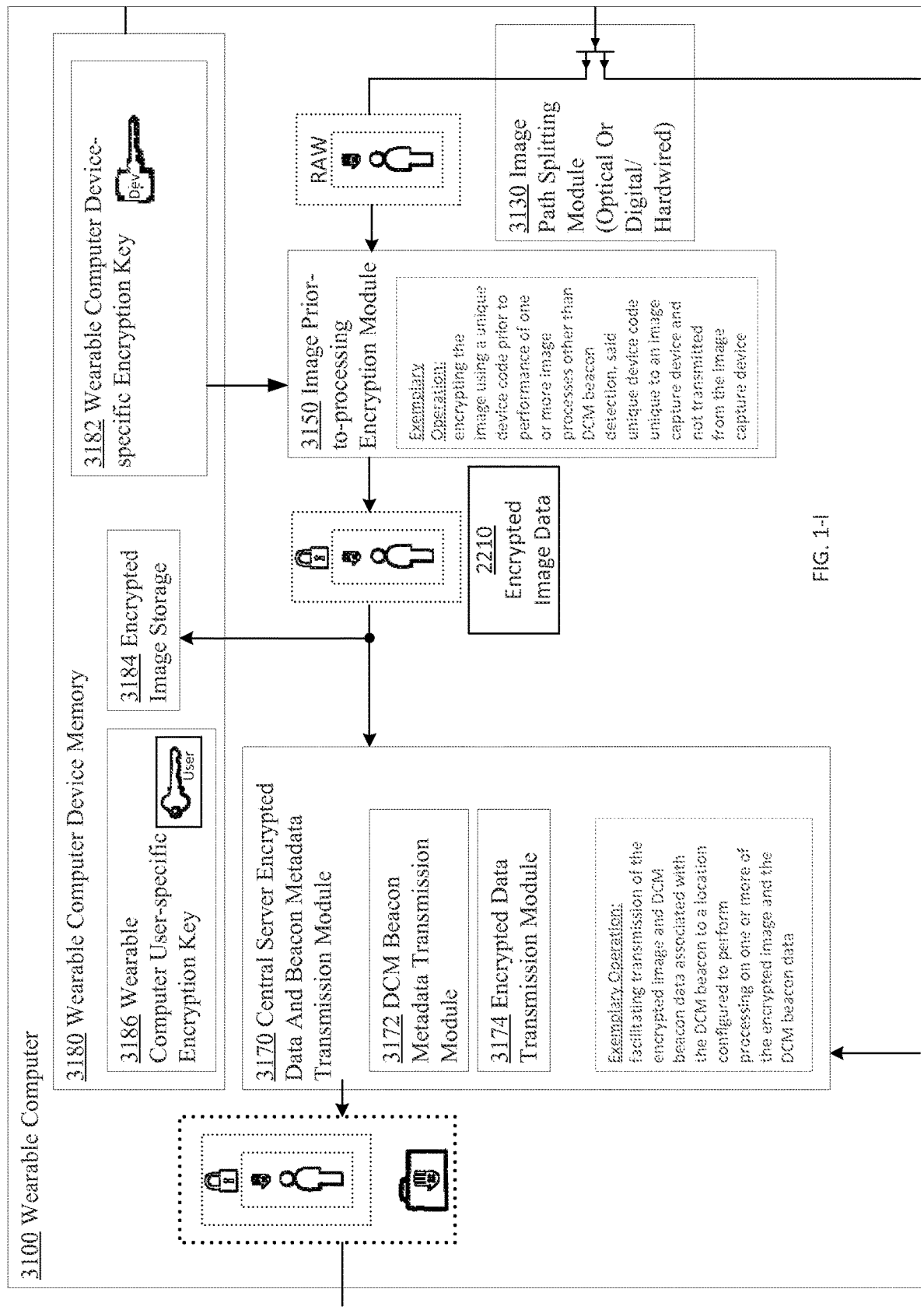
FIG. 1-I

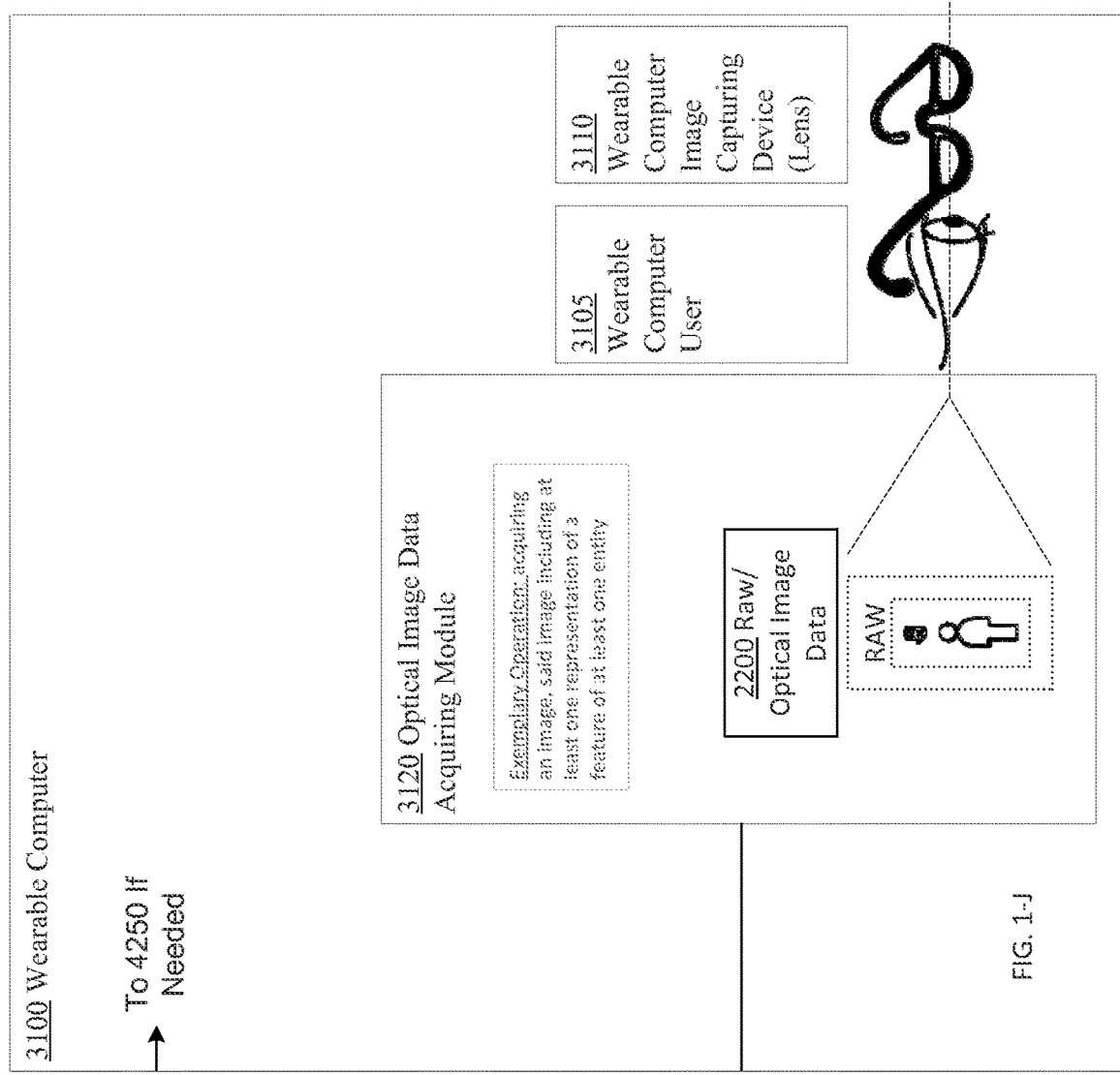
FIG. 1-J

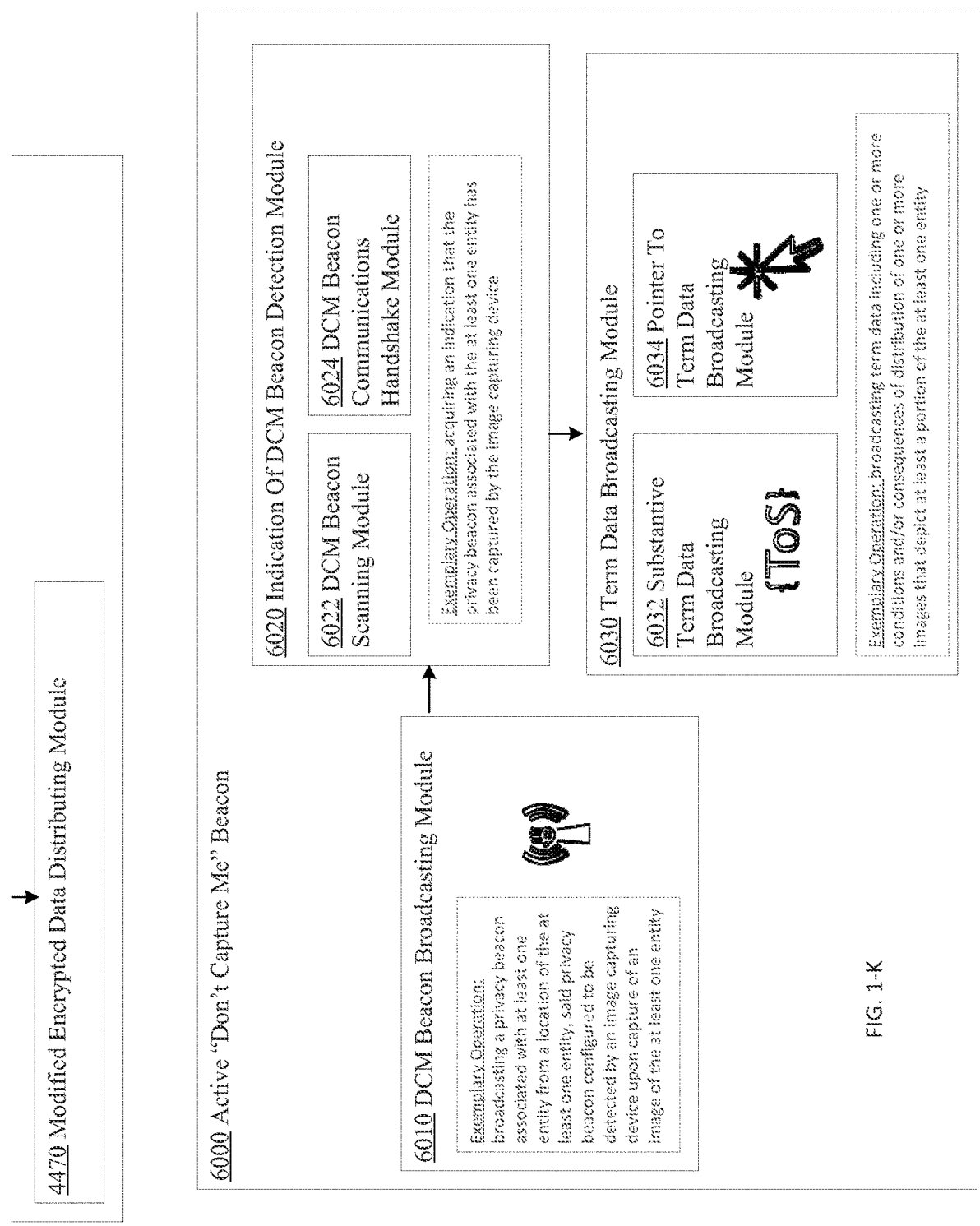
FIG. 1-K

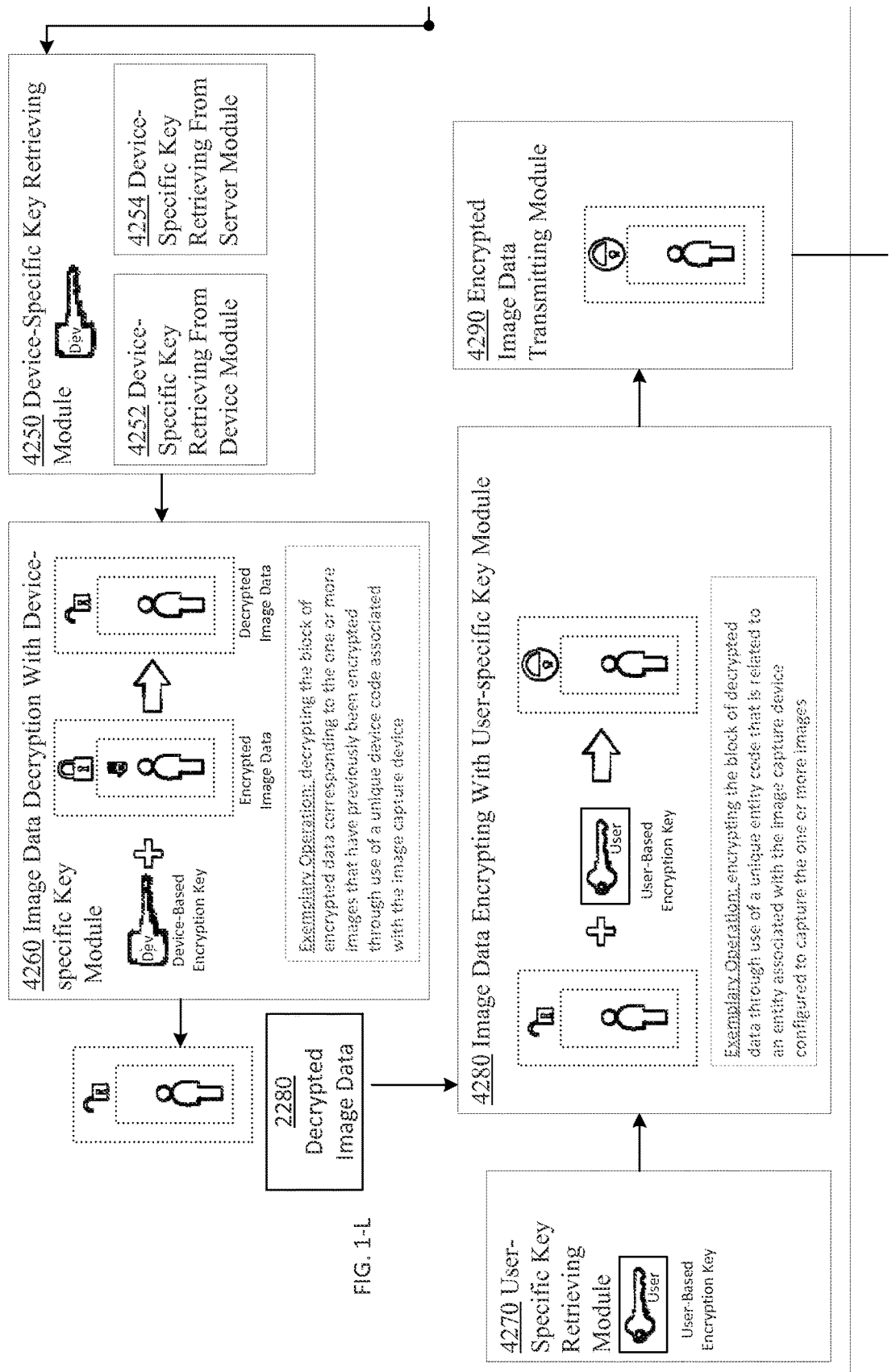
FIG. 1-L

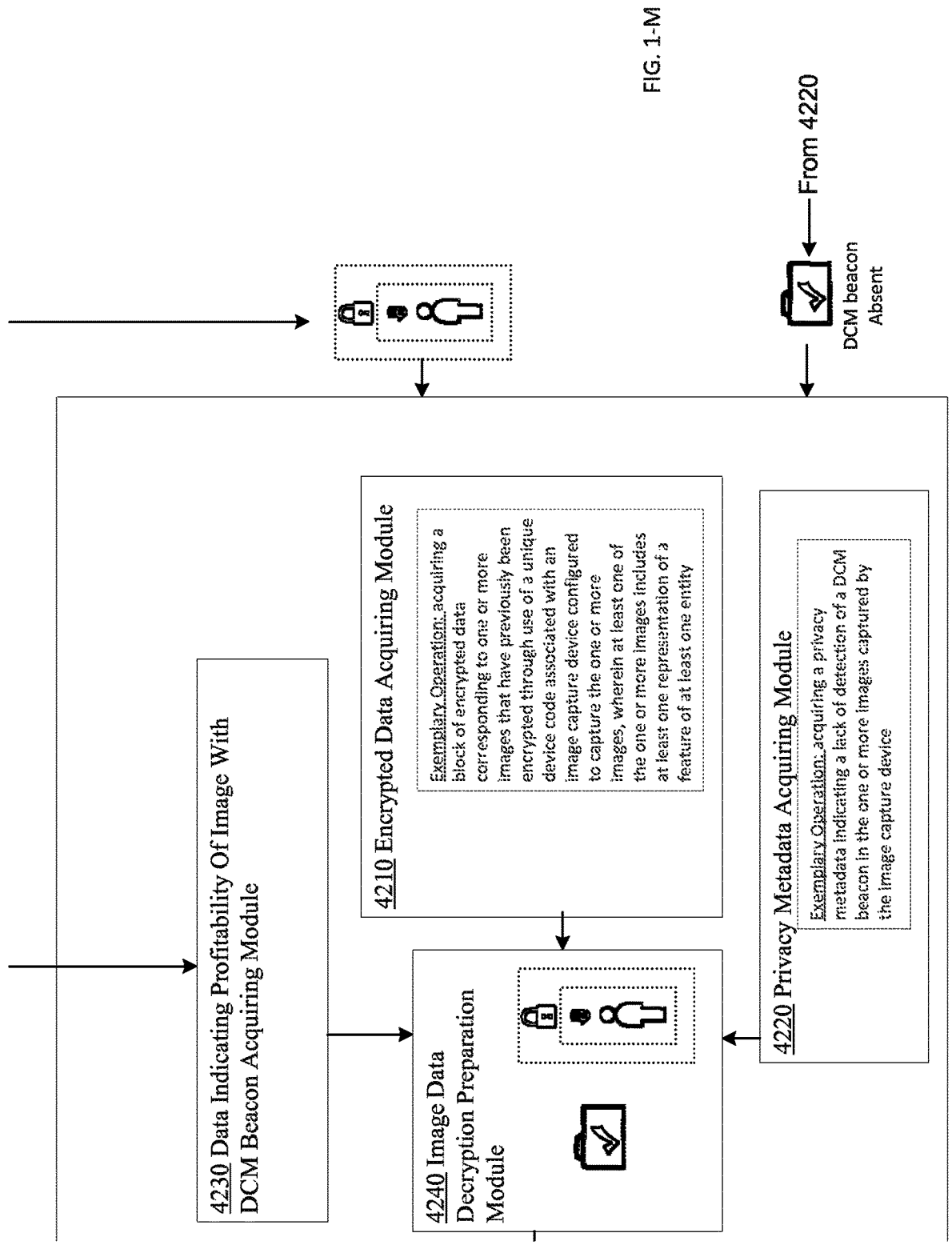

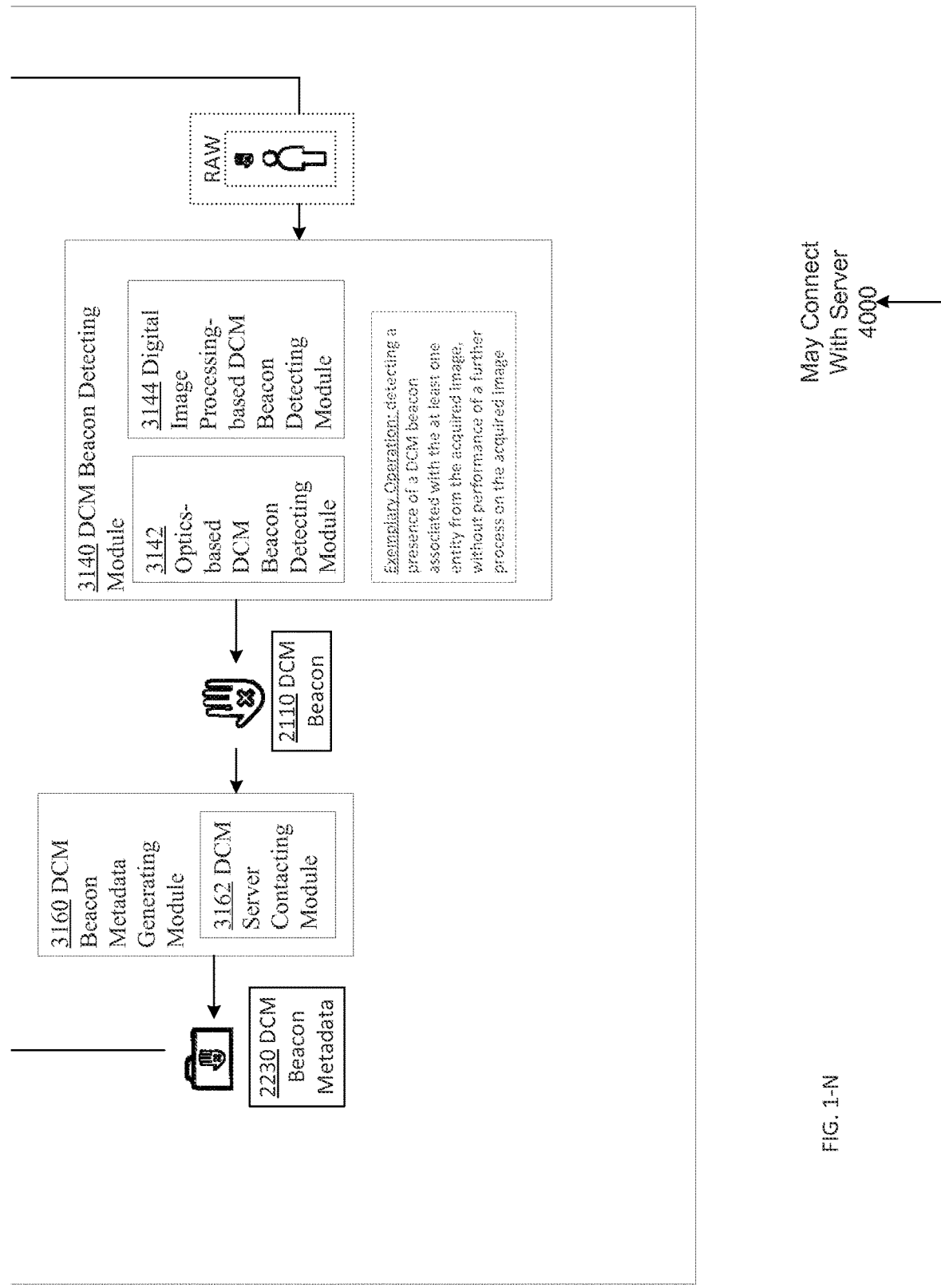
FIG. 1-N

FIG. 1-O

2610 Active "Don't Capture Me" (DCM) Beacon
2107 User Associated With An Active "Don't Capture Me" Beacon
Figure 1
| Fig. 1-A | Fig. 1-B | Fig. 1-C | Fig. 1-D | Fig. 1-E |
| --- | --- | --- | --- | --- |
| Fig. 1-F | Fig. 1-G | Fig. 1-H | Fig. 1-I | Fig. 1-J |
| Fig. 1-K | Fig. 1-L | Fig. 1-M | Fig. 1-N | Fig. 1-O |
| Fig. 1-P | Fig. 1-Q | Fig. 1-R | Fig. 1-S | Fig. 1-T |
FIG. 1-P

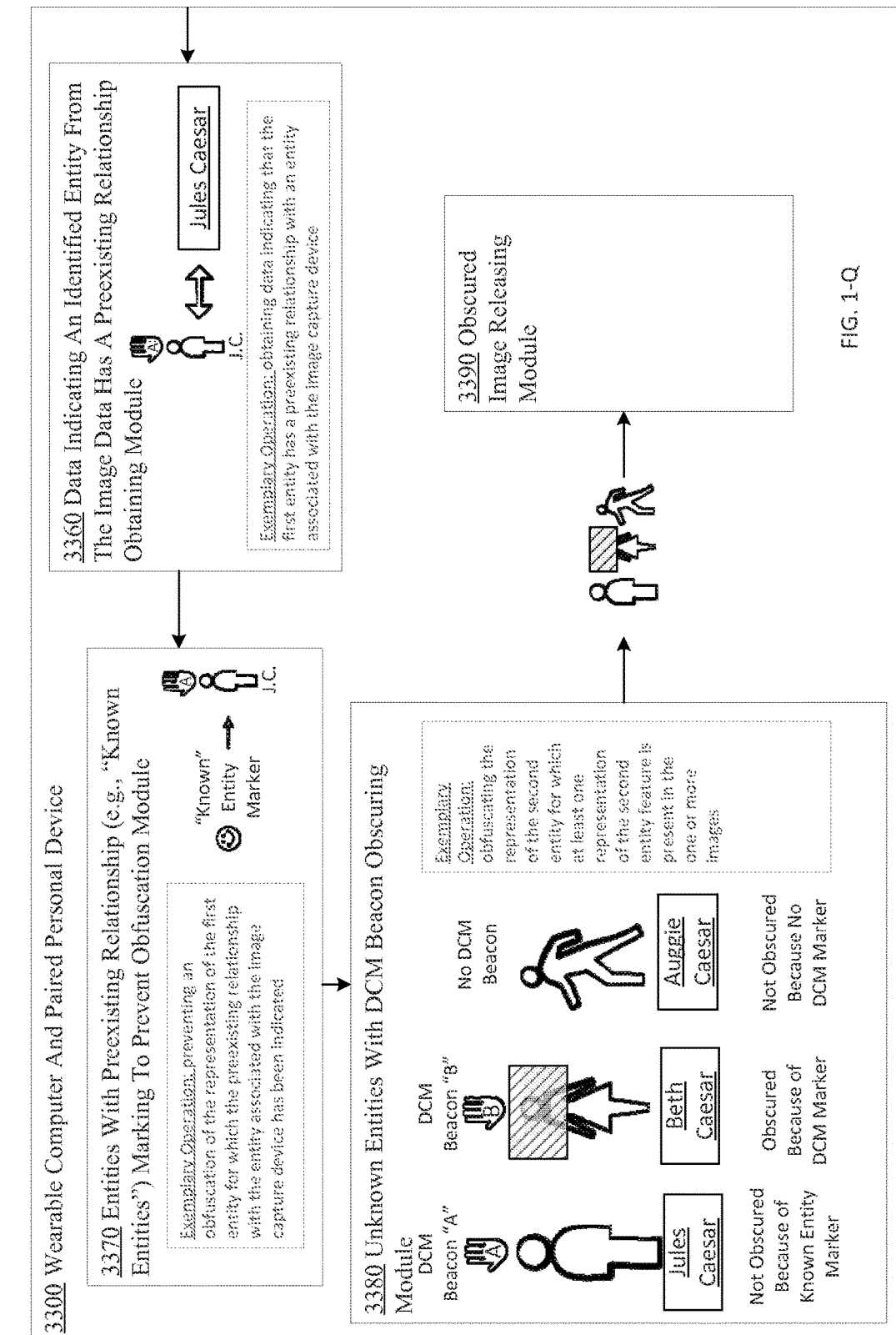
FIG. 1-Q

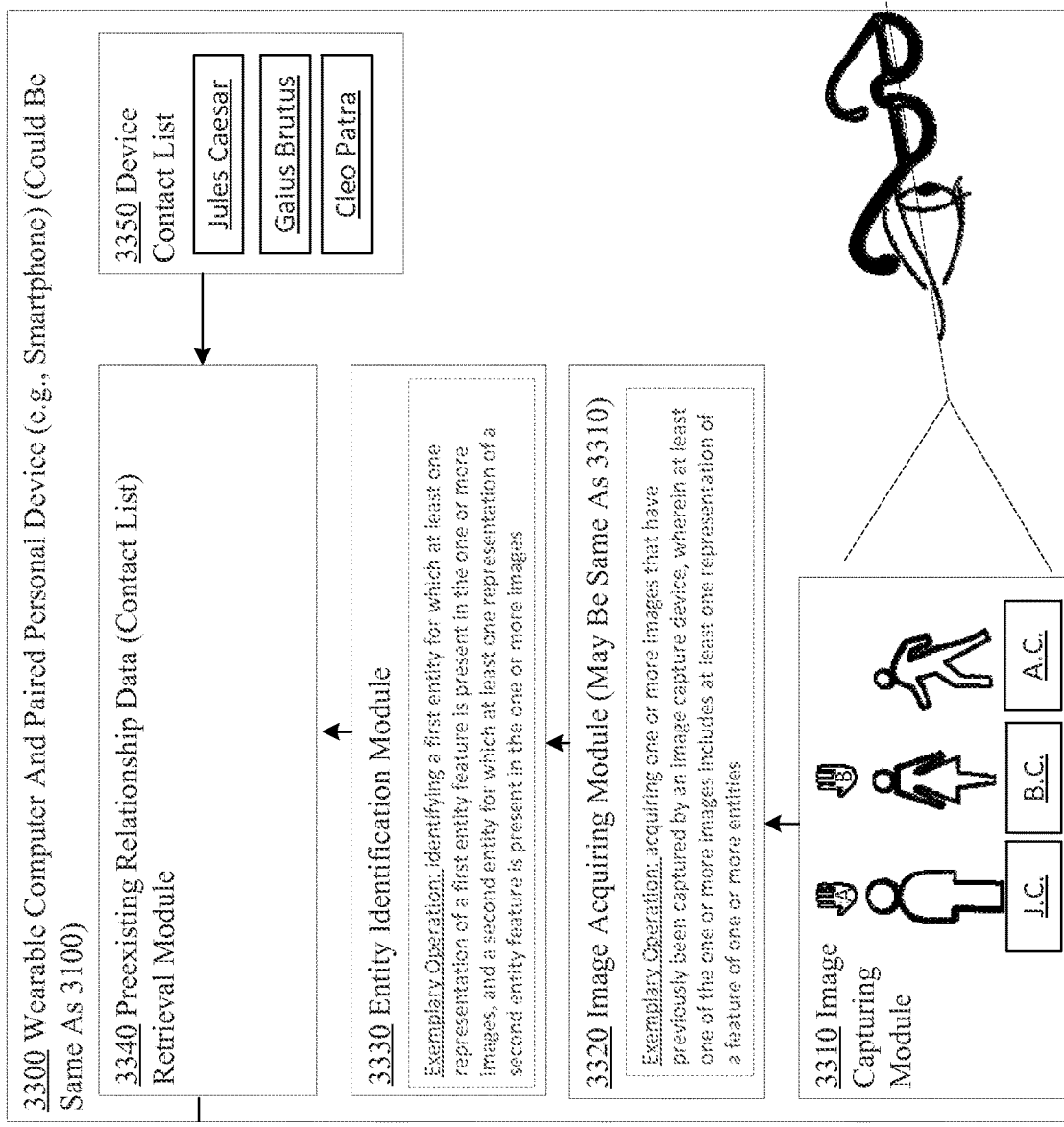
FIG. 1-R

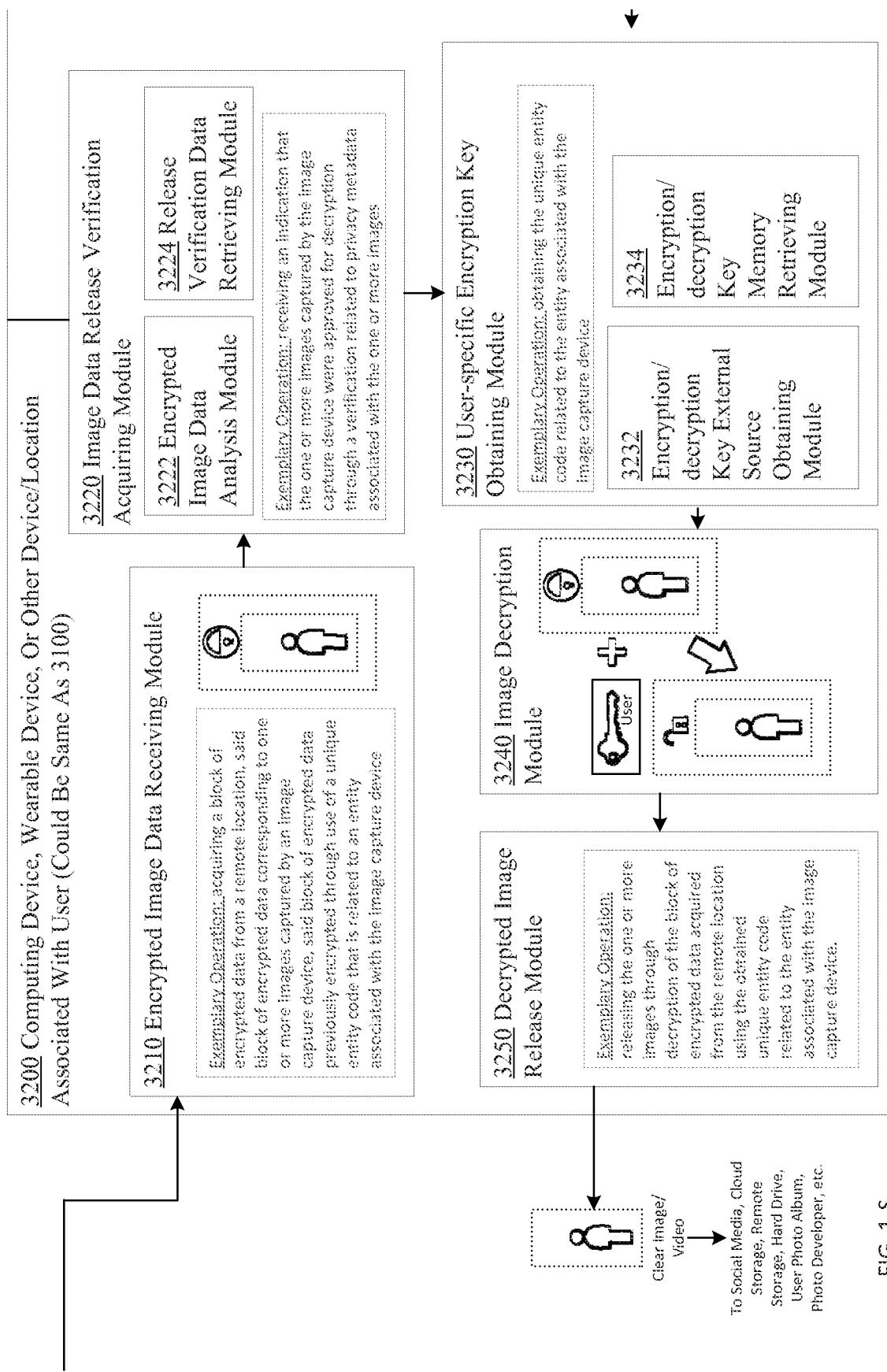
FIG. 1-S

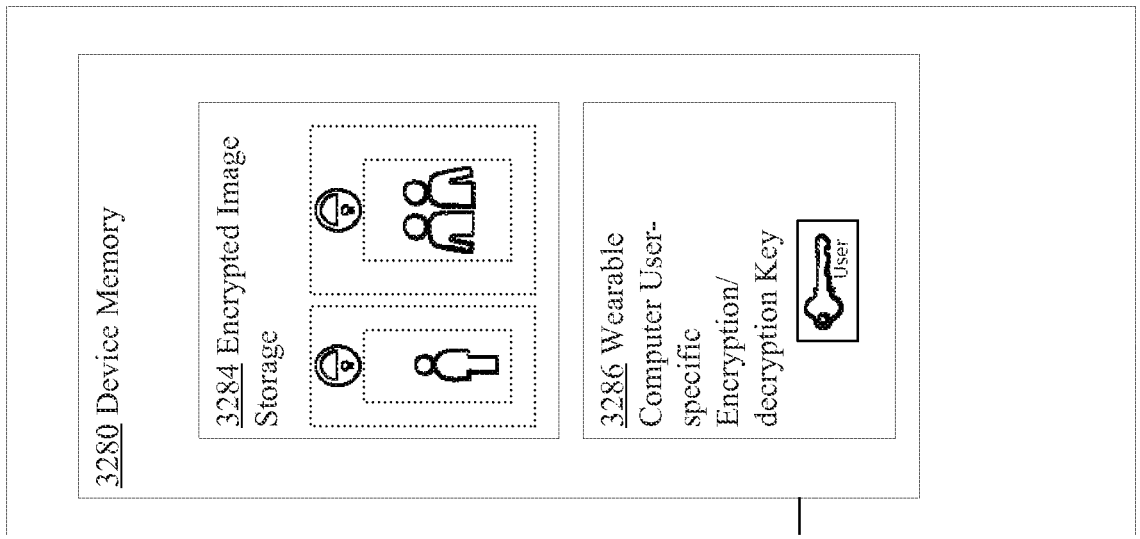
FIG. 1-T

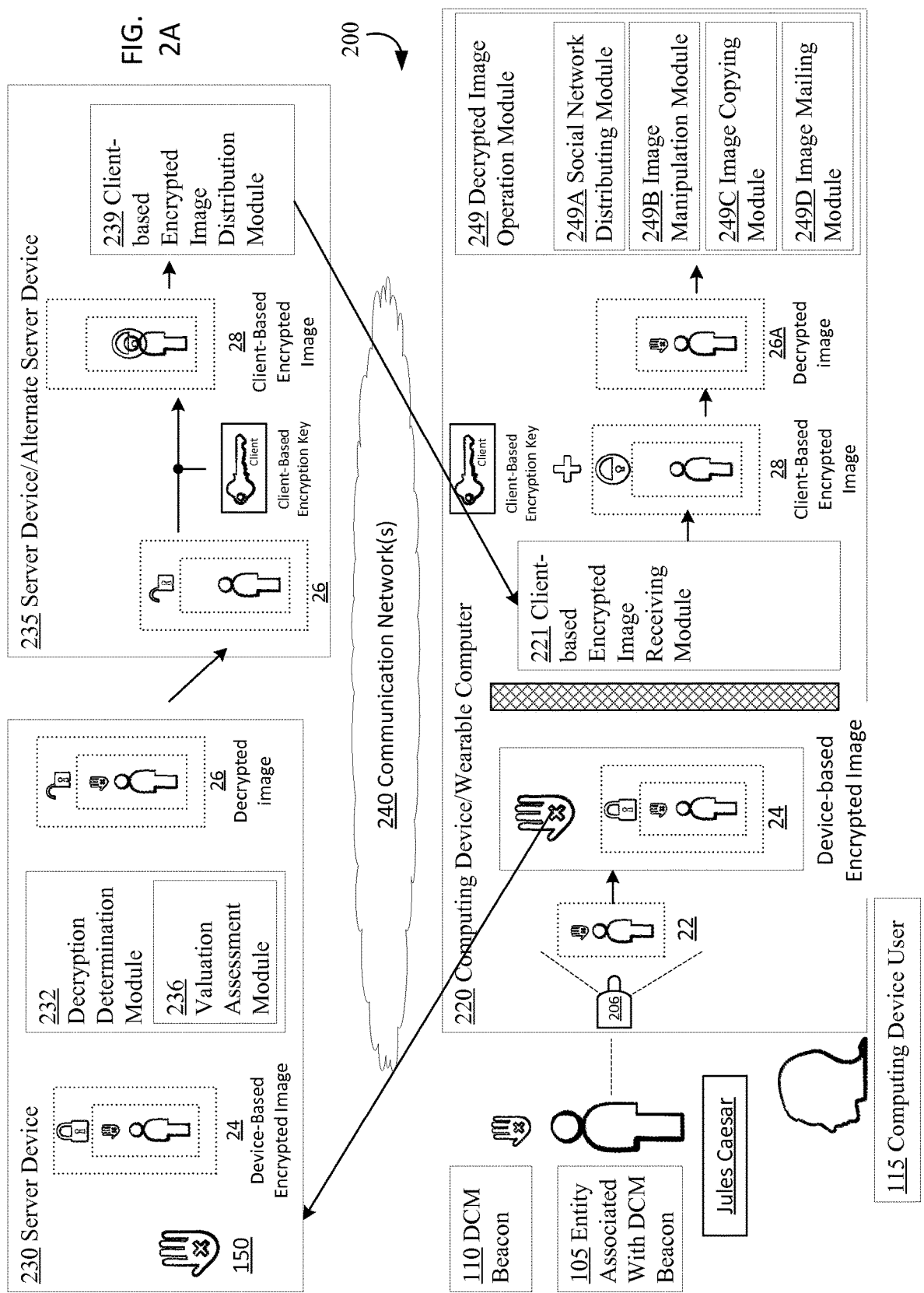

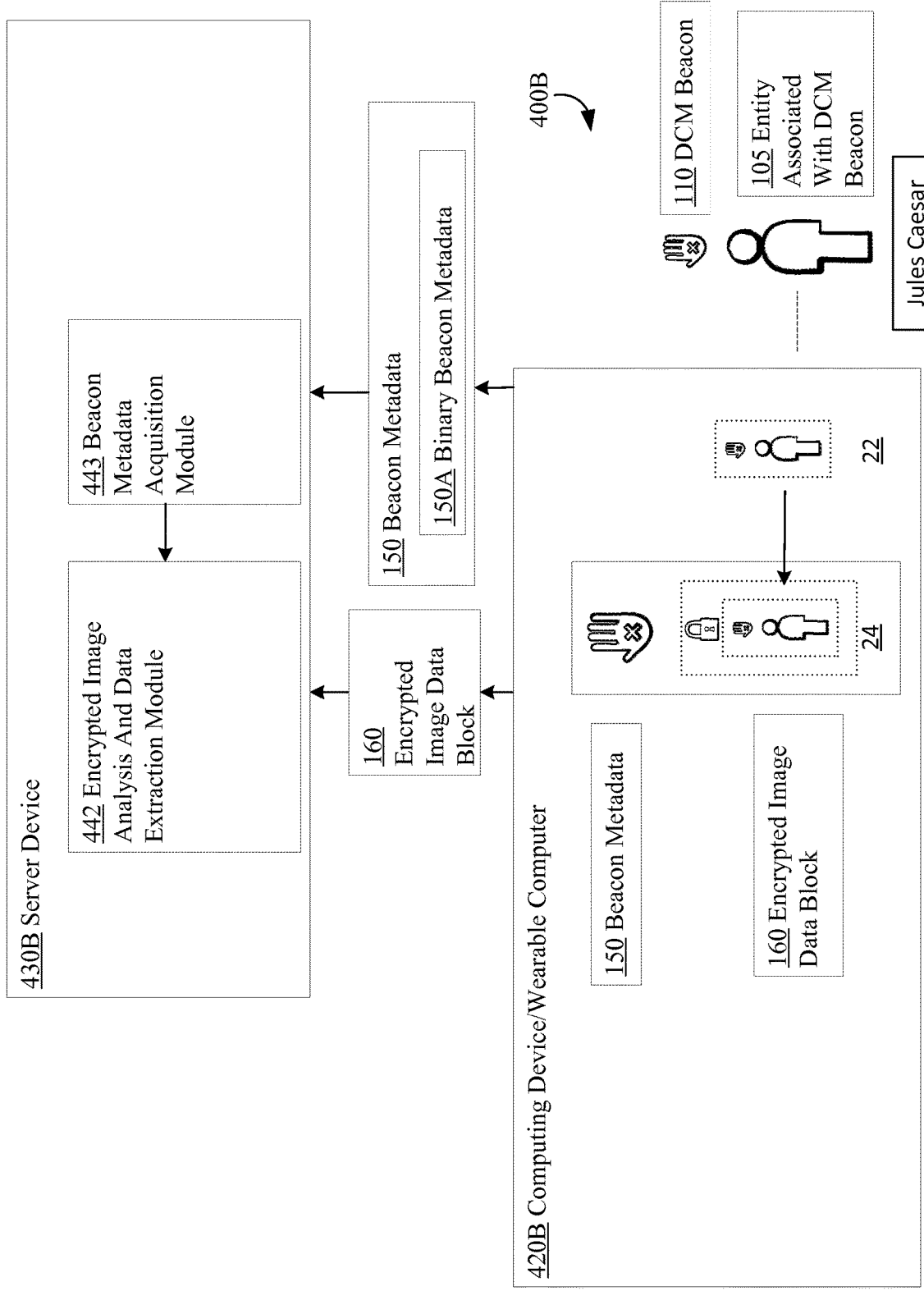

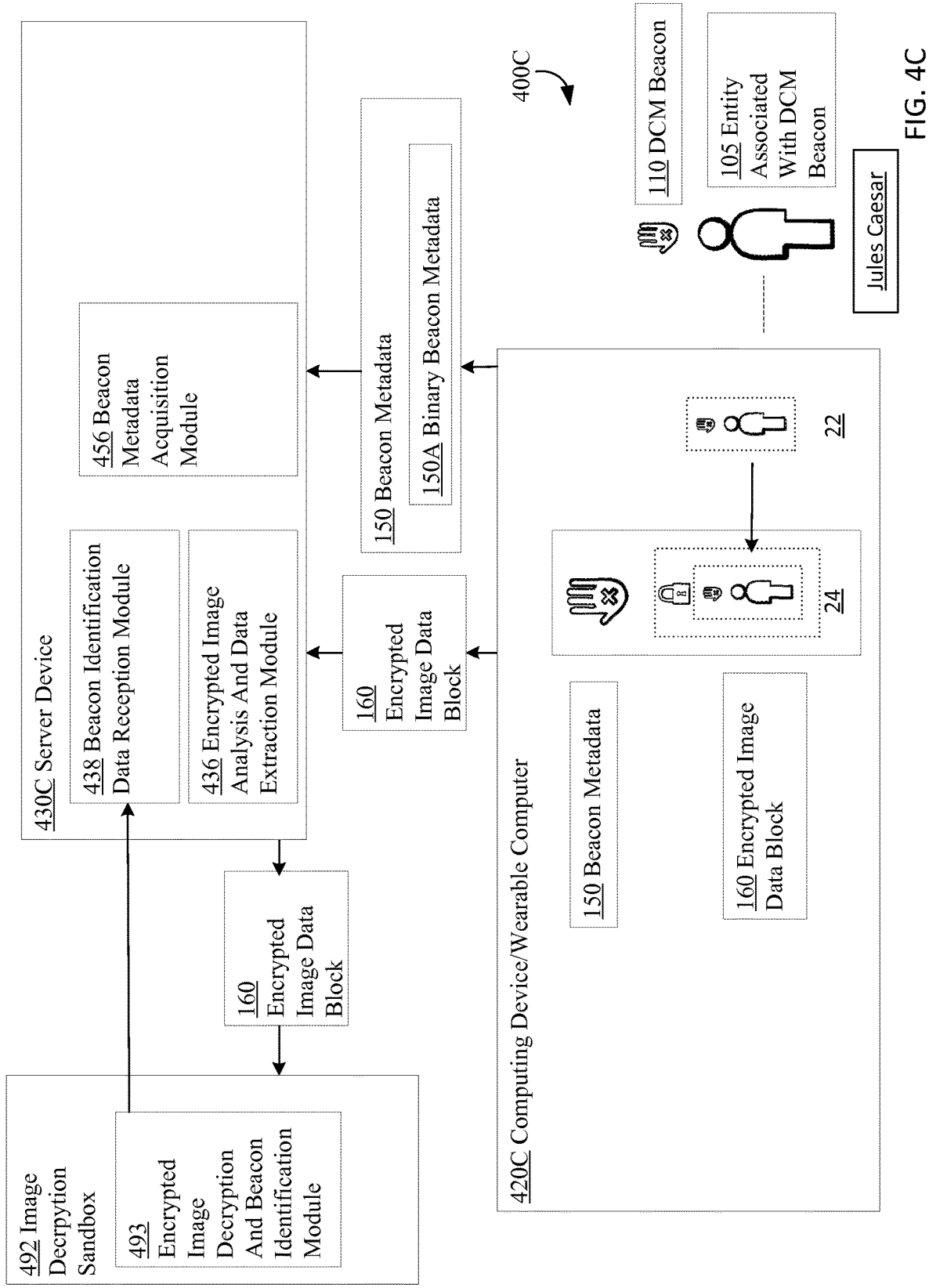

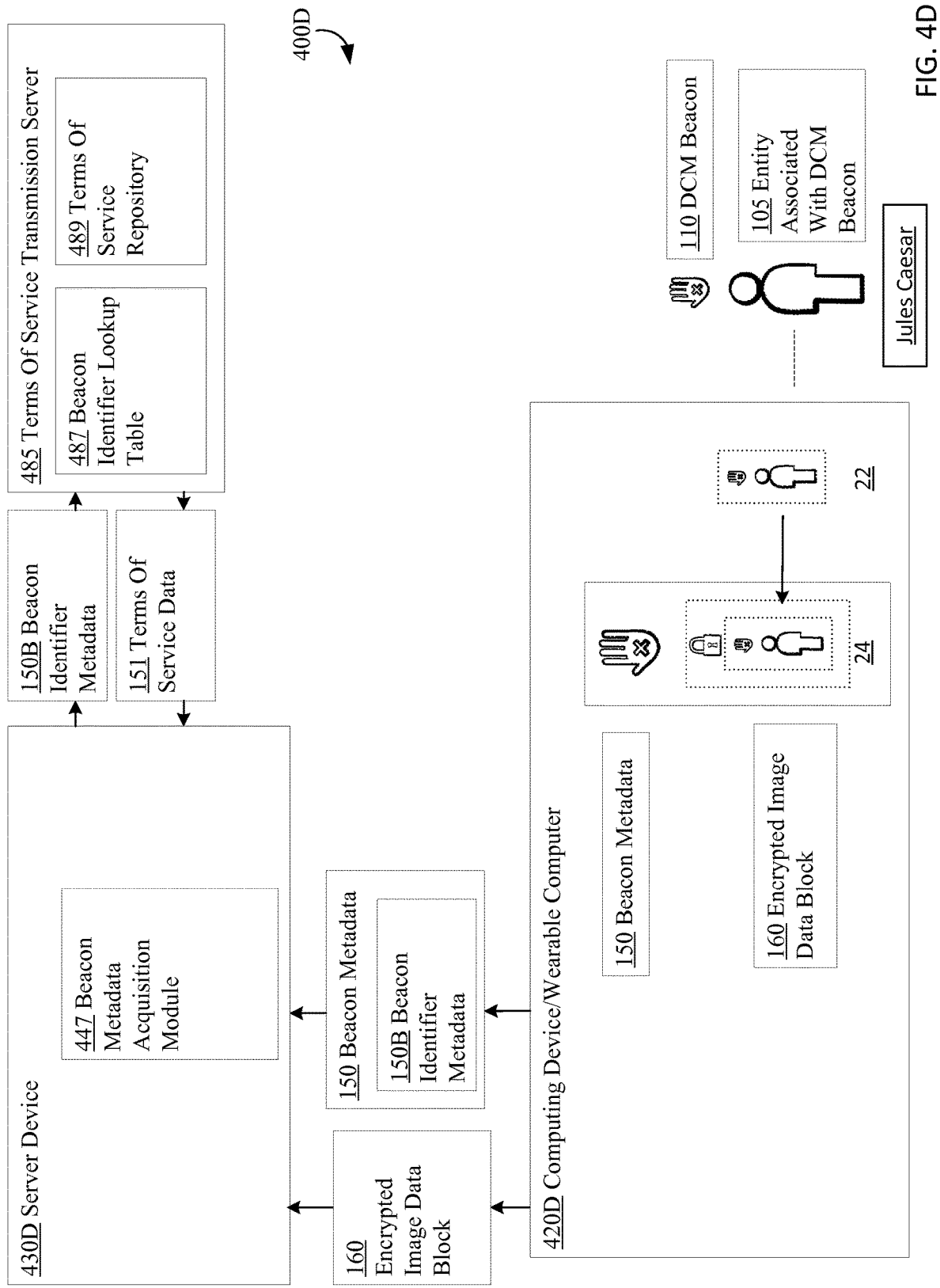

252 Device-based Encrypted Image That Is An Image That Has Previously Been Encrypted Through Use Of A Particular Device Code Assigned To An Image Capture Device Configured To Capture The Image, Wherein The Image Includes A Representation Of A Feature Of An Entity Acquiring Module 602 Device-based Encrypted Image That Is An Image That Has Previously Been Encrypted Through Use Of An Exclusive Device Code Assigned To A Singular Image Capture Device Configured To Capture The Image, Wherein The Image Includes A Representation Of A Feature Of An Entity Receiving Module 604 Device-based Encrypted Image That Is An Image That Has Previously Been Encrypted Through Use Of An Exclusive Device Code Assigned To A Singular Image Capture Device That Captured The Image, Wherein The Image Includes A Representation Of A Feature Of An Entity Receiving Module 606 Device-based Encrypted Image That Is An Image That Has Previously Been Encrypted Through Use Of A Symmetric Key Encryption In Which The Symmetric Key Is Generated Using The Exclusive Device Code Assigned To A Singular Image Capture Device That Captured The Image As A Seed, Wherein The Image Includes A Representation Of A Feature Of A Celebrity Singer Receiving Module 608 Device-based Encrypted Image That Is An Image That Has Previously Been Encrypted Through Use Of A Particular Device Code Generated By The Image Capture Device Configured To Capture The Image, Wherein The Image Includes A Representation Of A Feature Of An Entity Acquiring Module

Fig. 6

| Fig. 6A | Fig. 6B | Fig. 6C |

FIG. 6A

252 Device-based Encrypted Image That Is An Image That Has Previously Been Encrypted Through Use Of A Particular Device Code Assigned To An Image Capture Device Configured To Capture The Image, Wherein The Image Includes A Representation Of A Feature Of An Entity Acquiring Module 610 Device-based Encrypted Image That Is An Image That Has Previously Been Encrypted Through Use Of A Particular Device Code Assigned To An Image Capture Device That Is Configured To Be Operated By A Particular User, Configured To Capture The Image, Wherein The Image Includes A Representation Of A Feature Of An Entity Acquiring Module 612 Device-based Encrypted Image That Is An Image That Has Previously Been Encrypted Through Use Of A Particular Device Code Assigned To An Image Capture Device That Is Selected By A Particular User Of The Image Capture Device, Configured To Capture The Image, Wherein The Image Includes A Representation Of A Feature Of An Entity Acquiring Module 614 Device-based Encrypted Image That Is An Image That Has Previously Been Encrypted Through Use Of A Particular Device Code Assigned To An Image Capture Device That Is Related To A Login For A Particular User Of The Image Capture Device, Configured To Capture The Image, Wherein The Image Includes A Representation Of A Feature Of An Entity Acquiring Module 616 Device-based Encrypted Image That Is An Image That Has Previously Been Encrypted Through Use Of A Unique String Of Characters Assigned To An Image Capture Device Configured To Capture The Image, Wherein The Image Includes A Representation Of A Feature Of An Entity Acquiring Module 618 Device-based Encrypted Image That Is An Image That Has Previously Been Encrypted Through Use Of A Particular Device Code Assigned To An Image Capture Device Configured To Capture The Image, Wherein The Image Includes A Representation Of A Feature Of An Entity Acquiring From A Server That Obtained The Image From The Image Capture Device Module 620 Device-based Encrypted Image That Is An Image That Has Previously Been Encrypted Through Use Of A Particular Device Code Assigned To An Image Capture Device Configured To Capture The Image, Wherein The Image Includes A Representation Of A Feature Of An Entity Acquiring From A Server That Obtained The Device-based Encrypted Image From The Image Capture Device Module

FIG. 6B

252 Device-based Encrypted Image That Is An Image That Has Previously Been Encrypted Through Use Of A Particular Device Code Assigned To An Image Capture Device Configured To Capture The Image, Wherein The Image Includes A Representation Of A Feature Of An Entity Acquiring Module 622 Device-based Encrypted Image That Is An Image That Has Previously Been Encrypted Through Use Of A Particular Device Code Assigned To An Image Capture Device Configured To Capture The Image, Wherein The Image Includes A Representation Of A Feature Of An Entity Acquiring From A Server That Determined That The Device-based Encrypted Image Has Been Cleared For Decryption Module

Fig. 6

| Fig. 6A | Fig. 6B | Fig. 6C |

FIG. 6C

254 Decrypted Image Through Decryption Of The Device-based Encrypted Image In Response To A Decryption Approval Generating Module

706 Decryption Key Configured To Decrypt The Device-based Encrypted Image Acquiring Module

702 Decrypted Image Through Decryption That Uses A Decryption Key Of The Device-based Encrypted Image In Response To A Decryption Approval Generating Module

704 Decrypted Image Through Decryption Of The Device-based Encrypted Image That Uses A Decryption Key Obtained From The Image Capture Device In Response To A Decryption Approval Generating Module

710 Decryption Key Configured To Decrypt The Device-based Encrypted Image Acquiring From A Decryption Key Storage Bank Module

712 Decryption Key Configured To Decrypt The Device-based Encrypted Image Acquiring From A Management Server Configured To Store One Or More Particular Device Codes Associated With One Or More Image Capture Devices That Have At Least One Property In Common Module

714 Decryption Key Configured To Decrypt The Device-based Encrypted Image Generating At Least Partly Based On The Particular Device Code Module

716 Particular Device Code Acquiring Module

718 Decryption Key Generating From The Acquired Particular Device Code Module

708 Acquired Decryption Key Configured To Decrypt The Device-based Encrypted Image Application To The Device-based Encrypted Image In Response To The Generated Decryption Approval Module

| Fig. 7A | Fig. 7B | Fig. 7C | Fig. 7D | Fig. 7E | Fig. 7F |

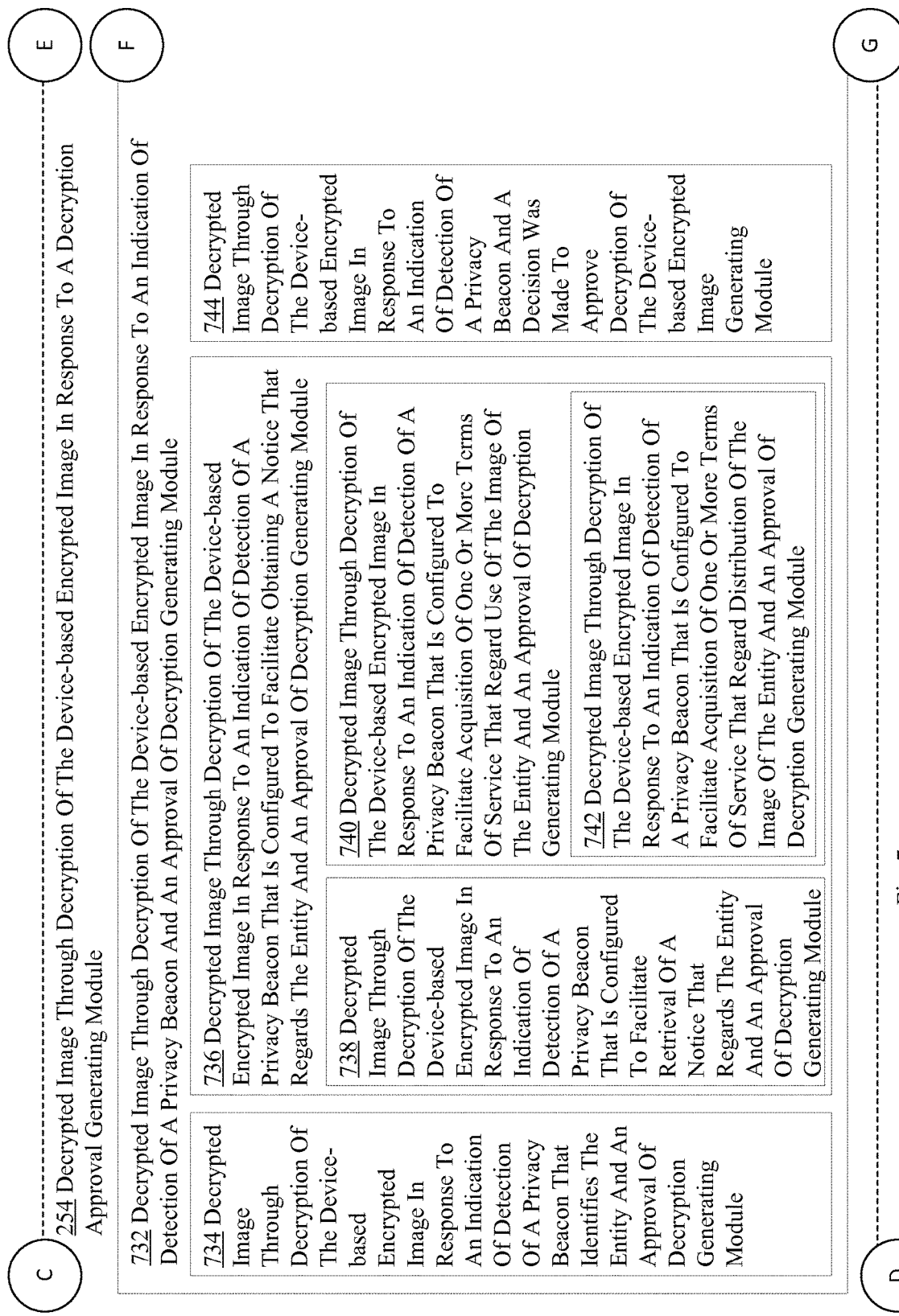

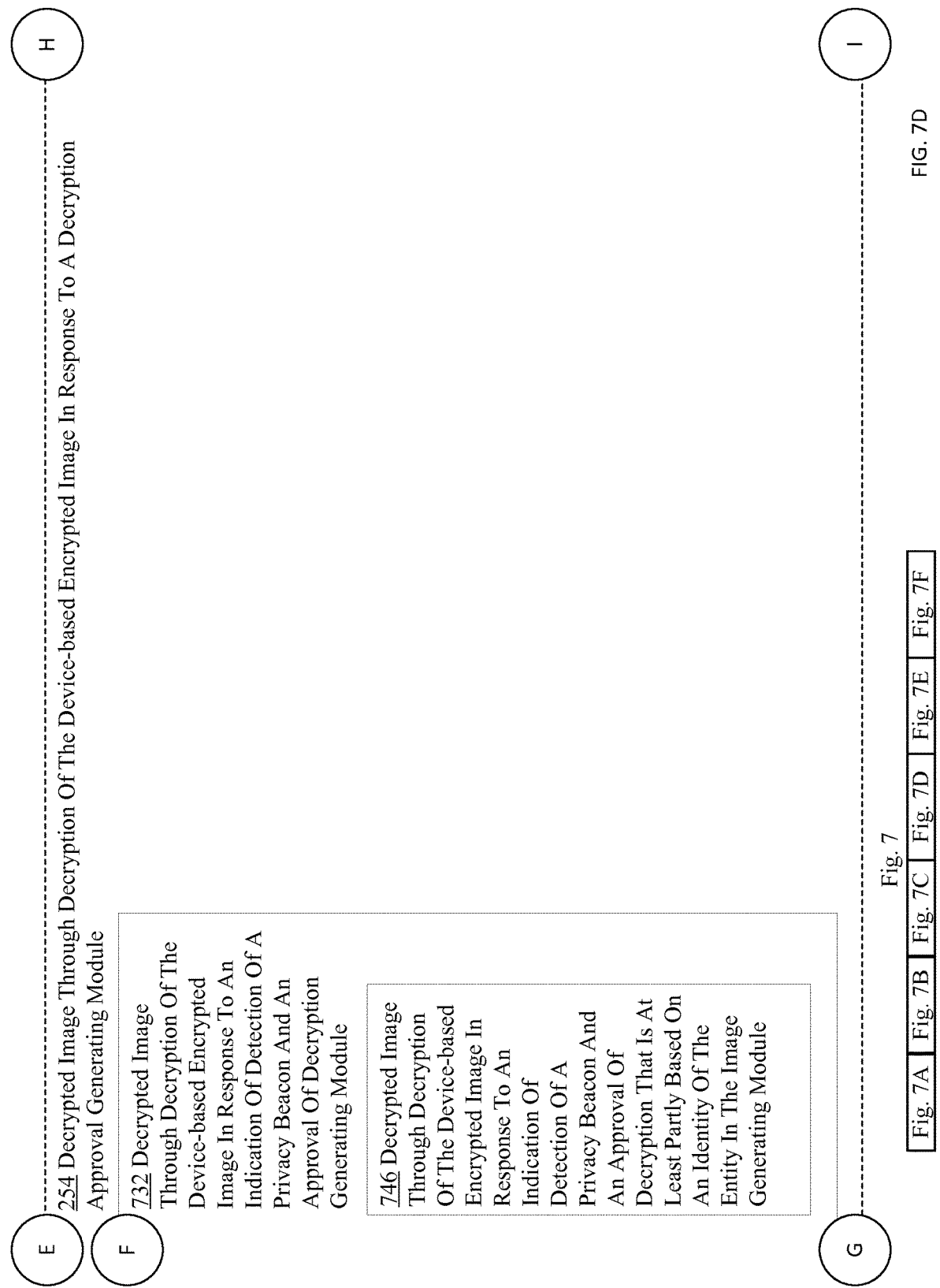

254 Decrypted Image Through Decryption Of The Device-based Encrypted Image In Response To A Decryption Approval Generating Module

748 Determination That Privacy Beacon Associated With The Entity Was Detected Acquiring Module

754 Determination That Was Performed By The Image Capture Device And That Indicates That Privacy Beacon Associated With The Entity Was Detected Acquiring Module

756 Metadata That Indicates That The Privacy Beacon Associated With The Entity Was Detected Receiving Module

750 Indication That The Image Has Been Approved For Decryption That Is At Least Partly Based On Data Associated With The Privacy Beacon Obtaining Module

758 Indication That The Image Has Been Approved For Decryption That Is At Least Partly Based On An Identity Of The Entity Associated With The Privacy Beacon Obtaining Module

760 Indication That The Image Has Been Approved For Decryption That Is At Least Partly Based On A Net Worth Of The Entity Associated With The Privacy Beacon Obtaining Module

762 Indication That The Image Has Been Approved For Decryption That Is At Least Partly Based On An Estimated Damage Recovery Likelihood Factor Calculated Based On An Identity Of The Entity Associated With The Privacy Beacon Obtaining Module

764 Indication That The Image Has Been Approved For Decryption That Is At Least Partly Based On Data Retrieved At Least Partially Through Use Of Nonunique Identification Data Associated With The Privacy Beacon Obtaining Module

766 Indication That The Image Has Been Approved For Decryption That Is At Least Partly Based On Term Data Including One Or More Terms Of Service Retrieved At Least Partially Through Use Of Nonunique Identification Data Associated With The Privacy Beacon Obtaining Module

752 Decrypting The Device-based Encrypted Image In Response To The Obtained Indication Module

Fig. 7

| Fig. 7A | Fig. 7B | Fig. 7C | Fig. 7D | Fig. 7E | Fig. 7F |

FIG. 7E

254 Decrypted Image Through Decryption Of The Device-based Encrypted Image In Response To A Decryption Approval Generating Module 768 Indication That The Device-based Encrypted Image Has Been Approved For Decryption At Least Partly Based On A Valuation Of The Image Acquiring Module 772 Indication That The Device-based Encrypted Image Has Been Approved For Decryption At Least Partly Based On A Valuation Of The Image That Is At Least Partly Based On The Representation Of The Feature Of The Entity Acquiring Module 774 Indication That The Device-based Encrypted Image Has Been Approved For Decryption At Least Partly Based On A Valuation Of The Image That Is At Least Partly Based On A Comparison Of The Valuation Of The Image And An Estimated Amount Of Damages That May Be Incurred Through Distribution Of The Image That Contains The Representation Of The Feature Of The Entity Acquiring Module 776 Indication That The Device-based Encrypted Image Has Been Approved For Decryption At Least Partly Based On A Valuation Of The Image That Is At Least Partly Based On A Comparison Of The Valuation Of The Image And An Estimated Amount Of Damages That May Be Incurred Through Distribution Of The Image That Is Calculated At Least Partly Based On Term Data That Includes One Or More Terms Of Service That Govern Use Of The Image That Contains The Representation Of The Feature Of The Entity Acquiring Module 770 Device-based Encrypted Image Decrypting In Response To The Acquired Indication Module

Fig. 7

| Fig. 7A | Fig. 7B | Fig. 7C | Fig. 7D | Fig. 7E | Fig. 7F |

FIG. 7F

256 Client-based Encrypted Image Through Encryption Of The Generated Decrypted Image That Uses A Particular Client Code That Is Assigned To A Client That Is Associated With The Image Capture Device Configured To Capture The Image Creating Module 802 Client-based Encrypted Image Through Encryption Of The Generated Decrypted Image That Uses A Particular Client Code That Is Assigned To The Client By A Third Party And That Is Associated With The Image Capture Device Configured To Capture The Image Creating Module 804 Client-based Encrypted Image Through Encryption Of The Generated Decrypted Image That Uses A Unique Entity Code That Is Assigned To The Client By A Third Party And That Is Associated With The Image Capture Device Configured To Capture The Image Creating Module 806 Client-based Encrypted Image Through Encryption Of The Generated Decrypted Image That Uses A Unique Entity Code That Is Assigned To The Client By A Third Party And That Is Associated With The Image Capture Device Configured To Capture The Image And That Is Configured To Be Used As A Seed In A Generation Of An Encryption Key Creating Module 808 Client-based Encrypted Image Through Encryption Of The Generated Decrypted Image That Uses A Unique Entity Code That Is Assigned To A Client That Is An Operator Of Image Capture Device Configured To Capture The Image Creating Module 810 Client-based Encrypted Image Through Encryption Of The Generated Decrypted Image That Uses A Particular Client Code That Is Assigned To A Client That Is Associated With The Image Capture Device Configured To Capture The Image And That Is Unique To A Particular Set Of Clients That Includes The Client Associated With The Image Capture Device Creating Module

| Fig. 8A | Fig. 8B | Fig. 8C |

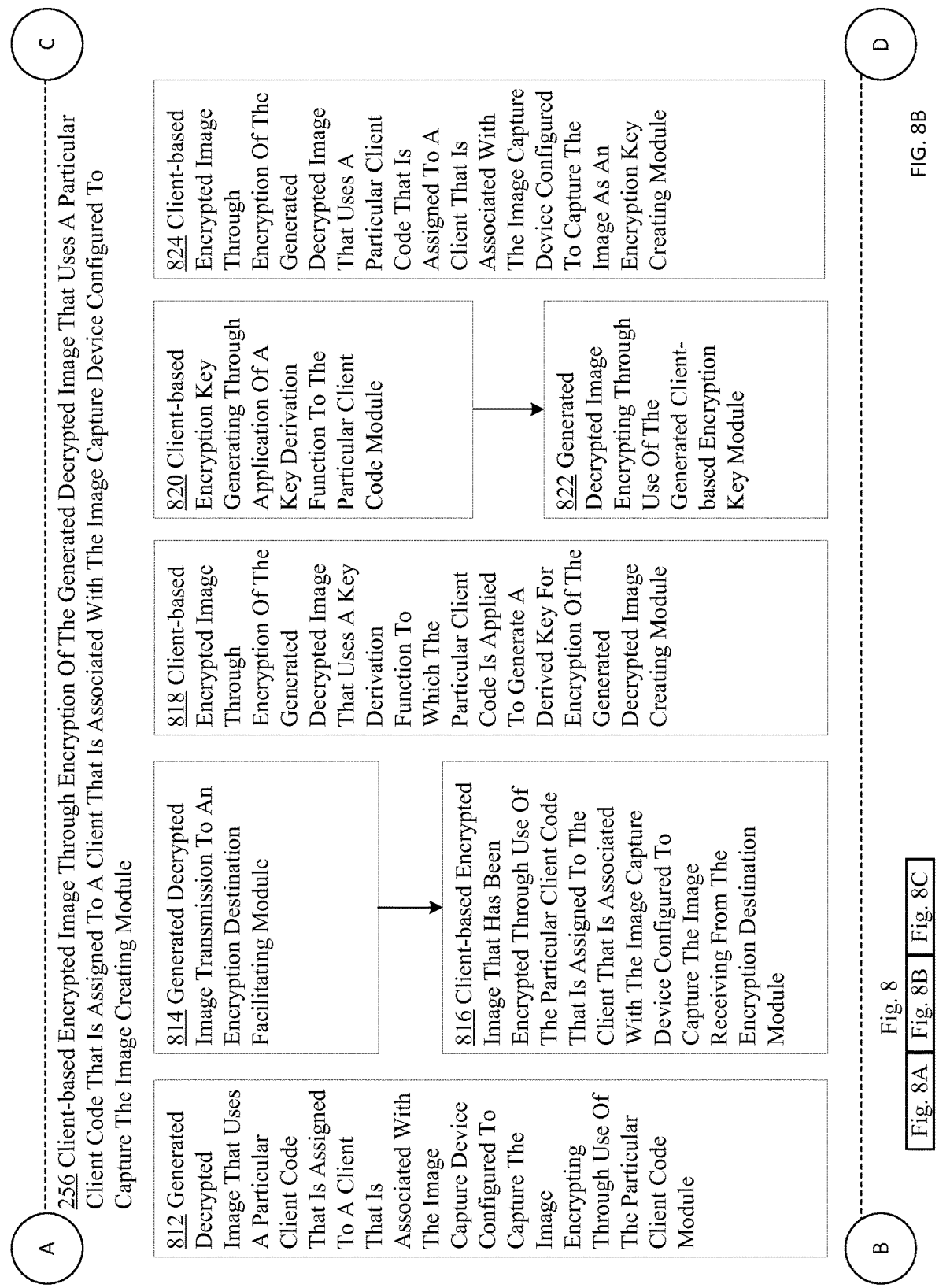

256 Client-based Encrypted Image Through Encryption Of The Generated Decrypted Image That Uses A Particular Client Code That Is Assigned To A Client That Is Associated With The Image Capture Device Configured To Capture The Image Creating Module 826 Client-based Encrypted Image Through Encryption Of The Generated Decrypted Image That Uses A Particular Client Code As A Seed Value For A Symmetric Key Cipher That Is Assigned To A Client That Is Associated With The Image Capture Device Configured To Capture The Image Creating Module 828 Client-based Encrypted Image Through Encryption Of The Generated Decrypted Image That Uses A Particular Client Code That Is Assigned To A Client That Is An Operator Of The Image Capture Device Configured To Capture The Image Creating Module 830 Client-based Encrypted Image Through Encryption Of The Generated Decrypted Image That Uses A Particular Client Code That Is Assigned To A Client That Is An Operator Of The Image Capture Device That Captured The Image Creating Module 832 Client-based Encrypted Image Through Encryption Of The Generated Decrypted Image That Uses A Particular Client Code That Is Assigned To A Client That Is Associated With The Image Capture Device Configured To Capture The Image By An Entity External To The Image Capture Device Creating Module 834 Client-based Encrypted Image Through Encryption Of The Generated Decrypted Image That Uses A Particular Client Code That Is Assigned To The Client That Is An Operator Of The Image Capture Device Configured To Capture The Image That Is Assigned To The Client By A Developer Of One Or More Applications Present In A Memory Of The Image Capture Device Creating Module 836 Client-based Encrypted Image Through Encryption Of The Generated Decrypted Image That Uses A Particular Client Code That Is Assigned, At A Time That The Image Is Captured, To The Client That Is Associated With The Image Capture Device Configured To Capture The Image Creating Module

Fig. 8

| Fig. 8A | Fig. 8B | Fig. 8C |

FIG. 8C

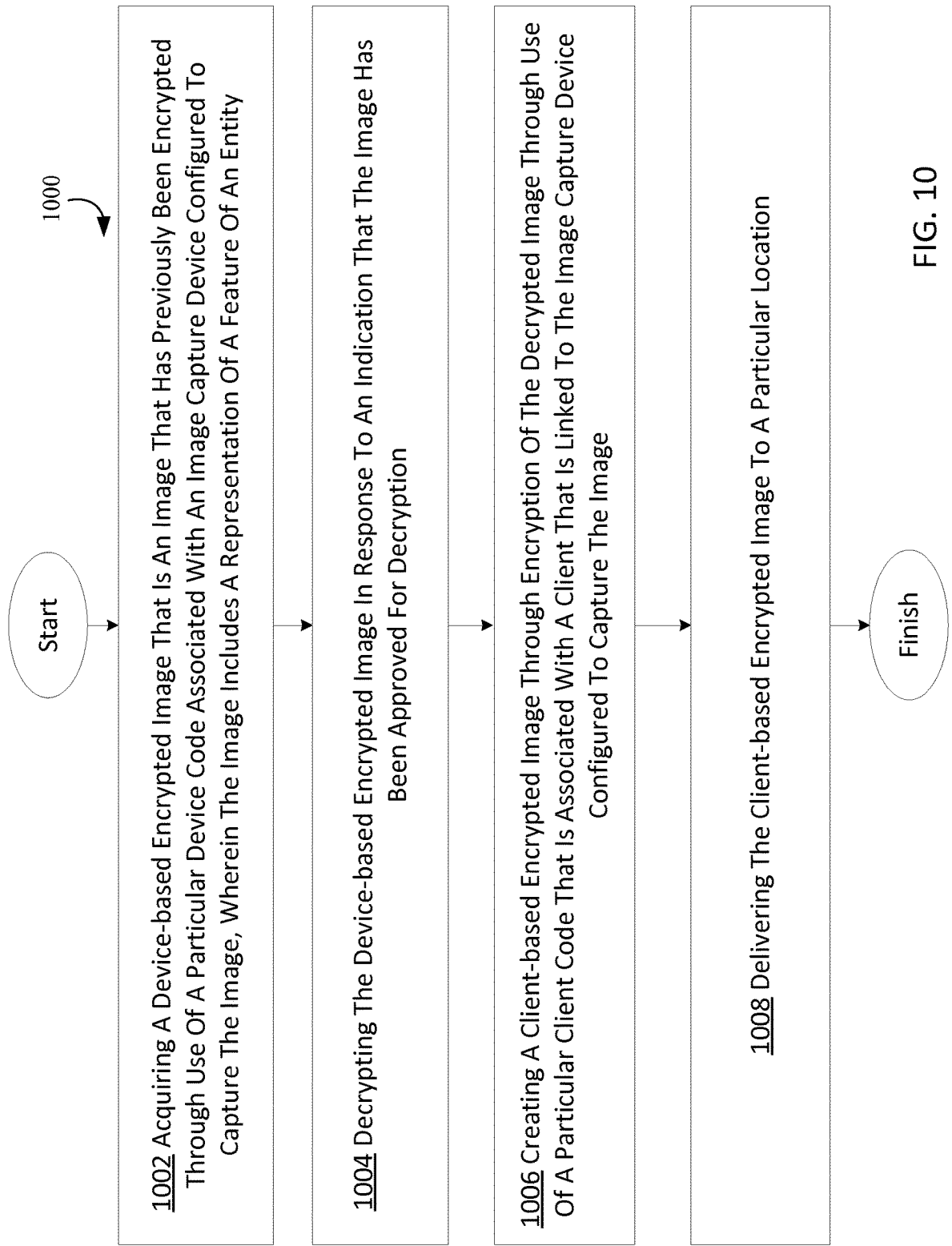

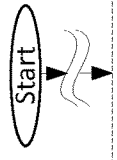
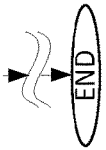

1002 Acquiring A Device-based Encrypted Image That Is An Image That Has Previously Been Encrypted Through Use Of A Unique Device Code Associated With An Image Capture Device Configured To Capture The Image, Wherein The Image Includes A Representation Of A Feature Of An Entity 1102 Receiving The Device-based Encrypted Image That Is The Image That Has Previously Been Encrypted Through Use Of The Particular Device Code That Is A Unique Device Code And That Is Associated With An Image Capture Device Configured To Capture The Image, Wherein The Image Includes The Representation Of The Feature Of The Entity 1108 Acquiring The Device-based Encrypted Image That Is An Image That Has Previously Been Encrypted Through Use Of A Particular Device Code Generated By The Image Capture Device Configured To Capture The Image, Wherein The Image Includes The Representation Of The Feature Of The Entity 1104 Receiving The Device-based Encrypted Image That Is The Image That Has Previously Been Encrypted Through Use Of The Particular Device Code That Is Associated With The Image Capture Device That Captured The Image, Wherein The Image Includes The Representation Of The Feature Of The Entity 1106 Receiving The Device-based Encrypted Image That Is An Image That Has Been Encrypted Through Use Of A Symmetric-key Encryption In Which The Symmetric Key Is Unique And Based On The Image Capture Device That Captured The Image, Wherein The Image Includes Pixel Data Of A Face Of A Famous Movie Star Person

FIG. 11A

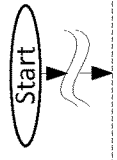
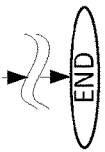

1002 Acquiring A Device-based Encrypted Image That Is An Image That Has Previously Been Encrypted Through Use Of A Unique Device Code Associated With An Image Capture Device Configured To Capture The Image, Wherein The Image Includes A Representation Of A Feature Of An Entity 1110 Acquiring The Device-based Encrypted Image That Is The Image That Has Previously Been Encrypted Through Use Of A Particular Device Code Associated With A User Of The Image Capture Device Configured To Capture The Image, Wherein The Image Includes The Representation Of The Feature Of The Entity 1112 Acquiring A Device-based Encrypted Image That Is An Image That Has Previously Been Encrypted Through Use Of A Particular Device Code Set By The User Of The Image Capture Device Configured To Capture The Image, Wherein The Image Includes The Representation Of The Feature Of The Entity 1114 Acquiring The Device-based Encrypted Image That Is The Image That Has Previously Been Encrypted Through Use Of A Particular Device Code Associated With A Login Identifier Used By The User To Login To The Capture Device, Wherein The Image Includes The Representation Of The Feature Of The Entity 1116 Acquiring A Device-based Encrypted Image That Is An Image That Has Previously Been Encrypted Through Use Of An Encryption Key That Was Generated At Least Partly Based On A Unique String Assigned To The Image Capture Device Configured To Capture The Image, Wherein The Image Includes The Representation Of The Feature Of The Entity 1118 Acquiring The Device-based Encrypted Image That Is An Image That Has Previously Been Encrypted Through Use Of A Particular Device Code Associated With An Image Capture Device Configured To Capture The Image, From A Server That Received The Image From The Image Capture Device 1120 Acquiring The Device-based Encrypted Image That Is An Image That Has Previously Been Encrypted Through Use Of A Particular Device Code Associated With An Image Capture Device Configured To Capture The Image, From A Server That Received The Device-based Encrypted Image From The Image Capture Device

FIG. 11B

1004 Decrypting The Device-based Encrypted Image In Response To An Indication That The Image Has Been Approved For Decryption

1268 Acquiring The Indication That The Image Has Been Approved For Decryption That Is At Least Partly Based On A Valuation Of The Image

1272 Acquiring The Indication That The Image Has Been Approved For Decryption That Is At Least Partly Based On A Valuation Of The Image With Regard To The Representation Of The Feature Of The Entity

1274 Acquiring The Indication That The Image Has Been Approved For Decryption That Is At Least Partly Based On A Comparison Between An Estimated Value Of The Image And An Estimated Amount Of Damages That May Be Incurred Through Distribution Of The Image

1276 Acquiring The Indication That The Image Has Been Approved For Decryption That Is At Least Partly Based On A Comparison Between An Estimated Value Of The Image And An Estimated Amount Of Damages That May Be Incurred Through Distribution Of The Image, Said Estimated Amount Of Damages Configured To Be Estimated At Least Partly Based On Term Data That Includes One Or More Terms Of Service That Govern Distribution Of One Or More Images That Contain The Representation Of The Feature Of The Entity

1270 Decrypting The Device-based Encrypted Image In Response To The Acquired Indication

FIG. 12F

METHODS, SYSTEMS, AND DEVICES FOR DELIVERING IMAGE DATA FROM CAPTURED IMAGES TO DEVICES

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 14/051,213, entitled METHODS, SYSTEMS, AND DEVICES FOR FACILITATING VIABLE DISTRIBUTION OF DATA COLLECTED BY WEARABLE COMPUTATION, naming Pablos Holman, Roderick A. Hyde, Royce A. Levien, Richard T. Lord, Robert W. Lord, and Mark A. Malamud as inventors, filed 10 Oct. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/055,471, entitled METHODS, SYSTEMS, AND DEVICES FOR HANDLING IMAGE DATA FROM CAPTURED IMAGES, naming Pablos Holman, Roderick A. Hyde, Royce A. Levien, Richard T. Lord, Robert W. Lord, and Mark A. Malamud as inventors, filed 16 Oct. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/055,543, entitled METHODS, SYSTEMS, AND DEVICES FOR HANDLING IMAGE DATA FROM CAPTURED IMAGES, naming Pablos Holman, Roderick A. Hyde, Royce A. Levien, Richard T. Lord, Robert W. Lord, and Mark A. Malamud as inventors, filed 16 Oct. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/084,254, entitled DEVICES, METHODS, AND SYSTEMS FOR ANALYZING CAPTURED IMAGE DATA AND PRIVACY DATA, naming Pablos Holman, Roderick A. Hyde, Royce A. Levien, Richard T. Lord, Robert W. Lord, and Mark A. Malamud as inventors, filed 19 Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/084,579 entitled DEVICES, METHODS, AND SYSTEMS FOR ANALYZING CAPTURED IMAGE DATA AND PRIVACY DATA, naming Pablos Holman, Roderick A. Hyde, Royce A. Levien, Richard T. Lord, Robert W. Lord, and Mark A. Malamud as inventors, filed 19 Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/084,581, entitled METHODS, SYSTEMS, AND DEVICES FOR HANDLING IMAGE DATA FROM CAPTURED IMAGES, naming Pablos Holman, Roderick A. Hyde, Royce A. Levien, Richard T. Lord, Robert W. Lord, and Mark A. Malamud as inventors, filed 19 Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/084,591, entitled METHODS, SYSTEMS, AND DEVICES FOR HANDLING IMAGE DATA FROM CAPTURED IMAGES, naming Pablos Holman, Roderick A. Hyde, Royce A. Levien, Richard T. Lord, Robert W. Lord, and Mark A. Malamud as inventors, filed 19 Nov. 2013, which is currently co-pending or is an application of which a currently co-pending application is entitled to the benefit of the filing date.

RELATED APPLICATIONS

U.S. patent application Ser. No. 14/108,185, entitled METHODS, SYSTEMS, AND DEVICES FOR HANDLING INSERTED IMAGE DATA INTO CAPTURED IMAGES, naming Pablos Holman, Roderick A. Hyde, Royce A. Levien, Richard T. Lord, Robert W. Lord, and Mark A. Malamud as inventors, filed 16 Dec. 2013, is related to the present application.

U.S. patent application Ser. No. 14/108,217, entitled METHODS, SYSTEMS, AND DEVICES FOR HANDLING INSERTED IMAGE DATA INTO CAPTURED IMAGES, naming Pablos Holman, Roderick A. Hyde, Royce A. Levien, Richard T. Lord, Robert W. Lord, and Mark A. Malamud as inventors, filed 16 Dec. 2013, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to the capture of images that may include personality rights.

SUMMARY

Recently, there has been an increased popularity in wearable computers, e.g., computers that are placed in articles of clothing or clothing accessories, e.g., watches, eyeglasses, shoes, jewelry, accessories, shirts, pants, headbands, and the like. As technology allows electronic devices to become smaller and smaller, more and more items may be "smart" items, e.g., may contain a computer.

In addition, image capturing technology has also improved, allowing for high quality digital cameras that can capture pictures, audio, video, or a combination thereof. These digital cameras may be small enough to fit onto wearable computers, e.g., inside of eyeglasses. In some instances, the digital camera may blend into the eyeglasses mold, and may not be immediately recognizable as a camera. Such eyeglasses may be indistinguishable or somewhat distinguishable from standard eyeglasses that do not contain a camera and/or a computer.

Further, the cost of data storage has decreased dramatically, and it is not uncommon for an average person in a developed nation to have access to enough digital storage to store months' and/or years' worth of video and pictures. As the cost of data storage has decreased dramatically, so too has the cost of processors to process that data, meaning that automation may be able to take an entire day's worth of surreptitious recording, and isolate those portions of the recording that captured persons, either specific persons or persons in general.

Accordingly, with technology, it is possible for a person to "wear" a computer, in the form of eyeglasses, watches, shirts, hats, or through a pocket-sized device carried by a person, e.g., a cellular telephone device. This wearable computer may be used to record people, e.g., to capture pictures, audio, video, or a combination thereof a person, without their knowledge. Thus, conversations that a person may assume to be private, may be recorded and widely distributed. Moreover, a person may be surreptitiously recorded while they are in a locker room, in a bathroom, or in a telephone booth. It may be difficult or impossible to tell when a person is being recorded. Further, once proliferation of these wearable computers with digital cameras becomes widespread, people must assume that they are under surveillance 100% of the time that they are not in their house.

Therefore, a need has arisen to provide systems that attempt to limit the capture and distribution of a person's personality rights. The present invention is directed to devices, methods, and systems that attempt to limit the capture and distribution of captured images of persons. Specifically, the present invention is directed to devices, methods, and systems that attempt to limit the capture and distribution of captured images of persons, implemented at a device that carries out the capturing of the image. In some embodiments, this device may be a wearable computer, but in other embodiments, any image capturing device or any device that has an image capturing device incorporated into its functionality may implement the devices, methods, and systems described herein.

The instant application is directed to devices, methods, and systems that have a capability to capture images, and in which the capture of those images may include capturing images of a person, persons, or portion(s) of a person for which a privacy beacon may be associated. The privacy beacon may be optical, digital, or other form (e.g., radio, electromagnetic, biomechanic, quantum-state, and the like), and may be detected through digital or optical operations, as discussed herein. The instant application describes devices, methods and systems that may interface with other parts of a larger system, which may be described in detail in this or other applications.

In one or more various aspects, a method includes, but is not limited to, acquiring a device-based encrypted image that is an image that has previously been encrypted through use of a particular device code associated with an image capture device configured to capture the image, wherein the image includes a representation of a feature of an entity, decrypting the device-based encrypted image in response to an indication that the image has been approved for decryption, creating a client-based encrypted image through encryption of the decrypted image through use of a particular client code that is associated with a client that is linked to the image capture device configured to capture the image, and delivering the client-based encrypted image to a particular location. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for carrying out the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for acquiring a device-based encrypted image that is an image that has previously been encrypted through use of a particular device code associated with an image capture device configured to capture the image, wherein the image includes a representation of a feature of an entity, means for decrypting the device-based encrypted image in response to an indication that the image has been approved for decryption, means for creating a client-based encrypted image through encryption of the decrypted image through use of a particular client code that is associated with a client that is linked to the image capture device configured to capture the image, and means for delivering the client-based encrypted image to a particular location. In addition to the foregoing, other system aspects are described in the claims, drawings, and text forming a part of the disclosure set forth herein.

In one or more various aspects, a system includes, but is not limited to, circuitry for acquiring a device-based encrypted image that is an image that has previously been encrypted through use of a particular device code associated with an image capture device configured to capture the image, wherein the image includes a representation of a feature of an entity, circuitry for decrypting the device-based encrypted image in response to an indication that the image has been approved for decryption, circuitry for creating a client-based encrypted image through encryption of the decrypted image through use of a particular client code that is associated with a client that is linked to the image capture device configured to capture the image, and delivering the client-based encrypted image to a particular location. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for acquiring a device-based encrypted image that is an image that has previously been encrypted through use of a particular device code associated with an image capture device configured to capture the image, wherein the image includes a representation of a feature of an entity, one or more instructions for decrypting the device-based encrypted image in response to an indication that the image has been approved for decryption, one or more instructions for creating a client-based encrypted image through encryption of the decrypted image through use of a particular client code that is associated with a client that is linked to the image capture device configured to capture the image, and one or more instructions for delivering the client-based encrypted image to a particular location. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for acquiring a device-based encrypted image that is an image that has previously been encrypted through use of a particular device code associated with an image capture device configured to capture the image, wherein the image includes a representation of a feature of an entity, one or more interchained physical machines ordered for decrypting the device-based encrypted image in response to an indication that the image has been approved for decryption, one or more interchained physical machines ordered for creating a client-based encrypted image through encryption of the decrypted image through use of a particular client code that is associated with a client that is linked to the image capture device configured to capture the image, and one or more interchained physical machines ordered for delivering the client-based encrypted image to a particular location.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1, including FIGS. 1-A through 1-T, shows a high-level system diagram of one or more exemplary environments in which transactions and potential transactions may be carried out, according to one or more embodiments. FIG. 1 forms a partially schematic diagram of an environment(s) and/or an implementation(s) of technologies described herein when FIGS. 1-A through 1-T are stitched together in the manner shown in FIG. 1-P, which is reproduced below in table format.

In accordance with 37 C.F.R. § 1.84(h)(2), FIG. 1 shows "a view of a large machine or device in its entirety . . . broken into partial views . . . extended over several sheets" labeled FIG. 1-A through FIG. 1-T (Sheets 1-20). The "views on two or more sheets form, in effect, a single complete view, [and] the views on the several sheets . . . [are] so arranged that the complete figure can be assembled" from "partial views drawn on separate sheets . . . linked edge to edge. Thus, in FIG. 1, the partial view FIGS. 1-A through 1-T are ordered alphabetically, by increasing in columns from left to right, and increasing in rows top to bottom, as shown in the following table:

TABLE 1

Figure 2B:
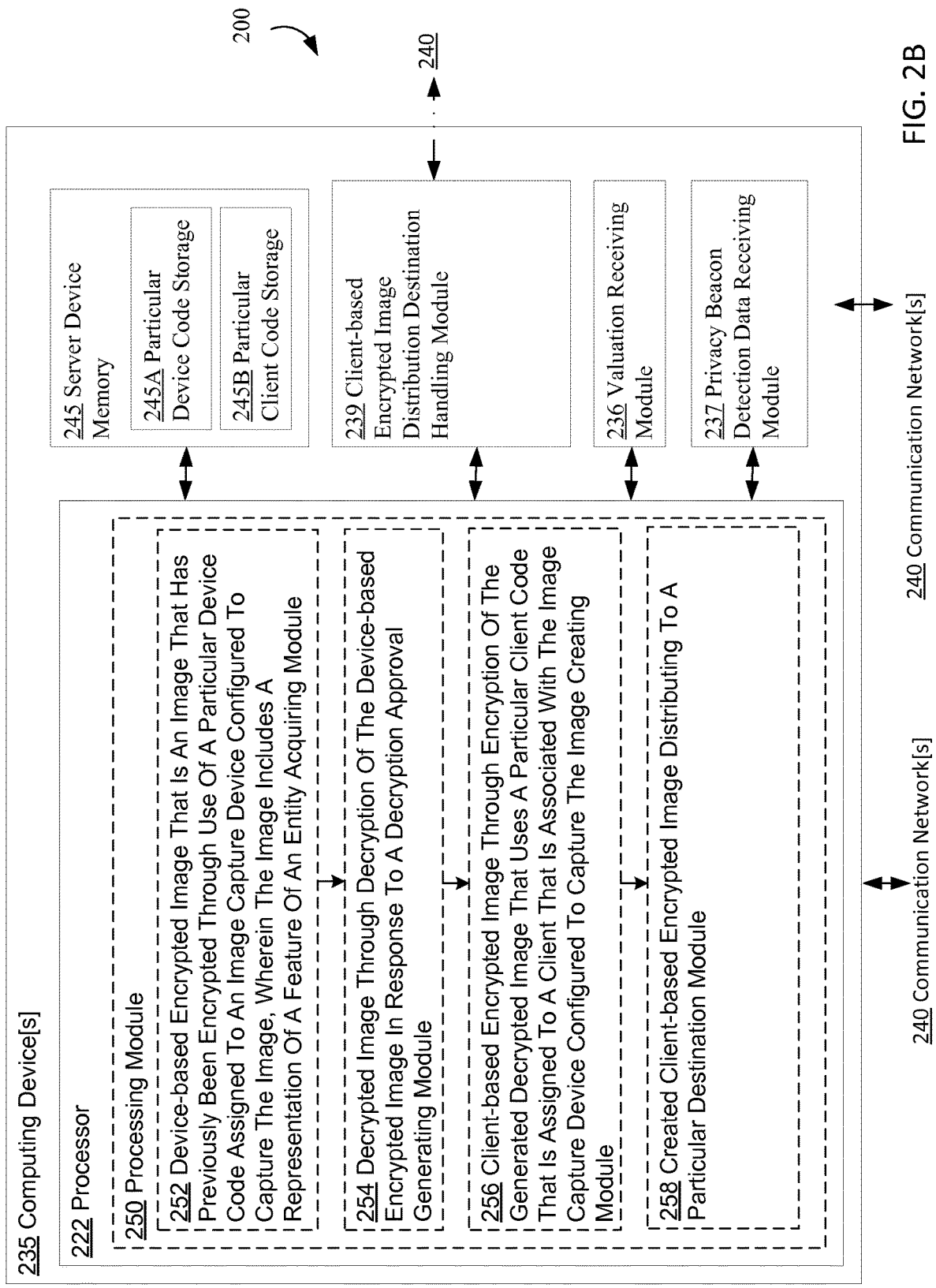

Table showing alignment of enclosed drawings to form partial schematic of one or more environments.

| (1, 1) - FIG. 1-A | (1, 2) - FIG. 1-B | (1, 3) - FIG. 1-C | (1, 4) - FIG. 1-D | (1, 5) - FIG. 1-E |
|---|---|---|---|---|
| (2, 1) - FIG. 1-F | (2, 2) - FIG. 1-G | (2, 3) - FIG. 1-H | (2, 4) - FIG. 1-I | (2, 5) - FIG. 1-J |
| (3, 1) - FIG. 1-K | (3, 2) - FIG. 1-L | (3, 3) - FIG. 1-M | (3, 4) - FIG. 1-N | (3, 5) - FIG. 1-O |
| (4, 1) - FIG. 1-P | (4, 2) - FIG. 1-Q | (4, 3) - FIG. 1-R | (4, 4) - FIG. 1-S | (4, 5) - FIG. 1-T |

In accordance with 37 C.F.R. § 1.84(h)(2), FIG. 1 is " . . . a view of a large machine or device in its entirety . . . broken into partial views . . . extended over severalsheets . . . [with] no loss in facility of understanding the view." The partial views drawn on the several sheets indicated in the above table are capable of being linked edge to edge, so that no partial view contains parts of another partial view. As here, "where views on two or more sheets form, in effect, a single complete view, the views on the several sheets are so arranged that the complete figure can be assembled without concealing any part of any of the views appearing on the various sheets." 37 C.F.R. § 1.84(h)(2).

It is noted that one or more of the partial views of the drawings may be blank, or may not contain substantive elements (e.g., may show only lines, connectors, and the like). These drawings are included in order to assist readers of the application in assembling the single complete view from the partial sheet format required for submission by the USPTO, and, while their inclusion is not required and may be omitted in this or other applications, their inclusion is proper, and should be considered intentional.

FIG. 1-A, when placed at position (1,1), forms at least a portion of a partially schematic diagram of an environment(s) and/or an implementation(s) of technologies described herein.

FIG. 1-B, when placed at position (1,2), forms at least a portion of a partially schematic diagram of an environment(s) and/or an implementation(s) of technologies described herein.

FIG. 1-C, when placed at position (1,3), forms at least a portion of a partially schematic diagram of an environment(s) and/or an implementation(s) of technologies described herein.

FIG. 1-D, when placed at position (1,4), forms at least a portion of a partially schematic diagram of an environment(s) and/or an implementation(s) of technologies described herein.

FIG. 1-E, when placed at position (1,5), forms at least a portion of a partially schematic diagram of an environment(s) and/or an implementation(s) of technologies described herein.

FIG. 1-F, when placed at position (2,1), forms at least a portion of a partially schematic diagram of an environment(s) and/or an implementation(s) of technologies described herein.

FIG. 1-G, when placed at position (2,2), forms at least a portion of a partially schematic diagram of an environment(s) and/or an implementation(s) of technologies described herein.

FIG. 1-H, when placed at position (2,3), forms at least a portion of a partially schematic diagram of an environment(s) and/or an implementation(s) of technologies described herein.

FIG. 1-I, when placed at position (2,4), forms at least a portion of a partially schematic diagram of an environment(s) and/or an implementation(s) of technologies described herein.

FIG. 1-J, when placed at position (2,5), forms at least a portion of a partially schematic diagram of an environment(s) and/or an implementation(s) of technologies described herein.

FIG. 1-K, when placed at position (3,1), forms at least a portion of a partially schematic diagram of an environment(s) and/or an implementation(s) of technologies described herein.

FIG. 1-L, when placed at position (3,2), forms at least a portion of a partially schematic diagram of an environment(s) and/or an implementation(s) of technologies described herein.

FIG. 1-M, when placed at position (3,3), forms at least a portion of a partially schematic diagram of an environment(s) and/or an implementation(s) of technologies described herein.

FIG. 1-N, when placed at position (3,4), forms at least a portion of a partially schematic diagram of an environment(s) and/or an implementation(s) of technologies described herein.

FIG. 1-O, when placed at position (3,5), forms at least a portion of a partially schematic diagram of an environment(s) and/or an implementation(s) of technologies described herein.

FIG. 1-P, when placed at position (4,1), forms at least a portion of a partially schematic diagram of an environment(s) and/or an implementation(s) of technologies described herein.

FIG. 1-Q, when placed at position (4,2), forms at least a portion of a partially schematic diagram of an environment(s) and/or an implementation(s) of technologies described herein.

FIG. 1-R, when placed at position (4,3), forms at least a portion of a partially schematic diagram of an environment(s) and/or an implementation(s) of technologies described herein.

FIG. 1-S, when placed at position (4,4), forms at least a portion of a partially schematic diagram of an environment(s) and/or an implementation(s) of technologies described herein.

FIG. 1-T, when placed at position (4,5), forms at least a portion of a partially schematic diagram of an environment(s) and/or an implementation(s) of technologies described herein.

FIG. 2A shows a high-level block diagram of an exemplary environment 200, according to one or more embodiments.

FIG. 2B shows a high-level block diagram of a computing device, e.g., a device 235 operating in an exemplary environment 200, according to one or more embodiments.

Figure 3A:
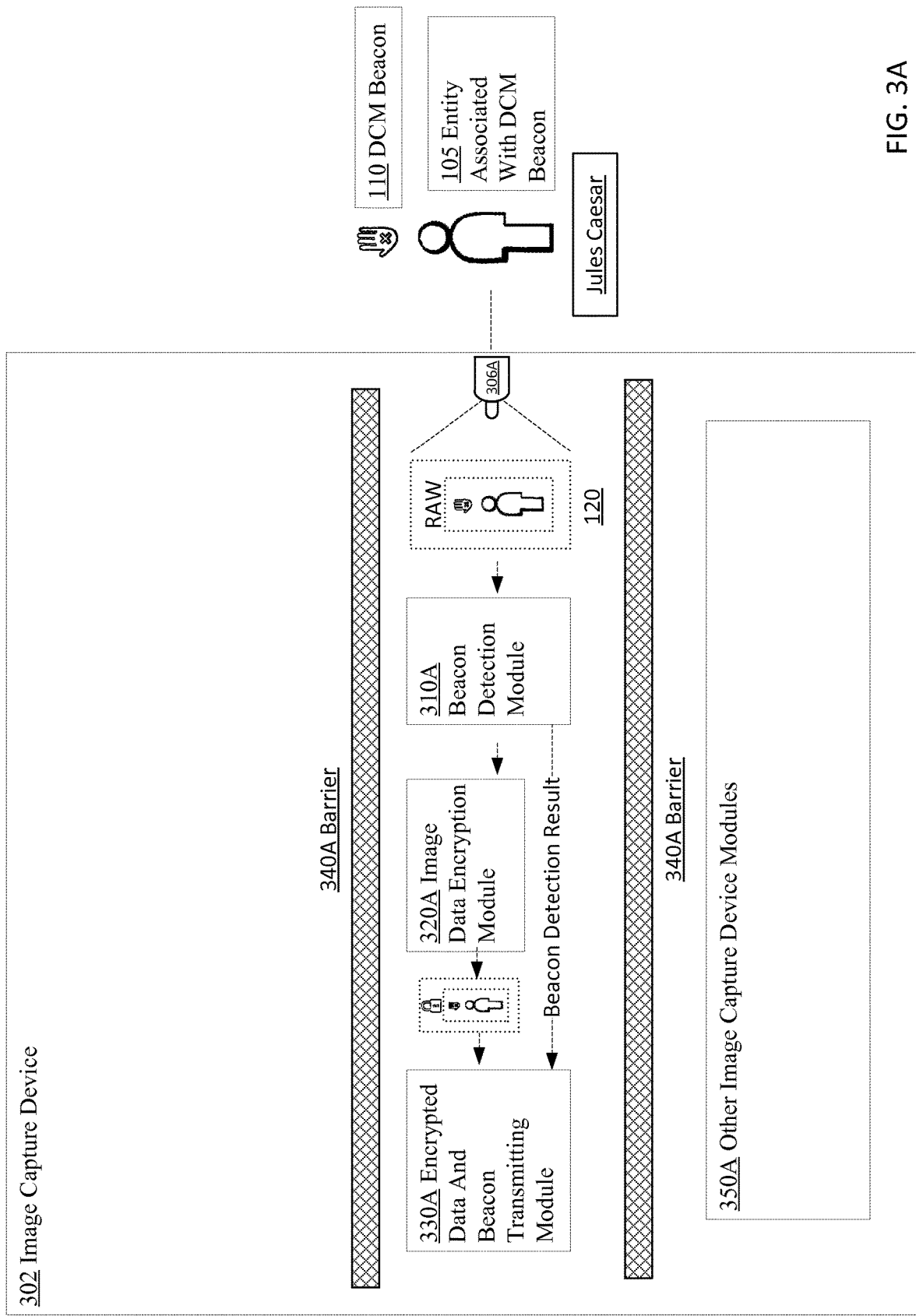

FIG. 3A shows a high-level block diagram of an exemplary image capturing device 302, according to one or more embodiments.

Figure 3B:
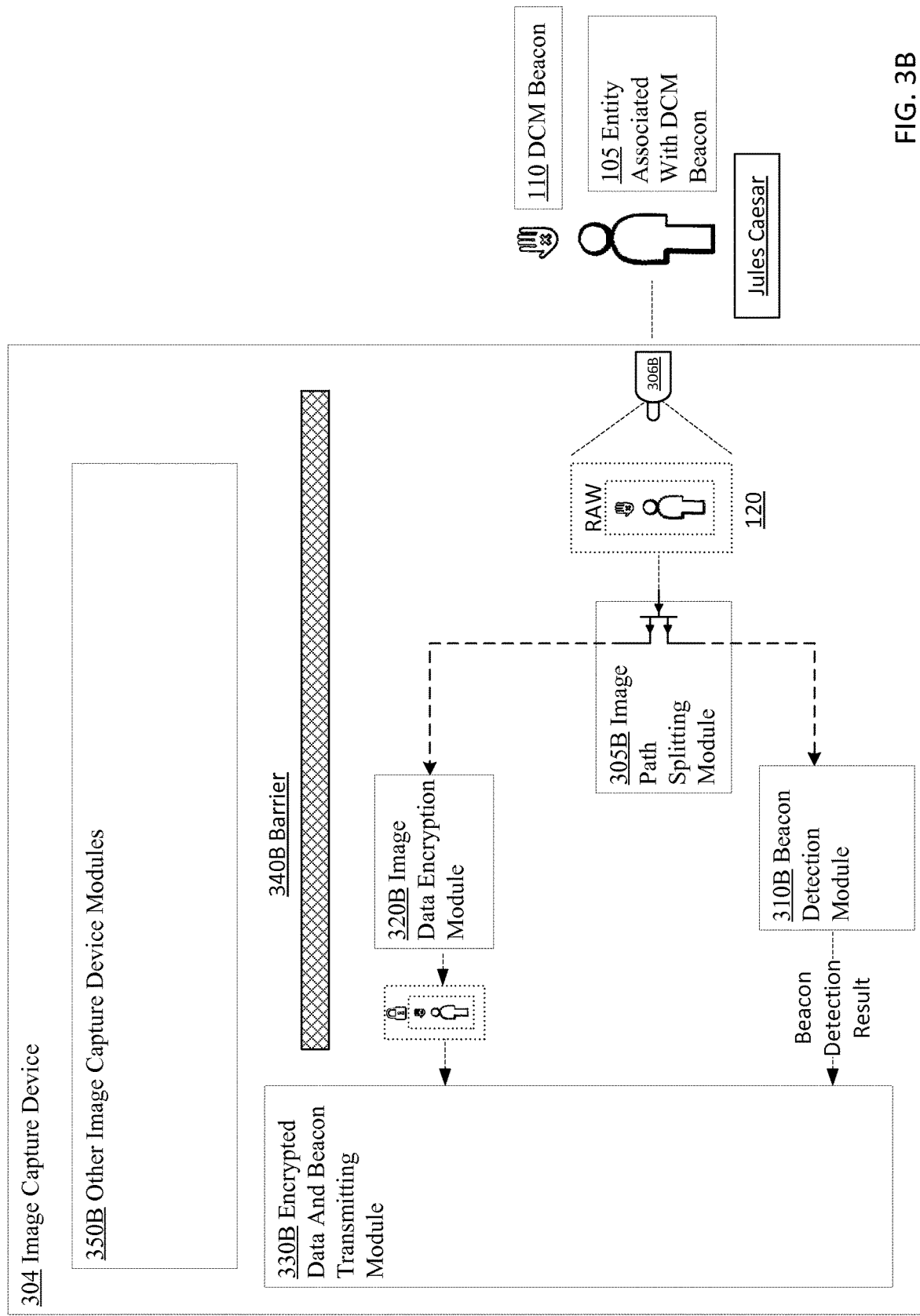

FIG. 3B shows a high-level block diagram of an exemplary image capturing device 304, according to one or more embodiments.

Figure 3C:
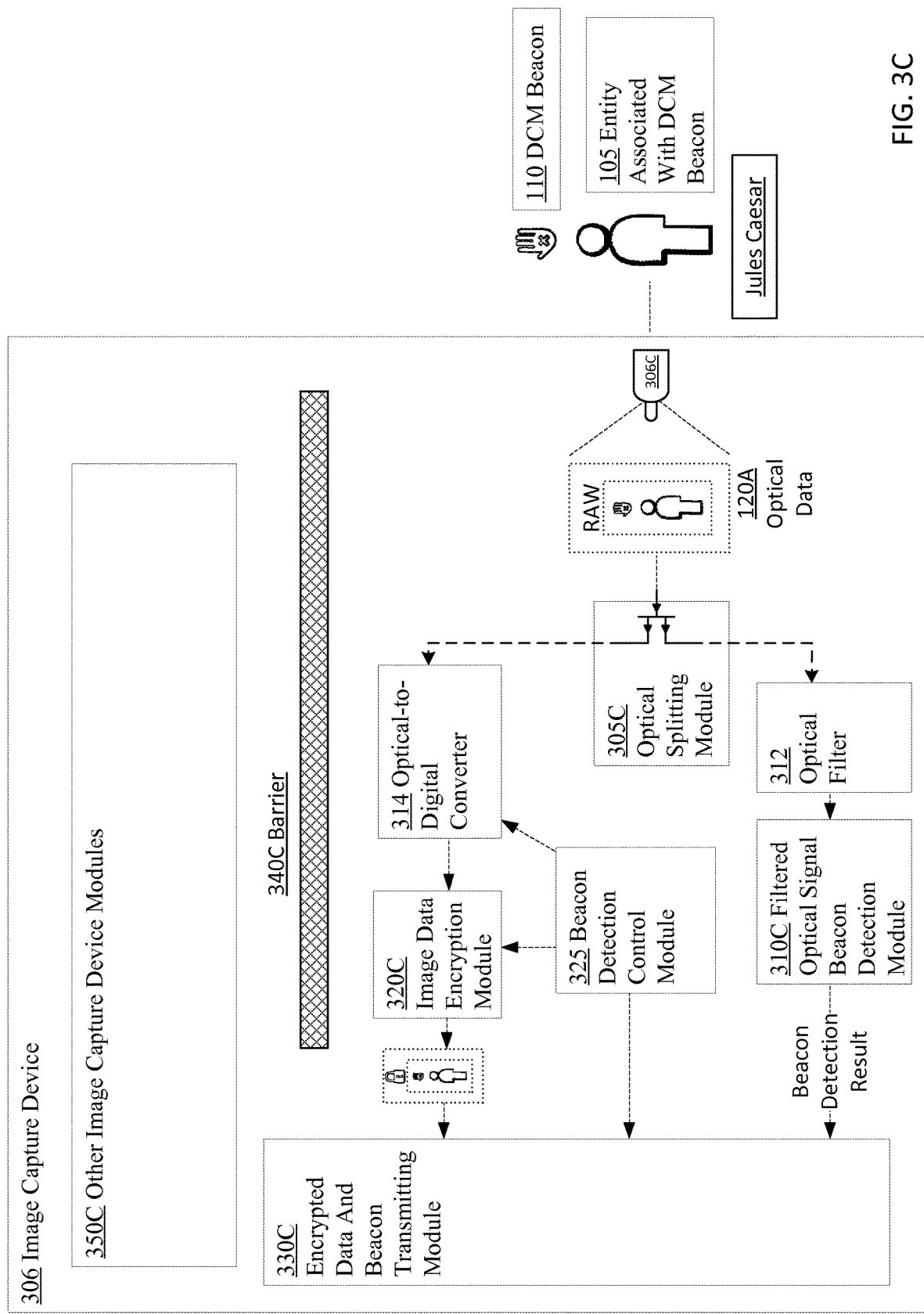

FIG. 3C shows a high-level block diagram of an exemplary image capturing device 306, according to one or more embodiments.

Figure 3D:
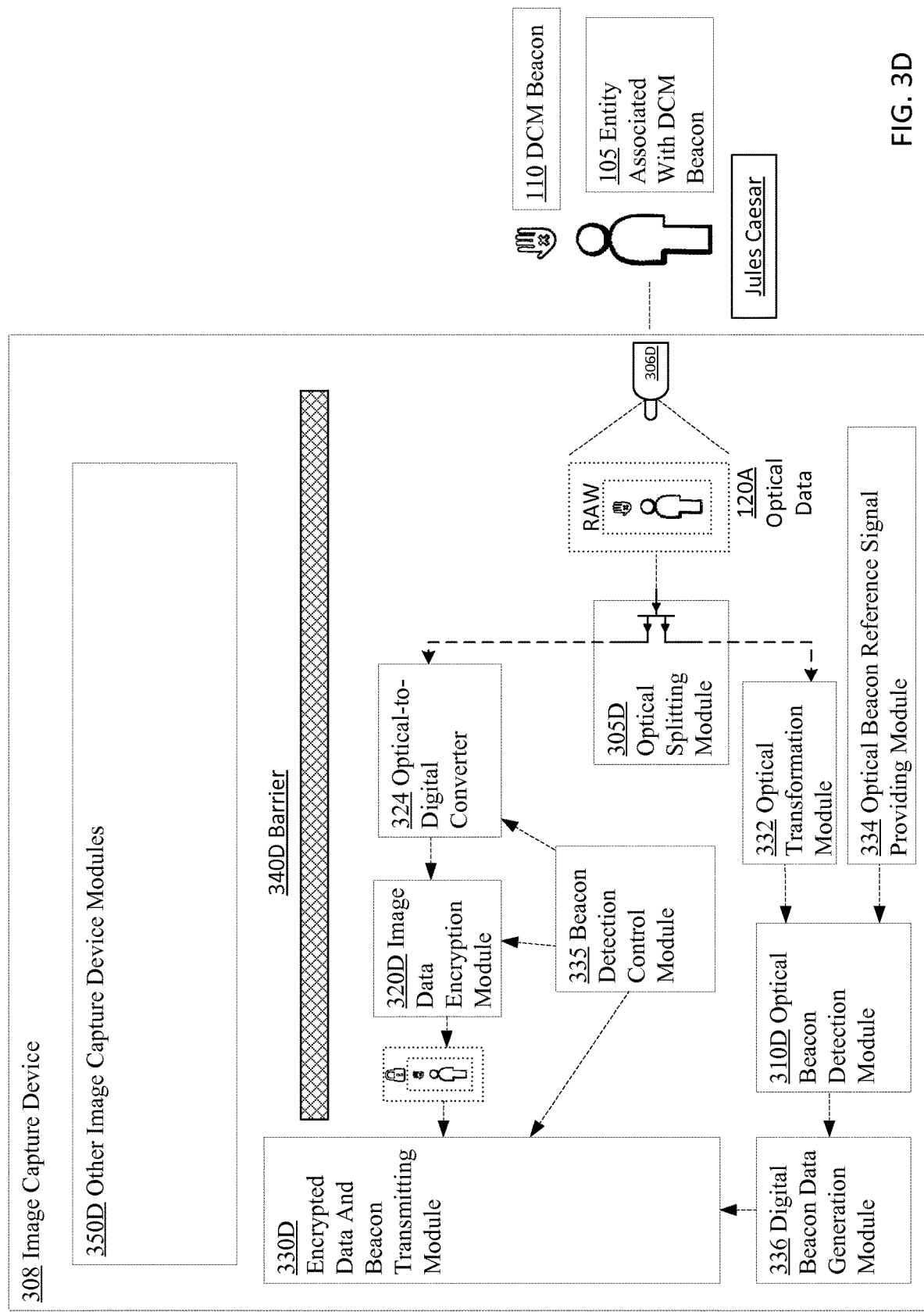

FIG. 3D shows a high-level block diagram of an exemplary image capturing device 308, according to one or more embodiments.

Figure 3E:
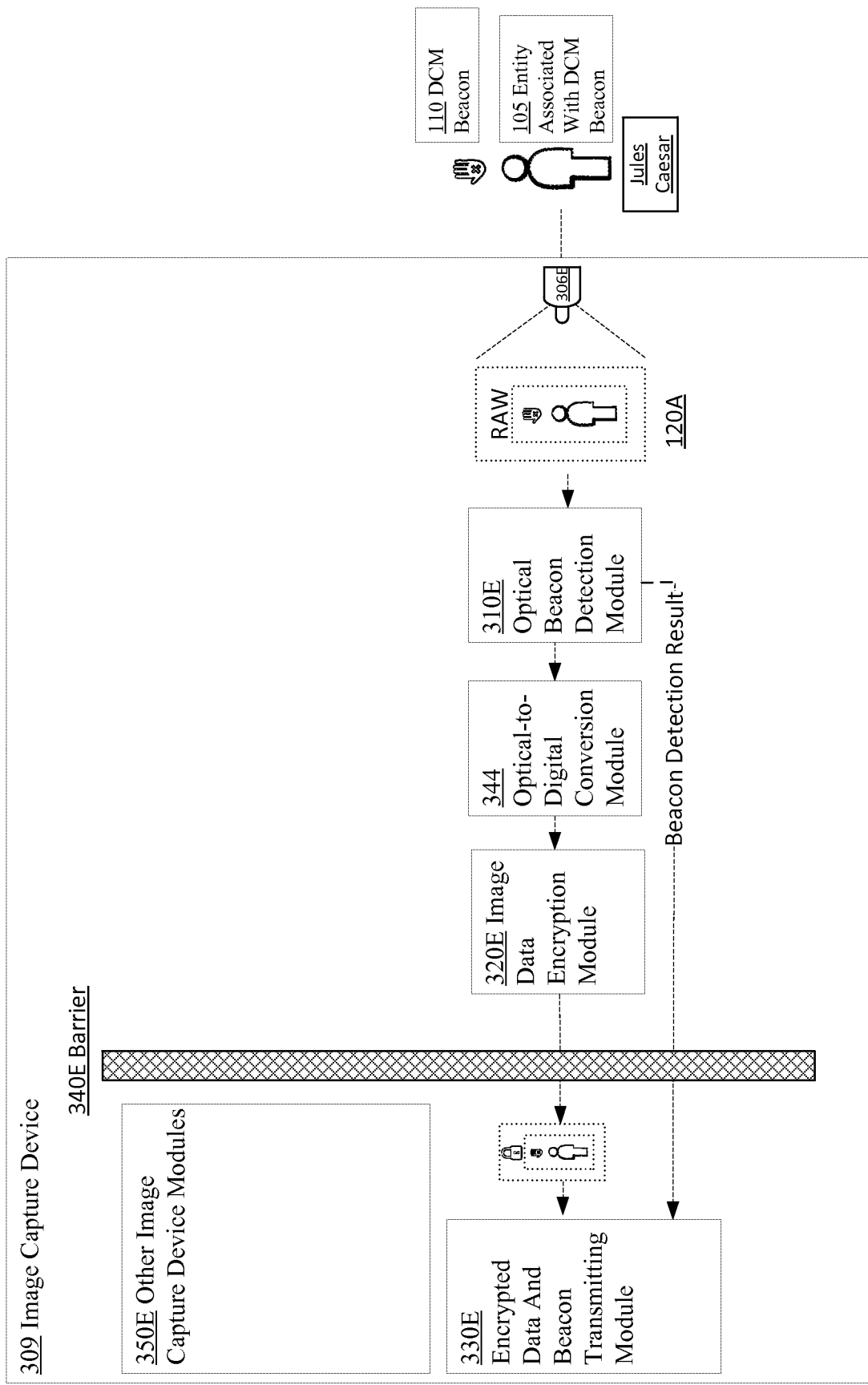

FIG. 3E shows a high-level block diagram of an exemplary image capturing device 309, according to one or more embodiments.

Figure 4A:
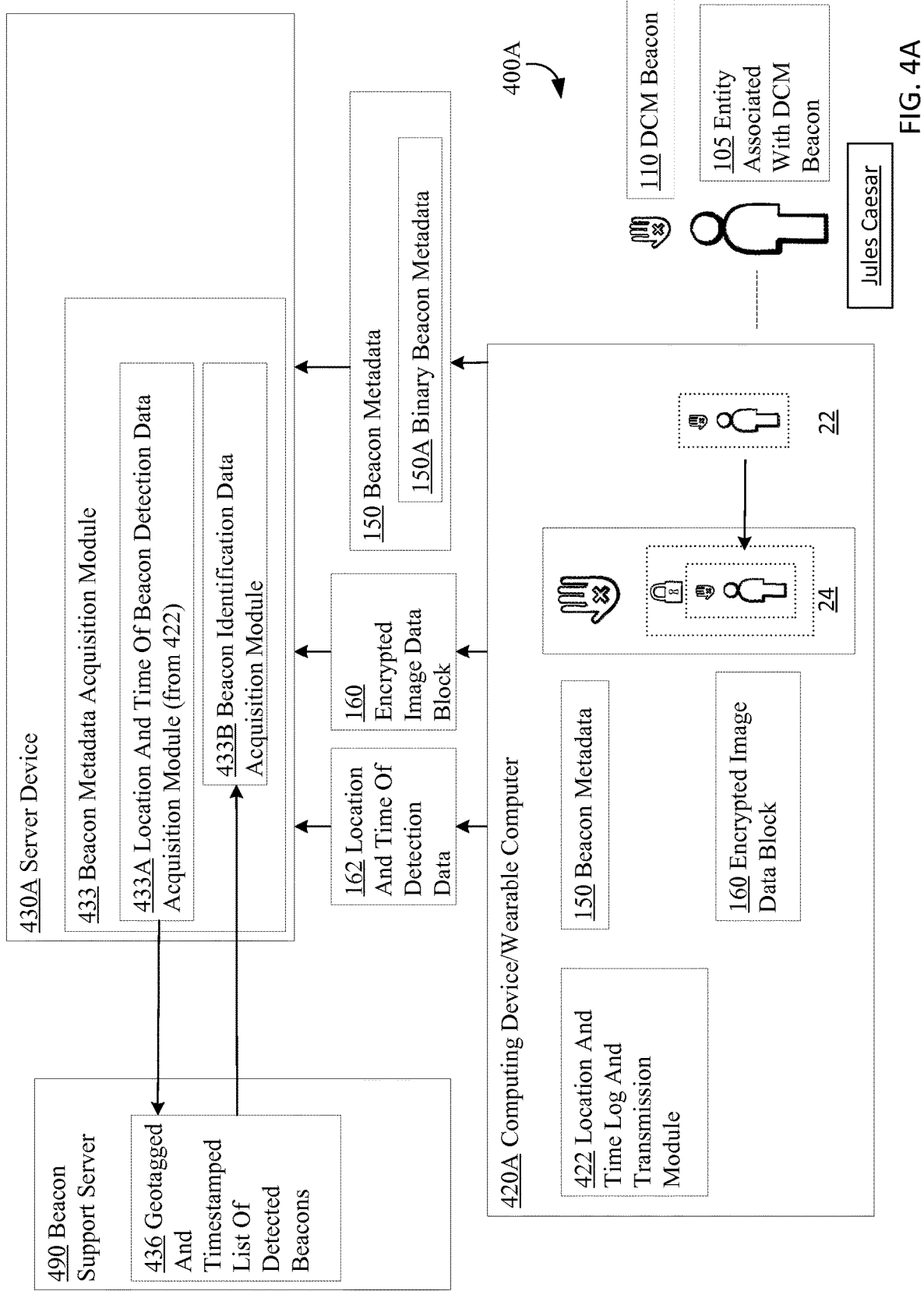

FIG. 4A shows a high-level block diagram of an exemplary environment 400A including a computing device 420A and a server device 430A.

FIG. 4B shows a high-level block diagram of an exemplary environment 400B including a computing device 420B and a server device 420B.

FIG. 4C shows a high-level block diagram of an exemplary environment 400C including a computing device 420C and a server device 420C.

FIG. 4D shows a high-level block diagram of an exemplary environment 400D including a computing device 420D and a server device 420D.

Figure 4E:
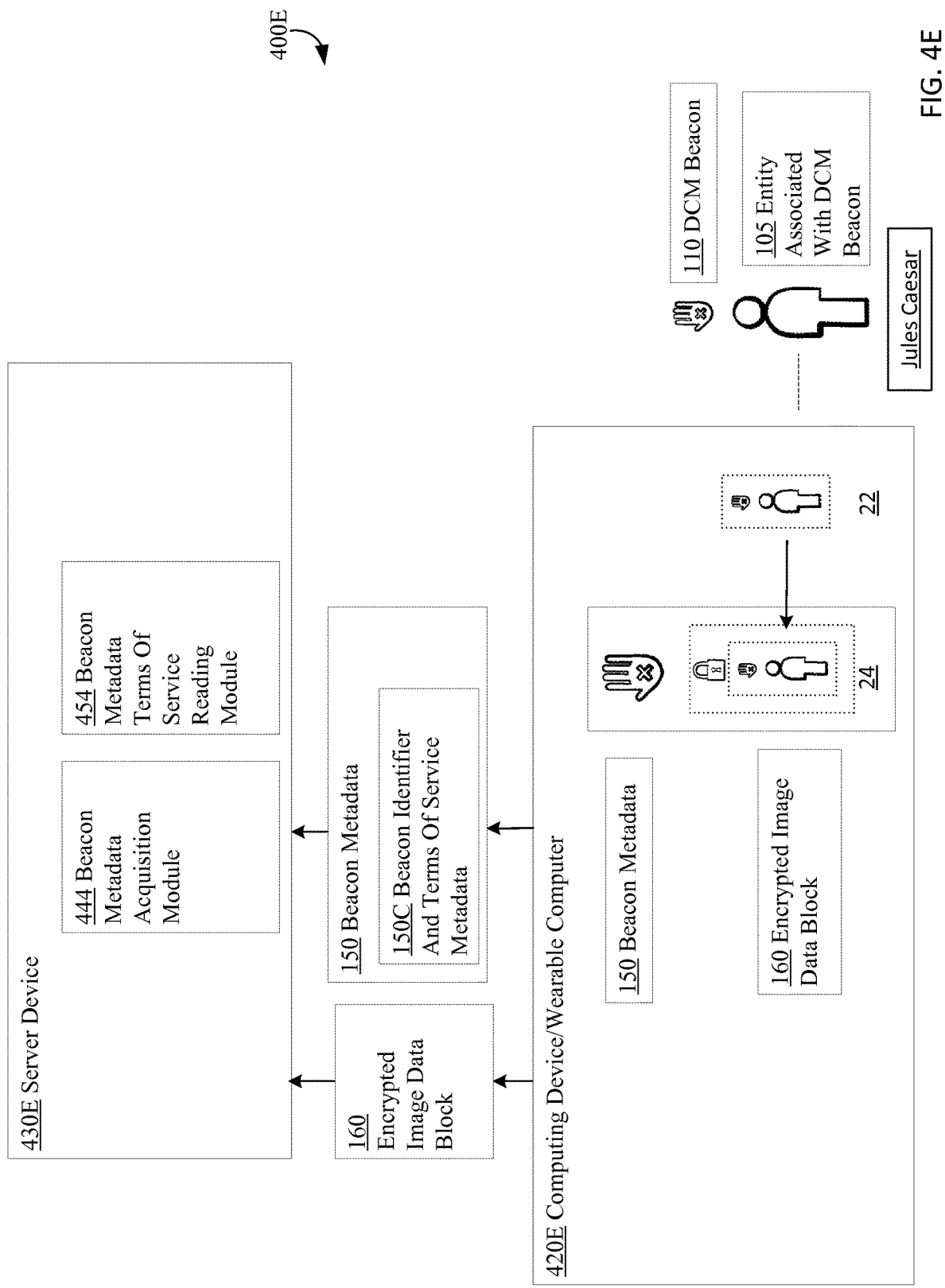

FIG. 4E shows a high-level block diagram of an exemplary environment 400B including a computing device 420B and a server device 420B.

Figure 5A:
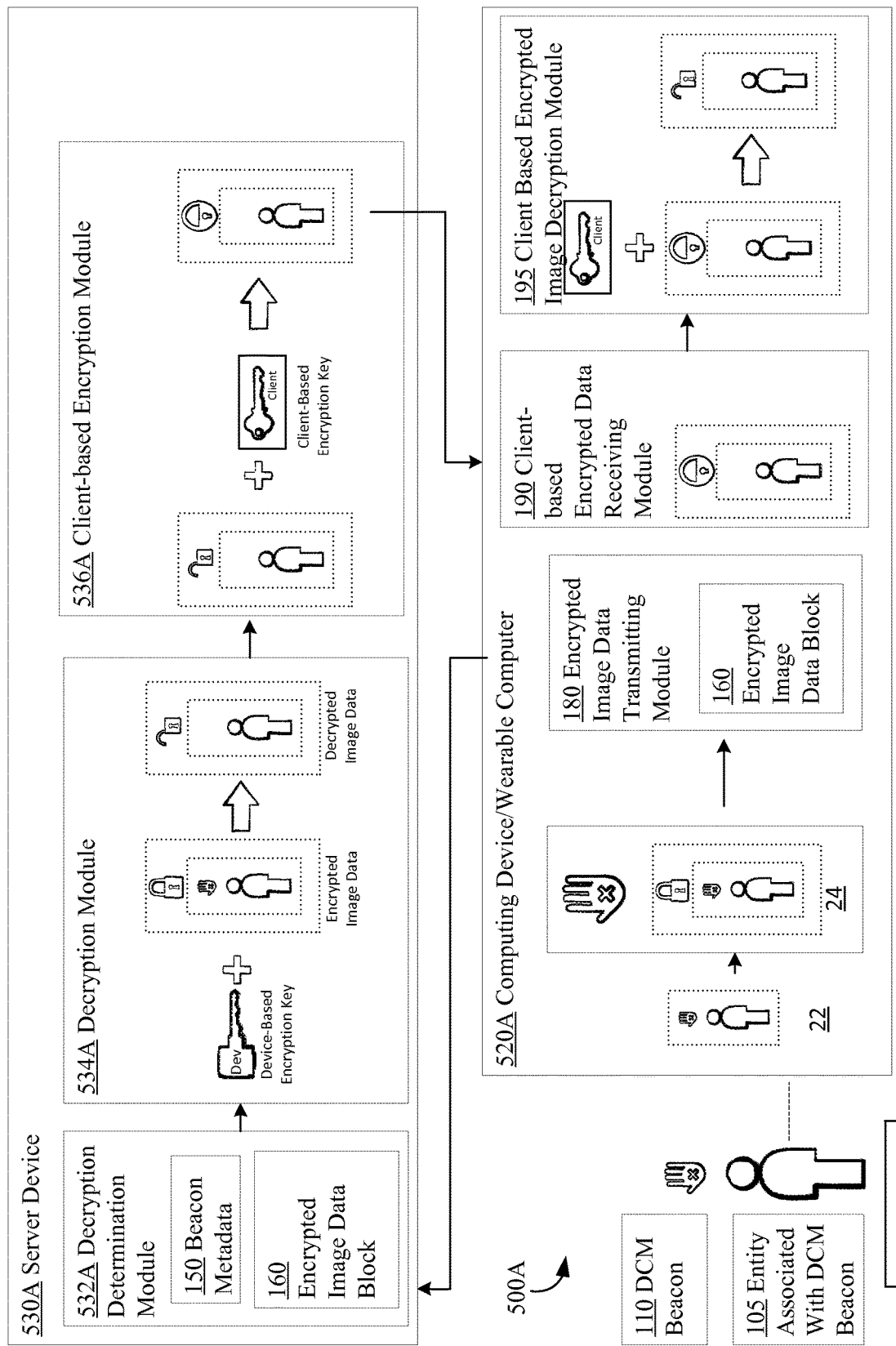

FIG. 5A shows a high-level block diagram of an exemplary environment 500A including a computing device 520A and a server device 530A.

Figure 5B:
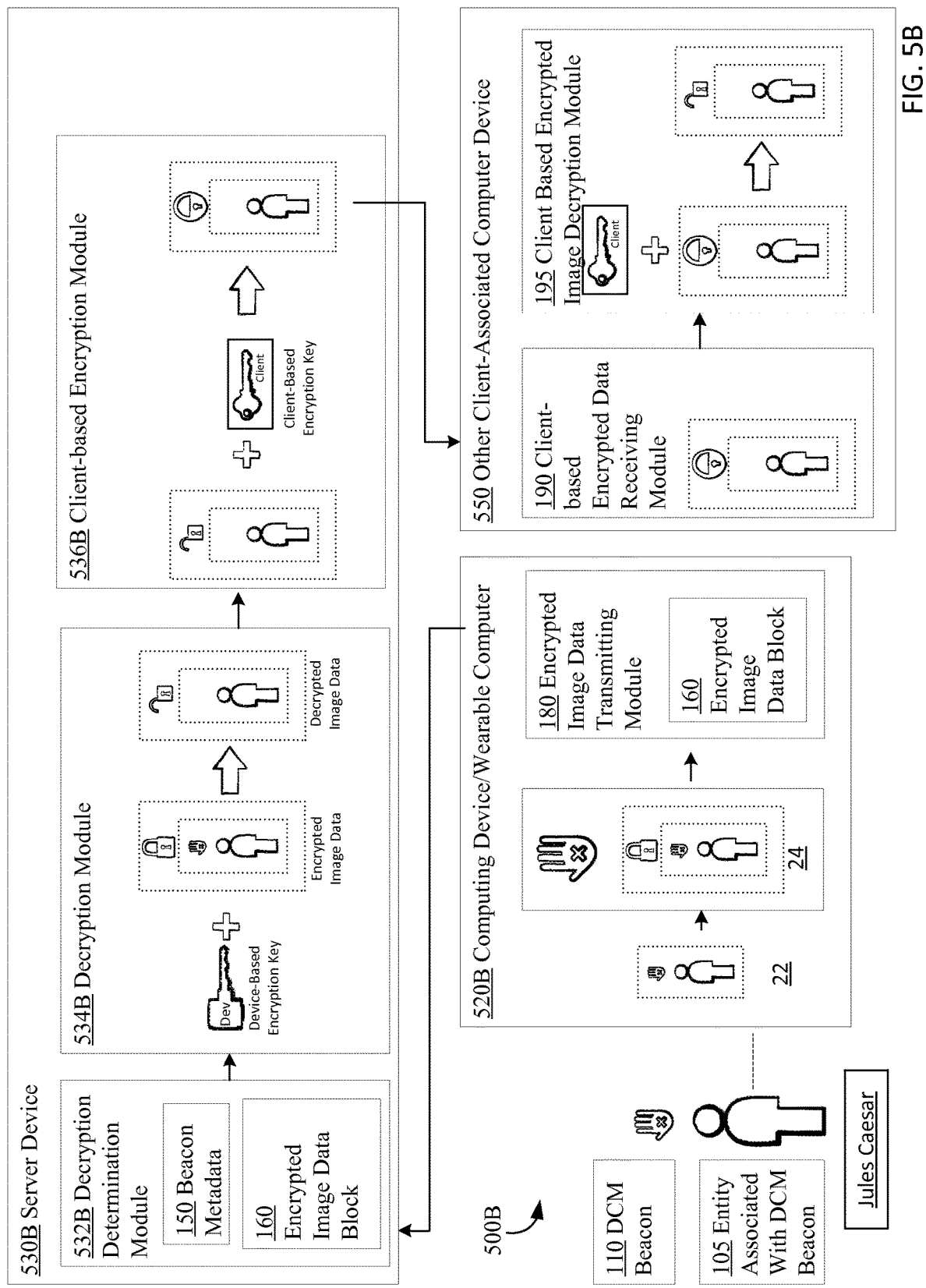

FIG. 5B shows a high-level block diagram of an exemplary environment 500B including a computing device 520B and a server device 530B.

Figure 5C:
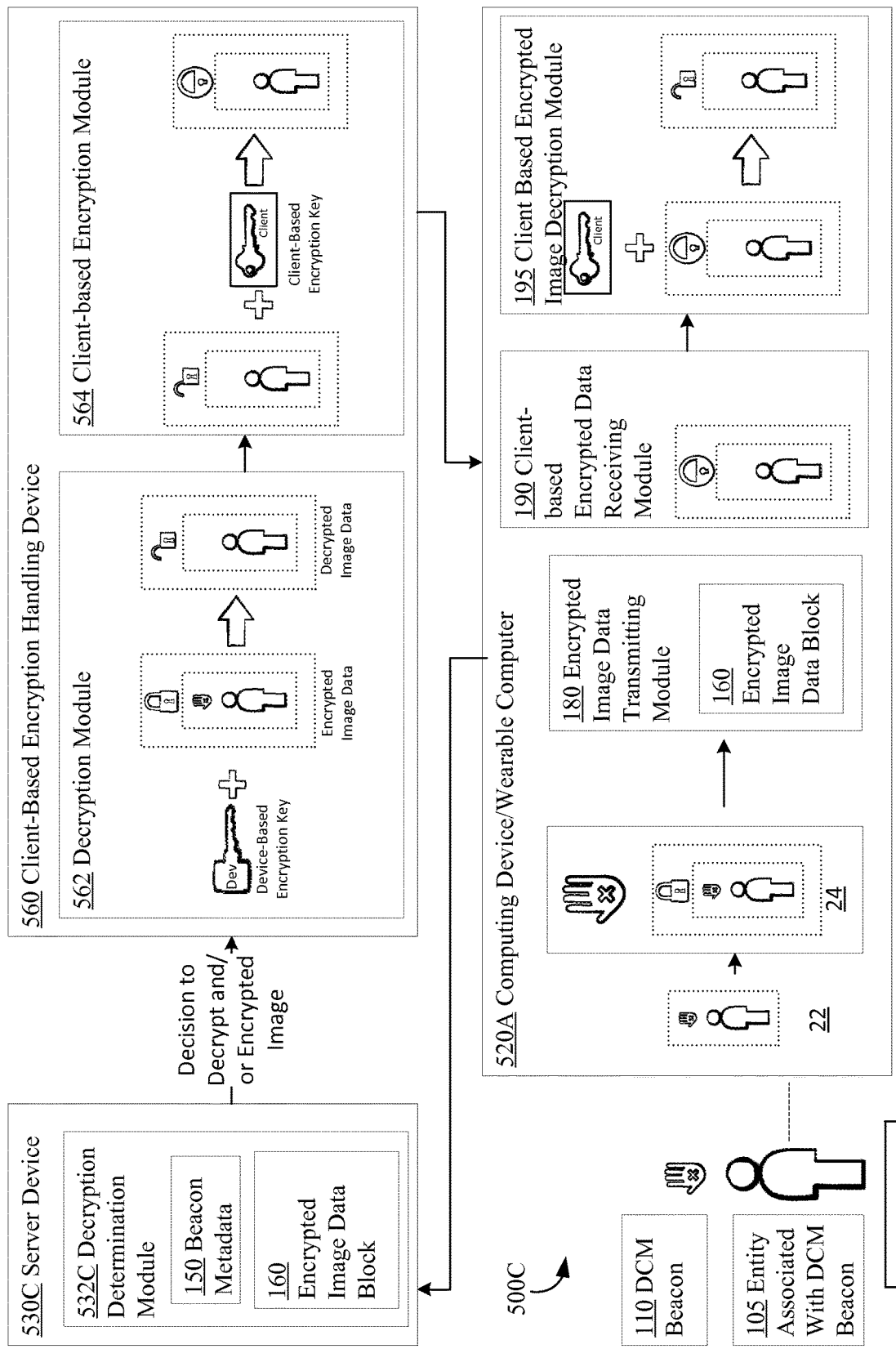

FIG. 5C shows a high-level block diagram of an exemplary environment 500C including a computing device 520C and a server device 530C.

Figure 5D:
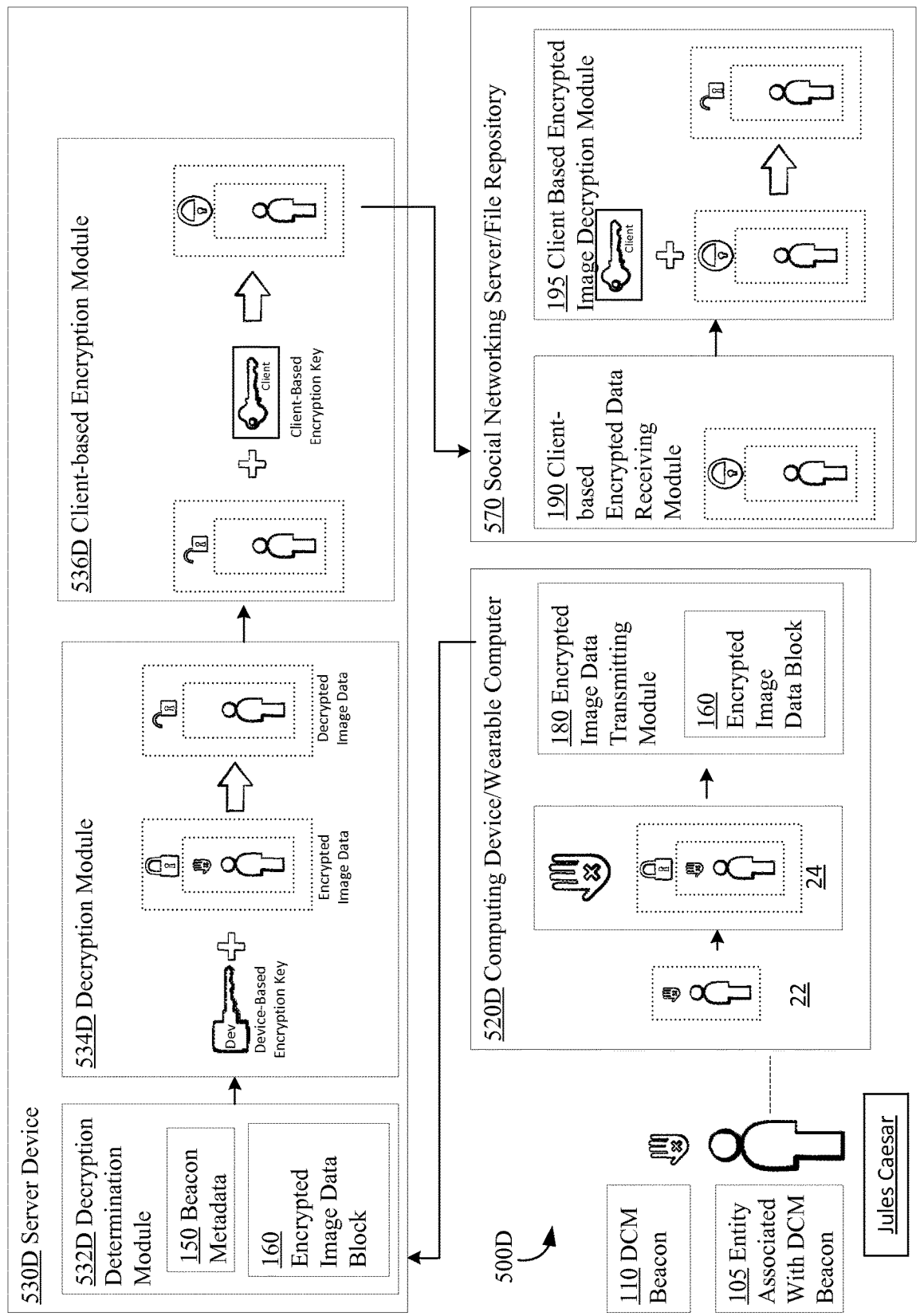

FIG. 5D shows a high-level block diagram of an exemplary environment 500D including a computing device 520D and a server device 530D.

FIG. 6, including FIGS. 6A-6C, shows a particular perspective of an device-based encrypted image that is an image that has previously been encrypted through use of a particular device code assigned to an image capture device configured to capture the image, wherein the image includes a representation of a feature of an entity acquiring module 252 of processing module 250 of device 240 of FIG. 2B, according to an embodiment.

Figure 7B:
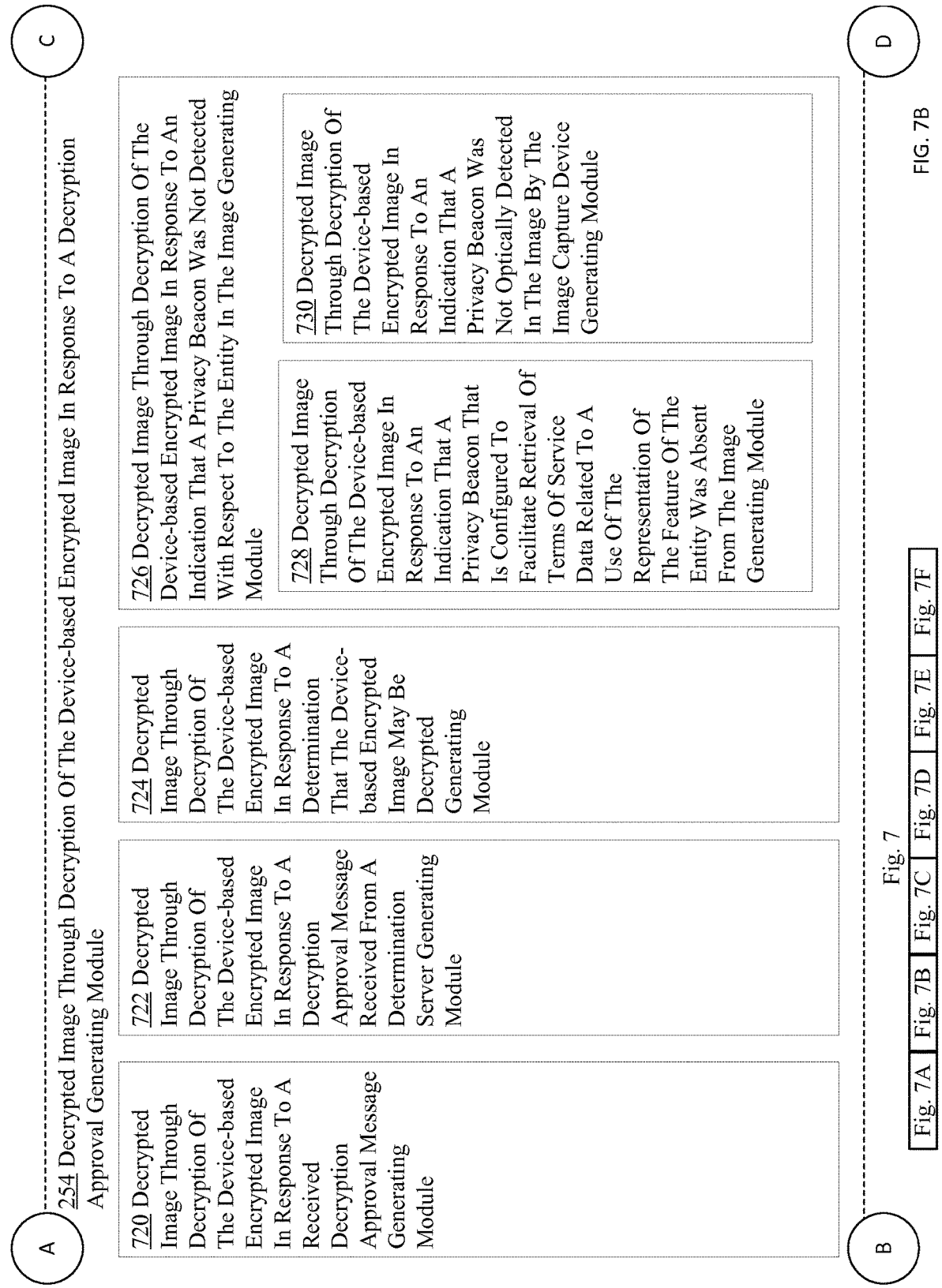

FIG. 7, including FIGS. 7A-7F, shows a particular perspective of a decrypted image through decryption of the device-based encrypted image in response to a decryption approval generating module 254 of processing module 250 of device 240 of FIG. 2B, according to an embodiment.

FIG. 8, including FIGS. 8A-8C, shows a particular perspective of a client-based encrypted image through encryption of the generated decrypted image that uses a particular client code that is assigned to a client that is associated with the image capture device configured to capture the image creating module 256 of processing module 250 of device 240 of FIG. 2B, according to an embodiment.

Figures 9, 9A:
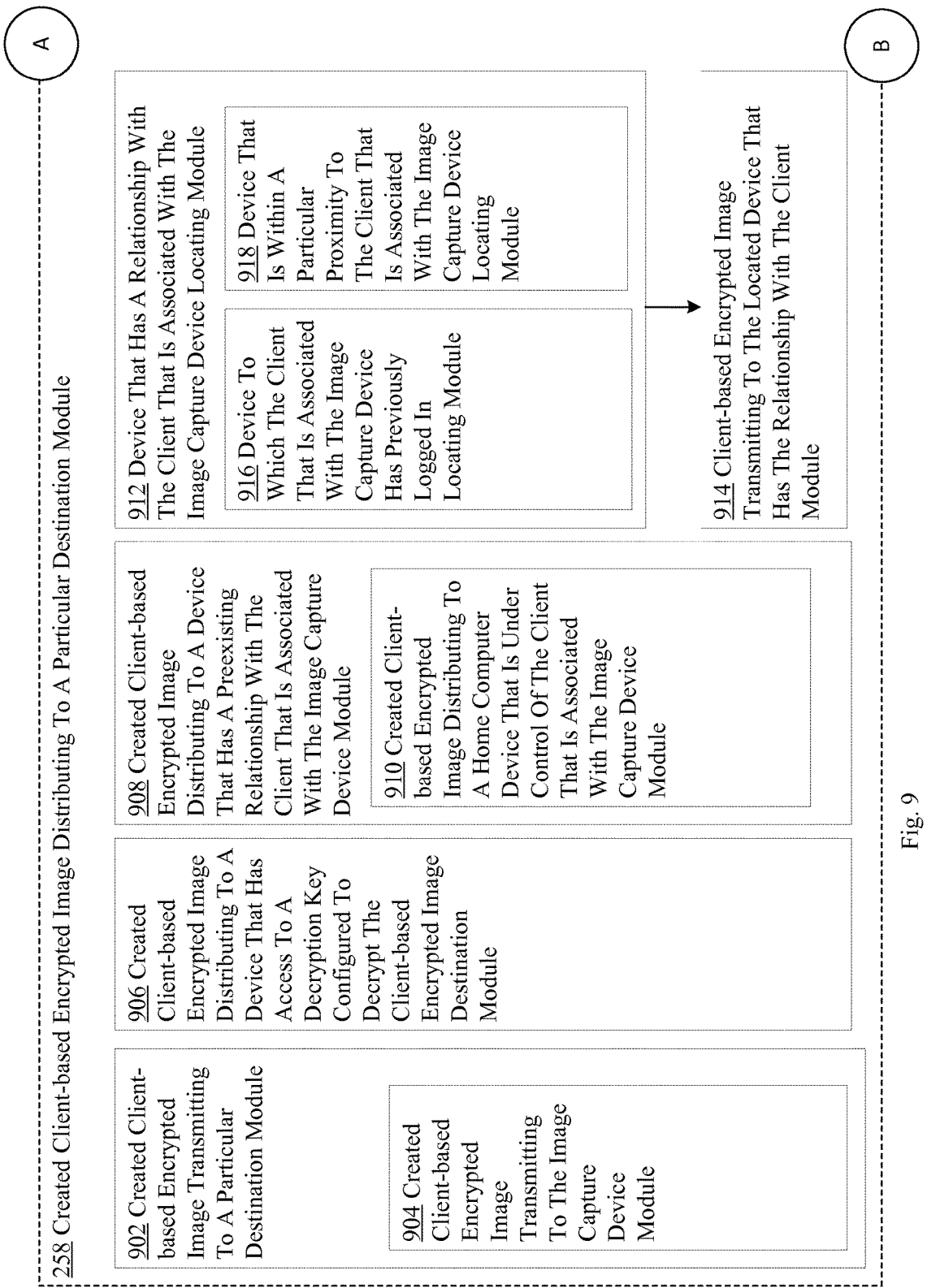
Figure 9B:
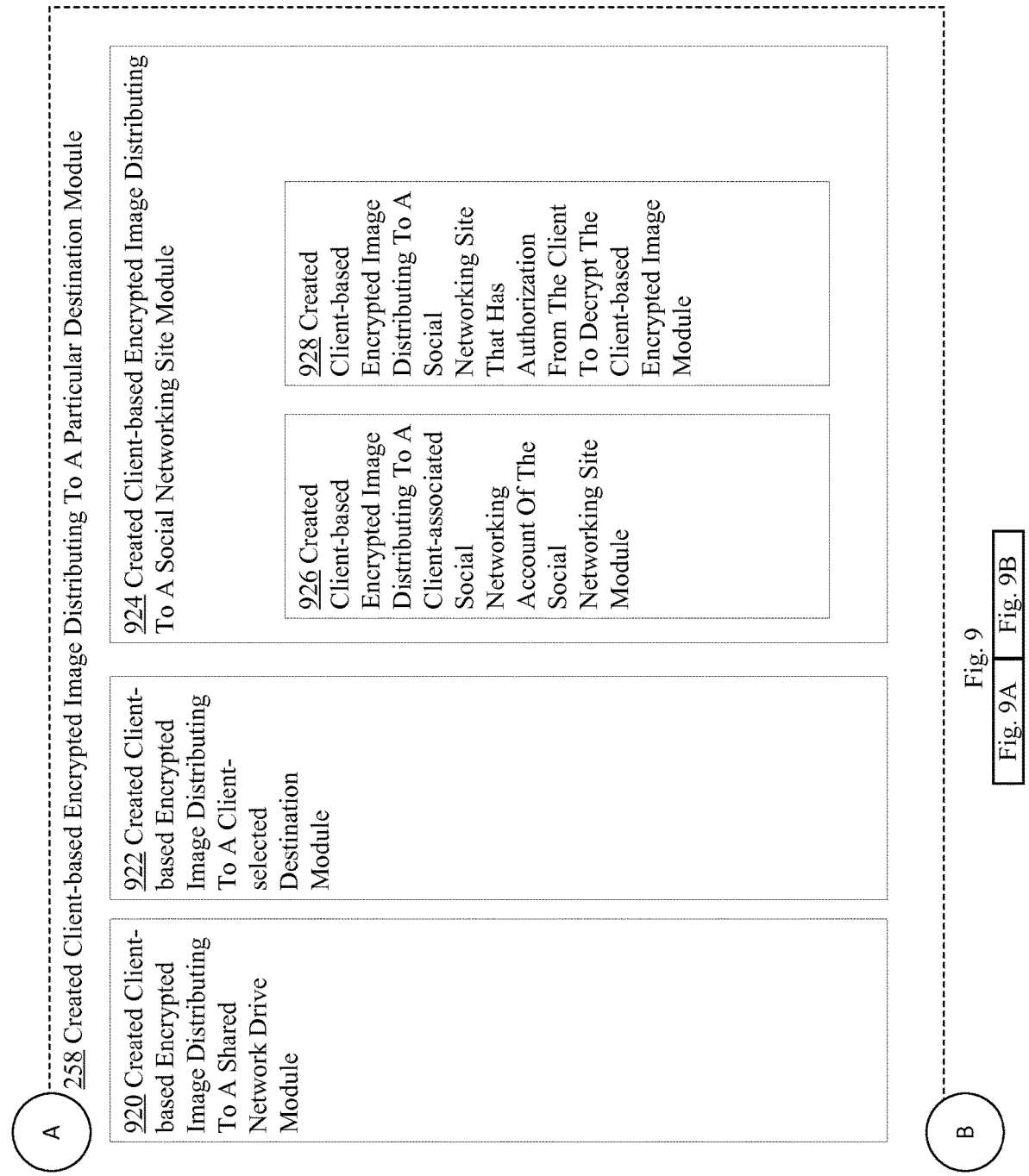

FIG. 9, including FIGS. 9A-9B, shows a particular perspective of a created client-based encrypted image distributing to a particular destination module 258 of processing module 250 of device 240 of FIG. 2B, according to an embodiment.

FIG. 10 is a high-level logic flowchart of a process, e.g., operational flow 1000, according to an embodiment.

FIG. 11A is a high-level logic flow chart of a process depicting alternate implementations of an acquiring a device-based encrypted image operation 1002, according to one or more embodiments.

FIG. 11B is a high-level logic flow chart of a process depicting alternate implementations of an acquiring a device-based encrypted image operation 1002, according to one or more embodiments.

Figure 11C:
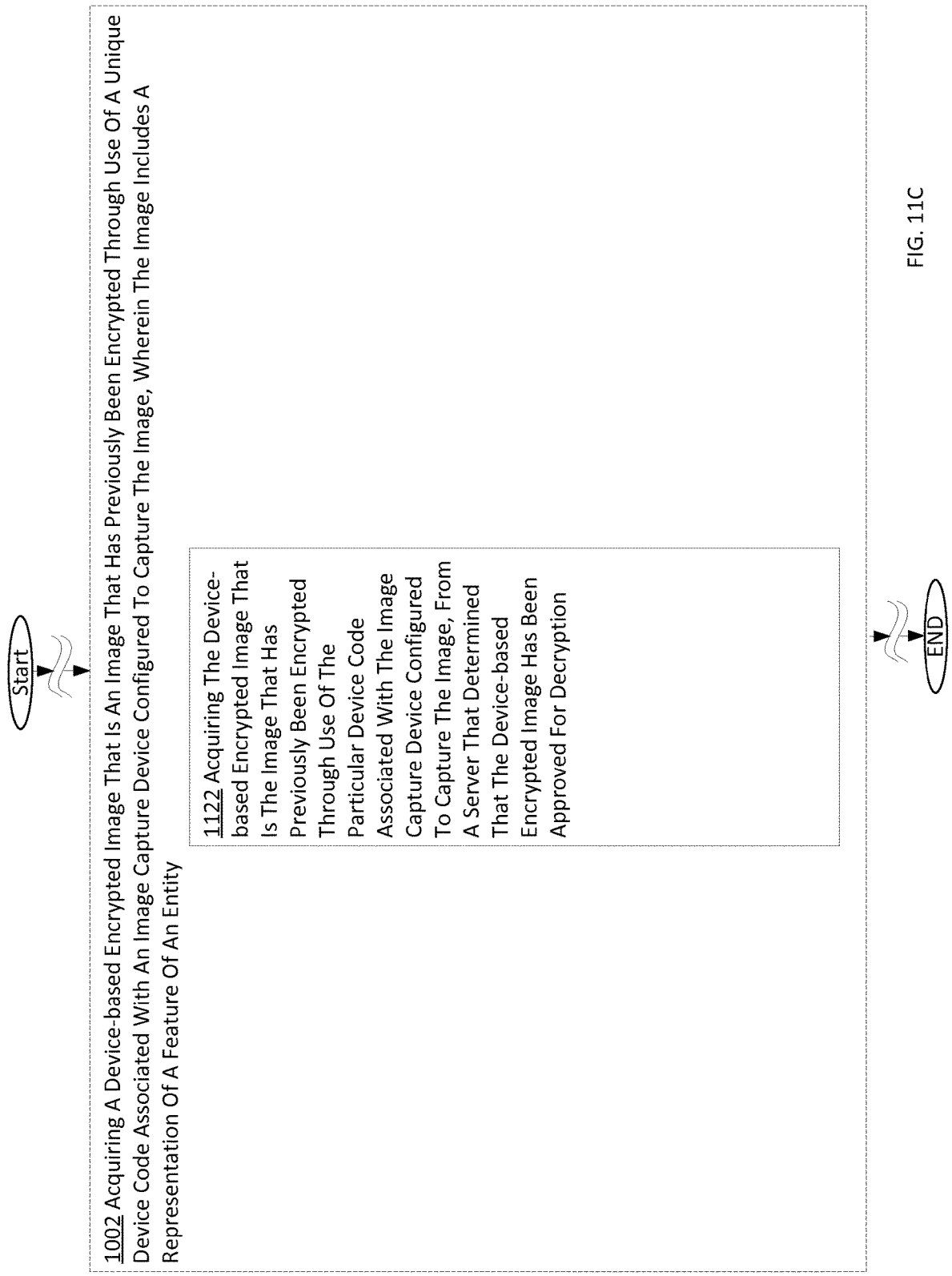

FIG. 11C is a high-level logic flow chart of a process depicting alternate implementations of an acquiring a device-based encrypted image operation 1002, according to one or more embodiments.

Figure 12A:
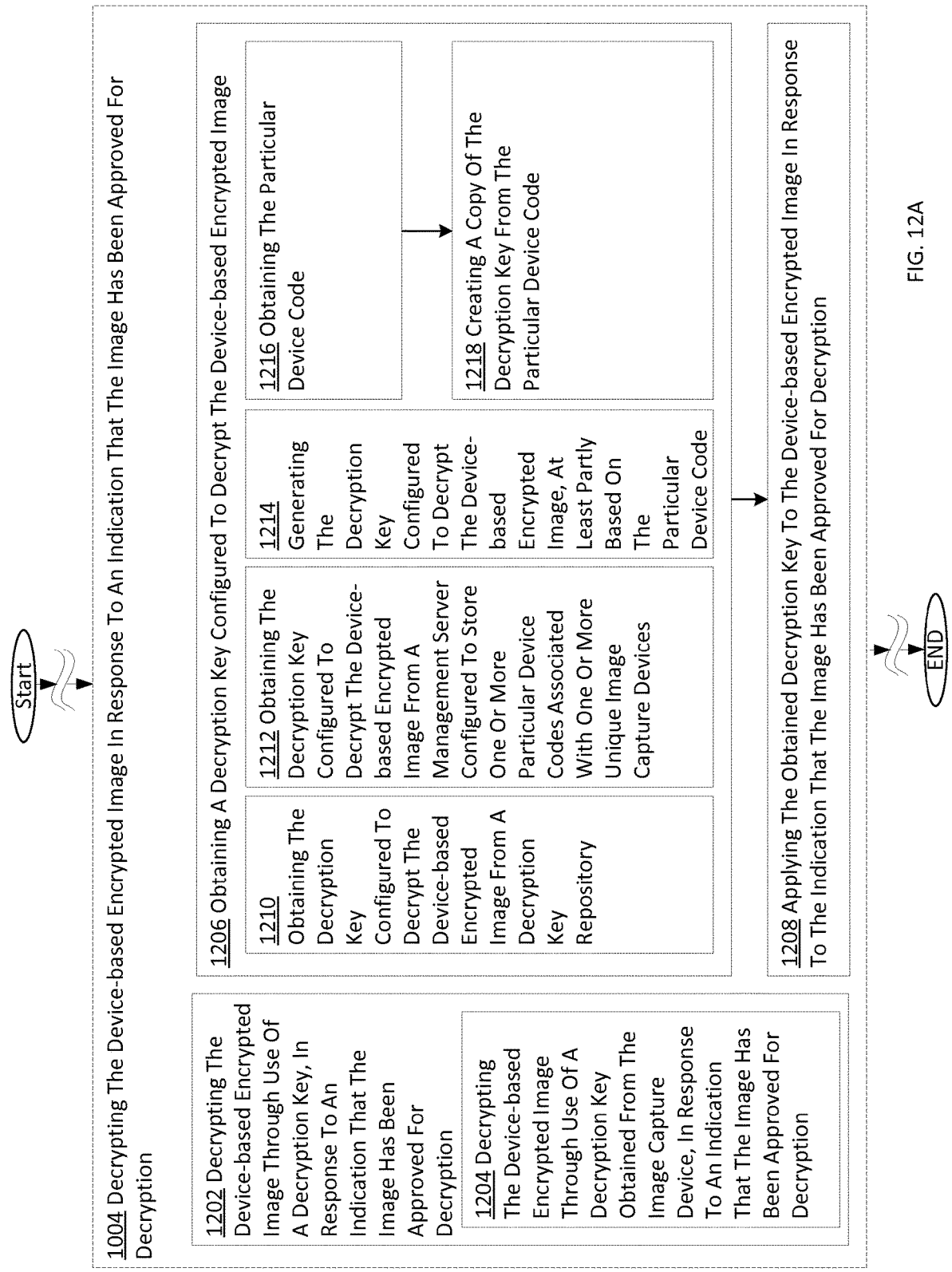

FIG. 12A is a high-level logic flow chart of a process depicting alternate implementations of a decrypting the device-based encrypted image in response to an indication operation 1004, according to one or more embodiments.

Figure 12B:
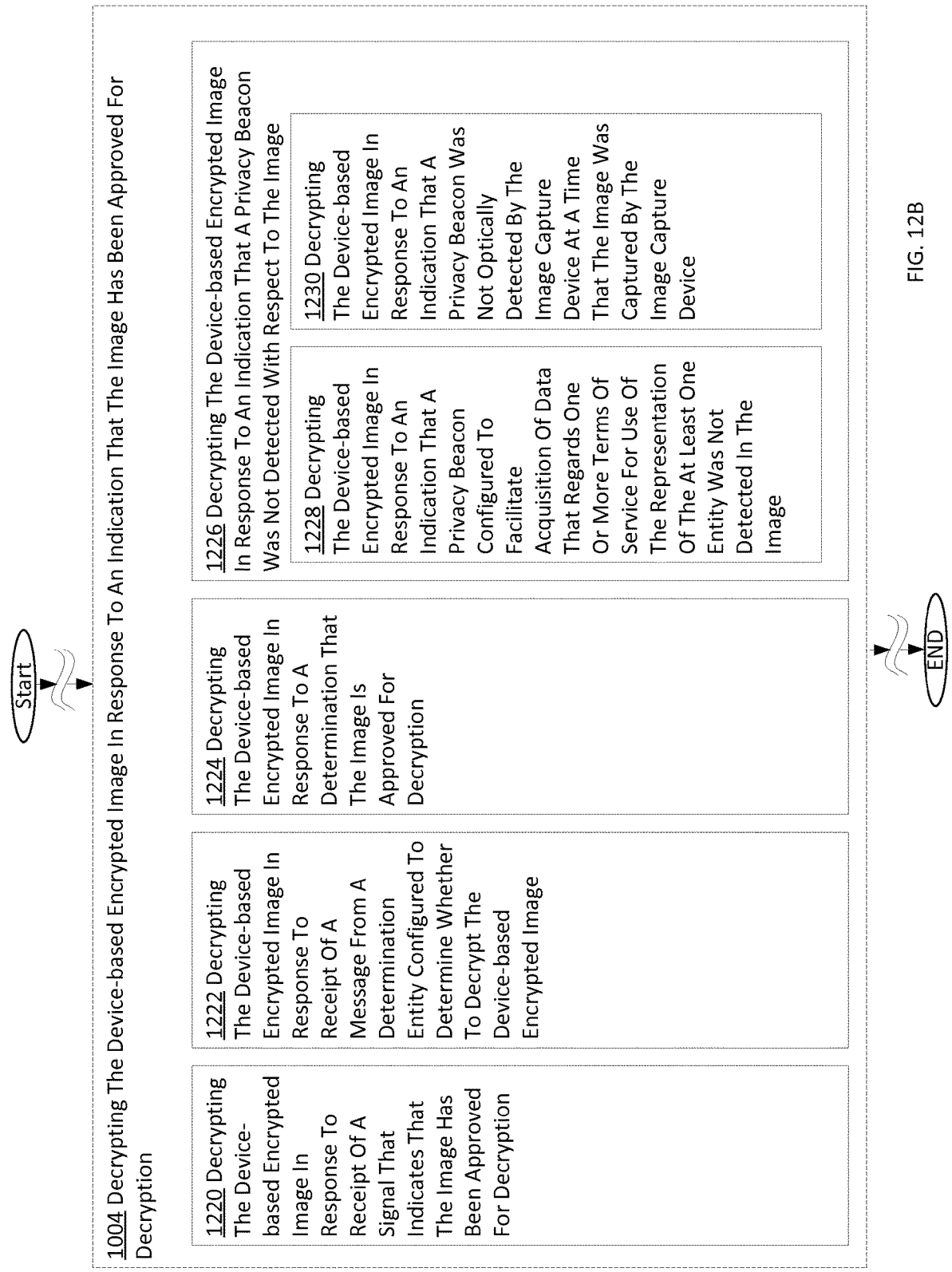

FIG. 12B is a high-level logic flow chart of a process depicting alternate implementations of a decrypting the device-based encrypted image in response to an indication operation 1004, according to one or more embodiments.

Figure 12C:

FIG. 12C is a high-level logic flow chart of a process depicting alternate implementations of a decrypting the device-based encrypted image in response to an indication operation 1004, according to one or more embodiments.

Figure 12D:
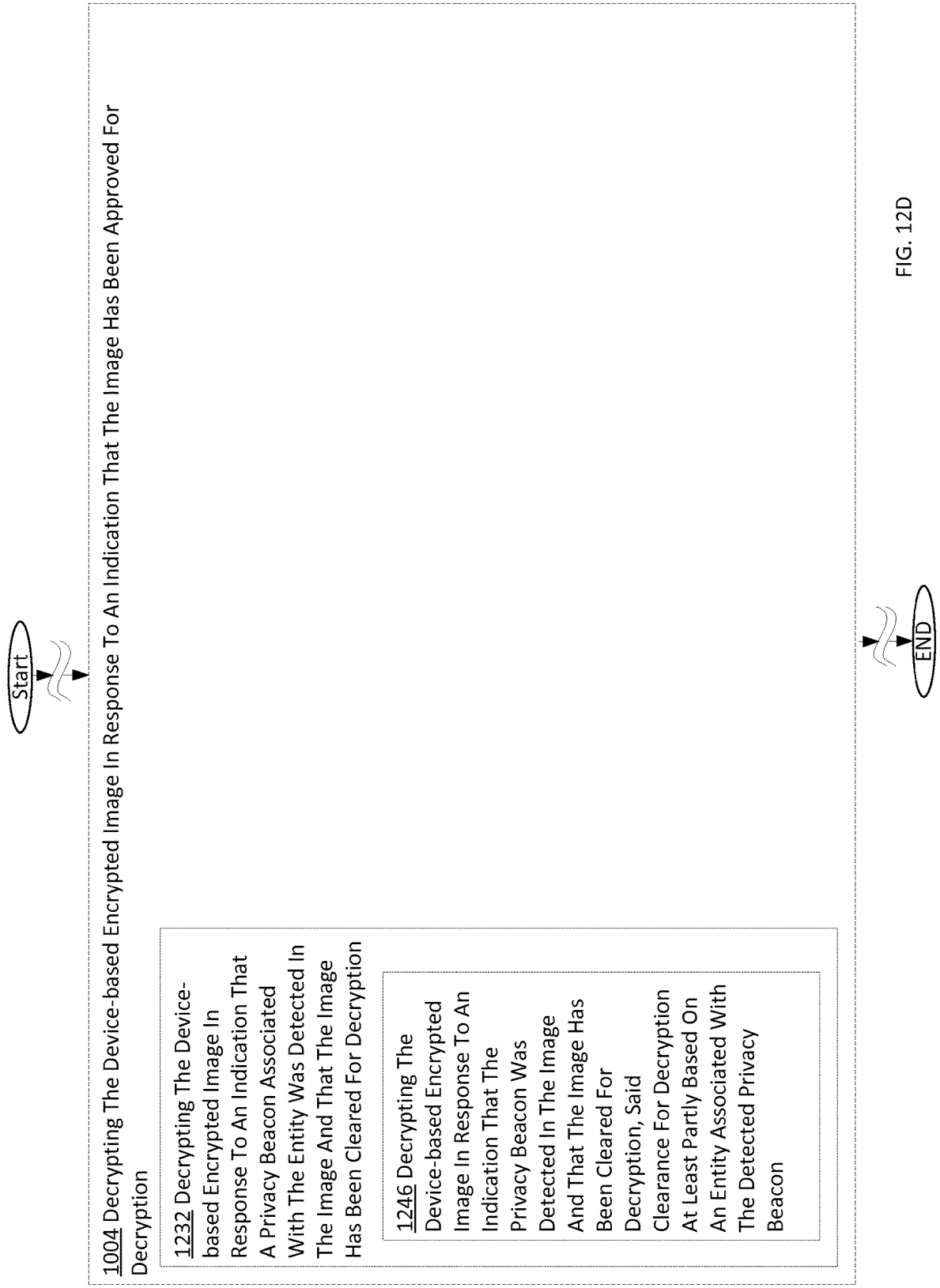

FIG. 12D is a high-level logic flow chart of a process depicting alternate implementations of a decrypting the device-based encrypted image in response to an indication operation 1004, according to one or more embodiments.

Figure 12E:
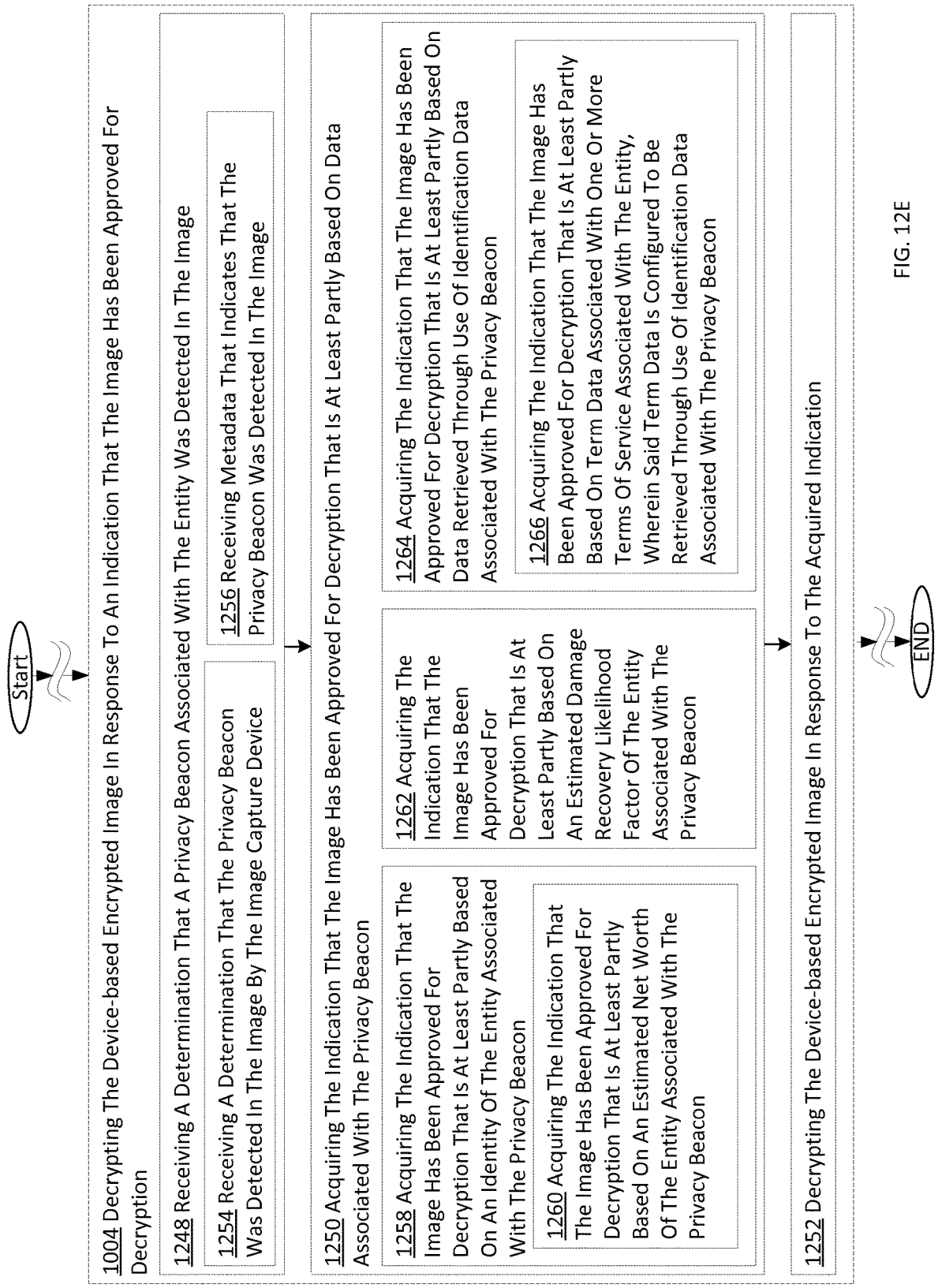

FIG. 12E is a high-level logic flow chart of a process depicting alternate implementations of a decrypting the device-based encrypted image in response to an indication operation 1004, according to one or more embodiments.

FIG. 12F is a high-level logic flow chart of a process depicting alternate implementations of a decrypting the device-based encrypted image in response to an indication operation 1004, according to one or more embodiments.

Figure 13A:
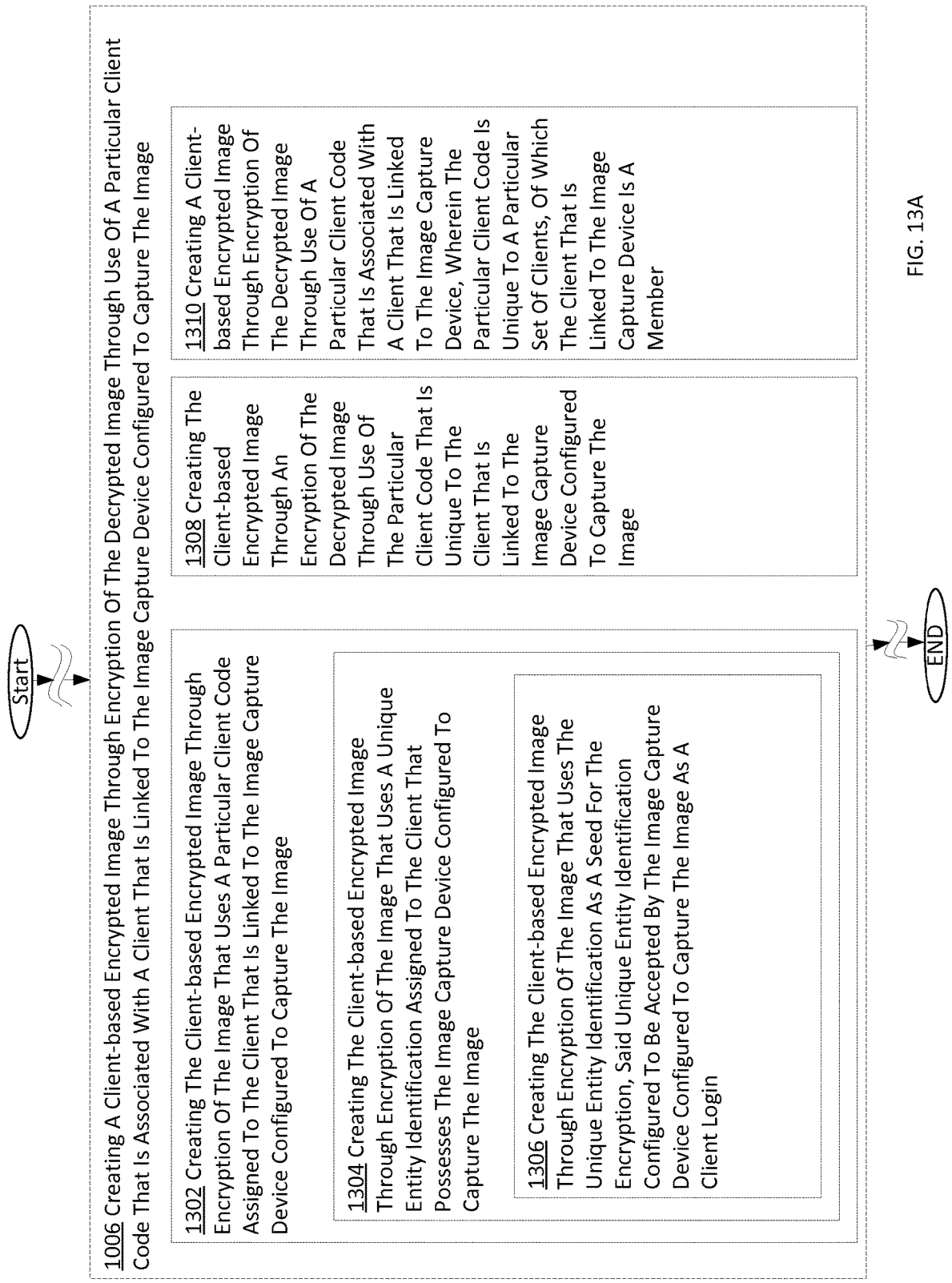

FIG. 13A is a high-level logic flow chart of a process depicting alternate implementations of a creating a client-based encrypted image operation 1006, according to one or more embodiments.

Figure 13B:
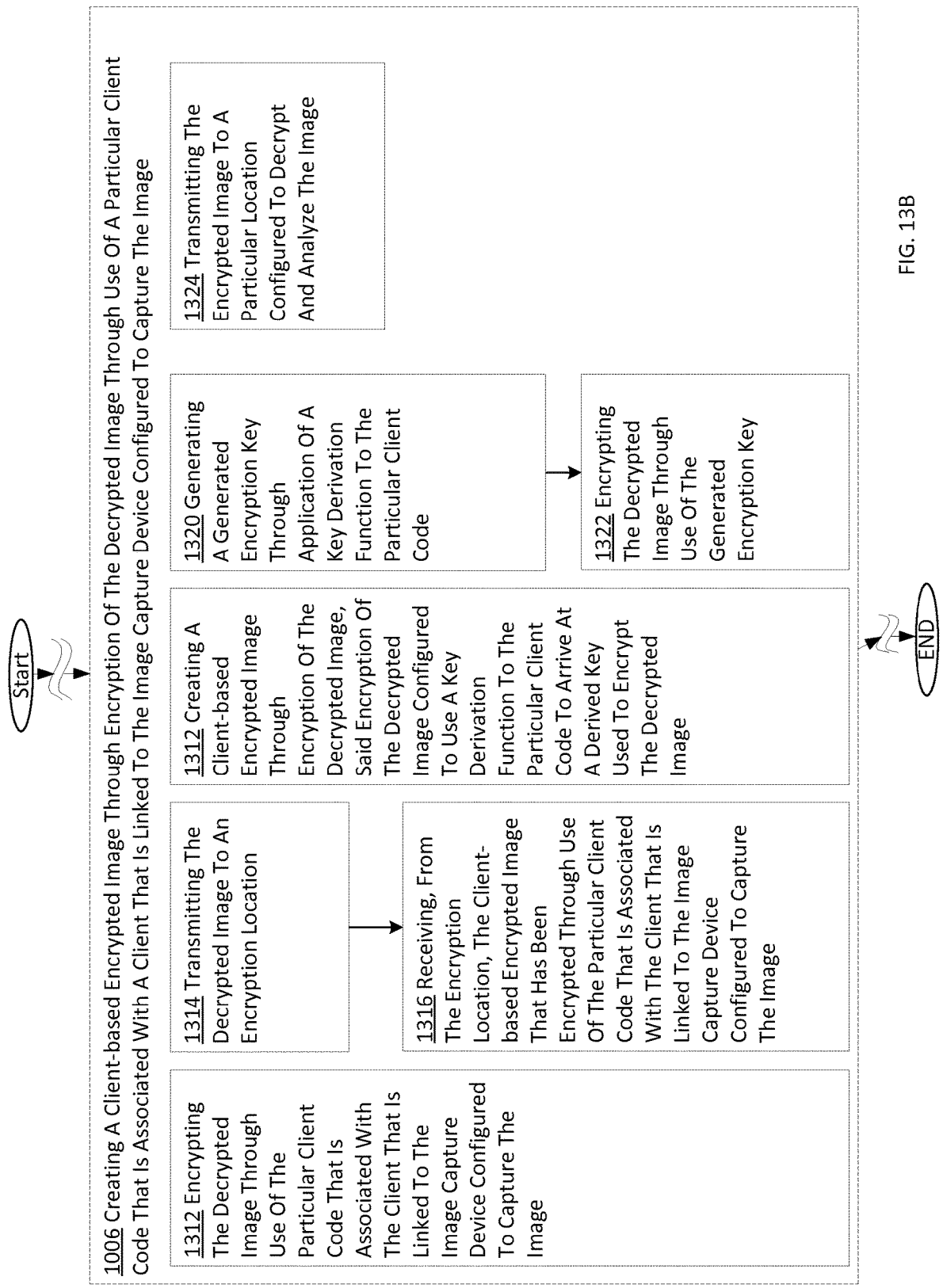

FIG. 13B is a high-level logic flow chart of a process depicting alternate implementations of a creating a client-based encrypted image operation 1006, according to one or more embodiments.

Figure 13C:
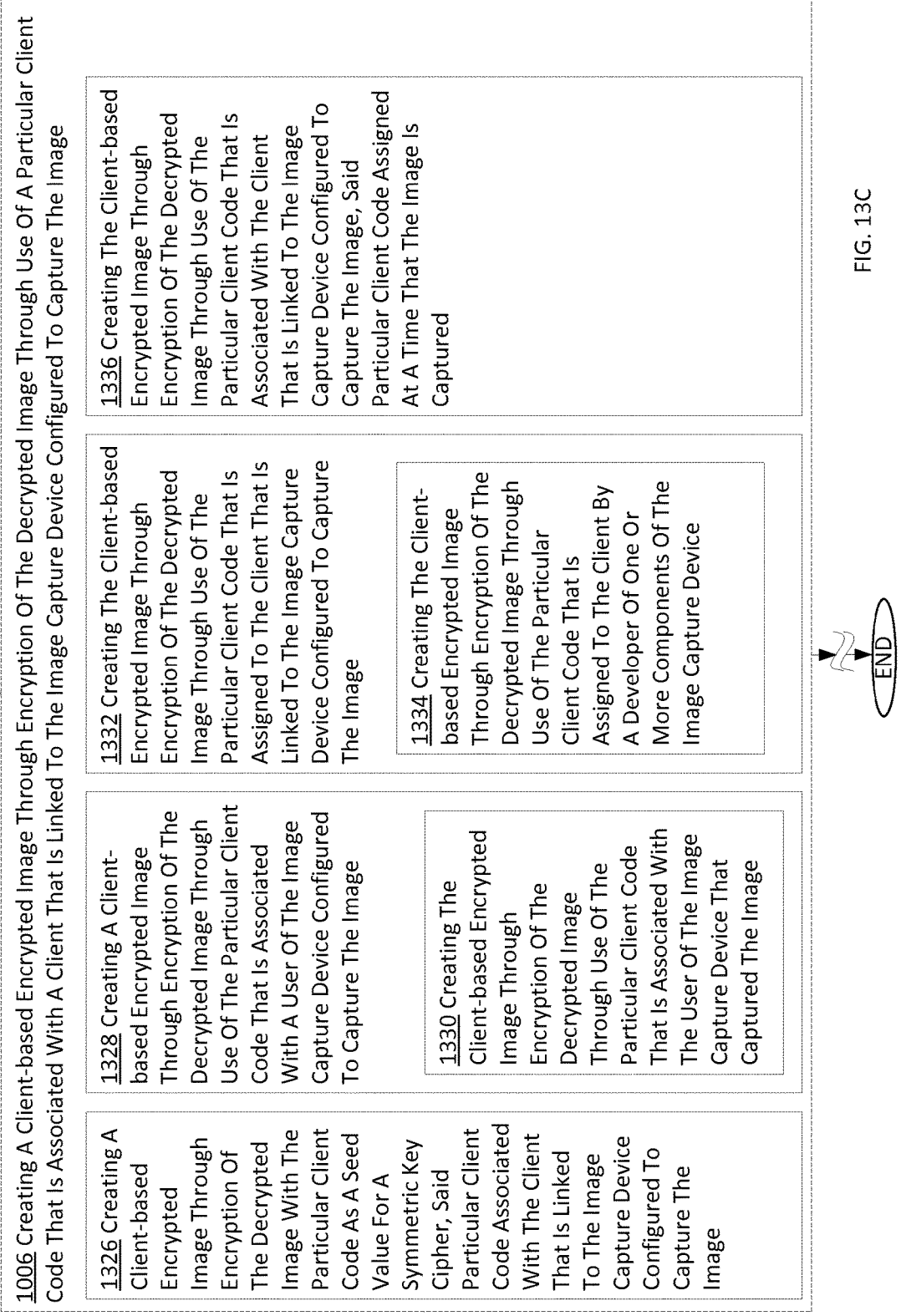

FIG. 13C is a high-level logic flow chart of a process depicting alternate implementations of a creating a client-based encrypted image operation 1006, according to one or more embodiments.

Figure 14A:
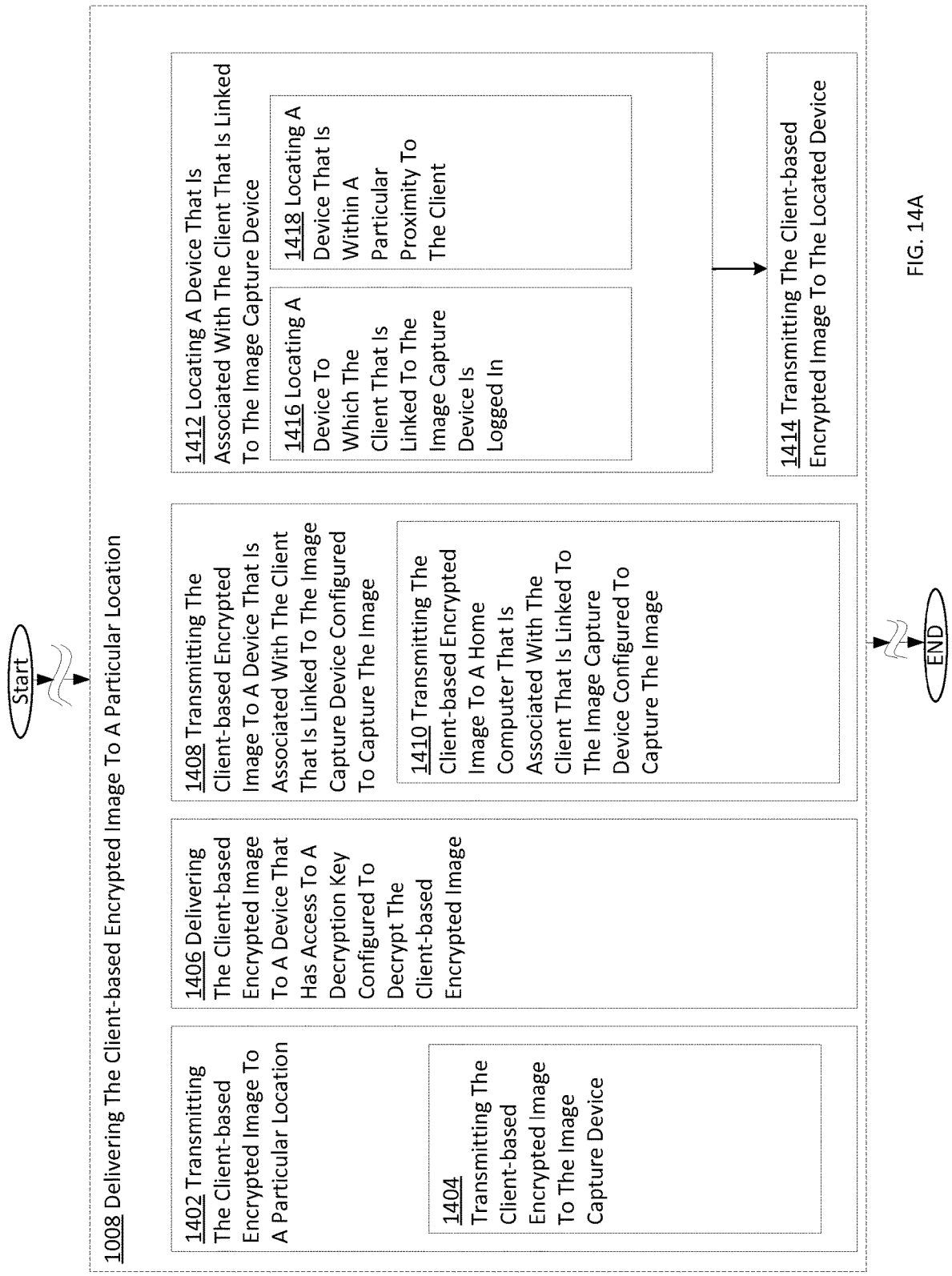

FIG. 14A is a high-level logic flow chart of a process depicting alternate implementations of a delivering the client-based encrypted image operation 1008, according to one or more embodiments.

Figure 14B:
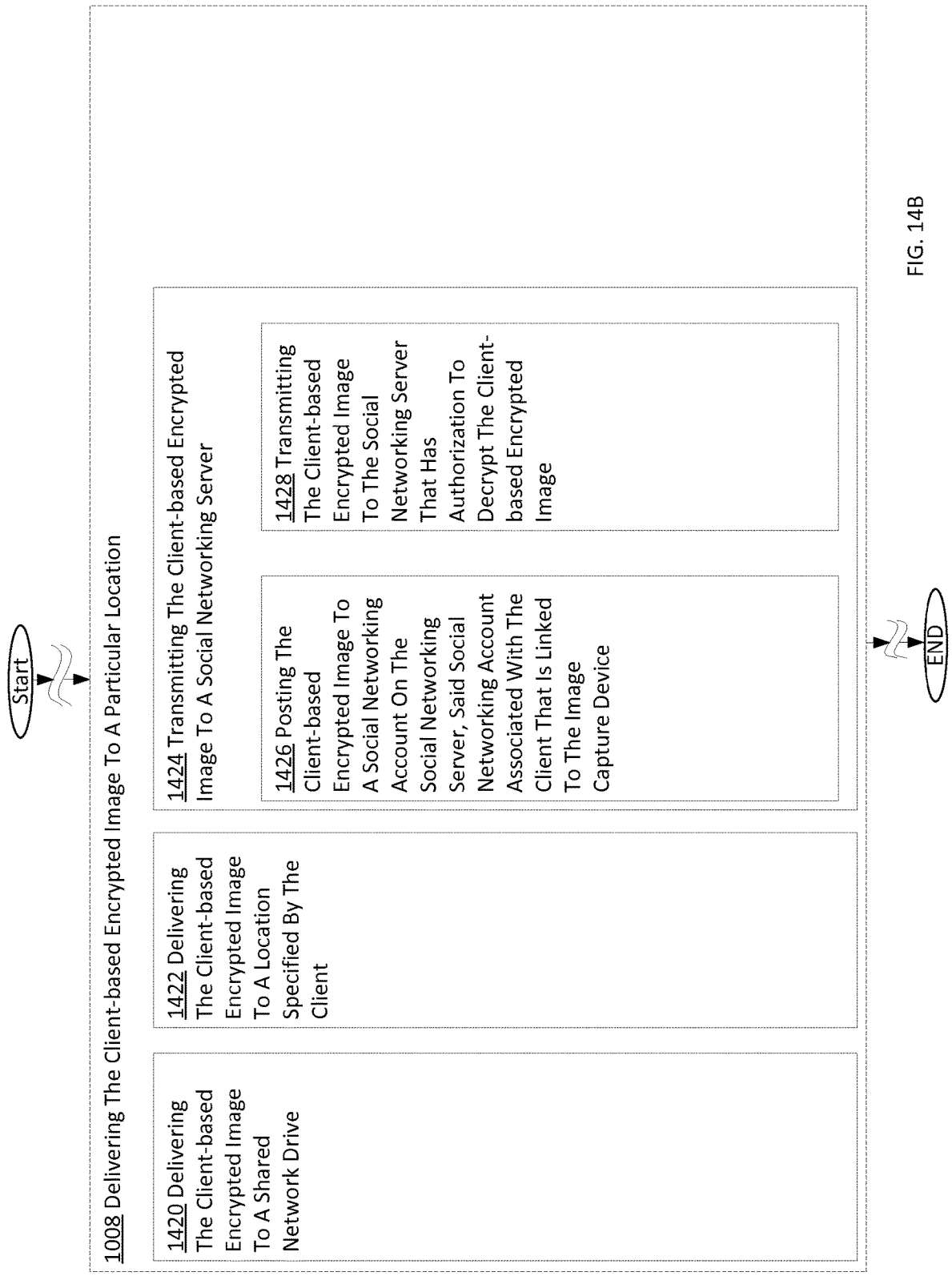

FIG. 14B is a high-level logic flow chart of a process depicting alternate implementations of a delivering the client-based encrypted image operation 1008, according to one or more embodiments.

DETAILED DESCRIPTION

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for acquiring a device-based encrypted image that is an image that has previously been encrypted through use of a particular device code associated with an image capture device configured to capture the image, wherein the image includes a representation of a feature of an entity, decrypting the device-based encrypted image in response to an indication that the image has been approved for decryption, creating a client-based encrypted image through encryption of the decrypted image through use of a particular client code that is associated with a client that is linked to the image capture device configured to capture the image, and delivering the client-based encrypted image to a particular location.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software (e.g., a high-level computer program serving as a hardware specification)).

Importantly, although the operational/functional descriptions described herein are understandable by the human mind, they are not abstract ideas of the operations/functions divorced from computational implementation of those operations/functions. Rather, the operations/functions represent a specification for massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to a human reader. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail herein, these logical operations/functions are not representations of abstract ideas, but rather are representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-levelprogramming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood by a human reader). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of logic, such as Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configurations, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible to most humans. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that useful, tangible, and concrete work is done. For example, as indicated above, such machine language—the compiled version of the higher-level language—functions as a technical specification which selects out hardware logic gates, specifies voltage levels, voltage transition timings, etc., such that the useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality of logic(s), or (d) virtually any combination of the foregoing. Indeed, any physical object which has a stable, measurable, and changeable state may be used to construct a machine based on the above technical description. Charles Babbage, for example, constructed the first mechanized computational apparatus out of wood, with the apparatus powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language should not be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software (e.g., a high-level computer program serving as a hardware specification), and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software (e.g., a high-level computer program serving as a hardware specification), and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software (e.g., a high-level computer program serving as a hardware specification) implementation; or, yet again alternatively, the implementer may opt for some combination of hardware, software (e.g., a high-level computer program serving as a hardware specification), and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software (e.g., a high-level computer program serving as a hardware specification), and or firmware.

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software (e.g., a high-level computer program serving as a hardware specification) or firmware, or of gate arrays or programmable hardware, such as by performing a reception of or a transmission of one or more instructions in relation to one or more operations described herein. Alternatively or additionally, in some variants, an implementation may include special-purpose hardware, software (e.g., a high-level computer program serving as a hardware specification), firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although one or more users maybe shown and/or described herein, e.g., in FIG. 1, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

It is noted that "wearable computer" is used throughout this specification, and in the examples given, it is generally a wearable computer that captures images. However, this is merely for exemplary purposes. The same systems may apply to conventional digital cameras, and any other camera, including security cameras, surveillance cameras, motor vehicle mounted cameras, road/traffic cameras, cameras at automated teller machines, and the like.

Referring now to FIG. 1, in an embodiment, an entity, e.g., a user of a privacy beacon, e.g., user 2105, e.g., a person, e.g., "Jules Caesar," may be associated with a "Don't Capture Me" (hereinafter "DCM") privacy beacon, e.g., DCM Beacon 2110. In an embodiment, a DCM beacon may be active, e.g., may contain circuitry and be an active unit, e.g., something wearable, e.g., on a piece of clothing, or on a ring, or on a drone associated with the user. In an embodiment, the DCM beacon may be passive, e.g., it may be something that can be detected in the electromagnetic spectrum, or can be otherwise detected but does not contain any circuitry or advanced logic gates of its own. In an embodiment, the DCM beacon may be a combination of the two.

In an embodiment, a DCM beacon may be detectable by a machine or a human being (e.g., a stop sign painted on a user's forehead may be a DCM beacon). In an embodiment, a DCM beacon may be detectable by a particular type of machine, structure, or filter, and may be otherwise undetectable or difficult to detect through human senses. For example, in an embodiment, a DCM beacon may be seen using ultraviolet or infrared light, or a DCM beacon may emit light outside the visible spectrum. In an embodiment, a DCM beacon may be visible or detectable after a filter is applied, e.g., a DCM beacon may be visible after a red filter is applied, or after a transformation is applied to a captured image, e.g., a Fourier transformation.

In an embodiment, a DCM beacon may be detected optically. In another embodiment, a DCM beacon may be detected by sensing a different kind of wave emitted by a DCM beacon, e.g., a wave in the nonvisible electromagnetic spectrum, a sound wave, an electromagnetic wave, and the like. In an embodiment, a DCM beacon may use quantum entanglement (e.g., through use of an entanglement-based protocol, among others).

In an embodiment, a DCM beacon may transmit data, e.g., a terms of service for the user (e.g., user 2105) for which the DCM beacon (e.g., DCM beacon 2110) is associated or linked. In an embodiment, a DCM beacon may be encoded with a location of data, e.g., a web address of a server where terms of service for the user (e.g., user 2105) for which the DCM beacon (e.g., DCM beacon 2110) is associated.

In an embodiment, a DCM beacon may be provided by a drone, of any size, e.g., nanometers to full-sized aircraft, that is associated with the user.

In an embodiment, a DCM beacon may be provided by a piece of electronics that a user carries, e.g., a cellular telephone, tablet, watch, wearable computer, or otherwise.

In an embodiment, a DCM beacon may be embedded in the user, ingested by the user, implanted in the user, taped to the skin of the user, or may be engineered to grow organically in the user's body.

In an embodiment, a DCM beacon may be controlled by a magnetic field or other field emitted by a user, either through a user's regular electromagnetic field or through a field generated by a device, local or remote, associated with the user.

Referring again to FIG. 1, in an embodiment, a different user, e.g., a wearable computer user 3105, may have a wearable computer 3100. A wearable computer may be a pair of eyeglasses, a watch, jewelry, clothing, shoes, a piece of tape placed on the user's skin, it may be ingested by the user or otherwise embedded into the user's body. Wearable computer 3100 may be a piece of electronics carried by a user 3105. Wearable computer 3100 may not be a "wearable" computer in a traditional sense, but may be a laptop computer, tablet device, or smartphone carried by a user. In an embodiment, wearable computer 3100 may not be associated with a user at all, but may simply be a part of a surveillance system, e.g., a security camera, or a camera at an Automated Teller Machine ("ATM").

Wearable Computer That Captures the Image (FIG. 1-I; 1-J, 1-N, 1-O).

Referring now to FIG. 1, e.g., FIG. 1-J, wearable computer 3100 may include a wearable computer image capturing device 3110, e.g., a lens. Wearable computer image capturing device 3110 may include functionality to capture images, e.g., an image sensor, e.g., a charge-coupled device ("CCM") or a complementary metal-oxide semiconductor ("CMOS"), an analog-to digital converter, and/or any other equipment used to convert light into electrons. Wearable computer image capturing device 3110 may capture the optical data, which may remain as light data, or may be converted into electrons through an image sensor, as raw data. This raw data, e.g., raw data 2200 may be captured by the optical image data acquiring module 3120 of wearable computer 3100. Optical image data acquiring module 3120 may be configured to acquire an image, e.g., an image of user 2105. As described above, a DCM beacon 2110 may be associated with user 2105. In an embodiment, at this point in the operation of wearable computer 3100, no processing has been performed on the raw image data 2200.

Although not pictured here, wearable computer image capturing device 3110 may also include circuitry to detect audio (e.g., a microphone) and/or video (e.g., the ability to capture frames above a certain rate of frames per second). This circuitry and its related explanation have been omitted to maintain simplicity of the drawing, however, through this application, "raw image data 2200" should be considered to also possibly include still pictures, video, and audio, in some embodiments.

Referring now to FIG. 1-I, in an embodiment, wearable computer 3100 then may transfer the raw/optical image data 2200 to an image path splitting module 3130. This splitting path may be optical, e.g., a set of mirrors/lenses, for the case in which raw image data 2200 is still in optical form, or digital, e.g., through use of known electrical signal splitters. Image path splitting module 3130 may be implemented as hardware, software, or a combination thereof.

Referring again to FIG. 1, e.g., FIG. 1-I, in an embodiment, the north (upper) branch, as illustrated in FIG. 1, transmits the raw image data 2200 to an image prior-to-processing encryption module 3150. Image prior-to-processing encryption module 3150 may receive the raw image data 2200. From there, image prior-to-processing encryption module 3150 may acquire an encryption key that is device-specific, e.g., wearable computer device specific encryption key 3182. In an embodiment, wearable computer device-specific encryption key 3182 may be stored in wearable computer device memory 3180, which also may include encrypted image storage 3184, and a wearable computer user-specific encryption key 3186. In another embodiment, device-specific encryption key 3182 may be retrieved from elsewhere, e.g., cloud storage. In another embodiment, device-specific encryption key 3182 may be generated in real time by the device. In another embodiment, device-specific encryption key 3182 may be generated in real time by the device based on random user input (e.g., the last five words spoken by the device and recorded).

In an embodiment, image prior-to-processing encryption module 3150 may generate encrypted image data 2210. Encrypted image data 2210 may be stored in encrypted image storage 3184 of wearable computer device memory 3180. In an embodiment, encrypted image data 2210 also may be transmitted to central server encrypted data and beacon metadata transmission module 3170.

Referring again to FIG. 1-I and FIG. 1-N, in an embodiment, the south (lower) branch, as illustrated in FIG. 1, may transmit the raw image data 2200 to a DCM beacon detecting module 3140. In an embodiment, DCM beacon detecting module 3140 may include one or more of optics-based DCM beacon detecting module 3142, which may be configured to detect the DCM beacon in an optical signal (e.g., light). In an embodiment, DCM beacon detecting module 3140 may include digital image processing-based DCM beacon detecting module 3144, which may be configured to detect the DCM beacon in a converted electron signal (e.g., data signal). In an embodiment, DCM beacon detecting module 3140 is configured to detect a presence or an absence of a DCM beacon, e.g., DCM beacon 2110, associated with the entity (e.g., user 2105, e.g., "Jules Caesar"), without performing any additional processing on the image, or releasing the image for other portions of wearable computer 3100 to use. In an embodiment, for example, raw image data 2200 is not stored in device memory of wearable computer 3100 in a form that is accessible to other applications and/or programs available to wearable computer 3100 or other computing devices that may communicate with wearable computer 3100. For example, a user 3105 of wearable computer 3100 may not, at this stage in processing, capture the raw data 2200 and upload it to a social networking site, e.g., Facebook. In an embodiment, DCM beacon detecting module 3140 may be implemented in hardware, which may prevent users or third parties from bypassing the DCM beacon detecting module 3140, without disassembling the device and physically altering the circuit/logic.

Referring now to FIG. 1-N, in an embodiment, the DCM beacon detecting module 3140 may detect the DCM beacon 2110. For example, in the exemplary embodiment shown in FIG. 1, DCM beacon detecting module 3140 may detect the DCM beacon 2110 that is associated with user 2105, e.g., Jules Caesar. Thus, DCM beacon detecting module 3140 now knows to lock the image data and prevent unencrypted image data from being accessed on the device. Although not shown in this example, if the DCM beacon had not been found, then in an embodiment, the image data 2200 would have been released for use by the device, e.g., for uploading to social network or cloud storage, for example.

In an embodiment, the detected DCM beacon 2110 associated with Jules Caesar may be transmitted to DCM beacon metadata generating module 3160. DCM beacon metadata generating module 3160 may generate metadata based on the detection of the beacon. The metadata may be as simple as "the image data contains a privacy beacon," e.g., Boolean data. In an embodiment, the metadata may be more complex, and may identify the user associated with the privacy beacon, e.g., the metadata may describe "A privacy beacon associated with Jules Caesar has been found in the image data." In another embodiment, the metadata may include the terms of service associated with the personality rights of Jules Caesar, an example of which terms of service will be provided in more detail herein.

In an embodiment, the detected DCM beacon 2110 may be very simple (e.g., optically detectable), and to obtain/generate metadata associated with the detected DCM beacon 2110, DCM beacon metadata generating module 3160 may include a DCM server contacting module 3162, which may contact one or more entities to obtain more information regarding the DCM beacon 2110. The DCM beacon metadata generating module 3160 may, in some embodiments, transmit the DCM beacon, or the image in which the DCM beacon was captured, to the external entity, in order to obtain more accurate data. For example, the DCM server contacting module 3162 may contact service term management server 5000, which may have DCM beacon registry 5010, which will be discussed in more detail further herein.

In an embodiment, DCM beacon metadata generating module 3160 may generate the DCM beacon metadata 2230, and transfer DCM beacon metadata 2230 to central server encrypted data and beacon metadata transmission module 3170.

Referring again to FIG. 1, e.g., FIG. 1-I, central server encrypted data and beacon metadata transmission module 3170 may receive the encrypted image data 2210 and the DCM beacon metadata 2230 (e.g., see FIG. 1-N). In an embodiment, central server encrypted data and beacon metadata transmission module 3170 may facilitate the transmission of encrypted image data 2210 and DCM beacon metadata 2230 to a server, e.g., wearable computer encrypted data receipt and determination server 4000, which will be discussed in more detail herein. In an embodiment, central server encrypted data and beacon metadata transmission module 3170 may include one or more of DCM beacon metadata transmission module 3172, which may be configured to transmit the DCM beacon metadata 2230, and encrypted data transmission module 3174, which may be configured to transmit the encrypted image data 2210.

Wearable Computer server (FIG. 1-H, 1-G)

Referring again to FIG. 1, e.g., FIG. 1-H, in an embodiment, a system may include a wearable computer server, e.g., wearable computer encrypted data receipt and determination server 4000. In an embodiment, a wearable computer server may be provided by a manufacturer of the wearable device 3100. In an embodiment, a wearable computer server may be provided by a developer of one or more software applications for the wearable device 3100. In an embodiment, wearable computer server 4000 may not have a direct relationship with wearable device 3100 prior to receiving the encrypted image data and the DCM beacon metadata 2230, as will be discussed in more detail herein. In an embodiment, a wearable computer server 4000 may be implemented at a home computer of a user, for example, and may communicate only with wearable devices that are associated with that user. In another embodiment, a wearable computer server 4000 may communicate with many wearable devices 3100, which may or may not have some relationship. In an embodiment, wearable computer server 4000 may communicate with one or more wearable devices 3100 through use of a communication network, which may use any known form of device communication. In an embodiment, wearable computer server 4000 may be chosen by wearable device 3100, either due to proximity or due to one or more properties or characteristics of wearable computer server 4000. In an embodiment, wearable computer server 4000 may be free to agree or disagree to process DCM beacon and image data received from various wearable devices 3100. In an embodiment, wearable computer server 4000 may be distributed across many computers and/or servers.

In an embodiment, wearable computer encrypted data receipt and determination server 4000 may include an encrypted data and beacon metadata reception module 4100. Encrypted data and beacon metadata reception module 4100 may receive encrypted image data 2210 and DCM beacon metadata 2230 from wearable computer 3100, e.g., central server encrypted data and beacon metadata transmission module 3170. In an embodiment, encrypted data and beacon metadata reception module 4100 may include a DCM beacon metadata reception module 4104. DCM beacon metadata reception module 4104 may be configured to acquire a privacy metadata, e.g., DCM beacon metadata 2230, corresponding to a detection of a DCM beacon, e.g., DCM beacon 2110, in the one or more images captured by the image capture device, e.g., wearable computer 3100. In an embodiment, encrypted data and beacon metadata reception module 4100 may include encrypted data reception module 4102. In an embodiment, encrypted data reception module 4102 may be configured to acquire one or more of a block of encrypted data corresponding to one or more images that previously have been encrypted, e.g., encrypted image data 2210. In an embodiment, encrypted data module 4102 may transmit, or facilitate the transmission of, encrypted image data 2210 to an entity that will perform a secondary detection of the privacy beacon, e.g., DCM beacon detection test duplicating server 4800, which will be discussed in more detail further herein.

Referring again to FIG. 1-H, in an embodiment, encrypted data and beacon metadata reception module 4100 may transmit the received DCM beacon metadata to DCM beacon metadata reading module 4120. If the DCM beacon metadata 2230 indicates that a DCM beacon was not found, then, in an embodiment, processing may transfer to module 4220, which will be discussed in more detail further herein. In the example shown in FIG. 1, the DCM beacon 2110 associated with Jules Caesar was found, and the DCM beacon metadata 2230 indicates this state to DCM beacon metadata reading module 4120.

Referring now to FIG. 1-G, in an embodiment, when the presence of the DCM beacon 2110 is determined through the DCM beacon metadata, e.g., DCM beacon metadata 2230, then a DCM beacon TOS retrieval module 4122 may retrieve term data from a location, which may be a remote location, e.g., a DCM beacon management server 5100, which will be discussed in more detail further herein. In an embodiment, DCM beacon TOS retrieval module 4122 may retrieve term data that includes a terms of service that specifies one or more conditions in which the image containing the DCM beacon 2110 may be used. In an embodiment, the TOS may also specify one or more penalties for using the personality rights that may be associated with the image, without acquiring permission or paying a licensing fee prior to releasing or utilizing the image. In an embodiment, the TOS also may include language forcing the entity that viewed the privacy beacon to accept the TOS upon viewing of the beacon. The TOS will be described in more detail with respect to modules 5000 and 5100.

Referring again to FIG. 1-G, in an embodiment, wearable computer encrypted data receipt and determination server 4000 also may include an encrypted data value calculation module 4130. Encrypted data value calculation module 4130 may use one or more algorithms or other methods of inducing or deducing an estimate regarding how much advertising or other revenue may be garnered by using the images containing the entity associated with the privacy beacon. For example, in an embodiment, encrypted data value calculation module 4130 may include a facial recognition program to recognize the person or persons associated with the beacon. In another embodiment, however, this may not be necessary, because the DCM beacon metadata and/or the ToS may identify the person. In an embodiment, encrypted data value calculation module 4130 may use various heuristics to calculate ad revenue, e.g., based on models used by popular advertising methods, or based on prior releases of images of the person associated with the DCM beacon 2110. In an embodiment, module 4130 may use social networking to acquire a focus group and test the image on the focus group, in order to assist in revenue determination. For example, in the example shown in FIG. 1, the image in question is of Jules Caesar, who is the reclusive leader of the Roman Empire, and so the ad revenue generated from having an actual picture of Jules Caesar, or a video of Jules Caesar drinking a mead-and-tonic, may have high net value.

Referring again to FIG. 1-G, in an embodiment, the ToS acquired from DCM beacon TOS retrieval module 4122, and the encrypted data valuation calculated from encrypted data value calculation module 4130 may be sent to release of encrypted data determination module 4140. Release of encrypted data determination module 4140 may make a determination, at least partly based on the acquired metadata, and at least partly based on a value calculation based on the representation of the feature of the person associated with the DCM beacon 2110 (e.g., Jules Caesar drinking a mead-and-tonic). That determination may be regarding whether to allow an action, e.g., processing, decryption, distribution, editing, releasing, sharing, saving, posting to a social network, and the like, of the image. In an embodiment, the decision may be based on whether the potential advertising revenue outweighs the potential damages retrieved from the terms of service. In an embodiment, this calculation may be a strict number comparison (e.g., is "revenue" greater than "damages"). In an embodiment, the calculation may include more complex factors, e.g., likelihood of success on a damages claim, likelihood that revenues will increase, secondary revenue factors from increased traffic and/or brand awareness, and the like. In addition, in an embodiment, the comparison may not be strictly less than/greater than, e.g., in a risk adverse algorithm, if the numbers are close, then the determination may be to not release the encrypted data, even if the potential ad revenue is calculated as larger than the potential damages by a small amount.

Referring again to FIG. 1-G, if the determination made by release of encrypted data determination module 4140 is "NO," e.g., the potential revenue is less than the potential damages, then the encrypted data 2210 is moved to an encrypted data holding and/or quarantine module 4150. In an embodiment, the data from encrypted data holding and/or quarantine module 4150 is deleted after a predetermined time period, e.g., seven days. In an embodiment, the data is simply stored, encrypted and locked away. In an embodiment, the encrypted image data 2210 may be transmitted to an ad replacement value determination server 4400, shown in FIG. 1-F, which will be discussed in more detail herein.

Referring again to FIG. 1-G, if the determination made by release of encrypted data determination module 4140 is "YES," e.g., the potential revenue is more than the potential damages, then the encrypted data 2210 is transferred to encrypted data decryption enabling module 4152, shown in FIG. 1-H. In an embodiment, encrypted data decryption enabling module 4152 may be configured to determine whether to perform decryption of at least a portion of the encrypted data 2210 based on the result from module 4140 by transmitting the encrypted image data 2210 to wearable computer acquired encrypted data decryption and re-encryption server 4200, which will be discussed in more detail.

Wearable Computer Acquired Encrypted Data Decryption And Re-Encryption Server 4200 (FIGS. 1-L and 1-M)

Referring now to FIG. 1-M, in an embodiment, the system may include wearable computer acquired encrypted data decryption and re-encryption server 4200. In an embodiment, wearable computer acquired encrypted data decryption and re-encryption server 4200 may be a portion of wearable computer server 4000. In an embodiment, however, wearable computer acquired encrypted data decryption and re-encryption server 4200 may be a different server than wearable computer server 4000, and may be controlled by a different entity. For example, in an embodiment, the owner of the wearable computer 3100 hardware may control wearable computer server 4000. After the decision is made to decrypt the data at the wearable computer server 4000, control may be handed off to a different server in control of software on the wearable computer, e.g., software that handles pictures taken by the wearable computer 3100. In another embodiment, wearable computer acquired encrypted data decryption and re-encryption server 4200 may be controlled by a social networking/media site, e.g., Facebook, who may have an agreement to acquire the image data at the same time as the device.

Referring again to FIG. 1-M, in an embodiment, wearable computer acquired encrypted data decryption and re-encryption server 4200 may include encrypted data acquiring module 4210, which may acquire the encrypted image data 2210 from the wearable computer server 4000. In an embodiment, wearable computer acquired encrypted data decryption and re-encryption server 4200 may include a privacy metadata acquiring module 4220, which may acquire privacy metadata from module 4120, if the DCM beacon was never detected and the image is free to be used. For example, in an embodiment, image data with no DCM beacon may be treated similarly to image data with a DCM beacon, but that has been determined to have an advertising value greater than a potential damages value. For example, in an embodiment, image data with no DCM beacon may be treated as image data with potential damages value of zero.

Referring again to FIG. 1-M, in an embodiment, wearable computer acquired encrypted data decryption and re-encryption server 4200 may include data indicating profitability of image with DCM beacon acquiring module 4230, which may receive data from module 4150 of wearable computer server 4000 indicating that the image should be decrypted regardless of the DCM beacon because of its potential profitability.

Referring again to FIG. 1-M, in an embodiment, wearable computer acquired encrypted data decryption and re-encryption server 4200 may include image data decryption preparation module 4240, which may receive data from one or more of data indicating profitability of image with DCM beacon acquiring module 4230, encrypted data acquiring module 4210, and privacy metadata acquiring module 4220. In an embodiment, module 4240 may prepare the image or images for decryption, e.g., perform pre-processing, check image integrity, reconfirm the privacy beacon calculations, and the like.

Referring now to FIG. 1-L, wearable computer acquired encrypted data decryption and re-encryption server 4200 may include device-specific key retrieving module 4250 which may retrieve the device-specific key used to encrypt/decrypt the encrypted image data 2210. In an embodiment, device-specific key retrieving module 4250 may include a device-specific key retrieving from device module 4252, which may be configured to retrieve the device-specific key directly from the device that encrypted the image, e.g., wearable computing device 3100. In an embodiment, device-specific key retrieving module 4250 may include a device-specific key retrieving from server module 4254, which may be configured to retrieve the device-specific key from a server, e.g., from wearable computer encrypted data receipt and determination server 400, or from DCM beacon detection test duplicating server 4800, or from another server not depicted in FIG. 1.

Referring again to FIG. 1-L, in an embodiment, image data decryption with device-specific key module 4260 may take the device-specific key retrieved from module 4250, and apply it to the encrypted image data 2210 to generate decrypted image data 2280, as shown by the icon with the unlocked lock in FIG. 1-L.

Referring again to FIG. 1-L, the image data has been decrypted. However, to protect security, in some embodiments, the data may be re-encrypted with a key that is not tied to a specific device, but may be tied to a specific user of the device, e.g., the key may be related to user 3105, rather than wearable device 3100. This embodiment will be described in more detail herein. This embodiment allows the re-encrypted data to be securely sent to a different device belonging to the user, e.g., a smart TV, a home computer, a video game system, or another portable electronic device, e.g., a cellular smartphone. In an embodiment, the re-encryption with a user specific key may be omitted.

In an embodiment, wearable computer acquired encrypted data decryption and re-encryption server 4200 may include a user-specific key retrieving module 4270, that may be configured to obtain, through generation, acquisition, reception, or retrieval, of a user-specific encryption key. The user-specific encryption key may be delivered to image data encrypting with user-specific key module 4280, which, in an embodiment, also may receive the decrypted image data 2280.

Referring again to FIG. 1-L, in an embodiment, image data encrypting with user-specific key module 4280 may be configured to encrypt the block of decrypted data through use of a unique user code that is related to the user 3105 of the wearable device 3100. The again-encrypted image data then may be transferred to encrypted image data transmitting module 4290. In an embodiment, encrypted image data transmitting module 4290 may transmit the image data that has been encrypted with a user-specific key to one or more other devices, which will be discussed in more detail herein.

Computing Device That Receives the Image Data (FIGS. 1-S and 1-T).

Referring now to FIG. 1-S, in an embodiment, the system may include a computing device 3200, which may be a wearable computer or other device. In an embodiment, computing device 3200 may be the same as wearable computer 3100, but it does not necessarily have to be the same. In an embodiment, computing device 3200 receives the image data. In an embodiment, as described above, the received image data has been encrypted with a user-specific code. Thus, in such an embodiment, computing device 3200 may be associated with user 3105 of the wearable computing device 3100. For example, a user 3105 may have a wearable computing device 3100 that captures images of people. After processing those images at the server 4000, for example, the images, which, in some embodiments, now may be encrypted with a user-specific code, may be transmitted to computing device 3200, which may be the user 3105's home media center back at her house. In another embodiment, computing device 3200 may be user 3105's laptop device, or user 3105's smartphone or tablet device. And, as previously mentioned, in another embodiment, computing device 3200 may simply be the user 3105's wearable computing device 3100 that captured the images originally.

In an embodiment, the computing device 3200 and the wearable computing device 3100 pictured in FIG. 1 are the same device. In an embodiment, the encryption, transmission to a server, decryption, and transmission back, may occur invisibly to the user 3105, e.g., to the user 3105 of the wearable computing device 3100, the images are available to her after they are recorded and saved, with a delay that is not specified. In some embodiments, the user 3105 may not be informed of the path taken by the captured image data.

In an embodiment, wearable computing device 3100 may include an encrypted image data receiving module 3210 configured to acquire the data encrypted by the user-specific key code from encrypted image data transmitting module 4290 of wearable computer 4200. In an embodiment, computing device 3200 may include image data release verification acquiring module 3220, which may be configured to determine that the images received from the encrypted image data transmitting module 4290 of wearable computer 4200 have been approved for release and/or use. In an embodiment, the determination may be made based on the ground that the images are encrypted with a user-specific key rather than a device specific key, if it is possible to tell from the encrypted information (e.g., in some embodiments, different types of encryption that may leave a different "signature" may be used). In an embodiment, the determination may be made by again analyzing the image data. In an embodiment, image data release verification acquiring module 3220 may include encrypted image data analysis module 3222 which may perform analysis on the encrypted image data, including, but not limited to, reading metadata attached to the encrypted image data, to verify that the received encrypted image data is approved for release and/or processing. In an embodiment, image data release verification acquiring module 3220 may include release verification data retrieving module 3224, which may be configured to obtain release verification data from the device that performed the verification, e.g., server 4000, or from a different device.

Referring now to FIG. 1-T, in an embodiment, computing device 3200 may include device memory 3280. Device memory 3280 may store the wearable computer user-specific encryption/decryption key 3286, which may be used to decrypt the received encrypted image data. In an embodiment, device memory 3280 also may include encrypted image storage 3284, which may include one or more image data, which may be encrypted.

Referring again to FIG. 1-S, in an embodiment, computing device 3200 may include user-specific decryption key obtaining module 3230, which may obtain the user-specific encryption/decryption key. In an embodiment, user-specific decryption key obtaining module 3230 may include encryption/decryption key external source obtaining module 3232, which may be configured to obtain the encryption/decryption key from an external source, e.g., server 4000. In an embodiment, user-specific decryption key obtaining module may include encryption/decryption key memory retrieving module 3234, which may be configured to retrieve the encryption/decryption key from device memory 3280 of computing device 3200.

Referring again to FIG. 1-S, in an embodiment, computing device 3200 may include image decryption module 3240, which may use the user-specific encryption/decryption key to decrypt the image data. In an embodiment, the decrypted image data then may be sent to decrypted image release module 3250, where the clear image data may be accessed by the device, and transmitted to other locations, posted to social networking or cloud storage, be shared, manipulated, saved, edited, and otherwise have open access to the decrypted image data.

Ad Replacement Value Determination Server (FIG. 1-F).

Referring back to FIG. 1-G, as discussed briefly above, release of encrypted data determination module 4140 may determine not to release the encrypted data, which may be stored in an encrypted data holding and/or quarantine module 4150. In an embodiment, the encrypted data and the DCM beacon may be transmitted to an ad replacement value determination server, as shown in FIG. 1-F.

Referring now to FIG. 1-F, in an embodiment, the system may include an ad replacement value determination server 4400. Ad replacement value determination server 4400 may take the encrypted image data and determine if there is a way to monetize the images such that the monetization may outweigh the potential damages. For example, ad replacement value determination server 4400 may calculate potential earnings and limited damages liability, if, for example, an entity with the DCM beacon, e.g., Jules Caesar, is instead shown with an advertisement where his head would normally be. In an embodiment, ad replacement value server may be controlled by a different entity than server 4000, and there may be an agreement in place for the ad replacement value determination server 4400 to receive encrypted data for which the server 4000 decides it does not want to allow distribution. For example, ad replacement value server 4400 may be run by a smaller social networking site that cares less about potential damages because they have fewer assets, or are less risk-averse. In another embodiment, ad replacement value determination server 4400 may be part of server 4000, and it may be a practice of server 4000 to send an encrypted image for further analysis after the server 4000 determines that the image is not likely to be profitable without modification.

Referring again to FIG. 1-F, in an embodiment, ad replacement value determination server 4400 may include a DCM beacon metadata reception module 4410 configured to receive the DCM beacon metadata from the wearable computer encrypted data receipt and determination server 4000. In an embodiment, ad replacement value determination server 4400 may include an encrypted data reception module 4420 that may be configured to receive the encrypted data from the wearable computer encrypted data receipt and determination server 4000, e.g., from the encrypted data holding module 4150.

Referring again to FIG. 1-F, in an embodiment, ad replacement value determination server 4400 may include a DCM beacon term acquiring module 4430, which may acquire one or more terms of service from service term management server 5000 and/or DCM beacon management server 5100, similarly to DCM beacon terms-of-service retrieval module 4122 of wearable computer encrypted data receipt and determination server 4000. In an embodiment, DCM beacon term acquiring module may include DCM beacon remote retrieval module 4432. In an embodiment, DCM beacon term acquiring module may be configured to retrieve term data from a remote location, e.g., service term management server 5000, which term data may correspond to a term of service associated with a release of image data that includes the person with which the DCM beacon is associated, e.g., Jules Caesar.

Referring again to FIG. 1-F, in an embodiment, ad replacement value determination server 4400 may include an encrypted data value calculation with standard ad placement module 4440. In an embodiment, standard ad placement module 4440 may perform a similar calculation as encrypted data value calculation module 4130 of wearable computer encrypted data receipt and determination server 4000. In an embodiment, for example, encrypted data value calculation with standard ad placement module 4440 may calculate whether an estimated advertising revenue from one or more advertisement images placed in the encrypted image data will be greater than an estimated potential liability for distribution of the images. In an embodiment, the estimated potential liability is based at least in part on the terms of service which may be retrieved by the DCM beacon term acquiring module 4430.

Referring again to FIG. 1-F, in an embodiment, ad replacement value determination server 4400 may include encrypted image data modification with intentionally obscuring ad placement module 4450. In an embodiment, encrypted image data modification with intentionally obscuring ad placement module 4450 may be configured to modify the encrypted image data (e.g., which, in some embodiments, may require limited decryption and then re-encryption) by replacing one or more areas associated with the entity related to the DCM beacon, e.g., Jules Caesar's face (e.g., or in another embodiment, Jules Caesar's genitalia, if, e.g., it was a naked picture of Jules Caesar), with one or more advertisement images.

Referring again to FIG. 1-F, in an embodiment, ad replacement value determination server 4400 may include modified encrypted data value calculation with intentionally obscuring ad placement module 4460. In an embodiment, modified encrypted data value calculation with intentionally obscuring ad placement module 4460 may be configured to calculate an estimated advertising revenue from the modified image data. In an embodiment, the modified image data then may be distributed through modified encrypted data distributing module 4470.

Tracking Server (FIG. 1-E).

Referring now to FIG. 1-E, in an embodiment, a system may include tracking server 9000. Tracking server 9000 may be configured to log use of a "Don't Capture Me" (hereinafter "DCM") beacon by one or multiple users. In an embodiment, tracking server 9000 may track active DCM beacons, e.g., beacon 2110, through communication with said one or more beacons. In an embodiment, tracking server may track DCM beacons through other means, e.g., social networking and the like. The DCM beacon does not need to be an active DCM beacon in order to be tracked by tracking server 9000.

In an embodiment, tracking server 9000 may include deployment of one or more active and/or passive DCM beacons monitoring module 9010. Deployment of one or more active and/or passive DCM beacons monitoring module 9010 may include one or more of active DCM beacon monitoring module 9012 and passive DCM beacon monitoring/data gathering module 9020. In an embodiment, passive DCM beacon monitoring/data gathering module 9020 may gather data about the passive DCM beacon by observing it, e.g., through satellite video capture, through other image capturing devices, e.g., phone cameras, security cameras, laptop webcams, and the like, or through other means. In an embodiment, passive DCM beacon monitoring/data gathering module 9020 may include user input module 9022, which may receive an indication from a user, e.g., a switch flipped on a user's cell phone, indicating that the user is using the DCM beacon. In an embodiment, passive DCM beacon monitoring/data gathering module 9020 may include a device status module which tracks a device with which the passive DCM beacon is associated, e.g., a wearable computer that is a shirt, or a cellular phone device in the pocket. In an embodiment, passive DCM beacon monitoring/data gathering module 9020 may include a social media monitoring module that monitors posts on social networking sites to determine if the DCM beacon is being used, and a location of the user.

Referring again to FIG. 1-E, in an embodiment, tracking server 9000 may include a record of the deployment of the one or more active and/or passive DCM beacons storing module 9030, which may be configured to store a record of usage and/or detection logs of the DCM beacons that are monitored. In an embodiment, record of the deployment of the one or more active and/or passive DCM beacons storing module 9030 may store a record of the deployment in deployment record storage 9032. In an embodiment, record of the deployment of the one or more active and/or passive DCM beacons storing module 9030 may transmit all or portions of the recorded record through record of the deployment of one or more active and/or passive DCM beacons transmitting module 9040.

Service Term Management Server 5000 (FIG. 1-A)

Referring now to FIG. 1-A, in an embodiment, the system may include service term management server 5000, which may manage terms of service that are associated with a DCM beacon and/or a person. In an embodiment, service term management server 5000 may include a DCM beacon registry 5010. In an embodiment, the DCM beacon registry 5010 may include one or more of a user's name, e.g., Jules Caesar, a terms of service associated with Jules Caesar, which may be custom to Jules Caesar, or may be a generic terms of service that is used for many persons, and various representations of portions of Jules Caesar, e.g., likeness, handprint, footprint, voiceprint, pictures of private areas, and the like.

Referring again to FIG. 1-A, in an embodiment, the system may include a terms of service generating module 5020. Terms of service generating module 5020 may create a terms of service for the user Jules Caesar. A sample Terms of Service is shown in FIG. 1-A and is reproduced here. It is noted that this is a condensed Terms of Service meant to illustrate an exemplary operation of the system in the environment, and accordingly, several necessary legal portions may be omitted. Accordingly, the example Terms of Service should not be considered as a binding, legal document, but rather a representation of what the binding, legal document would look like, that would enable one skilled in the art to create a full Terms of Service.

Exemplary Terms of Service for User 2105 (Jules Caesar)

1. By capturing an image of any part of the user Jules Caesar (hereinafter "Image"), or providing any automation, design, resource, assistance, or other facilitation in the capturing of the Image, you agree that you have captured these Terms of Service and that you acknowledge and agree to them. If you cannot agree to these Terms of Service, you should immediately delete the captured Image. Failure to do so will constitute acceptance of these Terms of Service.

2. The User Jules Caesar owns all of the rights associated with the Image and any representation of any part of Jules Caesar thereof;

3. By capturing the Image, you agree to provide the User Jules Caesar just compensation for any commercialization of the User's personality rights that may be captured in the Image.

4. By capturing the Image, you agree to take all reasonable actions to track the Image and to provide an accounting of all commercialization attempts related to the Image, whether successful or not.

5. By capturing the Image, you accept a Liquidated Damages agreement in which unauthorized use of the Image will result in mandatory damages of at least, but not limited to, $1,000,000.

In an embodiment, terms of service generating module may include one or more of a default terms of service storage module 5022, a potential damage calculator 5024, and an entity interviewing for terms of service generation module. In an embodiment, default terms of service storage module 5022 may store the default terms of service that are used as a template for a new user, e.g., when Jules Caesar signs up for the service, this is the terms of service that is available to him. In an embodiment, potential damage calculator 5024 may determine an estimate of how much in damages that Jules Caesar could collect for a breach of his personality rights. In an embodiment, for example, potential damage calculator may search the internet to determine how much Jules Caesar appears on social media, blogs, and microblog (e.g., Twitter) accounts. In an embodiment, entity interviewing for terms of service generation module 5026 may create an online questionnaire/interview for Jules Caesar to fill out, which will be used to calculate potential damages to Jules Caesar, e.g., through determining Jules Caesar's net worth, for example.

In an embodiment, service term management server 5000 may include terms of service maintenance module 5030, which may maintain the terms of service and modify them if, for example, the user becomes more popular, or gains a larger online or other presence. In an embodiment, terms of service maintenance module 5030 may include one or more of a social media monitoring module 5042, that may search social networking sites, and an entity net worth tracking module 5034 that may have access to the entity's online bank accounts, brokerage accounts, property indexes, etc., and monitor the entity's wealth.

In an embodiment, serviced term management server 5000 may include a use of representations of an entity detecting module 5040. In an embodiment, use of representations of an entity detecting module 5040 may include one or more of a social media monitoring module 5042, a public photo repository monitoring module 5044, and a public blog monitoring module 5046. In an embodiment, use of representations of an entity detecting module 5040 may track uses of representations, e.g., images, of the user Jules Caesar, to try to detect violations of the terms of service, in various forums.

DCM Beacon Management Server 5100 (FIG. 1-B)

Referring now to FIG. 1-B, in an embodiment, the system may include a DCM beacon management server 5100, which may be configured to manage the DCM beacon associated with a user, e.g., DCM beacon 2110 for user 2105, e.g., Jules Caesar. In an embodiment, DCM beacon management server 5100 and service term management server 5000 may be the same server. In another embodiment, DCM beacon management server 5100 and service term management server 5000 may be hosted by different entities. For example, a specialized entity may handle the terms of service generation, e.g., a valuation company that may be able to determine a net "social network" worth of a user, e.g., Jules Caesar, and use that to fashion the terms of service.

Referring again to FIG. 1-B, in an embodiment, DCM beacon management server 5100 may include DCM beacon communication with entity wanting to avoid having their image captured module 5110. DCM beacon communication with entity wanting to avoid having their image captured module 5110 may be configured to communicate with a user, e.g., user 2105, e.g., Jules Caesar, and may handle the creation, generation, maintenance, and providing of the DCM beacon 2110 to Jules Caesar, whether through electronic delivery or through conventional delivery systems (e.g., mail, pickup at a store, etc.). In an embodiment, DCM beacon communication with entity wanting to avoid having their image captured module 5110 may include one or more of DCM beacon transmission module 5112, DCM beacon receiving module 5114, and DCM beacon generating module 5116.

In an embodiment, DCM beacon management server 5100 may include entity representation acquiring module 5120. Entity representation acquiring module 5100 may be configured to receive data regarding one or more features of the user that will be associated with the DCM beacon. For example, the user might upload pictures of his body, face, private parts, footprint, handprint, voice recording, hairstyle, silhouette, or any other representation that may be captured and/or may be deemed relevant.

In an embodiment, DCM beacon management server 5100 may include DCM beacon association with one or more terms of service and one or more entity representations module 5130. In an embodiment, DCM beacon association with one or more terms of service and one or more entity representations module 5130 may be configured to, after generation of a DCM beacon, obtain a terms of service to be associated with that DCM beacon. In an embodiment, the terms of service may be received from service term management server 5000.

In an embodiment, DCM beacon management server 5100 may include a DCM beacon capture detecting module 5140. DCM beacon capture detection module 5140 may detect when a DCM beacon is captured, e.g., if it is an active beacon, or it may receive a notification from various servers (e.g., server 4000) and/or wearable devices (e.g., wearable device 3100) that a beacon has been detected, if it is a passive DCM beacon.

In an embodiment, when a DCM beacon is detected, DCM beacon management server 5100 may include terms of service associated with DCM beacon distributing module, which may be configured to provide the terms of service associated with the DCM beacon to an entity that captured the image including the DCM beacon, e.g., to module 4122 of wearable computer encrypted data receipt and determination server 4000, or DCM beacon remote retrieval module 4430 of ad replacement value determination server 4400, for example.

Wearable Computer with Optional Paired Personal Device 3300 (FIGS. 1-Q and 1-R)

Referring now to FIG. 1-R, in an embodiment, the system may include a wearable computer 3300. Wearable computer 3300 may have additional functionality beyond capturing images, e.g., it may also store a user's contact list for emails, phone calls, and the like. In another embodiment, wearable computer 3300 may be paired with another device carried by a user, e.g., the user's smartphone device, which stores the user's contact list. As will be described in more detail herein, wearable computer 3300 operates similarly to wearable computer 3100, except that entities with DCM beacons are obscured, unless they have a preexisting relationship with the user. It is noted that DCM beacon detection and encryption may operate similarly in wearable computer 3300 as in wearable computer 3100, and so substantially duplicated parts have been omitted.

Referring again to FIG. 1-R, in an embodiment, wearable computer 3300 may include an image capturing module 3310, which may capture an image of Jules Caesar, who has DCM beacon "A", Beth Caesar, who has DCM beacon "B", and Auggie Caesar, who has no DCM beacon. In an embodiment, wearable computer 3300 may include an image acquiring module 3320, which may be part of image capturing module 3310, to acquire one or more images captured by an image capture device, e.g., the image of Jules Caesar, Beth Caesar, and Auggie Caesar.

In an embodiment, wearable computer 3300 may include an entity identification module 3330, which may perform one or more recognition algorithms on the image in order to identify persons in the image. Entity identification module may use known facial recognition algorithms, for example, or may ask the user for input, or may search the internet for similar images that have been identified, for example.

Referring again to FIG. 1-R, in an embodiment, wearable computer 3300 may include preexisting relationship data retrieval module 3340, which may retrieve names of known persons, e.g., from a device contact list, e.g., device contact list 3350. In the example shown in FIG. 1, Jules Caesar is in the contact list of the device 3300. It is noted that the device contact list 3350 may be stored on a different device, e.g., the user's cellular telephone.

Referring now to FIG. 1-Q, in an embodiment, wearable computer 3300 may include data indicating an identified entity from the image data has a preexisting relationship obtaining module 3360, which, in an embodiment, may obtain data indicating that one of the entities recorded in the image data (e.g., Jules Caesar) is in the user's contact list.

Referring again to FIG. 1-Q, in an embodiment, wearable computer 3300 may include entities with preexisting relationship marking to prevent obfuscation module 3370. In an embodiment, entities with preexisting relationship marking to prevent obfuscation module 3370 may attach a marker to the image, e.g., a real marker on the image or a metadata attachment to the image, or another type of marker, that prevents obfuscation of that person, regardless of DCM beacon status, because they are in the user's contact list.

Referring again to FIG. 1-Q, in an embodiment, wearable computer 3300 may include unknown entities with DCM beacon obscuring module 3380, which may obfuscate any of the entities in the image data that have a DCM beacon and are not in the contact list. For example, in the example shown in FIG. 1, Beth Caesar's image is obscured, e.g., blurred, blacked out, covered with advertisements, or the like, because she has a DCM beacon associated with her image, and because she is not in the user's contact list. Jules Caesar, on the other hand, is not obscured because a known entity marker was attached to his image at module 3370, because Jules Caesar is in the contact list of an associated device of the user. Auggie Caesar is not obscured regardless of contact list status, because there is no DCM beacon associated with Auggie Caesar.

Referring again to FIG. 1-Q, after the image is obscured, obscured image 3390 of wearable computer 3300 may release the image to the rest of the device for processing, or to another device, the Internet, or cloud storage, for further operations on the image data.

Active DCM Beacon 6000 (FIGS. 1-P and 1-K).

Referring now to FIG. 1-P, in an embodiment, a user 2107 may be associated with an active DCM beacon 2610, which will be discussed in more detail herein. The word "Active" in this context merely means that the DCM beacon has some form of circuitry or emitter.

Referring now to FIG. 1-K, in an embodiment, the system may include an active DCM beacon 6000, which may show an active DCM beacon, e.g., active DCM beacon 2610, in more detail. In an embodiment, beacon 6000 may include DCM beacon broadcasting module 6010. In an embodiment, DCM beacon broadcasting module 6010 may broadcast a privacy beacon associated with at least one user, e.g., user 2107, from at or near the location of user 2107. The beacon may be detected by an image capturing device when the user is captured in an image.

Referring again to FIG. 1-K, in an embodiment, the beacon 6000 may include an indication of DCM beacon detection module 6020, which may detect, be informed of, or otherwise acquire an indication that the active DCM beacon has been captured by an image capturing device. In an embodiment, indication of DCM beacon detection module 6020 may include one or more of DCM beacon scanning module 6022, which may scan nearby devices to see if they have detected the beacon, and DCM beacon communications handshake module 6024, which may establish communication with one or more nearby devices to determine if they have captured the beacon.

Referring again to FIG. 1-K, in an embodiment, beacon 6000 may include term data broadcasting module 6030, which may broadcast, or which may order to be broadcasted, term data, which may include the terms of service. In an embodiment, term data broadcasting module 6030 may include one or more of a substantive term data broadcasting module 6032, which may broadcast the actual terms of service, and pointer to term data broadcasting module 6034, which may broadcast a pointer to the terms of service data that a capturing device may use to retrieve the terms of service from a particular location.

DCM Beacon Test Duplicating Server 4800 (FIGS. 1-C and 1-D)

Referring now to FIG. 1-C, in an embodiment, the system may include a DCM beacon test duplicating server 4800. In an embodiment, the DCM beacon test duplicating server 4800 may take the image data, and perform the test for capturing the beacon again, as a redundancy, as a verification, or as a protection for wearable computer server 4000. In an embodiment, DCM beacon test duplicating server 4800 may be a part of wearable computer server 4000. In another embodiment, DCM beacon test duplicating server 4800 may be separate from wearable computer server 4000, and may be controlled by a different entity, e.g., a watchdog entity, or an independent auditing agency.

Referring again to FIG. 1-C, in an embodiment, DCM beacon test duplicating server 4800 may include encrypted data reception for secondary DCM beacon detection module 4810, which may acquire the encrypted image data containing the user, e.g., user 2105, e.g., Jules Caesar, and the associated DCM beacon, e.g., DCM beacon 2110.

Referring again to FIG. 1-C, in an embodiment, DCM beacon test duplicating server 4800 may include a device-specific key retrieving module 4820, which may retrieve the device-specific key, e.g., from wearable computer device 3100, or from wearable computer server 4000. In an embodiment, DCM beacon test duplicating server 4800 may include image data decryption with device-specific key module 4830, which may apply the device-specific key obtained by device-specific key retrieving module 4820, and apply it to the encrypted image data, to generate decrypted image data.

Referring again to FIG. 1-C, in an embodiment, the unencrypted image data may be sent to DCM beacon detecting module 4840 of DCM beacon test duplicating server 4800. If the raw image data was optical in its original form, then it may be reconverted to optical (e.g., light) data. In an embodiment, DCM beacon detecting module 4840 may perform a detection for the DCM beacon, as previously described. In an embodiment, DCM beacon detecting module 4840 may include one or more of an optics-based DCM beacon detecting module 4842 and a digital image processing-based DCM beacon detecting module 4844.

Referring now to FIG. 1-D, after the test for detecting the DCM beacon 2220 (which may be the same as the DCM beacon 2210, but is detected at a different place, so a different number has been assigned), DCM beacon detection at duplicating sever result obtaining module 4850 may obtain the result of the detection performed at DCM beacon test duplicating server 4800. Similarly, DCM beacon detection at device result obtaining module 4860 may obtain the result from the DCM beacon detection performed at wearable computer device 3100. The results from module 4850 and 4860 may be stored at DCM beacon test result storage and logging module 4870 of DCM beacon test duplicating server 4800.

Referring again to FIG. 1-D, the test results from DCM beacon test duplicating server 4800 and from wearable computer 3100 may be stored at DCM beacon test result storage and logging module 4870, and such results may be kept for a predetermined length of time. In an embodiment, the results may be transmitted to a requesting party using DCM beacon test result transmitting module 4880.

Referring again to the system, in an embodiment, a computationally-implemented method may include acquiring an image, said image including at least one representation of a feature of at least one entity, detecting a presence of a privacy beacon associated with the at least one entity from the acquired image, without performance of a further process on the acquired image, encrypting the image using a unique device code prior to performance of one or more image processes other than privacy beacon detection, said unique device code unique to an image capture device and not transmitted from the image capture device, and facilitating transmission of the encrypted image and privacy beacon data associated with the privacy beacon to a location configured to perform processing on one or more of the encrypted image and the privacy beacon data.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, acquiring a privacy metadata, said privacy metadata corresponding to a detection of a privacy beacon in the one or more images captured by the image capture device, said privacy beacon associated with the at least one entity, and determining, at least partly based on the acquired privacy metadata, and partly based on a value calculation based on the representation of the feature of the at least one entity for which the privacy beacon is associated, whether to allow processing, which may include distribution, decryption, etc., of the encrypted data block.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, acquiring a privacy metadata indicating detection of a privacy beacon in the one or more images captured by the image capture device, said privacy beacon associated with the at least one entity, retrieving term data from a remote location, said term data corresponding to a term of service associated with a potential release of the block of encrypted data corresponding to the one or more images that have previously been encrypted through use of the unique device code associated with the image capture device configured to capture the one or more images, calculating an expected valuation corresponding to potential revenue associated with the release of at least a portion of the block of encrypted data corresponding to the one or more images that have previously been encrypted through use of the unique device code associated with the image capture device configured to capture the one or more images, and determining whether to perform decryption of at least a portion of the block of encrypted data at least partially based on the calculation of the expected valuation corresponding to the potential revenue associated with the release of the at least the portion of the block of encrypted data, and at least partially based on the retrieved term data corresponding to the term of service.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, acquiring a privacy metadata indicating a lack of detection of a privacy beacon in the one or more images captured by the image capture device, decrypting the block of encrypted data corresponding to the one or more images that have previously been encrypted through use of a unique device code associated with the image capture device, and encrypting the block of decrypted data through use of a unique entity code that is related to an entity associated with the image capture device configured to capture the one or more images. Referring again to the system, in an embodiment, a computationally-implemented method may include acquiring a block of encrypted data from a remote location, said block of encrypted data corresponding to one or more images captured by an image capture device, said block of encrypted data previously encrypted through use of a unique entity code that is related to an entity associated with the image capture device, receiving an indication that the one or more images captured by the image capture device were approved for decryption through a verification related to privacy metadata associated with the one or more images, obtaining the unique entity code related to the entity associated with the image capture device, and releasing the one or more images through decryption of the block of encrypted data acquired from the remote location using the obtained unique entity code related to the entity associated with the image capture device.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, retrieving term data from a remote location, said term data corresponding to a term of service associated with a potential release of the one or more images that have previously been encrypted through use of the unique device code associated with the image capture device configured to capture the one or more images, calculating whether an estimated advertising revenue from one or more advertisement images placed in the one or more images of the block of encrypted data will be greater than an estimated potential liability for distribution of the one or more images of the block of encrypted data, said estimated potential liability at least partly based on the retrieved term data, modifying the one or more images of the block of encrypted data by replacing one or more areas associated with one or more entities at least partially depicted in the one or more images with the one or more advertisement images, and calculating a modified estimated advertising revenue from the modified one or more images of the block of encrypted data.

Referring again to the system, in an embodiment, a computationally-implemented method may include monitoring a deployment of a privacy beacon associated with a user, said privacy beacon configured to alert a wearable computer of one or more terms of service associated with said user in response to recordation of image data that includes said privacy beacon by said wearable computer, and said privacy beacon configured to instruct said wearable computer to execute one or more processes to impede transmission of the one or more images that include the user associated with said privacy beacon, and storing a record of the deployment of the privacy beacon associated with the user, said record configured to be retrieved upon request to confirm whether the privacy beacon associated with the user was active at a particular time.

Referring again to the system, in an embodiment, a computationally-implemented method may include receiving data regarding one or more features of one or more entities that are designated for protection by one or more terms of service, associating the one or more terms of service with a privacy beacon configured to be captured in an image when the one or more features of the one or more entities are captured in the image, and providing the terms of service to one or more media service providers associated with a device that captured an image that includes the privacy beacon, in response to receipt of an indication that an image that includes the privacy beacon has been captured.

Referring again to the system, in an embodiment, a computationally-implemented method may include acquiring one or more images that have previously been captured by an image capture device, wherein at least one of the one or more images includes at least one representation of a feature of one or more entities, identifying a first entity for which at least one representation of a first entity feature is present in the one or more images, and a second entity for which at least one representation of a second entity feature is present in the one or more images, obtaining data indicating that the first entity has a preexisting relationship with an entity associated with the image capture device, e.g., in a contact list, preventing an obfuscation of the representation of the first entity for which the preexisting relationship with the entity associated with the image capture device has been indicated, and obfuscating the representation of the second entity for which at least one representation of the second entity feature is present in the one or more images.

Referring again to the system, in an embodiment, a computationally-implemented method may include broadcasting a privacy beacon associated with at least one entity from a location of the at least one entity, said privacy beacon configured to be detected by an image capturing device upon capture of an image of the at least one entity, acquiring an indication that the privacy beacon associated with the at least one entity has been captured by the image capturing device, and broadcasting term data including one or more conditions and/or consequences of distribution of one or more images that depict at least a portion of the at least one entity.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, decrypting the block of encrypted data corresponding to the one or more images that have previously been encrypted through use of the unique device code associated with the image capture device configured to capture the one or more images, performing an operation to detect a presence of a privacy beacon associated with the at least one entity from the one or more images, wherein the privacy beacon previously had been detected by the image capture device, and storing outcome data corresponding an outcome of the operation to detect the presence of the privacy beacon associated with the at least one entity of the one or more images, wherein said outcome data includes an indication of whether a result of the performed operation to detect the presence of the privacy beacon associated with the at least one entity from the one or more images matches the previous detection of the privacy beacon by the image capture device.

Referring now to FIG. 2, FIG. 2A illustrates an example environment 200 in which the methods, systems, circuitry, articles of manufacture, and computer program products and architecture, in accordance with various embodiments, may be implemented by one or more server devices 235. As shown in FIG. 2A, one or more computing devices 220 may capture images. For example, computing device 220 may capture an image of an entity 105 associated with a privacy beacon, e.g., a DCM ("Don't Capture Me") beacon 110. In this and some other examples, the captured entity is named "Jules Caesar." In an embodiment in which computing device 220 is a wearable computer, computing device 220 may be worn by computing device user 115. In another embodiment, computing device user 115 is not present (e.g., computing device 220 is a security camera, or an automated teller machine with a camera).

Referring again to FIG. 2A, computing device 220 may capture the image data as image data 22, which may be optical data, e.g., light data, digital data, e.g., a digital signal, or data in another form. In a process that will be discussed in more detail herein according to various embodiments, image data 22 may be encrypted using a device-specific code, shown here as encrypted image data 24. Encrypted image data 24 may be transmitted to a server device 230, which may be an example of wearable computer server 3000 shown in FIG. 1. In an embodiment, computing device 220 may generate beacon metadata 150 from the detected DCM beacon 110. In an embodiment, beacon metadata 150 may be binary beacon metadata that indicates whether a beacon has been detected, e.g., yes or no. In an embodiment, beacon metadata 150 may include a data string that identifies the beacon, the entity, the type of beacon, data about the beacon, or a combination of the foregoing. In an embodiment, such a beacon metadata 150 may be used by server device 230 to obtain additional information about the entity, e.g., terms of service data, which will be described in more detail herein. In an embodiment, beacon metadata 150 may include terms of service data associated with the entity, e.g., Jules Caesar. The types of beacon metadata 150 are not limited to those listed in this paragraph, and the foregoing types of beacon metadata 150 will be described in more detail further herein with respect to FIGS. 4A-4E, and with respect to the specific examples listed herein.

Referring again to FIG. 2A, in an embodiment, server device 230 may include a decryption determination module 232, which may determine whether to decrypt the device-based encrypted image 24, in a process described in more detail in this application and the related applications. In an embodiment, decryption determination module 232 may include valuation assessment module 236. Valuation assessment module 236 may make one or more calculations and/or estimations to determine one or more of an estimated value of the captured image, and an estimated liability that may be incurred for the distribution of the image.

In an embodiment, if the decryption determination module 232 determines to decrypt the image, then the image may be decrypted into decrypted image 26. In an embodiment, decrypted image 26 may be transmitted to server device 235 for further operation. In an embodiment, server device 235 may be part of server device 230. In another embodiment, server device 235 may be separate from server device 230, or may be under the control of a related or separate entity. In an embodiment, server device 235 may apply a client-based encryption key to decrypted image 26 to generate client-based encrypted image 28. Upon encryption, client-based encrypted image 28 may be transmitted to another location, server, or social networking site, by client-based encrypted image distribution module 239. In an embodiment, client-based encrypted image 28 may be transmitted to computing device 220 by client-based encrypted image distribution module 239.

In an embodiment, computing device 220 may receive the client-based encrypted image at client-based encrypted image receiving module 221. Client-based encrypted image receiving module 221 may then facilitate decryption of the client-based encrypted image through use of the client-based encryption key, which may be stored on the device, inputted by the user, or retrieved from a remote database or server. Client-based encrypted image 28 thus may be decrypted into decrypted image 26A.

Referring again to FIG. 2A, computing device 220 may include other operation modules, e.g., a decrypted image operation module 249. Decrypted image operation module 249 may include one or more of a social network distributing module 249A, image manipulation module 249B, image copying module 249C, and image mailing module 249D. In an embodiment, the portions of the computing device 220 that deal with the device-based encrypted image 24, e.g., the image capturing components and the image encryption components, may be separated, either physically or virtually, from components that operate on the decrypted image, e.g., the client-based encrypted image receiving module 221 and the decrypted image operation module 229. In this way, the computing device 220 may be prevented from transmitting or operating on the unencrypted image as it is captured, or the encrypted image after it is encrypted by the device.

Referring again to FIG. 2A, in some embodiments, one or more of the encrypted image data and the DCM beacon metadata are transmitted over one or more communication network(s) 240. In various embodiments, the communication network 240 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 240 may be wired, wireless, or a combination of wired and wireless networks. It is noted that "communication network" as it is used in this application refers to one or more communication networks, which may or may not interact with each other.

Computing device 220 may be any electronic device, portable or not, that may be operated by or associated with one or more users. Computing device 220 is shown as interacting with a user 115. As set forth above, user 115 may be a person, or a group of people, or another entity that mimics the operations of a user. In an embodiment, user 115 may be a computer or a computer-controlled device. Computing device 220 may be, but is not limited to, a wearable computer. Computing device 220 may be any device that is equipped with an image capturing component, including, but not limited to, a cellular phone, a network phone, a smartphone, a tablet, a music player, a walkie-talkie, a radio, an augmented reality device (e.g., augmented reality glasses and/or headphones), wearable electronics, e.g., watches, belts, earphones, or "smart" clothing, earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like.

Referring now to FIG. 2B, FIG. 2B shows a detailed description of a server device 235 operating in environment 200, in an embodiment. It is noted that the components shown in FIG. 2B represent merely one embodiment of server device 235, and any or all components other than processor 222 may be omitted, substituted, or modified, in various embodiments.

Referring again to FIG. 2B, server device 235 may include a server device memory 245. In an embodiment, device memory 245 may include memory, random access memory ("RAM"), read only memory ("ROM"), flash memory, hard drives, disk-based media, disc-based media, magnetic storage, optical storage, volatile memory, nonvolatile memory, and any combination thereof. In an embodiment, device memory 245 may be separated from the device, e.g., available on a different device on a network, or over the air. For example, in a networked system, there may be many server devices 235 whose device memory 245 is located at a central server that may be a few feet away or located across an ocean. In an embodiment, server device 235 may include a device memory 245. In an embodiment, memory 245 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In an embodiment, memory 245 may be located at a single network site. In an embodiment, memory 245 may be located at multiple network sites, including sites that are distant from each other.

Referring again to FIG. 2B, in an embodiment, server device 235 may include a client-based encrypted image distribution destination module 239. In an embodiment, module 239 may be configured to handle a destination for the client-based encrypted image, e.g., which may be the image capture device that captured the image, a different device, e.g., a cell phone or a tablet device or a home computer, for example, a server, a social networking site, a cloud storage, a photo repository, and the like.

Referring again to FIG. 2B, in an embodiment, server device 235 may include a valuation receiving module 236, for embodiments in which a valuation of the captured image is received. In an embodiment, server device 235 may include a privacy beacon detection data receiving module 237, which may receive data regarding whether the privacy beacon was detected. In an embodiment, module 237 may receive data regarding the privacy beacon, e.g., an identifier that can be used to retrieve term data, or a term data, or another identifier.

Referring again to FIG. 2B, FIG. 2B shows a more detailed description of server device 235. In an embodiment, server device 235 may include a processor 222. Processor 222 may include one or more microprocessors, Central Processing Units ("CPU"), a Graphics Processing Units ("GPU"), Physics Processing Units, Digital Signal Processors, Network Processors, Floating Point Processors, and the like. In an embodiment, processor 222 may be a server. In an embodiment, processor 222 may be a distributed-core processor. Although processor 222 is as a single processor that is part of a single server device 235, processor 222 may be multiple processors distributed over one or many server devices 235, which may or may not be configured to operate together.

Processor 222 is illustrated as being configured to execute computer readable instructions in order to execute one or more operations described above, and as illustrated in FIGS. 10, 11A-11C, 12A-12FG, 13A-13C, and 14A-14B. In an embodiment, processor 222 is designed to be configured to operate as processing module 250, which may include one or more of device-based encrypted image that is an image that has previously been encrypted through use of a particular device code assigned to an image capture device configured to capture the image, wherein the image includes a representation of a feature of an entity acquiring module 252, decrypted image through decryption of the device-based encrypted image in response to a decryption approval generating module 254, client-based encrypted image through encryption of the generated decrypted image that uses a particular client code that is assigned to a client that is associated with the image capture device configured to capture the image creating module 256, and created client-based encrypted image distributing to a particular destination module 258.

FIGS. 3A-3E refer to an "image capture device," which is defined as any device that is equipped with the ability to capture images, and not necessarily a wearable computer or a device designed specifically to capture images.

Referring now to FIG. 3A, FIG. 3A shows an exemplary embodiment of a computing device 220 as image capture device 302. In an embodiment, image capture device 302 may include an image capture component, e.g., a lens 306A. Image capture component 306A may capture an image including the user 105 and the DCM beacon 110, and capture that image as raw (optical or digital) data 120. In an embodiment, image capture device 302 may include beacon detection module 310A that is configured to detect DCM beacon 110, either optically, digitally, or other, depending on the embodiment. After detection of the beacon, the image data may be sent to an image data encryption module 320A to encrypt the image. In an embodiment, if the beacon is not detected, the image data 120 is released past barrier 340A and the other image capture device modules 350A may operate on the image data 120. In an embodiment, the encrypted data, and data associated with the DCM beacon 110 (although not necessarily the beacon itself) may be transmitted to encrypted data and beacon transmitting module 330A, which may transmit the encrypted data and beacon data to an external source, e.g., server 3000 as described in FIG. 1. It is noted that beacon detection module 310A, image data encryption module 320A, and encrypted data and beacon transmitting module 330A may be separated from other image capture device modules 350A by barrier 340A.

In an embodiment, barrier 340A may be a physical barrier, e.g., beacon detection module 310A, lens 306A, image data encryption module 320A, and encrypted data and beacon transmitting module 330A may be hard-wired to each other and electrically excluded from other image capture device modules 350A. In another embodiment, barrier 340A may be implemented as a programmed barrier, e.g., the image data 120 is not transmitted to modules other than beacon detection module 310A, lens 306A, image data encryption module 320A, and encrypted data and beacon transmitting module 330A. In another embodiment, barrier 340A may be implemented as a data access barrier, e.g., the captured image data 120 may be protected, e.g., with an access or clearance level, so that only beacon detection module 310A, lens 306A, image data encryption module 320A, and encrypted data and beacon transmitting module 330A may read or operate on the image data 120. In another embodiment, barrier 340A may not be a complete barrier, e.g., barrier 340A may allow "read" access to the image data, but not "copy" or "write" access. In another embodiment, barrier 340A may be a barrier to transmission, e.g., the image may be viewed locally at the device, but may be barred from being saved to a removable memory, or uploaded to a cloud storage or social networking site/social media site.

Referring now to FIG. 3B, FIG. 3B shows an embodiment of a computing device 220 as image capture device 304. In an embodiment, image capture device 304 may include an image capture component, e.g., a lens and sensor 306B. Image capture component 306B may capture an image including the user 105 and the DCM beacon 110, and capture that image as raw (optical or digital) data 120. In an embodiment, image capture device 304 may include image path splitting module 305B that may receive the raw data 120 as a signal, e.g., optical or digital, and split the signal into two branches. As shown in FIG. 3B, one branch, e.g., the north branch, sends the raw signal to image data encryption module 320B, which may encrypt the image. In an embodiment, the other branch, e.g., the south branch, may send the signal to a beacon detection module 310B, which may detect the DCM beacon 110. In an embodiment, if the DCM beacon 110 is detected, then the unencrypted image data that arrived at beacon detection module 310B is destroyed. In an embodiment, if the DCM beacon 110 is not detected, then the encrypted image data from image data encryption module 320B is destroyed, and the unencrypted image data at beacon detection module 310B is allowed to pass to other image capture device modules 350B. In an embodiment, the beacon detection result and the encrypted image data are transmitted to the encrypted data and beacon transmitting module 330B. In an embodiment, barrier 340B may separate image path splitting module 305B, beacon detection module 310B, image data encryption module 320B, and encrypted data and beacon transmitting module 330B from other image capture device modules 350B.

In an embodiment, barrier 340B may be a physical barrier, e.g., beacon detection module 310B, lens 306B, image data encryption module 320B, and encrypted data and beacon transmitting module 330B may be hard-wired to each other and electrically excluded from other image capture device modules 350B. In another embodiment, barrier 340B may be implemented as a programmed barrier, e.g., the image data 120 is not transmitted to modules other than image path splitting module 305B, beacon detection 310B, lens 306B, image data encryption module 320B, and encrypted data and beacon transmitting module 330B. In another embodiment, barrier 340B may be implemented as a data access barrier, e.g., the captured image data may be protected, e.g., with an access or clearance level, so that only beacon detection module 310B, lens 306B, image data encryption module 320B, and encrypted data and beacon transmitting module 330B may read or operate on the image data 120. In another embodiment, barrier 340B may not be a complete barrier, e.g., barrier 340B may allow "read" access to the image data, but not "copy" or "write" access. In another embodiment, barrier 340B may be a barrier to transmission, e.g., the image may be viewed locally at the device, but may be barred from being saved to a removable memory, or uploaded to a cloud storage or social networking site/social media site.

Referring now to FIG. 3C, FIG. 3C shows an embodiment of a computing device 220 implemented as image capture device 306. In an embodiment, image capture device 306 may include an image capture component 306C that captures optical data 120A. In an embodiment, optical data 120A may be sent to optical splitting module 305C, which may split the optical signal, e.g., the light, into two paths. Referring to FIG. 3C, the "south" path may transmit the light to an optical filter 312, which may filter the light for a specific characteristic, e.g., a wavelength or an object, according to known optical filtration techniques. In an embodiment, the filtered optical signal may then be transmitted to a filtered optical signal beacon detection module 310C, which may detect the beacon 110 in the optical data 120A.

Referring again to FIG. 3C, the "north" path from optical splitting module 305C may transmit the optical image data to an optical-to-digital converter 314, e.g., a CMOS or CCD sensor. In an embodiment, the digital signal then may be transmitted to image data encryption module 320C, and the encrypted data transmitted to encrypted data and beacon transmitting module 330C, along with the beacon detection result, for transmission to an external source, e.g., server 3000 as shown in FIG. 1. In an embodiment, barrier 340C may prevent access to the unencrypted image data by other image capture device modules 350C. In an embodiment, barrier 340C may function similarly to barriers 340A and 340B, and the descriptions of those barriers and their possible implementations also may apply to barrier 340C. In an embodiment, image data encryption module 320C, encrypted data beacon and transmitting module 330C, and optical-to-digital converter 314 may be controlled by beacon detection control module 325, which may be part of the processor of image capture device 306, or may be a separate processor. In an embodiment, beacon detection control module 325 may form part or all of processor 222 of computing device 220 of FIG. 2B.

Referring now to FIG. 3D, FIG. 3D shows an exemplary implementation of a computing device 220 implemented as image capture device 308, according to an embodiment. Image capture device 308 may include an optical image collector 306D that may capture an image including the user 105 and the DCM beacon 110, and capture that image as optical data 120A. Optical data 120A may then be sent to optical splitting module 305D, which may split the optical signal, e.g., the light, into two paths. Referring to FIG. 3D, the "south" path may transmit the light to an optical transformation module 332, which may apply a transformation, e.g., a Fourier transformation, to the optical image data. The transformed optical data from module 332, as well as a reference image from optical beacon reference signal providing module 334 may be transmitted to optical beacon detection module 310D. Optical beacon detection module 310D may optically detect the beacon using Fourier transformation and an optical correlator. The basic operation of performing optical image object detection is described in the publically-available (at the University of Michigan Online Library) paper "Report of Project MICHIGAN, SIGNAL DETECTION BY COMPLEX SPATIAL FILTERING," by A. B. Vander Lugt, printed in July 1963 at the Radar Laboratory at the Institute of Science and Technology, the University of Michigan, which is hereby incorporated by reference in its entirety. Applicant's representative is including a copy of this paper with the filing of this application, for the convenience of the Examiner.

Referring again to FIG. 3D, the "north" path from optical splitting module 305D may transmit the optical image data to an optical-to-digital converter 324, e.g., a CMOS or CCD sensor. In an embodiment, the digital signal then may be transmitted to image data encryption module 320D, and the encrypted data transmitted to encrypted data and beacon transmitting module 330D, along with the beacon detection result, for transmission to an external source, e.g., server 3000 as shown in FIG. 1. In an embodiment, barrier 340D may prevent access to the unencrypted image data by other image capture device modules 350D. In an embodiment, barrier 340D may function similarly to barriers 340A and 340B, and the descriptions of those barriers and their possible implementations also may apply to barrier 340D. In an embodiment, image data encryption module 320D, encrypted data and beacon transmitting module 330D, and optical-to-digital converter 324 may be controlled by beacon detection control module 335, which may be part of the processor of image capture device 308, or may be a separate processor. In an embodiment, beacon detection control module 335 may form part or all of processor 222 of computing device 220 of FIG. 2B.

Referring now to FIG. 3E, FIG. 3E shows an exemplary embodiment of an implementation of computing device 220 as image capture device 309. In an embodiment, image capture device 309 may include an optical image collector 306E, e.g., a lens, which may collect the optical data 120A. Optical data 120A may be emitted to an optical beacon detection module 310E, which may detect the DCM beacon 110 using one of the above-described optical detection methods. After detection of the beacon using optical techniques, the optical signal may be captured by an optical-to-digital conversion module 344, and converted to digital image data, which is transferred to image data encryption module 320E for encryption. In an embodiment, modules 306E, 310E, 344, and 320E, are hard-wired to each other, and separated from encrypted data and beacon transmitting module 330E and other image capture device modules 350E by barrier 340E (which, in this embodiment, is shown for exemplary purposes only, because the physical construction of modules 306E, 310E, 344, and 320E removes the need for a barrier 340E, whether implemented as hardware, programming, security, or access. In this embodiment, the image data is encrypted prior to interaction with the "main" portions of image capture device 309, and after the beacon data has been optically detected.

FIGS. 4A-4E show one or more embodiments of a server device 230, according to one or more embodiments. Unless otherwise stated or contradictory to FIGS. 4A-4E, the server devices 430A, 430B, 430C, 430D, and 430E may include the elements of server device 230, as previously described. Similarly, unless otherwise stated or contradictory to FIGS. 4A-4E, the computing devices 420A, 420B, 420C, 420D, and 420E may include the elements of computing device 230, as previously described.

Referring now to FIG. 4A, FIG. 4A shows an exemplary implementation of server device 230 as server device 430A operating in exemplary environment 400A. In an embodiment, computing device 420A further includes a location and time log and transmission module 422A. In an embodiment, location and time log and transmission module 422A may record a location, e.g., through global positioning sensors, triangulation using radio signals, or other methods, of the computing device 420A, and a time that the image is captured, at the time the image is captured. This data of location and time of the image capture, e.g., location and time of detection data 162, may be transmitted to server device 430A, as shown in FIG. 4A.

Referring again to FIG. 4A, server device 430A may include a beacon metadata acquisition module 433. Beacon metadata acquisition module 433 may include location and time of beacon detection data acquisition module 433A. Location and time of beacon detection data acquisition module 433A may receive the location and time of detection data 162. In an embodiment in which the beacon metadata 150 is binary beacon metadata 150A, additional data regarding the image may be obtained. For example, server device 430A may transmit the location and time of detection data 162 to a remote location, e.g., to beacon support server 490. Beacon support server may include, for example, a geotagged and timestamped list of detected beacons 436, which may track a location and time when a beacon is detected. Beacon support server 490 may be associated with DCM beacon 110, and may be configured to log each time DCM beacon 110 is detected, e.g., in an embodiment in which DCM beacon 110 is an active beacon that can determine when it is detected. In an embodiment, beacon support server 490 may use the location and time of detection data 162 to determine which DCM beacon 110 is detected, and transmit the beacon identification information back to server device 430A, e.g., to beacon identification data acquisition module 433B. In an embodiment, this beacon identification information may be used by server device 430A. In an embodiment, the beacon identification information may be used to identify the entity in the image, without decrypting the image, for example.

Referring now to FIG. 4B, FIG. 4B shows an exemplary implementation of server device 230 as server device 430B operating in exemplary environment 400B. In an embodiment, the computing device 420B may generate beacon metadata 150, which may be binary beacon metadata 150A, and transmit the binary beacon metadata 150A to server device 430B. In an embodiment, server device 430B receives the binary beacon metadata 150A, e.g., through use of beacon metadata acquisition module 443, which may describe whether a beacon was detected in the encrypted image data block 160, but which may, in an embodiment, not provide additional data regarding the beacon. In an embodiment, server device 430B may include encrypted image analysis and data extraction module 442, which may perform analysis on the encrypted image 24, if possible. Such analysis may include, for example, that the encrypted image data block 160 may have metadata that is not encrypted or that may be read through the encryption. In an embodiment, for example, the image 22 may be encrypted in such a manner that certain characteristics of the encrypted image 24 may be obtained without decrypting the image. In an embodiment, server device 430B may use encrypted image analysis and data extraction module 442 to determine more information about the image, e.g., which may be used to perform valuation of the image and/or to retrieve term data regarding one or more terms of service associated with the DCM beacon 110 and the entity Jules Caesar 105.

Referring now to FIG. 4C, FIG. 4C shows an exemplary implementation of server device 230 as server device 430C operating in exemplary environment 400C. In an embodiment, computing device 420C may transmit the beacon metadata 150, which may be binary beacon metadata 150A, to server device 430C. Beacon metadata 150 may be obtained by beacon metadata acquisition module 456. In an embodiment, beacon metadata acquisition module 456 may relay data regarding the received metadata to a decision-making portion of server device 430C, e.g., a central processor. In an embodiment, server device 430C may determine that it wants more data regarding the image 22, in order to retrieve term data, or perform a valuation of the image data. Accordingly, in an embodiment, server device 430C may include encrypted image analysis and data extraction module 436, which may operate similarly to encrypted image analysis and data extraction module 442, and also, in an embodiment, encrypted image analysis and data extraction module 436 may transmit the encrypted image data block to a "sandbox," e.g., image decryption sandbox 492. Image decryption sandbox 492 may place the image in a virtual or physical "sandbox" where other processes may be unable to access the data. Image decryption sandbox 492 may be part of server device 430C, or may be a separate entity. In an embodiment, image decryption sandbox 492 may decrypt the encrypted image. Encrypted image decryption and beacon identification module 493 may perform analysis on the decrypted image, including identifying the beacon, or identifying the entity, or a combination thereof. The identification data then may be given to beacon identification data reception module 438. In an embodiment, the decrypted image data is then trapped in the sandbox and/or destroyed.

Referring now to FIG. 4D, FIG. 4D shows an exemplary implementation of server device 230 as server device 430D operating in exemplary environment 400D. In an embodiment, computing device 420D may transmit beacon metadata 150, e.g., beacon identifier metadata 150B, to server device 430D. In an embodiment, beacon identifier metadata 150B may identify the beacon, e.g., the DCM beacon 110. The identification may be a unique identification, e.g. "this beacon is associated with user #13606116, Jules Caesar," or, in an embodiment, the identification may be a class of beacon, e.g., "this is a beacon with a $100,000 dollar liquidated damages clause associated with using a likeness of the entity associated with the beacon," or "this is a beacon of a television celebrity," or "this is a beacon provided by Image Protect Corporation."

Referring again to FIG. 4D, server device 430D receives the beacon identifier metadata 150B, e.g., through use of beacon metadata acquisition module 447. In an embodiment, server device 430D may transmit the identifier to an external location, e.g., a terms of service transmission server 485. Terms of service transmission server 485 may store terms of service associated with various beacons in its terms of service repository 489. In an embodiment, each unique beacon may be associated with its own unique terms of service. In another embodiment, there may be common terms of service for various users. In another embodiment, there may be common terms of service for various classes of users. In an embodiment, the terms of service may vary depending on how much the entity, e.g., Jules Caesar, is paying to use the beacon service.

In an embodiment, terms of service transmission server 485 may include beacon identifier lookup table 487. Beacon identifier lookup table 487 may receive the beacon identifier metadata 150B, and use the beacon identifier metadata 150B to obtain the terms of service associated with that beacon, e.g., terms of service data 151. In an embodiment, terms of service data 151 then may be transmitted to server device 430D.

Referring now to FIG. 4E, FIG. 4E shows an exemplary implementation of server device 230 as server device 430E operating in exemplary environment 400E. In an embodiment, computing device 420E may detect the DCM beacon 110, and may obtain the terms of service from the detected beacon (e.g., the terms of service may be read from the beacon, e.g., in compressed binary). In an embodiment, the computing device 420E may use the detected beacon data to obtain the terms of service data from another location, e.g., a terms of service data server (not pictured).

Referring again to FIG. 4E, in an embodiment, computing device 420E may transmit beacon metadata 150, e.g., beacon identifier and terms of service metadata 150C, to server device 430E. Beacon metadata acquisition module 444 may receive the beacon identifier and terms of service metadata 150C, and detect that the terms of service are present in the beacon metadata 150. In an embodiment, beacon metadata terms of service reading module 454 may read the terms of service from the beacon metadata 150.

The foregoing examples are merely provided as examples of how beacon data may operate, and how identifying data and/or term of service data may be obtained by the various server devices, and should not be interpreted as limiting the scope of the invention, which is defined solely by the claims. Any and all components of FIGS. 4A-4E may be combined with each other, modified, or eliminated.

FIGS. 5A-5D show one or more embodiments of a computing device 230, among other components, operating in an environment 500 (e.g., 500A-500D), according to one or more embodiments. Unless otherwise stated or contradictory to FIGS. 5A-5D, the server devices 530A, 530B, 530C, and 530D may include the elements of server device 230, as previously described. Similarly, unless otherwise stated or contradictory to FIGS. 5A-5D, the computing devices 520A, 520B, 520C, and 520D may include the elements of computing device 220, as previously described.

Referring now to FIG. 5A, FIG. 5A shows an exemplary implementation of server device 230 as server device 530A operating in exemplary environment 500A. In an embodiment, as shown in FIG. 5A, computing device 520A may capture an image that includes an entity 105 that may be associated with a privacy beacon, e.g., DCM beacon 110. In an embodiment, the captured image, e.g., image 22, may be encrypted into encrypted image 24 using a device-based encryption key. In an embodiment, encrypted image 24 may be combined with beacon metadata, e.g., beacon metadata 150, in an encrypted image data block 160. In another embodiment, beacon metadata 150 may be separate from encrypted image data block 160. In an embodiment, the encrypted image 24 may be transmitted to a server device 530A by encrypted image data transmitting module 180. In an embodiment, a decryption determination module 532A may determine to decrypt the image, e.g., in a process described in one or more of this and/or previous applications incorporated by reference. In an embodiment, server device 530A may include decryption module 534A, which may apply a device-based decryption key to the encrypted image 24 to generate decrypted image data. In an embodiment, client-based encryption module 536A may apply a client-based encryption key to the decrypted image data, to generate a client-based encrypted image. In an embodiment, the client-based encrypted image then may be transmitted back to the computing device 520A, which may be a wearable computer, e.g., to client-based encrypted data receiving module 190. In an embodiment, upon receipt of the client-based encrypted image the client-based encrypted image decryption module 195 may decrypt the client-based encrypted image.

In an embodiment, one or more of the originally-captured image 22, the decrypted image data in the decryption module 534A of server device 530A, and the decrypted image data in the client-based encryption module 536A may be identical. In another embodiment, the substantive portion of the data (e.g., the color data) may be identical, and other data, e.g., header data or compression data, may be different. In another embodiment, the decrypted image data in the decryption module 534A of server device 530A, and the decrypted image data in the client-based encryption module 536A may be slightly different.

Referring now to FIG. 5B, FIG. 5B shows an exemplary implementation of server device 230 as server device 530B operating in exemplary environment 500B. In an embodiment, as shown in FIG. 5B, computing device 520B may capture an image that includes an entity 105 that may be associated with a privacy beacon, e.g., DCM beacon 110. In an embodiment, the captured image, e.g., image 22, may be encrypted into encrypted image 24 using a device-based encryption key. In an embodiment, encrypted image 24 may be combined with beacon metadata, e.g., beacon metadata 150, in an encrypted image data block 160. In another embodiment, beacon metadata 150 may be separate from encrypted image data block 160. In an embodiment, the encrypted image 24 may be transmitted to a server device 530B by encrypted image data transmitting module 180. In an embodiment, a decryption determination module 532B may determine to decrypt the image, e.g., in a process described in one or more of this and/or previous applications incorporated by reference. In an embodiment, server device 530B may include decryption module 534B, which may apply a device-based decryption key to the encrypted image 24 to generate decrypted image data. In an embodiment, client-based encryption module 536B may apply a client-based encryption key to the decrypted image data, to generate a client-based encrypted image.

Referring again to FIG. 5B, in an embodiment, the client-based encrypted image then may be transmitted to a device that is not the computing device 520B, e.g., rather to other client-associated computer device 550. Other client-associated computer device 550 may include client-based encrypted data receiving module 191 and/or client-based encrypted image decryption module 194 which may decrypt the client-based encrypted image, similarly to modules 190 and 195 of FIG. 5A, but not part of computing device 520B. In an embodiment, computer device 550 may also be worn or carried by the client, e.g., a smartphone carried by the client that was wearing the wearable computer 520B. In an embodiment, computer device 550 may be remote from the client, e.g., the client's home computer. In another embodiment, computer device 550 may be a shared server, e.g., where the client stores images on the cloud. In an embodiment similar to the one described above, the computing device 520B may not possess the decrypted image at any point during the process.

Referring again to FIG. 5B, similarly to FIG. 5A, in an embodiment, one or more of the originally-captured image 22, the decrypted image data in the decryption module 534B of server device 530B, and the decrypted image data in the client-based encryption module 536B may be identical. In another embodiment, the substantive portion of the data (e.g., the color data) may be identical, and other data, e.g., header data or compression data, may be different. In another embodiment, the decrypted image data in the decryption module 534B of server device 530B, and the decrypted image data in the client-based encryption module 536B may be slightly different.

Referring now to FIG. 5C, FIG. 5C shows an exemplary implementation of server device 230 as server device 530C operating in exemplary environment 500C. In an embodiment, as shown in FIG. 5A, computing device 520C may capture an image that includes an entity 105 that may be associated with a privacy beacon, e.g., DCM beacon 110. In an embodiment, the captured image, e.g., image 22, may be encrypted into encrypted image 24 using a device-based encryption key. In an embodiment, encrypted image 24 may be combined with beacon metadata, e.g., beacon metadata 150, in an encrypted image data block 160. In another embodiment, beacon metadata 150 may be separate from encrypted image data block 160. In an embodiment, the encrypted image 24 may be transmitted to a server device 530C by encrypted image data transmitting module 180. In an embodiment, a decryption determination module 532C may determine to decrypt the image, e.g., in a process described in one or more of this and/or previous applications incorporated by reference.

Referring again to FIG. 5C, in an embodiment, one or more of the decision to decrypt the encrypted image 24, and the encrypted image 24 may be transmitted to a client-based encryption handling device 560. In an embodiment, client-based encryption handling device 560 may include decryption module 562, which may apply a device-based decryption key to the encrypted image 24 to generate decrypted image data. In an embodiment, client-based encryption module 564 may apply a client-based encryption key to the decrypted image data, to generate a client-based encrypted image. In an embodiment, the client-based encrypted image, then may be transmitted back to the computing device 520A, which may be a wearable computer, e.g., to client-based encrypted data receiving module 190. In an embodiment, upon receipt of the client-based encrypted image the client-based encrypted image decryption module 195 may decrypt the client-based encrypted image.

Referring again to FIG. 5C, similarly to FIG. 5A, in an embodiment, one or more of the originally-captured image 22, the decrypted image data in the decryption module 562 of client-based encryption handling device 560, and the decrypted image data in the client-based encryption module 564 may be identical. In another embodiment, the substantive portion of the data (e.g., the color data) may be identical, and other data, e.g., header data or compression data, may be different. In another embodiment, the decrypted image data in the decryption module 562 of client-based encryption handling device 560, and the decrypted image data in the client-based encryption module 564 may be slightly different.

Referring now to FIG. 5D, FIG. 5D shows an exemplary implementation of server device 230 as server device 530D operating in exemplary environment 500D. In an embodiment, as shown in FIG. 5D, computing device 520D may capture an image that includes an entity 105 that may be associated with a privacy beacon, e.g., DCM beacon 110. In an embodiment, the captured image, e.g., image 22, may be encrypted into encrypted image 24 using a device-based encryption key. In an embodiment, encrypted image 24 may be combined with beacon metadata, e.g., beacon metadata 150, in an encrypted image data block 160. In another embodiment, beacon metadata 150 may be separate from encrypted image data block 160. In an embodiment, the encrypted image 24 may be transmitted to a server device 530D by encrypted image data transmitting module 180. In an embodiment, a decryption determination module 532D may determine to decrypt the image, e.g., in a process described in one or more of this and/or previous applications incorporated by reference. In an embodiment, server device 530D may include decryption module 534D, which may apply a device-based decryption key to the encrypted image 24 to generate decrypted image data. In an embodiment, client-based encryption module 536D may apply a client-based encryption key to the decrypted image data, to generate a client-based encrypted image.

Referring again to FIG. 5D, in an embodiment, the client-based encrypted image then may be transmitted to a device that is not the computing device 520D, e.g., rather to a social networking server 570 or file repository 570. In an embodiment, social networking server 570 may include client-based encrypted data receiving module 192, similarly to client-based encrypted data receiving module 190 of FIG. 5A. In an embodiment, social networking server 570 may include the client-based encrypted image decryption module 197, which may be similar to the client-based encrypted image decryption module 195 of FIG. 5A, and which may decrypt the client-based encrypted image. In an embodiment, social networking server may automatically decrypt the image, and/or take one or more actions, e.g., posting the image to a user's account, e.g., their "wall" on Facebook, or a similar structure. In another embodiment, the social networking server 570 may wait to decrypt the image, and/or to take one or more actions with the image, until the client that captured the image logs into the social networking service associated with the social networking server.

Referring again to FIG. 5D, similarly to FIG. 5A, in an embodiment, one or more of the originally-captured image 22, the decrypted image data in the decryption module 534D of server device 530D, and the decrypted image data in the client-based encryption module 536D may be identical. In another embodiment, the substantive portion of the data (e.g., the color data) may be identical, and other data, e.g., header data or compression data, may be different. In another embodiment, the decrypted image data in the decryption module 534D of server device 530D, and the decrypted image data in the client-based encryption module 536D may be slightly different.

Referring now to FIG. 6, FIG. 6 illustrates an exemplary implementation of the device-based encrypted image that is an image that has previously been encrypted through use of a particular device code assigned to an image capture device configured to capture the image, wherein the image includes a representation of a feature of an entity acquiring module 252. As illustrated in FIG. 6, the device-based encrypted image that is an image that has previously been encrypted through use of a particular device code assigned to an image capture device configured to capture the image, wherein the image includes a representation of a feature of an entity acquiring module may include one or more sub-logic modules in various alternative implementations and embodiments. For example, as shown in FIG. 6, e.g., FIG. 6A, in an embodiment, module 252 may include one or more of device-based encrypted image that is an image that has previously been encrypted through use of an exclusive device code assigned to a singular image capture device configured to capture the image, wherein the image includes a representation of a feature of an entity receiving module 602 and device-based encrypted image that is an image that has previously been encrypted through use of a particular device code generated by the image capture device configured to capture the image, wherein the image includes a representation of a feature of an entity acquiring module 608. In an embodiment, module 602 may include device-based encrypted image that is an image that has previously been encrypted through use of an exclusive device code assigned to a singular image capture device that captured the image, wherein the image includes a representation of a feature of an entity receiving module 604. In an embodiment, module 604 may include device-based encrypted image that is an image that has previously been encrypted through use of a symmetric key encryption in which the symmetric key is generated using the exclusive device code assigned to a singular image capture device that captured the image as a seed, wherein the image includes a representation of a feature of a celebrity singer receiving module 606.

Referring again to FIG. 6, e.g., FIG. 6B, in an embodiment, module 252 may include one or more of device-based encrypted image that is an image that has previously been encrypted through use of a particular device code assigned to an image capture device that is configured to be operated by a particular user, configured to capture the image, wherein the image includes a representation of a feature of an entity acquiring module 610, device-based encrypted image that is an image that has previously been encrypted through use of a unique string of characters assigned to an image capture device configured to capture the image, wherein the image includes a representation of a feature of an entity acquiring module 616, device-based encrypted image that is an image that has previously been encrypted through use of a particular device code assigned to an image capture device configured to capture the image, wherein the image includes a representation of a feature of an entity acquiring from a server that obtained the image from the image capture device module 618, and device-based encrypted image that is an image that has previously been encrypted through use of a particular device code assigned to an image capture device configured to capture the image, wherein the image includes a representation of a feature of an entity acquiring from a server that obtained the device-based encrypted image from the image capture device module 620. In an embodiment, module 610 may include one or more of device-based encrypted image that is an image that has previously been encrypted through use of a particular device code assigned to an image capture device that is selected by a particular user of the image capture device, configured to capture the image, wherein the image includes a representation of a feature of an entity acquiring module 612 and device-based encrypted image that is an image that has previously been encrypted through use of a particular device code assigned to an image capture device that is related to a login for a particular user of the image capture device, configured to capture the image, wherein the image includes a representation of a feature of an entity acquiring module 614.

Referring again to FIG. 6, e.g., FIG. 6C, in an embodiment, module 252 may include device-based encrypted image that is an image that has previously been encrypted through use of a particular device code assigned to an image capture device configured to capture the image, wherein the image includes a representation of a feature of an entity acquiring from a server that determined that the device-based encrypted image has been cleared for decryption module 622.

Referring now to FIG. 7, FIG. 7 illustrates an exemplary implementation of decrypted image through decryption of the device-based encrypted image in response to a decryption approval generating module 254. As illustrated in FIG. 7, the decrypted image through decryption of the device-based encrypted image in response to a decryption approval generating module 254 may include one or more sub-logic modules in various alternative implementations and embodiments. For example, as shown in FIG. 7, e.g., FIG. 7A, in an embodiment, module 254 may include one or more of decrypted image through decryption that uses a decryption key of the device-based encrypted image in response to a decryption approval generating module 702, decryption key configured to decrypt the device-based encrypted image acquiring module 706, and acquired decryption key configured to decrypt the device-based encrypted image application to the device-based encrypted image in response to the generated decryption approval module 708. In an embodiment, module 702 may include decrypted image through decryption of the device-based encrypted image that uses a decryption key obtained from the image capture device in response to a decryption approval generating module 704. In an embodiment, module 706 may include one or more of decryption key configured to decrypt the device-based encrypted image acquiring from a decryption key storage bank module 710, decryption key configured to decrypt the device-based encrypted image acquiring from a management server configured to store one or more particular device codes associated with one or more image capture devices that have at least one property in common module 712, decryption key configured to decrypt the device-based encrypted image generating at least partly based on the particular device code module 714, particular device code acquiring module 716, and decryption key generating from the acquired particular device code module 718.

Referring again to FIG. 7, e.g., FIG. 7B, in an embodiment, module 254 may include one or more of decrypted image through decryption of the device-based encrypted image in response to a received decryption approval message generating module 720, decrypted image through decryption of the device-based encrypted image in response to a decryption approval message received from a determination server generating module 722, decrypted image through decryption of the device-based encrypted image in response to a determination that the device-based encrypted image may be decrypted generating module 724, and decrypted image through decryption of the device-based encrypted image in response to an indication that a privacy beacon was not detected with respect to the entity in the image generating module 726. In an embodiment, module 726 may include one or more of decrypted image through decryption of the device-based encrypted image in response to an indication that a privacy beacon that is configured to facilitate retrieval of terms of service data related to a use of the representation of the feature of the entity was absent from the image generating module 728 and decrypted image through decryption of the device-based encrypted image in response to an indication that a privacy beacon was not optically detected in the image by the image capture device generating module 730.

Referring again to FIG. 7, e.g., FIG. 7C, in an embodiment, module 254 may include decrypted image through decryption of the device-based encrypted image in response to an indication of detection of a privacy beacon and an approval of decryption generating module 732. In an embodiment, module 732 may include one or more of decrypted image through decryption of the device-based encrypted image in response to an indication of detection of a privacy beacon that identifies the entity and an approval of decryption generating module 734, decrypted image through decryption of the device-based encrypted image in response to an indication of detection of a privacy beacon that is configured to facilitate obtaining a notice that regards the entity and an approval of decryption generating module 736, and decrypted image through decryption of the device-based encrypted image in response to an indication of detection of a privacy beacon and a decision was made to approve decryption of the device-based encrypted image generating module 744. In an embodiment, module 736 may include one or more of decrypted image through decryption of the device-based encrypted image in response to an indication of detection of a privacy beacon that is configured to facilitate retrieval of a notice that regards the entity and an approval of decryption generating module 738 and decrypted image through decryption of the device-based encrypted image in response to an indication of detection of a privacy beacon that is configured to facilitate acquisition of one or more terms of service that regard use of the image of the entity and an approval of decryption generating module 740. In an embodiment, module 740 may include decrypted image through decryption of the device-based encrypted image in response to an indication of detection of a privacy beacon that is configured to facilitate acquisition of one or more terms of service that regard distribution of the image of the entity and an approval of decryption generating module 742.

Referring again to FIG. 7, e.g., FIG. 7D, in an embodiment, module 254 may include module 732, as previously described. In an embodiment, module 732 may include decrypted image through decryption of the device-based encrypted image in response to an indication of detection of a privacy beacon and an approval of decryption that is at least partly based on an identity of the entity in the image generating module 746.

Referring again to FIG. 7, e.g., FIG. 7E, in an embodiment, module 254 may include one or more of determination that privacy beacon associated with the entity was detected acquiring module 748, indication that the image has been approved for decryption that is at least partly based on data associated with the privacy beacon obtaining module 750, and decrypting the device-based encrypted image in response to the obtained indication 752. In an embodiment, module 748 may include one or more of determination that was performed by the image capture device and that indicates that privacy beacon associated with the entity was detected acquiring module 754 and metadata that indicates that the privacy beacon associated with the entity was detected receiving module 756. In an embodiment, module 750 may include one or more of indication that the image has been approved for decryption that is at least partly based on an identity of the entity associated with the privacy beacon obtaining module 758, indication that the image has been approved for decryption that is at least partly based on an estimated damage recovery likelihood factor calculated based on an identity of the entity associated with the privacy beacon obtaining module 762, and indication that the image has been approved for decryption that is at least partly based on data retrieved at least partially through use of nonunique identification data associated with the privacy beacon obtaining module 764. In an embodiment, module 758 may include indication that the image has been approved for decryption that is at least partly based on a net worth of the entity associated with the privacy beacon obtaining module 760. In an embodiment, module 764 may include indication that the image has been approved for decryption that is at least partly based on term data including one or more terms of service retrieved at least partially through use of nonunique identification data associated with the privacy beacon obtaining module 766.

Referring again to FIG. 7, e.g., FIG. 7F, in an embodiment, module 254 may include one or more of indication that the device-based encrypted image has been approved for decryption at least partly based on a valuation of the image acquiring module 768 and device-based encrypted image decrypting in response to the acquired indication module 770. In an embodiment, module 768 may include one or more of indication that the device-based encrypted image has been approved for decryption at least partly based on a valuation of the image that is at least partly based on the representation of the feature of the entity acquiring module 772 and indication that the device-based encrypted image has been approved for decryption at least partly based on a valuation of the image that is at least partly based on a comparison of the valuation of the image and an estimated amount of damages that may be incurred through distribution of the image that contains the representation of the feature of the entity acquiring module 774. In an embodiment, module 774 may include indication that the device-based encrypted image has been approved for decryption at least partly based on a valuation of the image that is at least partly based on a comparison of the valuation of the image and an estimated amount of damages that may be incurred through distribution of the image that is calculated at least partly based on term data that includes one or more terms of service that govern use of the image that contains the representation of the feature of the entity acquiring module 776.

Referring now to FIG. 8, FIG. 8 illustrates an exemplary implementation of client-based encrypted image through encryption of the generated decrypted image that uses a particular client code that is assigned to a client that is associated with the image capture device configured to capture the image creating module 256. As illustrated in FIG. 8, the client-based encrypted image through encryption of the generated decrypted image that uses a particular client code that is assigned to a client that is associated with the image capture device configured to capture the image creating module 256 may include one or more sub-logic modules in various alternative implementations and embodiments. For example, as shown in FIG. 8, e.g., FIG. 8A, in an embodiment, module 256 may include one or more of client-based encrypted image through encryption of the generated decrypted image that uses a particular client code that is assigned to the client by a third party and that is associated with the image capture device configured to capture the image creating module 802, client-based encrypted image through encryption of the generated decrypted image that uses a unique entity code that is assigned to a client that is an operator of image capture device configured to capture the image creating module 808, and client-based encrypted image through encryption of the generated decrypted image that uses a particular client code that is assigned to a client that is associated with the image capture device configured to capture the image and that is unique to a particular set of clients that includes the client associated with the image capture device creating module 810. In an embodiment, module 802 may include client-based encrypted image through encryption of the generated decrypted image that uses a unique entity code that is assigned to the client by a third party and that is associated with the image capture device configured to capture the image creating module 804. In an embodiment, module 804 may include client-based encrypted image through encryption of the generated decrypted image that uses a unique entity code that is assigned to the client by a third party and that is associated with the image capture device configured to capture the image and that is configured to be used as a seed in a generation of an encryption key creating module 806.

Referring again to FIG. 8, e.g., FIG. 8B, in an embodiment, module 256 may include one or more of generated decrypted image that uses a particular client code that is assigned to a client that is associated with the image capture device configured to capture the image encrypting through use of the particular client code module 812, generated decrypted image transmission to an encryption destination facilitating module 814, client-based encrypted image that has been encrypted through use of the particular client code that is assigned to the client that is associated with the image capture device configured to capture the image receiving from the encryption destination module 816, client-based encrypted image through encryption of the generated decrypted image that uses a key derivation function to which the particular client code is applied to generate a derived key for encryption of the generated decrypted image creating module 818, client-based encryption key generating through application of a key derivation function to the particular client code module 820, generated decrypted image encrypting through use of the generated client-based encryption key module 822, and client-based encrypted image through encryption of the generated decrypted image that uses a particular client code that is assigned to a client that is associated with the image capture device configured to capture the image as an encryption key creating module 824.

Referring again to FIG. 8, e.g., FIG. 8C, in an embodiment, module 256 may include one or more of client-based encrypted image through encryption of the generated decrypted image that uses a particular client code as a seed value for a symmetric key cipher that is assigned to a client that is associated with the image capture device configured to capture the image creating module 826, client-based encrypted image through encryption of the generated decrypted image that uses a particular client code that is assigned to a client that is an operator of the image capture device configured to capture the image creating module 828, client-based encrypted image through encryption of the generated decrypted image that uses a particular client code that is assigned to a client that is associated with the image capture device configured to capture the image by an entity external to the image capture device creating module 832, and client-based encrypted image through encryption of the generated decrypted image that uses a particular client code that is assigned, at a time that the image is captured, to the client that is associated with the image capture device configured to capture the image creating module 836. In an embodiment, module 828 may include client-based encrypted image through encryption of the generated decrypted image that uses a particular client code that is assigned to a client that is an operator of the image capture device that captured the image creating module 830. In an embodiment, module 832 may include client-based encrypted image through encryption of the generated decrypted image that uses a particular client code that is assigned to the client that is an operator of the image capture device configured to capture the image that is assigned to the client by a developer of one or more applications present in a memory of the image capture device creating module 834.

Referring now to FIG. 9, FIG. 9 illustrates an exemplary implementation of created client-based encrypted image distributing to a particular destination module 258. As illustrated in FIG. 9, the created client-based encrypted image distributing to a particular destination module 258 may include one or more sub-logic modules in various alternative implementations and embodiments. For example, as shown in FIG. 9, e.g., FIG. 9A, in an embodiment, module 258 may include one or more of created client-based encrypted image transmitting to a particular destination module 902, created client-based encrypted image distributing to a device that has access to a decryption key configured to decrypt the client-based encrypted image destination module 906, created client-based encrypted image distributing to a device that has a preexisting relationship with the client that is associated with the image capture device module 908, device that has a relationship with the client that is associated with the image capture device locating module 912, and client-based encrypted image transmitting to the located device that has the relationship with the client module 914. In an embodiment, module 902 may include created client-based encrypted image transmitting to the image capture device module 904. In an embodiment, module 908 may include created client-based encrypted image distributing to a home computer device that is under control of the client that is associated with the image capture device module 910. In an embodiment, module 912 may include one or more of device to which the client that is associated with the image capture device has previously logged in locating module 916 and device that is within a particular proximity to the client that is associated with the image capture device locating module 918.

Referring again to FIG. 9, e.g., FIG. 9B, in an embodiment, module 258 may include one or more of created client-based encrypted image distributing to a shared network drive module 920, created client-based encrypted image distributing to a client-selected destination module 922, and created client-based encrypted image distributing to a social networking site module 924. In an embodiment, module 924 may include one or more of created client-based encrypted image distributing to a client-associated social networking account of the social networking site module 926 and created client-based encrypted image distributing to a social networking site that has authorization from the client to decrypt the client-based encrypted image module 928.

Referring now to FIG. 10, FIG. 10 shows operation 1000, e.g., an example operation of server device 230 operating in an environment 200. In an embodiment, operation 1000 may include operation 1002 depicting acquiring a device-based encrypted image that is an image that has previously been encrypted through use of a particular device code associated with an image capture device configured to capture the image, wherein the image includes a representation of a feature of an entity. For example, FIG. 2, e.g., FIG. 2B, shows device-based encrypted image that is an image that has previously been encrypted through use of a particular device code assigned to an image capture device configured to capture the image, wherein the image includes a representation of a feature of an entity acquiring module 252 acquiring (e.g., obtaining, receiving, calculating, selecting from a list or other data structure, receiving, retrieving, or receiving information regarding, performing calculations to find out, retrieving data that indicates, receiving notification, receiving information that leads to an inference, whether by human or automated process, or being party to any action or transaction that results in informing, inferring, or deducting, including but not limited to circumstances without absolute certainty, including more-likely-than-not and/or other thresholds) a device-based (e.g., the encryption is associated with the device, e.g., either performed by the device, or uses an encryption key associated with the device, or uses an encryption key that was derived from a device attribute, including but not limited to a device code) encrypted (e.g., one or more operations have been performed with the intention of preventing, delaying, or hindering unauthorized access) image (e.g., a description of a graphic picture that is a visual representation of something, regardless of whether that something is coherent, nonsensical, abstract, or otherwise), that is an image (e.g., a description of a graphic picture that is a visual representation of something, regardless of whether that something is coherent, nonsensical, abstract, or otherwise) that has previously been encrypted (e.g., prior to the "acquiring" previously described) through use of (e.g., was facilitated, at least in part, in the derivation of or carrying out of) a particular device code (e.g., any set of data that is associated with the device) assigned to (e.g., associated with) an image capture device (e.g., a device that has the hardware and/or software to facilitate the capture of images) configured to capture the image (e.g., a description of a graphic picture that is a visual representation of something, regardless of whether that something is coherent, nonsensical, abstract, or otherwise), wherein the image (e.g., a description of a graphic picture that is a visual representation of something, regardless of whether that something is coherent, nonsensical, abstract, or otherwise) includes a representation (e.g., a form of, e.g., pixels, vector maps, instructions for recreating, a set of brightness and color values, and the like) of a feature (e.g., a body, a part of a body, a thing carried by a body, a thing worn by a body, a thing possessed by a body, where the body is not necessarily human, living, or animate) of an entity (e.g., a thing, e.g., a person, a rock, a deer, anything that has separate and distinct existence and objective or conceptual reality)

Referring again to FIG. 13, operation 1300 may include operation 1304 depicting decrypting the device-based encrypted image in response to an indication that the image has been approved for decryption. For example, FIG. 2, e.g., FIG. 2B, shows decrypted image through decryption of the device-based encrypted image in response to a decryption approval generating module 254 decrypting (e.g., removing the encryption from, reversing the encryption, or generally modifying into an intelligible form) the device-based (e.g., the encryption is associated with the device, e.g., either performed by the device, or uses an encryption key associated with the device, or uses an encryption key that was derived from a device attribute, including but not limited to a device code) encrypted (e.g., one or more operations have been performed with the intention of preventing, delaying, or hindering unauthorized access) image (e.g., a description of a graphic picture that is a visual representation of something, regardless of whether that something is coherent, nonsensical, abstract, or otherwise) in response to (e.g., in some instances, with a causal link to, but also including after-in-time situations, and indirect responses, e.g., it need not be directly in response to, but could just be further down a chain of processing, or the event is one in a line of triggers and/or response generators) an indication (e.g., a data, signal, message, flag, binary encoding, state change, environment change, quantum state change) that the image (e.g., a description of a graphic picture that is a visual representation of something, regardless of whether that something is coherent, nonsensical, abstract, or otherwise) has been approved (e.g., cleared, granted, authorized, selected, allowed, or otherwise permission has been given or is implied or always present) for decryption (e.g., removal of the encryption, reversal of the encryption, or general modification into an intelligible form).

Referring again to FIG. 13, operation 1300 may include operation 1306 depicting creating a client-based encrypted image through encryption of the decrypted image through use of a particular client code that is associated with a client that is linked to the image capture device configured to capture the image. For example, FIG. 2, e.g., FIG. 2B, shows client-based encrypted image through encryption of the generated decrypted image that uses a particular client code that is assigned to a client that is associated with the image capture device configured to capture the image creating module 256 creating (e.g., generating, modifying, adding, developing, assisting in the creation of, facilitating, and the like) a client-based (e.g., the encryption is associated with the client (e.g., a user of the device), that is, the encryption is performed by the client, or uses an encryption key associated with the client, inputted by the client, or uses an encryption key that was derived from a client attribute, including but not limited to a client code, a client name, a client email address, a client identifier, e.g., a client social security number or drivers' license number) encrypted (e.g., one or more operations have been performed with the intention of preventing, delaying, or hindering unauthorized access) image (e.g., a description of a graphic picture that is a visual representation of something, regardless of whether that something is coherent, nonsensical, abstract, or otherwise) through encryption e.g., the facilitation of one or more processes that have the intention, whether successful or not, of preventing or delaying unauthorized access) of the decrypted image (e.g., the image that was decrypted in the previous step) through use of (e.g., was facilitated, at least in part, in the derivation of or carrying out of) a particular client code (e.g., any set of data that is associated with the client or created by the client) that is associated with (e.g., there is some relationship, regardless of how tenuous, including being assigned to, or including information about) a client (e.g., a user) linked to (e.g., has a relationship with, e.g., has previously used, purchased, logged into, viewed, received data from, etc.) the image capture device (e.g., a device that has the hardware and/or software to facilitate the capture of images) configured to capture the image (e.g., a description of a graphic picture that is a visual representation of something, regardless of whether that something is coherent, nonsensical, abstract, or otherwise).

Referring again to FIG. 13, operation 1300 may include operation 1308 depicting delivering the client-based encrypted image to a particular location. For example, FIG. 2, e.g., FIG. 2B, shows created client-based encrypted image distributing to a particular destination module 258 delivering (e.g., transmitting, facilitating the transmission of, specifying an address to transmit to, verifying, opening a communication channel, establishing a communication with) the client-based (e.g., the encryption is associated with the client (e.g., a user of the device), that is, the encryption is performed by the client, or uses an encryption key associated with the client, inputted by the client, or uses an encryption key that was derived from a client attribute, including but not limited to a client code, a client name, a client email address, a client identifier, e.g., a client social security number or drivers' license number) encrypted (e.g., one or more operations have been performed with the intention of preventing, delaying, or hindering unauthorized access) image (e.g., a description of a graphic picture that is a visual representation of something, regardless of whether that something is coherent, nonsensical, abstract, or otherwise) to a particular location (e.g., anything that can be a destination, e.g., a location, a particular device, a particular network address, a particular directory of a device, to a particular person, entity, or destination).

An example terms of service is listed below with the numbered paragraphs 1-5. Many other variations of terms of service are known and used in click-through agreements that are common at the time of filing, and the herein example is intended to be exemplary only and not limiting in any way.

1. By capturing an image of any part of the user Jules Caesar (hereinafter "Image"), or providing any automation, design, resource, assistance, or other facilitation in the capturing of the Image, you agree that you have captured these Terms of Service and that you acknowledge and agree to them. If you cannot agree to these Terms of Service, you should immediately delete the captured Image. Failure to do so will constitute acceptance of these Terms of Service.

2. The User Jules Caesar owns all of the rights associated with the Image and any representation of any part of Jules Caesar thereof;

3. By capturing the Image, you agree to provide the User Jules Caesar just compensation for any commercialization of the User's personality rights that may be captured in the Image.

4. By capturing the Image, you agree to take all reasonable actions to track the Image and to provide an accounting of all commercialization attempts related to the Image, whether successful or not.

5. By capturing the Image, you accept a Liquidated Damages agreement in which unauthorized use of the Image will result in mandatory damages of at least, but not limited to, $1,000,000.

A privacy beacon may include, but is not limited to, one or more of a marker that reflects light in a visible spectrum, a marker that reflects light in a nonvisible spectrum, a marker that emits light in a visible spectrum, a marker that emits light in a nonvisible spectrum, a marker that emits a radio wave, a marker that, when a particular type of electromagnetic wave hits it, emits a particular electromagnetic wave, an RFID tag, a marker that uses near-field communication, a marker that is in the form of a bar code, a marker that is in the form of a bar code and painted on a user's head and that reflects light in a nonvisible spectrum, a marker that uses high frequency low penetration radio waves (e.g., 60 GHz radio waves), a marker that emits a particular thermal signature, a marker that is worn underneath clothing and is detectable by an x-ray-type detector, a marker that creates a magnetic field, a marker that emits a sonic wave, a marker that emits a sonic wave at a frequency that cannot be heard by humans, a marker that is tattooed to a person's bicep and is detectable through clothing, a marker that is a part of a user's cellular telephone device, a marker that is broadcast by a part of a user's cellular telephone device, a marker that is broadcast by a keychain carried by a person, a marker mounted on a drone that maintains a particular proximity to the person, a marker mounted in eyeglasses, a marker mounted in a hat, a marker mounted in an article of clothing, the shape of the person's face is registered as the beacon, a feature of a person registered as the beacon, a marker displayed on a screen, a marker in the form of an LED, a marker embedded on a page, or a book, a string of text or data that serves as a marker, a marker embedded or embossed onto a device, and the like.

FIGS. 11A-11C depict various implementations of operation 1002, depicting acquiring a device-based encrypted image that is an image that has previously been encrypted through use of a particular device code associated with an image capture device configured to capture the image, wherein the image includes a representation of a feature of an entity according to embodiments. Referring now to FIG. 11A, operation 1002 may include operation 1102 depicting receiving the device-based encrypted image that is the image that has previously been encrypted through use of the particular device code that is a unique device code and that is associated with an image capture device configured to capture the image, wherein the image includes the representation of the feature of the entity. For example, FIG. 6, e.g., FIG. 6A shows device-based encrypted image that is an image that has previously been encrypted through use of an exclusive device code assigned to a singular image capture device configured to capture the image, wherein the image includes a representation of a feature of an entity receiving module 602 receiving the device-based (e.g., encrypted using an encryption key that is associated with the device) encrypted image (e.g., an image of two people sitting on a park bench, one of whom is a celebrity) that is the image (e.g., the image of two people sitting on a park bench, one of whom is a celebrity) that has previously been encrypted (e.g., through use of asymmetric key encryption) through use of (e.g., one or more of the key pair were derived from) the particular device code (e.g., the particular device code had twenty-seven characters in it, and so the number 27 was used in a pseudorandom number generator to assist in generation of the key pair) that is a unique device code (e.g., the particular device code is not used by any other device, although there may be other devices that have device codes with twenty-seven characters) and that is associated with an image capture device (e.g., a wearable computer, e.g., Google Glass) configured to capture the image (e.g., an image of two people sitting on a park bench, one of whom is a celebrity), wherein the image includes the representation (e.g., the pixels) of the feature (e.g., a frontal face shot) of the entity (e.g., the celebrity sitting on the park bench).

Referring again to FIG. 11A, operation 1102 may include operation 1104 depicting receiving the device-based encrypted image that is the image that has previously been encrypted through use of the particular device code that is associated with the image capture device that captured the image, wherein the image includes the representation of the feature of the entity. For example, FIG. 6, e.g., FIG. 6A, shows device-based encrypted image that is an image that has previously been encrypted through use of an exclusive device code assigned to a singular image capture device that captured the image, wherein the image includes a representation of a feature of an entity receiving module 604 receiving the device-based (e.g., encrypted using an encryption key that is stored on the device) encrypted image (e.g., an image of three people eating hamburgers in a fast food restaurant) that is the image (e.g., the image of three people eating hamburgers in a fast food restaurant) that has previously been encrypted (e.g., was encrypted at the time of capture by the image capture device to prevent the user of the device from immediately posting it to a social networking site) through use of (e.g., the particular device code is a private key and is not shared) the particular device code (e.g., a 1028-bit private decryption key that uses an RSA encryption scheme) that is associated with the image capture device (e.g., a wearable computer, e.g., an EyeTap device) that captured the image (e.g., the image of three people eating hamburgers in a fast food restaurant), wherein the image (e.g., the image of three people eating hamburgers in a fast food restaurant) includes the representation (e.g., a vector-based image representation) of the feature (e.g., a face of a person).

Referring again to FIG. 11A, operation 1104 may include operation 1106 depicting receiving the device-based encrypted image that is an image that has been encrypted through use of a symmetric-key encryption in which the symmetric key is unique and based on the image capture device that captured the image, wherein the image includes pixel data of a face of a famous movie star person. For example, FIG. 6, e.g., FIG. 6A, shows device-based encrypted image that is an image that has previously been encrypted through use of a symmetric key encryption in which the symmetric key is generated using the exclusive device code assigned to a singular image capture device that captured the image as a seed, wherein the image includes a representation of a feature of a celebrity singer receiving module 606 receiving the device-based (e.g., the image was encrypted based on the device that captured the image) encrypted image (e.g., a picture of a man and a woman sitting at a bar) that is an image (e.g., the picture of a man and a woman sitting at a bar) that has been encrypted through use of a symmetric-key encryption (e.g., Twofish, Serpent, Advanced Encryption Standard (AES), Blowfish, CAST5, RC4, 3DES, and the like) in which the symmetric key is unique (e.g., no other devices known to the system at large are known by the server to have the same key, although it is possible that other devices on other systems have the same key) and based on the image capture device (e.g., a wearable computer, e.g., a LifeLog device) that captured the image (e.g., the picture of the man and the woman sitting at a bar), wherein the image includes pixel data of a face of a famous movie star person (e.g., the woman at the bar in the image).

Referring again to FIG. 11A, operation 1002 may include operation 1108 depicting acquiring the device-based encrypted image that is an image that has previously been encrypted through use of a particular device code generated by the image capture device configured to capture the image, wherein the image includes the representation of the feature of the entity. For example, FIG. 6, e.g., FIG. 6A, shows device-based encrypted image that is an image that has previously been encrypted through use of a particular device code generated by the image capture device configured to capture the image, wherein the image includes a representation of a feature of an entity acquiring module 608 acquiring the device-based (e.g., one or more encryption keys are related to a property of the device, e.g., a device code) encrypted image (e.g., an image of five friends on a fishing boat) that is an image (e.g., the image of five friends on a fishing boat) that has previously been encrypted (e.g., was encrypted by the device prior to transmission from the device) through use of a particular device code (e.g., a one-time use encryption/decryption key pair) generated (e.g., created by, either based on user input or through other means, and which could be generated at power-on, at first login, at first power-on, or when the image is captured) by the image capture device (e.g., a hypothetical wearable computer, e.g., an Apple "iGlasses") configured to capture the image (e.g., the image of five friends on a fishing boat), wherein the image (e.g., the image of five friends on a fishing boat) includes the representation of the feature of the entity (e.g., a full body of one of the people on the boat).

Referring now to FIG. 11B, operation 1002 may include operation 1110 depicting acquiring the device-based encrypted image that is the image that has previously been encrypted through use of a particular device code associated with a user of the image capture device configured to capture the image, wherein the image includes the representation of the feature of the entity. For example, FIG. 6, e.g., FIG. 6B, shows device-based encrypted image that is an image that has previously been encrypted through use of a particular device code assigned to an image capture device that is configured to be operated by a particular user, configured to capture the image, wherein the image includes a representation of a feature of an entity acquiring module 610 acquiring the device-based encrypted image (e.g., an image of a family of four at a baseball game) that is the image (e.g., the image of a family of four at a baseball game) that has previously been encrypted (e.g., the image was encrypted when a video from which the image was pulled was taken, at the time that the video stream was converted to individual image files) through use of a particular device code (e.g., an algorithm used to generate random encryption keys using random user input (e.g., the last fifteen words spoken by the user and captured by the device) as seed values) associated with a user (e.g., the person who wears) of the image capture device (e.g., a hypothetical wearable computer, e.g., a Microsoft "KinectVision") configured to capture the image (e.g., the image of a family of four at a baseball game), wherein the image includes the representation of the feature of the entity (e.g., the parents have paid for a privacy beacon to be associated with one of the children that is depicted in the image taken at the baseball game).

Referring again to FIG. 11B, operation 1110 may include operation 1112 depicting acquiring a device-based encrypted image that is an image that has previously been encrypted through use of a particular device code set by the user of the image capture device configured to capture the image, wherein the image includes the representation of the feature of the entity. For example, FIG. 6, e.g., FIG. 6B, shows device-based encrypted image that is an image that has previously been encrypted through use of a particular device code assigned to an image capture device that is selected by a particular user of the image capture device, configured to capture the image, wherein the image includes a representation of a feature of an entity acquiring module 612 acquiring a device-based encrypted image (e.g., a picture of someone waiting for the subway) that is an image (e.g., picture of someone waiting for the subway) that has previously been encrypted through use of a particular device code (e.g., a random-length text string that is used to seed values for an encryption key generator) set by the user of the image capture device (e.g., a wearable computer, e.g., a Nokia SMARTglasses) configured to capture the image (e.g., the picture of someone waiting for the subway), wherein the image includes the representation of the feature (e.g., the face) of the entity (e.g., the person waiting for the subway).

Referring again to FIG. 11B, operation 1110 may include operation 1114 depicting acquiring the device-based encrypted image that is the image that has previously been encrypted through use of a particular device code associated with a login identifier used by the user to login to the capture device, wherein the image includes the representation of the feature of the entity. For example, FIG. 6, e.g., FIG. 6B, shows device-based encrypted image that is an image that has previously been encrypted through use of a particular device code assigned to an image capture device that is related to a login for a particular user of the image capture device, configured to capture the image, wherein the image includes a representation of a feature of an entity acquiring module 614 acquiring the device-based encrypted image (e.g., an image of two people on a sailboat) that is the image (e.g., the image of two people on a sailboat) that has previously been encrypted (e.g., was encrypted prior to acquisition) through use of (e.g., the particular device code was a part of the encryption process, e.g., provided a seed value or a parameter, or a random value for the encryption key generator) a particular device code associated with a login identifier (e.g., a username) used by the user to login to the capture device (e.g., a wearable computer, e.g., Google Glass), wherein the image includes the representation of the feature of the entity (e.g., one of the two people on the sailboat).

Referring again to FIG. 11B, operation 1002 may include operation 1116 depicting acquiring a device-based encrypted image that is an image that has previously been encrypted through use of an encryption key that was generated at least partly based on a unique string assigned to the image capture device configured to capture the image, wherein the image includes the representation of the feature of the entity. For example, FIG. 6, e.g., FIG. 6B, shows device-based encrypted image that is an image that has previously been encrypted through use of a unique string of characters assigned to an image capture device configured to capture the image, wherein the image includes a representation of a feature of an entity acquiring module 616 acquiring a device-based encrypted image (e.g., an image of football practice at a local high school) that is an image that has previously been encrypted through use of an encryption key that was generated at least partly based on a unique string (e.g., a MAC address) assigned to the image capture device (e.g., a hypothetical wearable computer that connects to the internet, e.g., a Samsung "Spectacles") configured to capture the image (e.g., the image of football practice at a local high school), wherein the image includes the representation of the feature (e.g., a full body shot) of the entity (e.g., the star quarterback who is a highly sought-after recruit).

Referring again to FIG. 11B, operation 1002 may include operation 1118 depicting acquiring the device-based encrypted image that is an image that has previously been encrypted through use of a particular device code associated with an image capture device configured to capture the image, from a server that received the image from the image capture device. For example, FIG. 6, e.g., FIG. 6B, shows device-based encrypted image that is an image that has previously been encrypted through use of a particular device code assigned to an image capture device configured to capture the image, wherein the image includes a representation of a feature of an entity acquiring from a server that obtained the image from the image capture device module 618 acquiring the device-based encrypted image (e.g., an image from a webcam on a computer of a person using the computer) that is an image (e.g., the image from a webcam on a computer of a person using the computer) that has previously been encrypted (e.g., was encrypted prior to being widely distributed) through use of a particular device code (e.g., a code assigned to a device by a device manufacturer on the first time the device connects to a particular network, e.g., the Internet) associated with an image capture device (e.g., a webcam on a portable computer, e.g., a laptop computer) configured to capture the image (e.g., the image from the webcam of the person using the computer), from a server that received the image from the image capture device (e.g., the webcam of the laptop).

Referring again to FIG. 11B, operation 1002 may include operation 1120 depicting acquiring the device-based encrypted image that is an image that has previously been encrypted through use of a particular device code associated with an image capture device configured to capture the image, from a server that received the device-based encrypted image from the image capture device. For example, FIG. 6, e.g., FIG. 6B, shows device-based encrypted image that is an image that has previously been encrypted through use of a particular device code assigned to an image capture device configured to capture the image, wherein the image includes a representation of a feature of an entity acquiring from a server that obtained the device-based encrypted image from the image capture device module 620 acquiring the device-based encrypted image (e.g., an image of two people on a date at a restaurant) that is an image (e.g., the image of two people on a date at a restaurant) that has previously been encrypted through use of a particular device code (e.g., a code assigned to the device at manufacture-time) associated with an image capture device (e.g., a wearable computer, e.g., the DigiLens DL40) configured to capture the image (e.g., the image of two people on a data at a restaurant, one of whom is a foreign dignitary and suspected intelligence officer), from a server that received the device-based encrypted image (e.g., the image of two people on a date at a restaurant) from the image capture device (e.g., the wearable computer, e.g., the DigiLens DL40).

Referring now to FIG. 11C, operation 1002 may include operation 1122 depicting acquiring the device-based encrypted image that is the image that has previously been encrypted through use of the particular device code associated with the image capture device configured to capture the image, from a server that determined that the device-based encrypted image has been approved for decryption. For example, FIG. 6, e.g., FIG. 6C, shows device-based encrypted image that is an image that has previously been encrypted through use of a particular device code assigned to an image capture device configured to capture the image, wherein the image includes a representation of a feature of an entity acquiring from a server that determined that the device-based encrypted image has been cleared for decryption module 622 acquiring the device-based encrypted image (e.g., an image of people in a doctor's waiting room) that is the image (e.g., the image of people in a doctor's waiting room) that has previously been encrypted through use of the particular device code (e.g., a string of bytes that are indecipherable to a human) associated with the image capture device (e.g., a wearable computer, e.g., the Oculon Optoelectronics) configured to capture the image (e.g., the image of people in a doctor's waiting room), from a server that determined that the device-based encrypted image has been approved for decryption (e.g., a server that determined that there was no privacy beacon detected in the image, or if there was, to decrypt the image anyway based on a risk/revenue analysis).

FIGS. 12A-12D depict various implementations of operation 1004, depicting decrypting the device-based encrypted image in response to an indication that the image has been approved for decryption, according to embodiments. Referring now to FIG. 12A, operation 1004 may include operation 1202 depicting decrypting the device-based encrypted image through use of a decryption key, in response to an indication that the image has been approved for decryption. For example, FIG. 7, e.g., FIG. 7A, shows decrypted image through decryption that uses a decryption key of the device-based encrypted image in response to a decryption approval generating module 702 decrypting (e.g., reversing an encryption, or rendering the image intelligible) the device-based encrypted image (e.g., an image of five workers in a cubicle farm) through use of a decryption key, in response to an indication (e.g., data received) that the image (e.g., the image of five workers in a cubicle farm) has been approved for decryption).

Referring again to FIG. 12A, operation 1202 may include operation 1204 depicting decrypting the device-based encrypted image through use of a decryption key obtained from the image capture device, in response to an indication that the image has been approved for decryption. For example, FIG. 7, e.g., FIG. 7A, shows decrypted image through decryption of the device-based encrypted image that uses a decryption key obtained from the image capture device in response to a decryption approval generating module 704 decrypting the device-based encrypted image (e.g., an image of three people at a restaurant) through use of a decryption key obtained from the image capture device (e.g., a wearable computer, e.g., a Fujitsu Laser EyeWear), in response to an indication that the image has been approved for decryption (e.g., data that indicates decryption approval).

Referring again to FIG. 12A, operation 1004 may include operation 1206 depicting obtaining a decryption key configured to decrypt the device-based encrypted image. For example, FIG. 7, e.g., FIG. 7A, shows decryption key configured to decrypt the device-based encrypted image acquiring module 706 obtaining a decryption key (e.g., a private key of an asymmetric key pair) configured to decrypt the device-based encrypted image (e.g., an image of three friends at a bar in St. Louis).

Referring again to FIG. 12A, operation 1004 may include operation 1208 depicting applying the obtained decryption key to the device-based encrypted image in response to the indication that the image has been approved for decryption. For example, FIG. 7, e.g., FIG. 7A, shows acquired decryption key configured to decrypt the device-based encrypted image application to the device-based encrypted image in response to the generated decryption approval module 708 applying the obtained decryption key (e.g., the private key of the asymmetric key pair) to the device-based encrypted image (e.g., the image of three friends at a bar in St. Louis) in response to the indication (e.g., the received data) that the image has been approved for decryption.

Referring again to FIG. 12A, operation 1206 may include operation 1210 depicting obtaining the decryption key configured to decrypt the device-based encrypted image from a decryption key repository. For example, FIG. 7, e.g., FIG. 7A, shows decryption key configured to decrypt the device-based encrypted image acquiring from a decryption key storage bank module 710 obtaining the decryption key configured to decrypt the device-based encrypted image (e.g., an image of a father and a son at an amusement park) from a decryption key repository (e.g., a server that hosts the decryption keys that correspond to many different image capture devices that run a particular application, e.g., an image capture application called "instant capture").

Referring again to FIG. 12A, operation 1206 may include operation 1212 depicting obtaining the decryption key configured to decrypt the device-based encrypted image from a management server configured to store one or more particular device codes associated with one or more unique image capture devices. For example, FIG. 7, e.g., FIG. 7A, shows decryption key configured to decrypt the device-based encrypted image acquiring from a management server configured to store one or more particular device codes associated with one or more image capture devices that have at least one property in common module 712 obtaining the decryption key configured to decrypt the device-based encrypted image (e.g., an image of two friends at a Matt & Kim concert) from a management server (e.g., a server that contacts many image capture devices, e.g., of a particular brand, manufacture, or that have a particular software application installed on them) configured to store one or more particular device codes associated with one or more unique image capture devices (e.g., all Google-branded image capture devices, including Google Glass, Google Nexus, etc.).

Referring again to FIG. 12A, operation 1206 may include operation 1214 depicting generating the decryption key configured to decrypt the device-based encrypted image, at least partly based on the particular device code. For example, FIG. 7, e.g., FIG. 7A, shows decryption key configured to decrypt the device-based encrypted image generating at least partly based on the particular device code module 714 generating (e.g., creating, in whole or in part) the decryption key configured to decrypt the device-based encrypted image, at least partly based on the particular device code (e.g., the particular device code is used to retrieve the decryption key from a database, or, in another embodiment, the particular device code is used as a part of a formula that, when applied to the encryption key, generates the decryption key).

Referring again to FIG. 12A, operation 1206 may include operation 1216 depicting obtaining the particular device code. For example, FIG. 7, e.g., FIG. 7A, shows particular device code acquiring module 716 obtaining the particular device code (e.g., the code that is associated with a device that captured an image, e.g., a wearable computer, e.g., a hypothetical Apple "iGlasses").

Referring again to FIG. 12A, operation 1206 may include operation 1218 depicting creating a copy of the decryption key from the particular device code. For example, FIG. 7, e.g., FIG. 7A, shows decryption key generating from the acquired particular device code module 718 creating a copy of the decryption key from the particular device code (e.g., using the particular device code as a key value in a database in which the decryption key can be retrieved).

Referring now to FIG. 12B, operation 1004 may include operation 1220 depicting decrypting the device-based encrypted image in response to receipt of a signal that indicates that the image has been approved for decryption. For example, FIG. 7, e.g., FIG. 7B, shows decrypted image through decryption of the device-based encrypted image in response to a received decryption approval message generating module 720 decrypting the device-based encrypted image (e.g., an image of four people sitting on a park bench) in response to receipt of a signal that indicates that the image (e.g., the image of four people sitting on a park bench) has been approved for decryption (e.g., a remote server has determined that no privacy beacon exists in the image).

Referring again to FIG. 12B, operation 1004 may include operation 1222 depicting decrypting the device-based encrypted image in response to receipt of a message from a determination entity configured to determine whether to decrypt the device-based encrypted image. For example, FIG. 7, e.g., FIG. 7B, shows decrypted image through decryption of the device-based encrypted image in response to a decryption approval message received from a determination server generating module 722 decrypting the device-based encrypted image (e.g., an image of a celebrity eating a particular brand of fast-food hamburger) in response to receipt of a message from a determination entity (e.g., a server configured to value the image and to determine what a potential liability would be for use of the image that contains a privacy beacon, relative to what damages the person associated with the privacy beacon may collect) configured to determine whether to decrypt the device-based encrypted image (e.g., the image of the celebrity eating a particular brand of fast-food hamburger).

Referring again to FIG. 12B, operation 1004 may include operation 1224 depicting decrypting the device-based encrypted image in response to a determination that the image is approved for decryption. For example, FIG. 7, e.g., FIG. 7B, shows decrypted image through decryption of the device-based encrypted image in response to a determination that the device-based encrypted image may be decrypted generating module 724 decrypting the device-based encrypted image (e.g., an image of a celebrity drinking a particular brand of beer) in response to a determination that the image is approved for decryption (e.g., a determination was made that even though a privacy beacon was detected in the image, the privacy beacon led to a retrieval of a terms of service associated with the use of the image of the celebrity, and it was determined that only 10,000 dollars in potential damages would be accrued, and that potential revenue for use of the image was greater than 5,000 dollars).

Referring again to FIG. 12B, operation 1004 may include operation 1226 depicting decrypting the device-based encrypted image in response to an indication that a privacy beacon was not detected with respect to the image. For example, FIG. 7, e.g., FIG. 7B, shows decrypted image through decryption of the device-based encrypted image in response to an indication that a privacy beacon was not detected with respect to the entity in the image generating module 726 decrypting the device-based encrypted image (e.g., an image of a professional basketball team ordering a particular brand of whiskey at a popular club) in response to an indication that a privacy beacon (e.g., a marker that reflects light in a visible spectrum that identifies a particular entity and that can be used to obtain term data that governs use and/or distribution of the image that contains the particular entity) was not detected with respect to the image (e.g., the image of a professional basketball team ordering a particular brand of whiskey at a popular club).

Referring again to FIG. 12B, operation 1226 may include operation 1228 decrypting the device-based encrypted image in response to an indication that a privacy beacon configured to facilitate acquisition of data that regards one or more terms of service for use of the representation of the at least one entity was not detected in the image. For example, FIG. 7, e.g., FIG. 7B, shows decrypted image through decryption of the device-based encrypted image in response to an indication that a privacy beacon that is configured to facilitate retrieval of terms of service data related to a use of the representation of the feature of the entity was absent from the image generating module 728 decrypting the device-based encrypted image (e.g., an image of an awards ceremony picture for a fraternity house) in response to an indication that a privacy beacon (e.g., a marker that reflects light in a nonvisible spectrum) configured to facilitate acquisition of data that regards one or more terms of service (e.g., a liquidated damages clause for posting the image to a social networking site) for use of the representation of the at least one entity (e.g., the image that contains the person) was not detected in the image (e.g., an image of an awards ceremony picture for a fraternity house).

Referring again to FIG. 12B, operation 1226 may include operation 1230 depicting decrypting the device-based encrypted image in response to an indication that a privacy beacon was not optically detected by the image capture device at a time that the image was captured by the image capture device. For example, FIG. 7, e.g., FIG. 7B, shows decrypted image through decryption of the device-based encrypted image in response to an indication that a privacy beacon was not optically detected in the image by the image capture device generating module 730 decrypting the device-based encrypted image (e.g., a picture of a famous person running a stop sign) in response to an indication that a privacy beacon (e.g., a marker that emits light in a particular pattern in a visible spectrum) was not optically detected (e.g., was not detected from the beam of light that was gathered by the image capture device) by the image capture device (e.g., a wearable computer, e.g., a hypothetical Samsung "Spectacles") at a time that the image (e.g., the image of the famous person running the stop sign) was captured by the image capture device (e.g., the wearable computer, e.g., the hypothetical Samsung "Spectacles").

Referring now to FIG. 12C, operation 1004 may include operation 1232 depicting decrypting the device-based encrypted image in response to an indication that a privacy beacon associated with the entity was detected in the image and that the image has been cleared for decryption. For example, FIG. 7, e.g., FIG. 7C, shows decrypted image through decryption of the device-based encrypted image in response to an indication of detection of a privacy beacon and an approval of decryption generating module 732 decrypting the device-based encrypted image (e.g., an image of a person driving in the wrong direction on an exit ramp) in response to an indication that a privacy beacon (e.g., marker that is in the form of a bar code) associated with the entity (e.g., associated with the car that the person was driving) was detected in the image (e.g., the image of the person driving the wrong direction) and that the image has been cleared for decryption (e.g., a determination has been made to allow the image to be decrypted and to allow access to the user that captured the image using the image capture device, if such a user exists (e.g., the user might not, if the image capture device is a security camera, or the "user" might be a corporate or governmental entity, e.g., a police office).

Referring again to FIG. 12C, operation 1232 may include operation 1234 depicting decrypting the device-based encrypted image in response to an indication that the privacy beacon that identifies the entity was detected in the image and that the image has been cleared for decryption. For example, FIG. 7, e.g., FIG. 7C, shows decrypted image through decryption of the device-based encrypted image in response to an indication of detection of a privacy beacon that identifies the entity and an approval of decryption generating module 734 decrypting the device-based encrypted image (e.g., an image of two people shooting pool) in response to an indication that the privacy beacon (e.g., a marker that emits light in a nonvisible spectrum) that identifies the entity (e.g., that identifies it through the pattern of emitted light) was detected in the image Referring again to FIG. 12C, operation 1232 may include operation 1236 depicting decrypting the device-based encrypted image in response to an indication that the privacy beacon associated with the entity was detected in the image, and that the image has been cleared for decryption, said privacy beacon configured to facilitate a notice that regards the entity. For example, FIG. 7, e.g., FIG. 7C, shows decrypted image through decryption of the device-based encrypted image in response to an indication of detection of a privacy beacon that is configured to facilitate a notice that regards the entity and an approval of decryption generating module 736 decrypting the device-based encrypted image (e.g., a satellite picture of everyone in an outdoor football stadium) in response to an indication that the privacy beacon (e.g., a marker that reflects light in a visible spectrum) associated with the entity (e.g., a famous football player on the sideline of the game) was detected in the image (e.g., the satellite picture of everyone in an outdoor football stadium), and that the image has been cleared for decryption (e.g., approval has been given that the image is too far away to fall under the term data that was retrieved using the data obtained from the privacy beacon), said privacy beacon configured to facilitate a notice that regards the entity (e.g., a notice regarding where to obtain the terms of service, e.g., if a privacy beacon is seen that emits light at a particular wavelength, e.g., wavelength A, then retrieve the terms of service that are located at a specific web address).

Referring again to FIG. 12C, operation 1236 may include operation 1238 depicting decrypting the device-based encrypted image in response to the indication that the privacy beacon associated with the entity was detected in the image, and that the image has been cleared for decryption, said privacy beacon configured to facilitate retrieval of a notice that regards the entity. For example, FIG. 7, e.g., FIG. 7C, shows decrypted image through decryption of the device-based encrypted image in response to an indication of detection of a privacy beacon that is configured to facilitate retrieval of a notice that regards the entity and an approval of decryption generating module 738 decrypting the device-based encrypted image in response to the indication that the privacy beacon associated with the entity was detected in the image (e.g., an image of two people having an argument in a public park), and that the image has been cleared for decryption, said privacy beacon configured to facilitate retrieval of a notice that regards the entity (e.g., the person in the image).

Referring again to FIG. 12C, operation 1236 may include operation 1240 depicting decrypting the device-based encrypted image in response to the indication that the privacy beacon associated with the entity was detected in the image, and that the image has been cleared for decryption, said privacy beacon configured to facilitate acquisition of a terms of service that regards the entity. For example, FIG. 7, e.g., FIG. 7C, shows decrypted image through decryption of the device-based encrypted image in response to an indication of detection of a privacy beacon that is configured to facilitate acquisition of one or more terms of service that regard use of the image of the entity and an approval of decryption generating module 740 decrypting the device-based encrypted image (e.g., an image of ten people waiting in line to buy a new piece of electronics) in response to the indication that the privacy beacon (e.g., marker that is tattooed to a person's bicep and is detectable through clothing) associated with the entity (e.g., one of the people in line) was detected in the image (e.g., the image of ten people waiting in line to buy a new piece of electronics), and that the image (e.g., the image of ten people waiting in line to buy a new piece of electronics) has been cleared for decryption (e.g., approval has been given that the person associated with the privacy beacon does not have the resources to pursue legal action to recover the damages specified in the term data retrieved through use of the privacy beacon identification data), said privacy beacon configured to facilitate acquisition of a terms of service that regards the entity (e.g., the privacy beacon contains a binary encoding of a web address where the terms of service may be retrieved).

Referring again to FIG. 12C, operation 1240 may include operation 1242 depicting decrypting the device-based encrypted image in response to the indication that the privacy beacon associated with the entity was detected in the image, and that the image has been cleared for decryption, said privacy beacon configured to facilitate acquisition of a terms of service regarding distribution of the image that contains the representation of the feature of the entity. For example, FIG. 7, e.g., FIG. 7C, shows decrypted image through decryption of the device-based encrypted image in response to an indication of detection of a privacy beacon that is configured to facilitate acquisition of one or more terms of service that regard distribution of the image of the entity and an approval of decryption generating module 742 decrypting the device-based encrypted image (e.g., an image of three male friends playing pickup basketball) in response to the indication that the privacy beacon (e.g., a marker that is in the form of a bar code and painted on a user's head and that reflects light in a nonvisible spectrum) associated with the entity (e.g., one of the basketball players) was detected in the image (e.g., the image of the three male friends playing pickup basketball), and that the image has been cleared for decryption, said privacy beacon configured to facilitate acquisition of a terms of service regarding distribution of the image that contains the representation of the feature of the entity (e.g., one of the basketball players).

Referring again to FIG. 12C, operation 1232 may include operation 1244 depicting decrypting the device-based encrypted image in response to an indication that the privacy beacon associated with the entity was detected in the image and that a decision was made to decrypt the image. For example, FIG. 7, e.g., FIG. 7C, shows decrypted image through decryption of the device-based encrypted image in response to an indication of detection of a privacy beacon and a decision was made to approve decryption of the device-based encrypted image generating module 744 decrypting the device-based encrypted image (e.g., an image of three people sitting on a couch taken by a smart TV in their friend's house) in response to an indication that the privacy beacon (e.g., a marker that is a part of a user's cellular telephone device) associated with the entity was detected in the image (e.g., the image of three people sitting on a couch taken by a smart TV in their friend's house) and that a decision was made to decrypt the image (e.g., the image of three people sitting on a couch taken by a smart TV in their friend's house).

Referring now to FIG. 12D, operation 1232 may include operation 1246 depicting decrypting the device-based encrypted image in response to an indication that the privacy beacon was detected in the image and that the image has been cleared for decryption, said clearance for decryption at least partly based on an entity associated with the detected privacy beacon. For example, FIG. 7, e.g., FIG. 7D, shows decrypted image through decryption of the device-based encrypted image in response to an indication of detection of a privacy beacon and an approval of decryption that is at least partly based on an identity of the entity in the image generating module 746 decrypting the device-based encrypted image (e.g., an image of four teens in a shopping mall) in response to an indication that the privacy beacon (e.g., a marker that is broadcast by a part of a user's cellular telephone device) was detected in the image (e.g. the image of four teens in a shopping mall) and that the image has been cleared for decryption, said clearance for decryption at least partly based on an entity (e.g., one of the teens is famous, and thus there is a chance for profit on the image, which is part of the reason why the image is cleared for decryption) associated with the detected privacy beacon (e.g., the marker that is broadcast by the part of the user's cellular telephone device).

Referring now to FIG. 12E, operation 1004 may include operation 1248 depicting receiving a determination that a privacy beacon associated with the entity was detected in the image. For example, FIG. 7, e.g., FIG. 7E, shows determination that privacy beacon associated with the entity was detected acquiring module 748 receiving a determination that a privacy beacon (e.g., marker mounted in eyeglasses) associated with (e.g., worn by) the entity (e.g., a canoeist) was detected in the image (e.g., a picture of five people whitewater canoeing).

Referring again to FIG. 12E, operation 1004 may include operation 1250 depicting acquiring the indication that the image has been approved for decryption that is at least partly based on data associated with the privacy beacon. For example, FIG. 7, e.g., FIG. 7E, shows indication that the image has been approved for decryption that is at least partly based on data associated with the privacy beacon obtaining module 750 acquiring the indication that the image (e.g., the picture of five people whitewater canoeing) has been approved for decryption that is at least partly based on data associated with the privacy beacon (e.g., a terms of service governing use of the image that are retrieved in part because of the data on the beacon).

Referring again to FIG. 12E, operation 1004 may include operation 1252 depicting decrypting the device-based encrypted image in response to the acquired indication. For example, FIG. 7, e.g., FIG. 7E, shows decrypting the device-based encrypted image in response to the obtained indication 752 decrypting the device-based encrypted image (e.g., the picture of five people whitewater canoeing) in response to the acquired indication (e.g., a packet of data).

Referring again to FIG. 12E, operation 1248 may include operation 1254 depicting receiving a determination that the privacy beacon was detected in the image by the image capture device. For example, FIG. 7, e.g., FIG. 7E, shows determination that was performed by the image capture device and that indicates that privacy beacon associated with the entity was detected acquiring module 754 receiving a determination that the privacy beacon (e.g., a shape of the person's face is registered as the beacon) was detected in the image (e.g., an image of three friends doing shots at a bar) by the image capture device (e.g., a wearable computer, e.g., Google Glass).

Referring again to FIG. 12E, operation 1248 may include operation 1256 depicting receiving metadata that indicates that the privacy beacon was detected in the image. For example, FIG. 7, e.g., FIG. 7E, shows metadata that indicates that the privacy beacon associated with the entity was detected receiving module 756 receiving metadata (e.g., data associated with the image, or packaged in the image) that indicates that the privacy beacon (e.g., a marker mounted in a hat) was detected in the image (e.g., an image of two people on a dinner date at a fancy restaurant).

Referring again to FIG. 12E, operation 1250 may include operation 1258 depicting acquiring the indication that the image has been approved for decryption that is at least partly based on an identity of the entity associated with the privacy beacon. For example, FIG. 7, e.g., FIG. 7E, shows indication that the image has been approved for decryption that is at least partly based on an identity of the entity associated with the privacy beacon obtaining module 758 acquiring the indication that the image (e.g., an image of two people at a baseball game) has been approved for decryption (e.g., there is a flag in the data received that indicates "ok to decrypt") that is at least partly based on an identity (e.g., is one of the people a celebrity, and if so, is their image potentially worth money) of the entity associated with the privacy beacon (e.g., a marker mounted in an article of clothing).

Referring again to FIG. 12E, operation 1258 may include operation 1260 depicting acquiring the indication that the image has been approved for decryption that is at least partly based on an estimated net worth of the entity associated with the privacy beacon. For example, FIG. 7, e.g., FIG. 7E, shows indication that the image has been approved for decryption that is at least partly based on a net worth of the entity associated with the privacy beacon obtaining module 760 acquiring the indication that the image (e.g., an image of a man and a woman at an amusement park) has been approved for decryption (e.g., a receipt of the decryption key is an implied indication that the image has been approved for decryption) that is at least partly based on an estimated net worth of the entity associated with the privacy beacon (e.g., a marker that emits a particular thermal signature).

Referring again to FIG. 12E, operation 1250 may include operation 1262 depicting acquiring the indication that the image has been approved for decryption that is at least partly based on an estimated damage recovery likelihood factor of the entity associated with the privacy beacon. For example, FIG. 7, e.g., FIG. 7E, shows indication that the image has been approved for decryption that is at least partly based on an estimated damage recovery likelihood factor calculated based on an identity of the entity associated with the privacy beacon obtaining module 762 acquiring the indication (e.g., performing a risk/potential damage analysis on to generate the indication, which is in the form of a binary signal that is internally generated) that the image (e.g., a picture of three people at a trendy dance club) has been approved for decryption (e.g., is okay to decrypt) that is at least partly based on an estimated damage recovery likelihood factor (e.g., is the person in the picture likely to sue, or do they have the resources to use) of the entity (e.g., is the entity sophisticated, e.g., college educated, or a lawyer, or do they speak English, or do they have access to the U.S. court system) associated with the privacy beacon (e.g., marker that emits a sonic wave at a frequency that cannot be heard by humans).

Referring again to FIG. 12E, operation 1250 may include operation 1264 depicting acquiring the indication that the image has been approved for decryption that is at least partly based on data retrieved through use of identification data associated with the privacy beacon. For example, FIG. 7, e.g., FIG. 7E, shows indication that the image has been approved for decryption that is at least partly based on an data retrieved at least partially through use of nonunique identification data associated with the privacy beacon obtaining module 764 acquiring the indication that the image (e.g., an image of an athlete drinking a particular orange-flavored sports drink) has been approved for decryption that is at least partly based on data (e.g., a terms of service data governing distribution of pictures of the entity using one or more items that are not associated with the entity's existing sponsorships, e.g., the athlete has an endorsement contract with a different sports drink company) retrieved through use of identification data (e.g., an ID number of the entity that is read from the privacy beacon that is sent to a remote database to retrieve the terms of service) associated with the privacy beacon (e.g., a marker that, when a particular type of electromagnetic wave hits it, emits a particular electromagnetic wave).

Referring again to FIG. 12E, operation 1264 may include operation 1266 depicting acquiring the indication that the image has been approved for decryption that is at least partly based on term data associated with one or more terms of service associated with the entity, wherein said term data is configured to be retrieved through use of identification data associated with the privacy beacon. For example, FIG. 7, e.g., FIG. 7E, shows indication that the image has been approved for decryption that is at least partly based on term data including one or more terms of service retrieved at least partially through use of nonunique identification data associated with the privacy beacon obtaining module 766 acquiring the indication that the image (e.g., an image of two people at a late-night fast food restaurant) has been approved for decryption that is at least partly based on term data associated with one or more terms of service (e.g., a liquidated damages clause for altering, e.g., "photo shopping" the image and distributing it to the Internet) associated with the entity (e.g., one of the people at the fast food restaurant), wherein said term data is configured to be retrieved through use of identification data associated with the privacy beacon (e.g., marker that emits light in a nonvisible spectrum).

Referring now to FIG. 12F, operation 1004 may include operation 1268 depicting acquiring the indication that the image has been approved for decryption that is at least partly based on a valuation of the image. For example, FIG. 7, e.g., FIG. 7F, shows indication that the device-based encrypted image has been approved for decryption at least partly based on a valuation of the image acquiring module 768 acquiring the indication that the image (e.g., an image of two people playing chess in a park in New York City) has been approved for decryption that is at least partly based on a valuation of the image (e.g., the image is deemed to be worth a lot of money because one of the people is Michael Jordan, e.g., a famous basketball player).

Referring again to FIG. 12F, operation 1004 may include operation 1270 depicting decrypting the device-based encrypted image in response to the acquired indication. For example, FIG. 7, e.g., FIG. 7F, shows device-based encrypted image decrypting in response to the acquired indication module 770 decrypting the device-based encrypted image (e.g., the image of Michael Jordan playing chess in a park in New York City) in response to the acquired indication (e.g., the data indicating the value of the image and that it is permitted to decrypt the image).

Referring again to FIG. 12F, operation 1268 may include operation 1272 depicting acquiring the indication that the image has been approved for decryption that is at least partly based on a valuation of the image with regard to the representation of the feature of the entity. For example, FIG. 7, e.g., FIG. 7F, shows indication that the device-based encrypted image has been approved for decryption at least partly based on a valuation of the image that is at least partly based on the representation of the feature of the entity acquiring module 772 acquiring the indication that the image (e.g., an image of a professional basketball player playing pickup basketball with a bunch of amateurs playing at the local YMCA) has been approved for decryption that is at least partly based on a valuation of the image with regard to the representation of the feature of the entity (e.g., the professional basketball player's face can be clearly seen, and the picture has much more value than an ordinary picture of ten guys playing pickup basketball because of the professional player in the picture).

Referring again to FIG. 12F, operation 1268 may include operation 1274 depicting acquiring the indication that the image has been approved for decryption that is at least partly based on a comparison between an estimated value of the image and an estimated amount of damages that may be incurred through distribution of the image. For example, FIG. 7, e.g., FIG. 7F, shows indication that the device-based encrypted image has been approved for decryption at least partly based on a valuation of the image that is at least partly based on a comparison of the valuation of the image and an estimated amount of damages that may be incurred through distribution of the image that contains the representation of the feature of the entity acquiring module 774 acquiring the indication that the image (e.g., an image of a famous married politician out with a woman who is not his wife) has been approved for decryption that is at least partly based on a comparison between an estimated value of the image (e.g., a gossip website might may 100,000 dollars for the image) and an estimated amount of damages (e.g., a terms of service retrieved from the identification data in the privacy beacon) that may be incurred through the distribution (e.g., sale to a gossip website that would then post it) of the image (e.g., the image of a famous married politician out with a woman who is not his wife).

Referring again to FIG. 12F, operation 1274 may include operation 1276 depicting acquiring the indication that the image has been approved for decryption that is at least partly based on a comparison between an estimated value of the image and an estimated amount of damages that may be incurred through distribution of the image, said estimated amount of damages configured to be estimated at least partly based on term data that includes one or more terms of service that govern distribution of one or more images that contain the representation of the feature of the entity. For example, FIG. 7, e.g., FIG. 7F, shows indication that the device-based encrypted image has been approved for decryption at least partly based on a valuation of the image that is at least partly based on a comparison of the valuation of the image and an estimated amount of damages that may be incurred through distribution of the image that is calculated at least partly based on term data that includes one or more terms of service that govern use of the image that contains the representation of the feature of the entity acquiring module 776 acquiring the indication that the image (e.g., an image of a famous actress eating a cheeseburger) has been approved for decryption that is at least partly based on a comparison between an estimated value of the image and an estimated amount of damages that may be incurred through distribution of the image, said estimated amount of damages configured to be estimated at least partly based on term data that includes one or more terms of service that govern distribution of one or more images (e.g., an image of a famous actress eating a cheeseburger) that contain the representation of the feature of the entity (e.g., the face of the actress).

FIGS. 13A-13E depict various implementations of operation 1006, depicting creating a client-based encrypted image through encryption of the decrypted image through use of a particular client code that is associated with a client that is linked to the image capture device configured to capture the image, according to embodiments. Referring now to FIG. 13A, operation 1006 may include operation 1302 depicting creating the client-based encrypted image through encryption of the image that uses a particular client code assigned to the client that is linked to the image capture device configured to capture the image. For example, FIG. 8, e.g., FIG. 8A, shows client-based encrypted image through encryption of the generated decrypted image that uses a particular client code that is assigned to the client by a third party and that is associated with the image capture device configured to capture the image creating module 802 creating the client-based encrypted image (e.g., an image of a famous female celebrity at the beach) through encryption of the image (e.g., the image of the famous female celebrity at the beach) that uses a particular client code (e.g., an identification number associated with the client, e.g., the client's social security number or drivers' license number) assigned to the client (e.g., the person that took the picture) that is linked (e.g., that owns or operates) to the image capture device (e.g., a wearable computer, e.g., Google Glass) configured to capture the image (e.g., the image of the famous female celebrity at the beach).

Referring again to FIG. 13A, operation 1302 may include operation 1304 depicting creating the client-based encrypted image through encryption of the image that uses a unique entity identification assigned to the client that possesses the image capture device configured to capture the image. For example, FIG. 8, e.g., FIG. 8A, shows client-based encrypted image through encryption of the generated decrypted image that uses a unique entity code that is assigned to the client by a third party and that is associated with the image capture device configured to capture the image creating module 804 creating the client-based encrypted image (e.g., an image of three friends at a sports bar) through encryption of the image (e.g., the image of the three friends at the sports bar) that uses a unique client identification (e.g., a unique user login to a service, e.g., an XBOX Live identification, or an Apple Store identification) assigned to the client (e.g., the person that captured the image) that possesses the image capture device (e.g., a wearable computer, e.g., an EyeTap device) configured to capture the image (e.g., the image of three friends at the sports bar).

Referring again to FIG. 13A, operation 1304 may include operation 1306 depicting creating the client-based encrypted image through encryption of the image that uses the unique client identification as a seed for the encryption, said unique client identification configured to be accepted by the image capture device configured to capture the image as a client login. For example, FIG. 8, e.g., FIG. 8A, shows client-based encrypted image through encryption of the generated decrypted image that uses a unique entity code that is assigned to the client by a third party and that is associated with the image capture device configured to capture the image and that is configured to be used as a seed in a generation of an encryption key creating module 806 creating (e.g., taking the decrypted image and encrypting it) the client-based encrypted image (e.g., a surreptitiously-taken image of a person working on their laptop at an airport)

through encryption of the image (e.g., the surreptitiously-taken image of a person working on their laptop at an airport) that uses the unique client identification (e.g., the user's profile login to the device) as a seed for the encryption (e.g., seed data that is used to "randomly" generate a pair of encryption keys), said unique client identification configured to be accepted by the image capture device (e.g., a hypothetical wearable computer, e.g., an Apple "iGlasses") configured to capture the image (e.g., surreptitiously-taken image of a person working on their laptop at an airport) as a client login (e.g., the user logs into the device using the unique client identification, so that if liability does arise from the use of the image, it can be tied both to a device and to a specific user of the device).

Referring again to FIG. 13A, operation 1006 may include operation 1308 depicting creating the client-based encrypted image through an encryption of the decrypted image through use of the particular client code that is unique to the client that is linked to the image capture device configured to capture the image. For example, FIG. 8, e.g., FIG. 8A, shows client-based encrypted image through encryption of the generated decrypted image that uses a unique entity code that is assigned to a client that is an operator of image capture device configured to capture the image creating module 808 creating the client-based encrypted image (e.g., an image of two people at a baseball game) through an encryption of the decrypted image (e.g., the image of the two people at the baseball game) through use (e.g., the particular client code allows generation of the encryption key and the paired decryption key) that is unique to the client (e.g., the person that captured the image) that is linked to the image capture device (e.g., a wearable computer, e.g., a hypothetical Microsoft "KinectVision") configured to capture the image (e.g., the image of the two people at the baseball game).

Referring again to FIG. 13A, operation 1006 may include operation 1310 depicting creating a client-based encrypted image through encryption of the decrypted image through use of a particular client code that is associated with a client that is linked to the image capture device, wherein the particular client code is unique to a particular set of clients, of which the client that is linked to the image capture device is a member. For example, FIG. 8, e.g., FIG. 8A, shows client-based encrypted image through encryption of the generated decrypted image that uses a particular client code that is assigned to a client that is associated with the image capture device configured to capture the image and that is unique to a particular set of clients that includes the client associated with the image capture device creating module 810 creating a client-based encrypted image (e.g., an image of five people playing poker) through encryption of the decrypted image (e.g., the image of five people playing poker) through use of a particular client code (e.g., which is a public key of an RSA encryption scheme) that is associated with a client that is linked to the image capture device (e.g., a wearable computer, e.g., Nokia SMARTglasses), wherein the particular client code (e.g., the public key) is unique to a particular set of clients (e.g., a family, or a company that all have the same device, or an organization), of which the client that is linked to the image capture device (e.g., the wearable computer, e.g., the Nokia SMARTglasses) is a member (e.g., is part of the family/company/organization).

Referring now to FIG. 13B, operation 1006 may include operation 1312 depicting encrypting the decrypted image through use of the particular client code that is associated with the client that is linked to the image capture device configured to capture the image. For example, FIG. 8, e.g., FIG. 8B, shows generated decrypted image that uses a particular client code that is assigned to a client that is associated with the image capture device configured to capture the image encrypting through use of the particular client code module 812 encrypting the decrypted image (e.g., an image of five people at a casino playing blackjack) through use of the particular client code (e.g., a 1024-bit encryption key) that is associated with the client (e.g., that was assigned to the client when the client first logged into the image capture device, without informing the client (since it may work transparently in some embodiments) that is linked to the image capture device (e.g., a wearable computer, e.g., a hypothetical Samsung "Spectacles") configured to capture the image (e.g., the image of five people at the casino playing blackjack).

Referring again to FIG. 13B, operation 1006 may include operation 1314 depicting transmitting the decrypted image to an encryption location. For example, FIG. 8, e.g., FIG. 8B, shows generated decrypted image transmission to an encryption destination facilitating module 814 transmitting the decrypted image (e.g., an image of twenty people around a craps table at a casino) to an encryption location (e.g., a server that stores the particular client codes for various clients and that performs the encryption into the client-based encrypted image).

Referring again to FIG. 13B, operation 1006 may include operation 1316 depicting receiving, from the encryption location, the client-based encrypted image that has been encrypted through use of the particular client code that is associated with the client that is linked to the image capture device configured to capture the image. For example, FIG. 8, e.g., FIG. 8B, shows client-based encrypted image that has been encrypted through use of the particular client code that is assigned to the client that is associated with the image capture device configured to capture the image receiving from the encryption destination module 816 receiving, from the encryption location (e.g., a server that stores the particular client codes for various clients and that performs the encryption into the client-based encrypted image), the client-based encrypted image (e.g., an encrypted version of the image of twenty people around a craps table at a casino) that has been encrypted through use of the particular client code (e.g., a private encryption key that is associated with the client and stored on a secure server that does not give out the codes) that is associated with the client (e.g., the person wearing the wearable computer) that is linked (e.g., has a login for) the image capture device (e.g., a wearable computer, e.g., a DigiLens DL40) configured to capture the image (e.g., the image of twenty people around a craps table at the casino).

Referring again to FIG. 13B, operation 1006 may include operation 1318 depicting creating a client-based encrypted image through encryption of the decrypted image, said encryption of the decrypted image configured to use a key derivation function to the particular client code to arrive at a derived key used to encrypt the decrypted image. For example, FIG. 8, e.g., FIG. 8B, shows client-based encrypted image through encryption of the generated decrypted image that uses a key derivation function to which the particular client code is applied to generate a derived key for encryption of the generated decrypted image creating module 818 creating a client-based encrypted image (e.g., an image of four people at a shopping mall, taken surreptitiously) through encryption of the decrypted image (e.g., image of four people at a shopping mall, taken surreptitiously), said encryption of the decrypted image configured to use a key derivation function (e.g., a function that derives sets of encryption and decryption keys) to the particular client code (e.g., a 32-digit number assigned to the client by the image capture device) to arrive at a derived key used to encrypt the decrypted image (e.g., the image of four people at a shopping mall, taken surreptitiously).

Referring again to FIG. 13B, operation 1006 may include operation 1320 depicting generating a generated encryption key through application of a key derivation function to the particular client code. For example, FIG. 8, e.g., FIG. 8B, shows client-based encryption key generating through application of a key derivation function to the particular client code module 820 generating a generated encryption key through application of a key derivation function (e.g., an HMAC-based Extract-and-Expand Key Derivation Function as specified in RFC 5869, herein incorporated by reference in its entirety) to the particular client code.

Referring again to FIG. 13B, operation 1006 may include operation 1322 depicting encrypting the decrypted image through use of the generated encryption key. For example, FIG. 8, e.g., FIG. 8B, shows generated decrypted image encrypting through use of the generated client-based encryption key module 822 encrypting the decrypted image (e.g., an image of a celebrity acting as a chef in a restaurant promotion) through use of the generated encryption key (e.g., the key generated from the HMAC-based derivation function).

Referring again to FIG. 13B, operation 1006 may include operation 1324 depicting creating a client-based encrypted image through encryption of the decrypted image with the particular client code as the encryption key, said particular client code associated with the client that is linked to the image capture device configured to capture the image. For example, FIG. 8, e.g., FIG. 8B, shows client-based encrypted image through encryption of the generated decrypted image that uses a particular client code that is assigned to a client that is associated with the image capture device configured to capture the image as an encryption key creating module 824 creating a client-based encrypted image through encryption of the decrypted image (e.g., an image of three tourists at the White House taken surreptitiously by a Secret Service agent) with the particular client code (e.g., a public-key in an asymmetric key set) as the encryption key, said particular client code associated with the client (e.g., a Secret Service agent) that is linked to the image capture device (e.g., a wearable computer, e.g., an Oculon Optoelectronics device) configured to capture the image (e.g., an image of three tourists at the White House taken surreptitiously by a Secret Service agent).

Referring now to FIG. 13C, operation 1006 may include operation 1326 depicting creating a client-based encrypted image through encryption of the decrypted image with the particular client code as a seed value for a symmetric key cipher, said particular client code associated with the client that is linked to the image capture device configured to capture the image. For example, FIG. 8, e.g., FIG. 8C, shows client-based encrypted image through encryption of the generated decrypted image that uses a particular client code as a seed value for a symmetric key cipher that is assigned to a client that is associated with the image capture device configured to capture the image creating module 826 creating a client-based encrypted image (e.g., an image of three off-duty police officers at a bar, taken covertly) through encryption of the decrypted image (e.g., image of three off-duty police officers at a bar, taken covertly) with the particular client code (e.g., a 64-bit character string) as a seed value for a symmetric key cipher (e.g., Data Encryption Algorithm ("DEA")), said particular client code (e.g., the 64-bit character string) associated with the client that is linked to the image capture device (e.g., a wearable computer, e.g., Google Glass) configured to capture the image (e.g., the image of three off-duty police officers at a bar, taken covertly).

Referring again to FIG. 13C, operation 1006 may include operation 1328 depicting creating a client-based encrypted image through encryption of the decrypted image through use of the particular client code that is associated with a user of the image capture device configured to capture the image. For example, FIG. 8, e.g., FIG. 8C, shows client-based encrypted image through encryption of the generated decrypted image that uses a particular client code that is assigned to a client that is an operator of the image capture device configured to capture the image creating module 828 creating a client-based encrypted image (e.g., an image of two people at a college football game) through encryption of the decrypted image (e.g., the image of two people at a college football game) through use of the particular client code (e.g., a pass-string that the user inputted the first time the user logged into the image capture device) that is associated with a user of the image capture device (e.g., a wearable computer, e.g., a hypothetical Microsoft "Kinect-Vision") configured to capture the image (e.g., the image of two people at a college football game).

Referring again to FIG. 13C, operation 1328 may include operation 1330 depicting creating the client-based encrypted image through encryption of the decrypted image through use of the particular client code that is associated with the user of the image capture device that captured the image. For example, FIG. 8, e.g., FIG. 8C, shows client-based encrypted image through encryption of the generated decrypted image that uses a particular client code that is assigned to a client that is an operator of the image capture device that captured the image creating module 830 creating the client-based encrypted image (e.g., a picture of friends gathered around a tailgate at a college football game) through encryption of the decrypted image (e.g., picture of friends gathered around a tailgate at a college football game) through use of the particular client code (e.g., a user's email account address) that is associated with the user of the image capture device (e.g., a wearable computer, e.g., a Google Glass device) that captured the image (e.g., the picture of friends gathered around a tailgate at a college football game).

Referring again to FIG. 13C, operation 1006 may include operation 1332 depicting creating the client-based encrypted image through encryption of the decrypted image through use of the particular client code that is assigned to the client that is linked to the image capture device configured to capture the image. For example, FIG. 8, e.g., FIG. 8C, shows client-based encrypted image through encryption of the generated decrypted image that uses a particular client code that is assigned to a client that is associated with the image capture device configured to capture the image by an entity external to the image capture device creating module 832 creating the client-based encrypted image (e.g., a surreptitious image of two people waiting at a bus stop) through encryption of the decrypted image (e.g., the surreptitious image of two people waiting at a bus stop) through use of the particular client code (e.g., the client's full name) that is assigned (e.g., at birth, the assignment does not have to be related to the device) to the client that is linked (e.g., that owns) to the image capture device (e.g., a wearable computer, e.g., an EyeTap device) configured to capture the image (e.g., the surreptitious image of two people waiting at a bus stop).

Referring again to FIG. 13C, operation 1328 may include operation 1334 depicting creating the client-based encrypted image through encryption of the decrypted image through use of the particular client code that is assigned to the client by a developer of one or more components of the image capture device. For example, FIG. 8, e.g., FIG. 8C, shows client-based encrypted image through encryption of the generated decrypted image that uses a particular client code that is assigned to the client that is an operator of the image capture device configured to capture the image that is assigned to the client by a developer of one or more applications present in a memory of the image capture device creating module 830 creating (e.g., applying the encryption to the decrypted image) the client-based encrypted image (e.g., an image of a table of people at a fundraiser for a charitable cause) through encryption of the decrypted image (e.g., the image of a table of people at a fundraiser for a charitable cause) through use of the particular client code (e.g., a login string) that is assigned to the client by a developer of one or more components (e.g., an image capturing component, or the software related to the image capturing component) of the image capture device (e.g., a wearable computer, e.g., a hypothetical Samsung "Spectacles").

Referring again to FIG. 13C, operation 1328 may include operation 1336 depicting creating the client-based encrypted image through encryption of the decrypted image through use of the particular client code that is associated with the client that is linked to the image capture device configured to capture the image, said particular client code assigned at a time that the image is captured. For example, FIG. 8, e.g., FIG. 8C, shows client-based encrypted image through encryption of the generated decrypted image that uses a particular client code that is assigned, at a time that the image is captured, to the client that is associated with the image capture device configured to capture the image creating module 836 creating the client-based encrypted image through encryption of the decrypted image (e.g., an image of two parents at a Little League baseball game) through use of the particular client code that is associated with the client that is linked to the image capture device configured to capture the image, said particular client code assigned at a time that the image (e.g., an image of two parents at a Little League baseball game) is captured.

FIGS. 14A-14C depict various implementations of operation 1008, depicting delivering the client-based encrypted image to a particular location, according to embodiments. Referring now to FIG. 14A, operation 1008 may include operation 1402 depicting transmitting the client-based encrypted image to a particular location. For example, FIG. 9, e.g., FIG. 9A, shows created client-based encrypted image transmitting to a particular destination module 902 transmitting the client-based encrypted image (e.g., an image of two people sitting at a bar) to a particular location (e.g., a device carried by the person that took the picture, but that is not the image capture device, e.g., transmitting the image to a cell phone device with more memory that is carried by the person that was wearing the computer that captured the image).

Referring again to FIG. 14A, operation 1402 may include operation 1404 depicting transmitting the client-based encrypted image to the image capture device. For example, FIG. 9, e.g., FIG. 9A, shows created client-based encrypted image transmitting to the image capture device module 904 transmitting the client-based encrypted image (e.g., an image of a man and a woman having dinner at a restaurant) to the image capture device (e.g., a wearable computer, e.g., a hypothetical Samsung "Spectacles").

Referring again to FIG. 14A, operation 1008 may include operation 1406 depicting delivering the client-based encrypted image to a device that has access to a decryption key configured to decrypt the client-based encrypted image. For example, FIG. 9, e.g., FIG. 9A, shows created client-based encrypted image distributing to a device that has access to a decryption key configured to decrypt the client-based encrypted image destination module 906 delivering the client-based encrypted image (e.g., a picture of five guys playing pickup basketball) to a device (e.g., a home computer that is owned by the client that took the picture using his image capture device, e.g., a wearable computer) that has access to a decryption key configured to decrypt the client-based encrypted image (e.g., the picture of five guys playing pickup basketball).

Referring again to FIG. 14A, operation 1008 may include operation 1408 depicting transmitting the client-based encrypted image to a device that is associated with the client that is linked to the image capture device configured to capture the image. For example, FIG. 9, e.g., FIG. 9A, shows created client-based encrypted image distributing to a device that has a preexisting relationship with the client that is associated with the image capture device module 906 transmitting the client-based encrypted image (e.g., a surreptitious picture of a person reading a newspaper on a park bench) to a device (e.g., a tablet device that is carried by the client's brother) that is associated with (e.g., owned by but not carried by, in this particular example) the client (e.g., the person that captured the image with a wearable computer) that is linked (e.g., that has a login for) the image capture device (e.g., a wearable computer, e.g., a LifeLog device) configured to capture the image (e.g., the surreptitious picture of the person reading the newspaper on the park bench).

Referring again to FIG. 14A, operation 1408 may include operation 1410 depicting transmitting the client-based encrypted image to a home computer that is associated with the client that is linked to the image capture device configured to capture the image. For example, FIG. 9, e.g., FIG. 9A, shows created client-based encrypted image distributing to a home computer device that is under control of the client that is associated with the image capture device module 908 transmitting the client-based encrypted image (e.g., an image of three people in line to buy cupcakes from a cupcake truck) to a home computer that is associated with the client that is linked to the image capture device (e.g., a wearable computer) configured to capture the image (e.g., the image of three people in line to buy cupcakes from a cupcake truck).

Referring again to FIG. 14A, operation 1008 may include operation 1412 depicting locating a device that is associated with the client that is linked to the image capture device. For example, FIG. 9, e.g., FIG. 9A, shows device that has a relationship with the client that is associated with the image capture device locating module 910 locating a device (e.g., a laptop device on a home network) that is associated with (e.g., has been used by) the client (e.g., the person that captured the image) that is linked to the image capture device (e.g., the wearable computer that captured the image, e.g., a hypothetical Apple "iGlasses").

Referring again to FIG. 14A, operation 1008 may include operation 1414 depicting transmitting the client-based encrypted image to the located device. For example, FIG. 9, e.g., FIG. 9A, shows client-based encrypted image transmitting to the located device that has the relationship with the client module 912 transmitting the client-based encrypted image (e.g., an image of four people on a fishing trip) to the located device (e.g., the laptop device on the home network).

Referring again to FIG. 14A, operation 1412 may include operation 1416 depicting locating a device to which the client that is linked to the image capture device is logged in. For example, FIG. 9, e.g., FIG. 9A, shows device to which the client that is associated with the image capture device has previously logged in locating module 916 locating a device (e.g., a different computer device) to which the client that is linked to the image capture device (e.g., the wearable computer, e.g., the Google Glass device) is logged in (e.g., the client is logged into the different computer device on a network).

Referring again to FIG. 14A, operation 1412 may include operation 1418 depicting locating a device that is within a particular proximity to the client. For example, FIG. 9, e.g., FIG. 9A, shows device that is within a particular proximity to the client that is associated with the image capture device locating module 918 locating a device (e.g., a smartphone device) that is within a particular proximity (e.g., three feet) to the client (e.g., the person that captured the image, and it is determined that the closest cell phone to the client is the client's cell phone).

Referring now to FIG. 14B, operation 1008 may include operation 1420 depicting delivering the client-based encrypted image to a shared network drive. For example, FIG. 9, e.g., FIG. 9B, shows created client-based encrypted image distributing to a shared network drive module 920 delivering the client-based encrypted image (e.g., a picture of five people at Thanksgiving dinner) to a shared network drive (e.g., a drive that more than one person has access to, and that can be accessed over a network).

Referring again to FIG. 14B, operation 1008 may include operation 1422 depicting delivering the client-based encrypted image to a location specified by the client. For example, FIG. 9, e.g., FIG. 9B, shows created client-based encrypted image distributing to a client-selected destination module 922 delivering the client-based encrypted image to a location (e.g., a web address, or a particular device, or a directory of the image capture device) specified by the client (e.g., the user tells, e.g., through input, where to send the encrypted image).

Referring again to FIG. 14B, operation 1008 may include operation 1424 depicting transmitting the client-based encrypted image to a social networking server. For example, FIG. 9, e.g., FIG. 9B, shows created client-based encrypted image distributing to a social networking site module 924 transmitting the client-based encrypted image (e.g., a picture of three friends at a birthday party) to a social networking server (e.g., a server controlled by a social network platform, e.g., Instagram).

Referring again to FIG. 14B, operation 1424 may include operation 1426 depicting posting the client-based encrypted image to a social networking account on the social networking server, said social networking account associated with the client that is linked to the image capture device. For example, FIG. 9, e.g., FIG. 9B, shows created client-based encrypted image distributing to a client-associated social networking account of the social networking site module 926 posting the client-based encrypted image (e.g., an image of four girls at cheerleading practice) to a social networking account on the social networking server (e.g., a server under control of a social network site, e.g., Facebook), said social networking account associated with (e.g., used by) the client that is linked to the image capture device (e.g., a wearable computer, e.g., Google Glass).

Referring again to FIG. 14B, operation 1424 may include operation 1428 depicting transmitting the client-based encrypted image to the social networking server that has authorization to decrypt the client-based encrypted image. For example, FIG. 9, e.g., FIG. 9B, shows created client-based encrypted image distributing to a social networking site that has authorization from the client to decrypt the client-based encrypted image module 928 transmitting the client-based encrypted image (e.g., an image of seven people playing poker at a kitchen table) to the social networking server (e.g., a server run by a social network provider, e.g., Twitter) that has authorization to decrypt the client-based encrypted image (e.g., the social network provider has the decryption key and when the picture is transmitted to the Twitter server, the picture is decrypted without further user intervention).

It is noted that, in the foregoing examples, various concrete, real-world examples of terms that appear in the following claims are described. These examples are meant to be exemplary only and non-limiting. Moreover, any example of any term may be combined or added to any example of the same term in a different place, or a different term in a different place, unless context dictates otherwise.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.)

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in an embodiment," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system comprising:
circuitry configured to acquire an encrypted image including a privacy beacon, which encrypted image has previously been encrypted through use of a private code, and which privacy beacon includes a do not capture image instruction and one or more terms of service associated with violation of the do not capture image instruction;
circuitry configured to determine that the encrypted image is approved for decryption in violation of the do not capture instruction at least partly based on the one or more terms of service associated with violation of the do not capture image instruction;
circuitry configured to decrypt the encrypted image into an unencrypted image in violation of the do not capture instruction through use of the private code; and
circuitry configured to release the unencrypted image.

2. The system of claim 1, wherein the private code was generated by an image capture device.

3. The system of claim 1, wherein the encrypted image includes a representation of a feature of an entity.

4. The system of claim 1, wherein the private code is related to a login credential for a user.

5. The system of claim 1, wherein the encrypted image is acquired from a server.

6. The system of claim 1, further comprising:
circuitry configured to obtain an indication that a privacy beacon was not detected with respect to the encrypted image.

7. The system of claim 1, further comprising:
circuitry configured to retrieve the one or more terms of service.

8. The system of claim 1, further comprising:
circuitry configured to obtain an indication of detection of a privacy beacon that identifies an entity.

9. The system of claim 1, further comprising:
circuitry configured to acquire metadata that is associated with the privacy beacon.

10. The system of claim 1, wherein the privacy beacon includes an identity of an entity associated with the privacy beacon.

11. The system of claim 1, wherein the circuitry configured to determine that the encrypted image is approved for decryption in violation of the do not capture instruction at least partly based on the one or more terms of service associated with violation of the do not capture image instruction comprises:
circuitry configured to determine that the encrypted image is approved for decryption in violation of the do not capture instruction at least partly based on a valuation of the unencrypted image, the valuation being based at least partly on an estimated damage recovery likelihood factor.

12. The system of claim 1, further comprising:
circuitry configured to acquire metadata that includes nonunique identification data associated with the privacy beacon.

13. The system of claim 1, further comprising:
circuitry configured to retrieve the one or more terms of service at least partially through use of metadata.

14. The system of claim 1, wherein the circuitry configured to determine that the encrypted image is approved for decryption in violation of the do not capture instruction at least partly based on the one or more terms of service associated with violation of the do not capture image instruction comprises:
circuitry configured to determine that the encrypted image is approved for decryption in violation of the do not capture instruction at least partly based on a valuation of the unencrypted image, the valuation being based at least partly on estimated revenue associated with violation of the do not capture instruction.

15. The system of claim 14, wherein said valuation of the unencrypted image is at least partly based on a comparison of an estimated revenue generated by the unencrypted image and an estimated amount of damages that may be incurred through distribution of the unencrypted image.

16. The system of claim 1, wherein said private code is assigned by a third party.

17. The system of claim 1, wherein said encrypted image has previously been encrypted through application of a key derivation function using the private code.

18. The system of claim 1, wherein said encrypted image has previously been encrypted using the private code as a seed value for a symmetric key cipher.

19. The system of claim 1, wherein said private code is assigned by a developer of one or more applications.

20. The system of claim 1, further comprising:
circuitry configured to perform analysis on the encrypted image to read metadata included with the encrypted image.

21. The system of claim 1, further comprising:
circuitry configured to retrieve the private code usable to decrypt the encrypted image, in response to verification that the encrypted image is approved for decryption.

22. The system of claim 1, wherein the circuitry configured to acquire an encrypted image including a privacy beacon, which encrypted image has previously been encrypted through use of a private code, and which privacy beacon includes a do not capture image instruction and one or more terms of service associated with violation of the do not capture image instruction comprises:
circuitry configured to acquire at a client device an encrypted image including a privacy beacon, which encrypted image has previously been encrypted through use of a private code, and which privacy beacon includes a do not capture image instruction and one or more terms of service associated with violation of the do not capture image instruction circuitry.

23. The system of claim 1, further comprising:
circuitry configured to re-encrypt at least a portion of the unencrypted image based at least partly on content of the unencrypted image.

24. The system of claim 1, wherein the circuitry configured to acquire an encrypted image including a privacy beacon, which encrypted image has previously been encrypted through use of a private code, and which privacy beacon includes a do not capture image instruction and one or more terms of service associated with violation of the do not capture image instruction comprises:
circuitry configured to acquire an encrypted image including a privacy beacon, which encrypted image has previously been encrypted through use of a private code, and which privacy beacon includes a do not capture image instruction and one or more terms of service associated with violation of the do not capture image instruction defined by a class of the privacy beacon.

25. The system of claim 1, wherein the circuitry configured to acquire an encrypted image including a privacy beacon, which encrypted image has previously been encrypted through use of a private code, and which privacy beacon includes a do not capture image instruction and one or more terms of service associated with violation of the do not capture image instruction comprises:

circuitry configured to acquire an encrypted image including a privacy beacon and privacy metadata broadcasted by the privacy beacon, which encrypted image has previously been encrypted through use of a private code, and which privacy metadata includes a do not capture image instruction and one or more terms of service or a pointer to the one or more terms of service associated with violation of the do not capture image instruction.

26. The system of claim 1, further comprising:

circuitry configured to dynamically adjust the one or more terms of service based on content of the encrypted image.

27. The system of claim 1, wherein the circuitry configured to release the unencrypted image comprises:

circuitry configured to release the unencrypted image for one or more of distribution, viewing, processing, posting to social media, cloud storage, remote storage, hard drive storage, manipulation, copying, mailing, user photo album storage, or photo developer usage.

28. A system comprising:

circuitry configured to acquire an encrypted image that has previously been encrypted by an image capture device through use of a unique private code that is assigned to a user associated with the image capture device;

circuitry configured to acquire metadata that is associated with the encrypted image, the metadata including a do not capture image instruction and one or more terms of service or a pointer to one or more terms of service associated with violation of the do not capture image instruction;

circuitry configured to verify that the encrypted image is approved for decryption in violation of the do not capture instruction at least partly based on an estimated damage amount that is based on the one or more terms of service associated with violation of the do not capture image instruction;

circuitry configured to decrypt the encrypted image into an unencrypted image in violation of the do not capture instruction at least partly in response to approval for decryption; and circuitry configured to release the unencrypted image for distribution on a social networking site.

29. A computer process comprising:

acquiring an encrypted image that has previously been encrypted by a device through use of a unique private code that is assigned to the device;

acquiring metadata that is associated with the encrypted image, the metadata including a do not capture image instruction and one or more terms of service or a pointer to one or more terms of service associated with violation of the do not capture image instruction;

verifying that the encrypted image is approved for decryption in violation of the do not capture instruction at least partly based on an estimated damage amount derived from the one or more terms of service associated with violation of the do not capture image instruction;

decrypting the encrypted image into an unencrypted image in violation of the do not capture instruction at least partly in response to approval for decryption; and releasing the unencrypted image for distribution on a social networking site.

* * * * *